US012565155B2

(12) United States Patent
Lee

(10) Patent No.: US 12,565,155 B2
(45) Date of Patent: Mar. 3, 2026

(54) VIBRATION APPARATUS, APPARATUS INCLUDING THE SAME, AND VEHICULAR APPARATUS INCLUDING THE VIBRATION APPARATUS

(71) Applicant: LG Display Co., Ltd., Seoul (KR)

(72) Inventor: Sungtae Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 825 days.

(21) Appl. No.: 17/957,970

(22) Filed: Sep. 30, 2022

(65) Prior Publication Data

US 2023/0121224 A1     Apr. 20, 2023

(30) Foreign Application Priority Data

Oct. 19, 2021     (KR) ........................ 10-2021-0139507

(51) Int. Cl.
| | |
|---|---|
| *B60R 11/02* | (2006.01) |
| *G10K 9/122* | (2006.01) |
| *H04R 17/00* | (2006.01) |
| *B60R 11/00* | (2006.01) |

(52) U.S. Cl.
CPC .......... *B60R 11/0217* (2013.01); *G10K 9/122* (2013.01); *H04R 17/00* (2013.01); *B60R 2011/0026* (2013.01); *H04R 2499/13* (2013.01); *H04R 2499/15* (2013.01)

(58) Field of Classification Search
CPC ........ B60R 11/0217; B60R 2011/0026; H04R 17/00; H04R 2499/13; H04R 2499/15; G10K 9/122
USPC ........................................................ 310/321
See application file for complete search history.

(56) References Cited

U.S. PATENT DOCUMENTS

| | | |
|---|---|---|
| 2003/0053642 A1 | 3/2003 | Bank et al. |
| 2013/0287233 A1 | 10/2013 | Kong et al. |
| 2015/0146892 A1 | 5/2015 | Watanabe |
| 2016/0014525 A1 | 1/2016 | Park et al. |
| 2020/0171542 A1 | 6/2020 | Kho et al. |
| 2021/0304920 A1 | 9/2021 | Ko et al. |
| 2021/0306741 A1 | 9/2021 | Kim et al. |
| 2022/0159369 A1 | 5/2022 | Su et al. |
| 2022/0182744 A1 | 6/2022 | Han et al. |

FOREIGN PATENT DOCUMENTS

| | | |
|---|---|---|
| CN | 103283261 A | 9/2013 |
| CN | 110049415 A | 7/2019 |
| CN | 111246354 A | 6/2020 |

(Continued)

OTHER PUBLICATIONS

Office Action dated Dec. 27, 2023 for Japanese Patent Application No. 2022-161358.

(Continued)

*Primary Examiner* — Emily P Pham
*Assistant Examiner* — Monica Mata
(74) *Attorney, Agent, or Firm* — Morgan, Lewis & Bockius LLP

(57) ABSTRACT

A vibration apparatus, an apparatus including the same, and a vehicular apparatus including the new vibration apparatus are provided having a simplified structure. The vibration apparatus includes a vibration portion, a first electrode portion at a first surface of the vibration portion and configured with a conductive adhesive member, and a second electrode portion at a second surface different from the first surface of the vibration portion.

53 Claims, 32 Drawing Sheets

G-G'

(56)         References Cited

FOREIGN PATENT DOCUMENTS

| | | | |
|---|---|---|---|
| CN | 113467634 | A | 10/2021 |
| DE | 3736900 | A1 | 5/1989 |
| EP | 1846959 | B1 | 10/2007 |
| EP | 2658285 | A1 | 10/2013 |
| JP | 2014-506413 | A | 3/2014 |
| JP | 2021-164165 | A | 10/2021 |
| KR | 20220081879 | A | 6/2022 |
| WO | 97/09842 | A2 | 3/1997 |

OTHER PUBLICATIONS

Extended European Search Report dated Mar. 9, 2023, issued in corresponding European Patent Application No. 22198766.2.
Office Action dated Feb. 13, 2025, issued in corresponding European Patent Application No. 22198766.2.
Office Action dated Jul. 19, 2025, issued in corresponding Chinese Patent Application No. 202211239616.5.

B-B'

C-C'

B-B'

C-C'

C-C'

1311g          1311e     1311c

C-C'

1311g       1311a    1311e      1311c

C-C'

1311g       1311a    1311e     1311c           1311g     194  196

C-C'

F-F'

G-G'

1311a

W1

W2

: 1311a1

: 1311a2

Z

Y X

1311a

W4

W3

: 1311a1

: 1311a2

Z

Y X

1311a

☒ : 1311a1

☐ : 1311a2

1311a

☒ : 1311a1

☐ : 1311a2

1311a

: 1311a1

: 1311a2

1311a

: 1311a1

: 1311a2

H-H'

SD2

1311d     1311b     1311f 1311a    1311e    1311c     1311g

Z

Y ◀─⊙ X

A-A'

IA            AA            IA 401
403

430    410          210 250 230 100   150    GS   330 350 310

400           1311(130)          300

Z

X ◀─⊙ Y

I-I'

520: 520A ~ 520C    530: 530A ~ 530L 550-3: 550M ~ 550P    550-5: 550R ~ 550T

540: 540C

530B: 530B1 ~ 530B3

550-1: 550A ~ 550G

530D: 530D1 ~ 530D4

550-2: 550H ~ 550L

⊚ : WS

530: 530A ~ 530L

530B: 530B1 ~ 530B3

540: 540A ~ 540D

530D: 530D1 ~ 530D4

550-1: 550A ~ 550G

530E: 530E1 ~ 530E3

550-2: 550H ~ 550L

○ : WS 550-3: 550M ~ 550P

530L: 530L1, 530L2     540: 540A, 540B1, 540B2     ◉: WS 550-4: 550Q

VIBRATION APPARATUS, APPARATUS INCLUDING THE SAME, AND VEHICULAR APPARATUS INCLUDING THE VIBRATION APPARATUS

CROSS-REFERENCE TO RELATED APPLICATIONS

This application claims the benefit of the Korean Patent Application No. 10-2021-0139507 filed on Oct. 19, 2021, which is hereby incorporated by reference as if fully set forth herein.

BACKGROUND

Technical Field

The present disclosure relates to a vibration apparatus, an apparatus including the same, and a vehicular apparatus including the vibration apparatus.

Discussion of the Related Art

Apparatuses include a separate speaker or sound apparatus, for providing a sound. When a speaker is provided in an apparatus, a problem occurs where the design and space arrangement of the apparatus are limited due to a space occupied by the speaker.

A speaker applied to apparatuses may be, for example, an actuator including a magnet and a coil. However, when an actuator is applied to an apparatus, there is a drawback where a thickness is thick. Piezoelectric devices for implementing a thin thickness are attracting much attention.

Due to a fragile characteristic, piezoelectric devices are easily damaged due to an external impact, causing a problem where the reliability of sound reproduction is low. Also, when a speaker such as a piezoelectric device is applied to a flexible apparatus, there is a problem where damage occurs due to a fragile characteristic.

The description provided in the background section should not be assumed to be prior art merely because it is mentioned in or associated with the background section. The background section may include information that describes one or more aspects of the subject technology.

SUMMARY

Accordingly, the inventors have recognized problems described above and have performed various experiments for implementing a vibration apparatus which may enhance the quality of sound and a sound pressure level characteristic. Through the various experiments, the inventors have invented a new vibration apparatus, an apparatus including the same, and a vehicular apparatus including the new vibration apparatus, which may enhance the quality of sound and a sound pressure level characteristic.

One or more aspects of the present disclosure is directed to providing a vibration apparatus, an apparatus including the same, and a vehicular apparatus including the new vibration apparatus, which may vibrate an apparatus or a vibration object (or a vibration member) to generate a vibration or a sound and may enhance a sound characteristic and/or a sound pressure level characteristic.

Accordingly, embodiments of the present disclosure are directed to a vibration apparatus, an apparatus including the same, and a vehicular apparatus including the vibration apparatus that substantially obviate one or more of the problems due to limitations and disadvantages of the related art.

An aspect of the present disclosure is to provide a vibration apparatus, an apparatus including the same, and a vehicular apparatus including the new vibration apparatus, which may have a simplified structure.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a vibration apparatus comprises a vibration portion, a first electrode portion at a first surface of the vibration portion and configured with a conductive adhesive member, and a second electrode portion at a second surface different from the first surface of the vibration portion.

In another aspect, a vibration apparatus comprises a vibration portion, a first electrode portion at a first surface of the vibration portion, a second electrode portion at a second surface different from the first surface of the vibration portion, a first cover member on the first electrode portion, a second cover member under the second electrode portion, a first adhesive layer between the first electrode portion and the first cover member, a second adhesive layer between the second electrode portion and the second cover member, and a signal cable applying a signal to each of the first electrode portion and the second electrode portion. At least a portion of the signal cable may be accommodated into one or more of the first adhesive layer and the second adhesive layer.

In another aspect, an apparatus comprises a vibration member and one or more vibration apparatuses connected to the vibration member. The one or more vibration apparatuses include a vibration portion, a first electrode portion at a first surface of the vibration portion and configured with a conductive adhesive member, and a second electrode portion at a second surface different from the first surface of the vibration portion.

In another aspect, an apparatus comprises a vibration member and one or more vibration apparatuses connected to the vibration member. The one or more vibration apparatuses include a vibration portion, a first electrode portion at a first surface of the vibration portion, a second electrode portion at a second surface different from the first surface of the vibration portion, a first cover member on the first electrode portion, a second cover member under the second electrode portion, a first adhesive layer between the first electrode portion and the first cover member, a second adhesive layer between the second electrode portion and the second cover member, and a signal cable configured to apply a signal to each of the first electrode portion and the second electrode portion. At least a portion of the signal cable may be accommodated into one or more of the first adhesive layer and the second adhesive layer.

In another aspect, a vehicular apparatus comprises an exterior material, an interior material covering the exterior material, and one or more vibration generating apparatuses in one or more of the exterior material, the interior material, and a region between the exterior material and the interior material. The one or more vibration apparatuses include a vibration portion, a first electrode portion at a first surface of the vibration portion and configured with a conductive adhesive member, and a second electrode portion at a second surface different from the first surface of the vibration portion. One or more of the interior material and the exterior material are configured to output a sound based on vibrations of the one or more vibration generating apparatuses.

In another aspect, a vehicular apparatus comprises an exterior material, an interior material covering the exterior material, and one or more vibration generating apparatuses in one or more of the exterior material, the interior material, and a region between the exterior material and the interior material. The one or more vibration apparatuses include a vibration portion, a first electrode portion at a first surface of the vibration portion, a second electrode portion at a second surface different from the first surface of the vibration portion, a first cover member on the first electrode portion, a second cover member under the second electrode portion, a first adhesive layer between the first electrode portion and the first cover member, a second adhesive layer between the second electrode portion and the second cover member, and a signal cable configured to apply a signal to each of the first electrode portion and the second electrode portion. At least a portion of the signal cable may be accommodated into one or more of the first adhesive layer and the second adhesive layer. One or more of the interior material and the exterior material are configured to output a sound based on vibrations of the one or more vibration generating apparatuses.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate aspects and embodiments of the disclosure and together with the description serve to explain principles of the disclosure.

Figure 1:
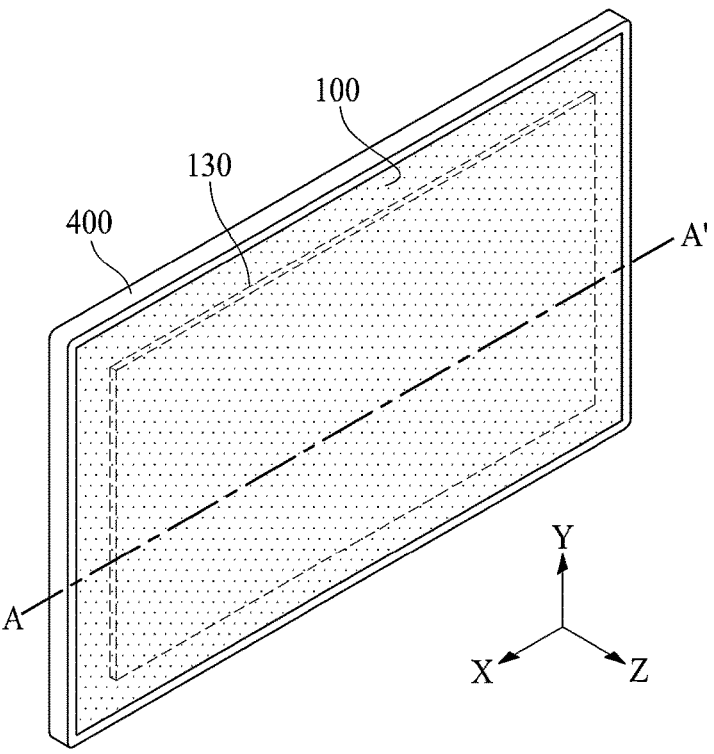
FIG. 1 illustrates an apparatus according to an embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. In the following description, when a detailed description of well-known functions or configurations may unnecessarily obscure aspects of the present disclosure, the detailed description thereof may be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals refer to like elements throughout unless stated otherwise. Names of the respective elements used in the following explanations are selected only for convenience of writing the specification and may be thus different from those used in actual products.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and completely convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, embodiments of the present disclosure are not limited to the illustrated details. Like reference numerals refer to like elements throughout the specification. In the following description, when the detailed description of the relevant known function or configuration is determined to unnecessarily obscure the important point of the present disclosure, the detailed description will be omitted.

When the terms "comprise," "have," and "include," "contain," "constitute," "make up of," "formed of," and the like are used, one or more other elements may be added unless the term, such as "only" is used. The terms of a singular form may include plural forms unless the context clearly indicates otherwise.

In construing an element, the element is construed as including an error range even where no explicit description is provided.

In describing a position relationship, for example, when the position relationship is described using "on," "over,"

"under," "above," "below," "beneath," "near," "close to," or "adjacent to," "beside," "next to," or the like, one or more portions may be arranged between two other portions unless a more limiting term, such as "immediate(ly)," "direct(ly)," or "close(ly)" is used. For example, when a structure is described as being positioned "on," "over," "under," "above," "below," "beneath," "near," "close to," or "adjacent to," "beside," or "next to" another structure, this description should be construed as including a case in which the structures contact each other as well as a case in which a third structure is disposed or interposed therebetween. Furthermore, the terms "front," "rear," "left," "right," "top," "bottom, "downward," "upward," "upper," "lower," and the like refer to an arbitrary frame of reference.

In describing a temporal relationship, for example, when the temporal order is described as "after," "subsequent," "next," "before," "prior to," or the like, a case which is not continuous may be included unless a more limiting term, such as "just," "immediate(ly)," or "direct(ly)" is used.

It will be understood that, although the terms "first," "second," "A," "B," "(a)," "(b)," or the like may be used herein to describe various elements, these elements should not be limited by these terms. These terms are only used to partition one element from another. For example, a first element could be termed a second element, and, similarly, a second element could be termed a first element, without departing from the scope of the present disclosure.

The terms "first horizontal axis direction," "second horizontal axis direction," and "vertical axis direction" should not be interpreted only based on a geometrical relationship in which the respective directions are perpendicular to each other, and may be meant as directions having wider directivities within the range within which the components of the present disclosure can operate functionally.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

The expression of a first element, a second elements "and/or" a third element should be understood as one of the first, second and third elements or as any or all combinations of the first, second and third elements. By way of example, A, B and/or C can refer to only A; only B; only C; any or some combination of A, B, and C; or all of A, B, and C.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

The apparatus according to embodiments the present disclosure may include a display apparatus such as an organic light emitting display (OLED) module or a liquid crystal module (LCM) including a display panel and a driver for driving the display panel. Also, the apparatus may include a set device (or a set apparatus) or a set electronic device such as a notebook computer, a TV, a computer monitor, an equipment apparatus including an automotive apparatus or another type apparatus for vehicles, or a mobile electronic device such as a smartphone or an electronic pad, which is a complete product (or a final product) including an LCM or an OLED module.

Therefore, in the present disclosure, examples of the apparatus may include a display apparatus itself, such as an LCM or an OLED module, and a set device which is a final consumer device or an application product including the LCM or the OLED module.

In some embodiments, an LCM or an OLED module including a display panel and a driver may be referred to as a display apparatus, and an electronic device which is a final product including an LCM or an OLED module may be referred to as a set device. For example, the display apparatus may include a display panel, such as an LCD or an OLED, and a source printed circuit board (PCB) which is a controller for driving the display panel. The set device may further include a set PCB which is a set controller electrically connected to the source PCB to overall control the set device.

A display panel applied to an embodiment of the present disclosure may use all types of display panels such as a liquid crystal display panel, an organic light emitting diode (OLED) display panel, and an electroluminescent display panel, but is not limited to a specific display panel which is vibrated by a sound generating apparatus according to an embodiment of the present disclosure to output a sound. Also, a shape or a size of a display panel applied to a display apparatus according to an embodiment of the present disclosure is not limited.

For example, when the display panel is a liquid crystal display panel, the display panel may include a plurality of gate lines, a plurality of data lines, and a plurality of pixels provided in a plurality of intersection areas defined by the gate lines and the data lines. Also, the display panel may include an array substrate which includes a thin film transistor (TFT) which is a switching element for adjusting a light transmittance of each pixel, an upper substrate which includes a color filter and/or a black matrix, and a liquid crystal layer which is formed between the array substrate and the upper substrate.

When the display panel is an organic light emitting display panel, the display panel may include a plurality of gate lines, a plurality of data lines, and a plurality of pixels respectively provided in a plurality of pixel areas defined by intersections of the gate lines and the data lines. Also, the display panel may include an array substrate including a thin film transistor (TFT) which is an element for selectively applying a voltage to each of the pixels, an organic light emitting device layer on the array substrate, and an encapsulation substrate disposed on the array substrate to cover the organic light emitting device layer. The encapsulation substrate may protect the TFT and the organic light emitting device layer from an external impact and may prevent water or oxygen from penetrating into the organic light emitting device layer. Also, a layer provided on the array substrate may include an inorganic light emitting layer (for example, a nano-sized material layer, a quantum dot, or the like). As another example, the layer provided on the array substrate may include a micro light emitting diode.

The display panel may further include a backing such as a metal plate attached on the display panel. However, the present embodiment is not limited to the metal plate, and the display panel may include another structure (for example, another structure including another material).

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, embodiments of the present disclosure will be described in detail with reference to the accompanying drawings. For convenience of description, a scale of each of elements illustrated in the accompanying drawings differs from a real scale, and thus, is not limited to a scale illustrated in the drawings.

Figure 2:
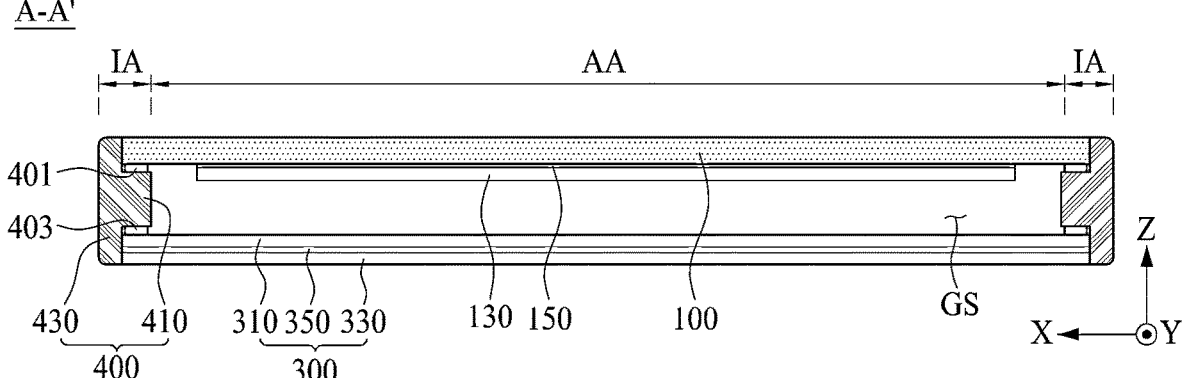
FIG. 2 is a cross-sectional view taken along line A-A' illustrated in FIG. 1.

FIG. 1 illustrates an apparatus according to an embodiment of the present disclosure. FIG. 2 is a cross-sectional view taken along line A-A' of FIG. 1.

Referring to FIGS. 1 and 2, an apparatus according to an embodiment of the present disclosure may include a vibration member and a vibration apparatus 30 which is disposed at a rear surface (or a backside surface) of the vibration member. For example, the vibration member may output a sound based on a vibration of the vibration apparatus 130. For example, the vibration member may be a vibration object, a display panel, a vibration plate, or a front member, but embodiments of the present disclosure are not limited thereto. Hereinafter, an example where a vibration member is a display panel will be described.

The display panel 100 may display an image (for example, an electronic image, a digital image, a still image, or a video image). For example, the display panel 100 may emit light to display an image. The display panel may be a curved display panel or all types of display panels such as a liquid crystal display panel, an organic light emitting display panel, a quantum dot light emitting display panel, a micro light emitting diode display panel, and an electrophoresis display panel. For example, the display panel 100 may be a flexible light emitting display panel, a flexible electrophoresis display panel, a flexible electro-wetting display panel, a flexible micro light emitting diode display panel, or a flexible quantum dot light emitting display panel, but embodiments of the present disclosure are not limited thereto.

The display panel 100 according to an embodiment of the present disclosure may include a display area AA which displays an image based on driving of a plurality of pixels. The display panel 100 may include a non-display area IA which surrounds the display area AA, but embodiments of the present disclosure are not limited thereto.

The display panel 100 according to an embodiment of the present disclosure may include an anode electrode, a cathode electrode, and a light emitting device and may display an image in a type such as a top emission type, a bottom emission type, or a dual emission type, based on a structure of a pixel array layer including a plurality of pixels. In the top emission type, visible light emitted from the pixel array layer may be irradiated a forward direction of a base substrate to allow an image to be displayed, and in the bottom emission type, the visible light emitted from the pixel array layer may be irradiated in a rearward direction of the base substrate to allow an image to be displayed.

The display panel 100 according to an embodiment of the present disclosure may include a pixel array portion disposed on a substrate. The pixel array portion may include a plurality of pixels which display an image based on a signal supplied through each of signal lines. The signal lines may include a gate line, a data line, and a pixel driving power line, but embodiments of the present disclosure are not limited thereto.

Each of the plurality of pixels may include a pixel circuit layer including a driving TFT provided in a pixel area which is configured by a plurality of gate lines and/or a plurality of data lines, an anode electrode electrically connected to the driving TFT, a light emitting device formed on the anode electrode, and a cathode electrode electrically connected to the light emitting device.

The driving TFT may be provided in a transistor region of each pixel area provided in a substrate. The driving TFT may include a gate electrode, a gate insulation layer, a semiconductor layer, a source electrode, and a drain electrode. The semiconductor layer of the driving TFT may include silicon such as amorphous silicon (a-Si), polysilicon (poly-Si), or low temperature poly-Si or may include oxide such as indium-gallium-zinc-oxide (IGZO), but embodiments of the present disclosure are not limited thereto.

The anode electrode (or a pixel electrode) may be provided in an opening region provided in each pixel area and may be electrically connected to the driving TFT.

The light emitting device according to an embodiment of the present disclosure may include an organic light emitting device layer provided on the anode electrode. The organic light emitting device layer may be implemented so that pixels emit light of the same color (for example, white light) or emit lights of different colors (for example, red light, green light, and blue light). The cathode electrode (or a common electrode) may be connected to the organic light emitting device layer provided in each pixel area. For example, the organic light emitting device layer may have a stack structure including two or more structures or a single structure including the same color.

In another embodiment of the present disclosure, the organic light emitting device layer may have a stack structure including two or more structures including one or more different colors for each pixel. Two or more structures including one or more different colors may be configured in one or more of blue, red, yellow-green, and green, or a combination thereof, but embodiments of the present disclosure are not limited thereto. An example of the combination may include blue and red, red and yellow-green, red and green, and red/yellow-green/green, but embodiments of the present disclosure are not limited thereto. Also, regardless of a stack order thereof, the combination may be applied. A stack structure including two or more structures having the same color or one or more different colors may further include a charge generating layer between two or more structures. The charge generating layer may have a PN junction structure and may include an N-type charge generating layer and a P-type charge generating layer.

According to another embodiment of the present disclosure, the light emitting device may include a micro light emitting diode device which is electrically connected to each of the anode electrode and the cathode electrode. The micro light emitting diode device may be a light emitting diode implemented as an integrated circuit (IC) type or a chip type. The micro light emitting diode device may include a first terminal electrically connected to the anode electrode and a second terminal electrically connected to the cathode electrode. The cathode electrode may be connected to the second terminal of the micro light emitting diode device provided in each pixel area.

An encapsulation portion may be formed on the substrate to surround the pixel array portion, and thus, may prevent oxygen or water from penetrating into the light emitting device layer of the pixel array portion. The encapsulation portion according to an embodiment of the present disclosure may be formed in a multi-layer structure where an organic material layer and an inorganic material layer are alternately stacked, but embodiments of the present disclosure are not limited thereto. The inorganic material layer may prevent oxygen or water from penetrating into the light emitting device layer of the pixel array portion. The organic material layer may be formed to have a thickness which is relatively thicker than that of the inorganic material layer, so as to cover particles occurring in a manufacturing process. For example, the encapsulation portion may include a first inorganic layer, an organic layer on the first inorganic layer, and a second inorganic layer on the organic layer. The organic layer may be a particle covering layer, but the terms are not limited thereto. A touch panel may be disposed on the encapsulation portion, or may be disposed at a rear surface of the pixel array portion or in the pixel array portion.

The display panel 100 according to an embodiment of the present disclosure may include a first substrate, a second substrate, and a liquid crystal layer. The first substrate may be an upper substrate or a TFT array substrate. For example, the first substrate may include a pixel array (or a display portion or a display area) including a plurality of pixels provided in a pixel area configured by the plurality of gate lines and/or the plurality of data lines. Each of the plurality of pixels may include a TFT connected to a gate line and/or a data line, a pixel electrode connected to the TFT, and a common electrode which is formed to be adjacent to the pixel electrode and is supplied with a common voltage.

The first substrate may further include a pad portion provided at a first edge (or a non-display portion or a first periphery) thereof and a gate driving circuit provided at a second edge (or a second non-display portion or a second periphery) thereof.

The pad portion may supply the pixel array portion and/or the gate driving circuit with a signal supplied from the outside. For example, the pad portion may include a plurality of data pads connected to the plurality of data lines through a plurality of data link lines and/or a plurality of gate input pads connected to the gate driving circuit through a gate control signal line. For example, a size of the first substrate may be greater than that of the second substrate, but the terms are not limited thereto.

The gate driving circuit may be embedded (or integrated) into the second edge (or a second periphery) of the first substrate so as to be connected to the plurality of gate lines. For example, the gate driving circuit may be implemented with a shift register including a transistor formed by the same process as a TFT provided in the pixel area. According to another embodiment of the present disclosure, the gate driving circuit may not be embedded into the first substrate and may be provided in a panel driving circuit in an IC type.

The second substrate may be a lower substrate or a color filter array substrate. For example, the second substrate may include a pixel pattern (or a pixel definition pattern) capable of including an opening region overlapping the pixel area formed in the first substrate and a color filter layer formed in the opening region. The second substrate may have a size which is less than that of the first substrate, but embodiments of the present disclosure are not limited thereto. The second substrate may overlap the other portion, except the first edge (or the first periphery), of the first substrate. The second substrate may be bonded to the other portion, except the first edge, of the first substrate by a sealant with the liquid crystal layer therebetween.

The liquid crystal layer may be disposed between the first substrate and the second substrate. The liquid crystal layer may include liquid crystal where an alignment direction of liquid crystal molecules is changed based on an electrical field generated by the common voltage and a data voltage applied to the pixel electrode for each pixel.

A second polarization member may be attached on a bottom surface (or a lower surface) of the second substrate and may polarize light which is incident from a backlight and travels to the liquid crystal layer. The first polarization member may be attached on a top surface (or an upper surface) of the first substrate and may polarize light which passes through the first substrate and is discharged to the outside.

The display panel 100 according to an embodiment of the present disclosure may drive the liquid crystal layer with the electrical field which is generated by the common voltage and the data voltage applied to each pixel, thereby displaying an image based on light passing through the liquid crystal layer.

In the display panel 100 according to another embodiment of the present disclosure, the first substrate may be a color filter array substrate, and the second substrate may be a TFT array substrate. For example, the display panel 100 according to another embodiment of the present disclosure may have a form where the display panel 100 according to an embodiment of the present disclosure is vertically reversed. In this case, a pad portion of the display panel 100 according to another embodiment of the present disclosure may be covered by a separate mechanism.

The display panel 100 according to another embodiment of the present disclosure may include a bending portion which is bent or curved to have a certain curvature radius or a curved shape.

The bending portion of the display panel 100 may be implemented at one or more of one edge portion (or one periphery portion) and the other edge portion (or the other periphery portion) of the display panel 100 parallel to each other. The one edge portion (or one periphery portion) and the other edge portion (or the other periphery portion) of the display panel 100 implementing the bending portion may include only the non-display area IA, or may include an edge portion (or a periphery portion) of the display area AA and the non-display area IA. The display panel 100 including a bending portion implemented by bending of the non-display area IA may have a one-side bezel bending structure or a both-side bezel bending structure. Also, the display panel 100 including the edge portion (or the periphery portion) of the display area AA and the bending portion implemented by bending of the non-display area IA may have a one-side active bending structure or a both-side active bending structure.

The vibration apparatus 130 may vibrate the display panel 100 at the rear surface of the display panel 100, and thus, may provide a user with a sound and/or a haptic feedback based on a vibration of the display panel 100. The vibration apparatus 130 may be implemented on a rear surface of the display panel 100 to directly vibrate the display panel 100. For example, the vibration apparatus 130 may be a vibration generating apparatus, a displacement apparatus, a sound apparatus, or a sound generating apparatus, but the terms are not limited thereto.

In an embodiment of the present disclosure, the vibration apparatus 130 may vibrate based on a vibration driving signal synchronized with an image displayed by the display panel 100, thereby vibrating the display panel 100. According to another embodiment of the present disclosure, the vibration apparatus 130 may vibrate based on a haptic feedback signal (or a tactile feedback signal) synchronized with a user touch applied to a touch panel (or a touch sensor layer) which is disposed on the display panel 100 or embedded into the display panel 100, and thus, may vibrate the display panel 100. Accordingly, the display panel 100 may vibrate based on a vibration of the vibration apparatus 130 to provide a user (or a viewer) with one or more of a sound and a haptic feedback.

The vibration apparatus 130 according to an embodiment of the present disclosure may be implemented to have a size corresponding to the display area AA of the display panel 100. A size of the vibration apparatus 130 may be 0.9 to 1.1 times a size of the display area AA, but embodiments of the present disclosure are not limited thereto. For example, a size of the vibration apparatus 130 may be the same as or smaller than the size of the display area AA. For example, a size of the vibration apparatus 130 may be the same as or approximately same as the display area AA of the display panel 100, and thus, the vibration apparatus 130 may cover a most region of the display panel 100 and a vibration generated by the vibration apparatus 130 may vibrate a whole portion of the display panel 100, and thus, localization of a sound may be high, and satisfaction of a user may be improved. Also, a contact area (or panel coverage) between the display panel 100 and the vibration apparatus 130 may increase, and thus, a vibration region of the display panel 100 may increase, thereby improving a sound of a middle-low-pitched sound band generated based on a vibration of the display panel 100. Also, a vibration apparatus 130 applied to a large-sized display apparatus may vibrate the entire display panel 100 having a large size (or a large area), and thus, localization of a sound based on a vibration of the display panel 100 may be further enhanced, thereby realizing an improved sound effect. Therefore, the vibration apparatus 130 according to an embodiment of the present disclosure may be on the rear surface of the display panel 100 to sufficiently vibrate the display panel 100 in a vertical (or front-to-rear) direction, thereby outputting a desired sound to a forward region in front of the apparatus or the display apparatus. For example, the vibration apparatus 130 according to an embodiment of the present disclosure may be disposed at the rear surface of the display panel 100 to sufficiently vibrate the display panel 100 in a vertical (or front-to-rear) direction with respect to a first direction (X) of the display panel 100, thereby outputting a desired sound to a forward region in front of the apparatus or the display apparatus.

The vibration apparatus 130 according to an embodiment of the present disclosure may be implemented as a film type. Because the vibration apparatus 130 is implemented as a film type, the vibration apparatus 130 may have a thickness which is thinner than the display panel 100, thereby reducing or minimizing an increase in thickness of the apparatus caused by the arrangement of the vibration apparatus 130. For example, the vibration apparatus 130 may be referred to as a sound generating module, a sound generating apparatus, a vibration generating apparatus, a displacement apparatus, a sound apparatus, a film actuator, a film type piezoelectric composite actuator, a film speaker, a film type piezoelectric speaker, or a film type piezoelectric composite speaker, which uses the display panel 100 as a vibration plate or a sound vibration plate, but the terms are not limited thereto.

According to another embodiment of the present disclosure, the vibration apparatus 130 may not be disposed at the rear surface of the display panel 100 and may be applied to a non-display panel instead of the display panel. For example, the non-display panel may be one or more of wood, plastic, glass, metal, cloth, fiber, rubber, paper, leather, an interior material of a vehicle, an indoor ceiling of a building, and an interior material of an aircraft, but embodiments of the present disclosure are not limited thereto. In this case, the non-display panel may be applied as a vibration plate, and the vibration apparatus 130 may vibrate the non-display panel to output a sound.

For example, an apparatus according to an embodiment of the present disclosure may include a vibration member (or a vibration object) and the vibration apparatus 130 disposed in the vibration member. For example, the vibration member may include a display panel including a pixel displaying an image, or may include a non-display panel. For example, the vibration member may include a display panel including a pixel displaying an image, or may be one or more of wood, plastic, glass, metal, cloth, fiber, rubber, paper, leather, mirror, an interior material of a vehicle, a glass window of a vehicle, an indoor ceiling of a building, a glass window of a building, an interior material of a building, an interior material of an aircraft, and a glass window of an aircraft, but embodiments of the present disclosure are not limited thereto. For example, the vibration member may include one or more of a display panel including a pixel displaying an image, a screen panel on which an image is projected from a display apparatus, a lighting panel, a signage panel, a vehicular interior material, a vehicular glass window, a vehicular exterior material, a ceiling material of a building, an interior material of a building, a glass window of a building, an interior material of an aircraft, a glass window of an aircraft, and mirror, but embodiments of the present disclosure are not limited thereto. For example, the non-display panel may be a light emitting diode lighting panel (or apparatus), an organic light emitting diode lighting panel (or apparatus), or an inorganic light emitting diode lighting panel (or apparatus), but embodiments of the present disclosure are not limited thereto. For example, the vibration member may include a display panel including a pixel displaying an image, or may be one or more of a light emitting diode lighting panel (or apparatus), an organic light emitting diode lighting panel (or apparatus), or an inorganic light emitting diode lighting panel (or apparatus), but embodiments of the present disclosure are not limited thereto.

According to another embodiment of the present disclosure, the vibration member may include a plate. The plate may include a metal material, or may include a single nonmetal material or a complex nonmetal material including one or more of metal, wood, plastic, glass, cloth, fiber, rubber, paper, mirror, and leather, but embodiments of the present disclosure are not limited thereto. According to another embodiment of the present disclosure, the vibration member may include a plate. The plate may include one or more of metal, wood, plastic, glass, cloth, fiber, rubber, paper, mirror, and leather, but embodiments of the present disclosure are not limited thereto. For example, the paper may be a cone paper for speakers. For example, the cone paper may be pulp or foam plastic, but embodiments of the present disclosure are not limited thereto. For example, the vibration member may be a vibration object, a vibration plate, or a front member, but embodiments of the present disclosure are not limited thereto.

The vibration apparatus 130 according to an embodiment of the present disclosure may be disposed at the rear surface of the display panel 100 to overlap the display area of the display panel 100. For example, the vibration apparatus 130 may overlap a display area, corresponding to half or more, of the display area of the display panel 100. According to another embodiment of the present disclosure, the vibration apparatus 130 may overlap the whole display area of the display panel 100.

When an alternating current (AC) voltage is applied, the vibration apparatus 130 according to an embodiment of the present disclosure may alternately contract and expand based on an inverse piezoelectric effect and may vibrate the display panel 100 based on a vibration. According to an embodiment of the present disclosure, the vibration apparatus 130 may vibrate based on a voice signal synchronized with an image displayed by the display panel to vibrate the display panel 100. According to another embodiment of the present disclosure, the vibration apparatus 130 may vibrate based on a haptic feedback signal (or a tactile feedback signal) synchronized with a user touch applied to a touch panel (or a touch sensor layer) which is disposed on the display panel 100 or embedded into the display panel 100, and thus, may vibrate the display panel 100. Accordingly, the display panel 100 may vibrate based on a vibration of the vibration apparatus 130 to provide a user (or a viewer) with one or more of a sound and a haptic feedback.

Therefore, the apparatus according to an embodiment of the present disclosure may output a sound, generated by a vibration of the display panel 100 based on a vibration of the vibration apparatus 130, in a forward direction of the display panel 100. Also, the apparatus according to an embodiment of the present disclosure may vibrate a large region of the display panel 100 by the vibration apparatus 130 of a film type, thereby more enhancing a sense of sound localization and a sound pressure level characteristic of a sound based on a vibration of the display panel 100.

The apparatus according to an embodiment of the present disclosure may further include a connection member 150 (or a first connection member) between the vibration apparatus 130 and the display panel 100.

For example, the connection member 150 may be disposed between the vibration apparatus 130 and the rear surface of the display panel 100, and thus, may connect or couple the vibration apparatus 130 to the rear surface of the display panel 100. For example, the vibration apparatus 130 may be connected or coupled to the rear surface of the display panel 100 by the connection member 150, and thus, may be supported by or disposed at the rear surface of the display panel 100. For example, the vibration apparatus 130 may be disposed at the rear surface of the display panel 100 by the connection member 150.

The connection member 150 according to an embodiment of the present disclosure may include a material including an adhesive layer which is good in adhesive force or attaching force with respect to each of the rear surface of the display panel 100 and the vibration apparatus 130. For example, the connection member 150 may include a foam pad, a double-sided tape, or an adhesive, but embodiments of the present disclosure are not limited thereto. For example, an adhesive layer of the connection member 150 may include epoxy, acryl, silicone, or urethane, but embodiments of the present disclosure are not limited thereto. For example, the adhesive layer of the connection member 150 may include an acryl-based material, having a characteristic where an adhesive force is relatively good and hardness is high, among acryl and urethane. Accordingly, a vibration of the vibration apparatus 130 may be well transferred to the display panel 100.

The adhesive layer of the connection member 150 may further include an additive such as a tackifier, a wax component, or an anti-oxidation agent, but embodiments of the present disclosure are not limited thereto. The additive may prevent the connection member 150 from being detached (stripped) from the display panel 100 by a vibration of the vibration apparatus 130. For example, the tackifier may be rosin derivative, the wax component may be paraffin wax, and the anti-oxidation agent may be a phenol-based anti-oxidation agent such as thioester, but embodiments of the present disclosure are not limited thereto.

According to another embodiment of the present disclosure, the connection member 150 may further include a hollow portion provided between the vibration apparatus 130 and the display panel 100. The hollow portion of the connection member 150 may provide an air gap between the vibration apparatus 130 and the display panel 100. Based on the air gap, a sound wave (or a sound pressure level) based on a vibration of the vibration apparatus 130 may not be dispersed by the connection member 150 and may concentrate on the display panel 100, and thus, the loss of a vibration based on the connection member 150 may be minimized, thereby increasing a sound pressure level characteristic and/or a sound characteristic of a sound generated based on a vibration of the display panel 100.

The apparatus according to an embodiment of the present disclosure may further include a supporting member 300 which is disposed at the rear surface (or a backside surface) of the display panel 100.

The supporting member 300 may cover a rear surface of the display panel 100. For example, the supporting member 300 may cover a whole rear surface of the display panel 100 with a gap space GS therebetween. For example, the supporting member 300 may include at least one or more among a glass material, a metal material, and a plastic material. For example, the supporting member 300 may be a rear surface structure, a set structure, a supporting structure, a supporting cover, a rear member, a case, or a housing, but embodiments of the present disclosure are not limited thereto. For example, the supporting member 300 may be referred to as the other term such as a cover bottom, a plate bottom, a back cover, a base frame, a metal frame, a metal chassis, a chassis base, or m-chassis. For example, the supporting member 300 may be implemented as an arbitrary type frame or a plate-shaped structure disposed at a rear surface of the display panel 100.

A periphery or a sharp corner of the supporting member 300 may have an inclined shape or a curved shape through a chamfer process or a corner rounding process. For example, the supporting member 300 of the glass material may be sapphire glass. As another embodiment of the present disclosure, the supporting member 300 of the metal material may include one or more of aluminum (Al), an Al alloy, a magnesium (Mg), a Mg alloy, and an iron (Fe)-nickel (Ni) alloy.

The supporting member 300 according to an embodiment of the present disclosure may include a first supporting member 310 and a second supporting member 330.

The first supporting member 310 may be disposed between the second supporting member 330 and the rear surface of the display panel or the display panel 100. For example, the first supporting member 310 may be disposed between a front edge (or a front periphery) of the second supporting member 330 and a rear edge (or a rear periphery) of the display panel or the display panel 100. The first supporting member 310 may support one or more of an edge portion (or a periphery portion) of the second supporting member 330 and an edge portion (or a periphery portion) of the display panel or the display panel 100. In another embodiment of the present disclosure, the first supporting member 310 may cover the rear surface of the display panel or the display panel 100. For example, the first supporting member 310 may cover the whole rear surface of the display panel or the display panel 100. For example, the first supporting member 310 may be a member which covers the whole rear surface of the display panel or the display panel 100. For example, the first supporting member 310 may include one or more of a glass material, a metal material, and a plastic material. For example, the first supporting member 310 may be an inner plate, a first rear structure, a first supporting structure, a first supporting cover, a first back cover, a first rear member, an internal plate, or an internal cover, but the terms are not limited thereto. For example, the first supporting member 310 may be omitted.

The first supporting member 310 may be apart from the rearmost surface of the display panel 100 with the gap space GS therebetween, or may be apart from the vibration apparatus 130. For example, the gap space GS may be referred to as an air gap, a vibration space, and a sound sounding box, but the terms are not limited thereto.

The second supporting member 330 may be disposed at a rear surface of the first supporting member 310. The second supporting member 330 may cover the whole rear surface of the display panel or the display panel 100. For example, the second supporting member 330 may include one or more of a glass material, a metal material, and a plastic material. For example, the second supporting member 330 may be an outer plate, a rear plate, a back plate, a back cover, a rear cover, a second rear structure, a second supporting structure, a second supporting cover, a second back cover, a second rear member, an external plate, or an external cover, but the terms are not limited thereto.

The supporting member 300 according to an embodiment of the present disclosure may further include a connection member 350 (or a second connection member).

The connection member 350 may be disposed between the first supporting member 310 and the second supporting member 330. For example, the first supporting member 310 may be coupled or connected to the second supporting member 330 by the connection member 350. For example, the connection member 350 may be an adhesive resin, a double-sided tape, or a double-sided foam tape, but embodiments of the present disclosure are not limited thereto. For example, the connection member 350 may have elasticity for impact absorption, but embodiments of the present disclosure are not limited thereto. For example, the connection member 350 may be disposed in a whole region between the first supporting member 310 and the second supporting member 330. In another embodiment of the present disclosure, the connection member 350 may be formed in a mesh structure including an air gap between the first supporting member 310 and the second supporting member 330.

The apparatus according to an embodiment of the present disclosure may further include a middle frame 400. The middle frame 400 may be disposed between a rear edge (or a rear periphery) of the display panel or the display panel 100 and a front edge (or a front periphery) of the supporting member 300. The middle frame 400 may support one or more of an edge portion (or a periphery portion) of the display panel and an edge portion (or a periphery portion) of the supporting member. The middle frame 400 may surround one or more of lateral surfaces of each of the display panel and the supporting member 300. The middle frame 400 may provide the air space GS between the display panel and the supporting member 300. The middle frame 400 may be referred to as a middle cabinet, a middle cover, a middle chassis, a connection member, a frame, a frame member, a middle member, or a lateral cover member, but the terms are not limited thereto.

The middle frame 400 according to an embodiment of the present disclosure may include a first supporting portion 410 and a second supporting portion 430. For example, the first supporting portion 410 may be a supporting portion, but the terms are not limited thereto. For example, the second supporting portion 430 may be a sidewall portion, but the terms are not limited thereto.

The first supporting portion 410 may be disposed between a rear edge (or a rear periphery) of the display panel or the display panel 100 and a front edge (or a front periphery) of the supporting member 300, and thus, may provide a gap space GS between the display panel or the display panel 100 and the supporting member 300. A front surface of the first supporting portion 410 may be coupled or connected to the rear edge (or the rear periphery) of the display panel or the display panel 100 by a first adhesive member 401. A rear surface of the first supporting portion 410 may be coupled or connected to the front edge (or the front periphery) of the supporting member 300 by a second adhesive member 403. For example, the first supporting portion 410 may have a single picture frame structure having a tetragonal shape or a picture frame structure having a plurality of division bar forms, but embodiments of the present disclosure are not limited thereto.

The second supporting portion 430 may be disposed in parallel with a thickness direction Z of the apparatus. For example, the second supporting portion 430 may be vertically coupled to an outer surface of the first supporting portion 410 in parallel with the thickness direction Z of the apparatus. The second supporting portion 430 may surround one or more of an outer surface of the display panel 100 and an outer surface of the supporting member 300, thereby protecting the outer surface of each of the display panel 100 and the supporting member 300. The first supporting portion 410 may protrude from an inner surface of the second supporting portion 430 to the gap space GS between the display panel 100 and the supporting member 300.

The apparatus according to an embodiment of the present disclosure may include a panel connection member (or a connection member) instead of the middle frame 400.

The panel connection member may be disposed between the rear edge (or the rear periphery) of the display panel 100 and the front edge (or the front periphery) of the supporting member 300, and thus, may provide a gap space GS between the display panel 100 and the supporting member 300. The panel connection member may be disposed between the rear edge (or the rear periphery) of the display panel 100 and the front edge (or the front periphery) of the supporting member 300 and may attach the display panel 100 on the supporting member 300. For example, the panel connection member may be implemented with a double-sided tape, a single-sided tape, or a double-sided foam tape, but embodiments of the present disclosure are not limited thereto. For example, an adhesive layer of the panel connection member may include epoxy, acryl, silicone, or urethane, but embodiments of the present disclosure are not limited thereto. For example, in order to minimize the transfer of a vibration of the display panel 100 to the supporting member 300, the adhesive layer of the panel connection member may include an acryl-based material, having a characteristic where an adhesive force is relatively good and hardness is high, among acryl and urethane. Accordingly, a vibration of the display panel 500 transferred to the supporting member 300 may be minimized.

In the apparatus according to an embodiment of the present disclosure, in a case where the panel connection member is provided instead of the middle frame 400, the supporting member 300 may include a bending sidewall which is bent from one side (or an end) of the second supporting member 330 to surround one or more of outer surfaces (or outer sidewalls) of the first supporting member 310, the panel connection member, and the display panel 100. The bending sidewall according to an embodiment of the present disclosure may have a single sidewall structure or a hemming structure. The hemming structure may be a structure where an end portion of an arbitrary member is bent in a curved shape and overlaps or is apart from another portion in parallel. For example, in order to enhance a sense of beauty of a lateral surface in design, the bending sidewall may include a first bending sidewall which is bent from one side (or an end) of the second supporting member 330 and a second bending sidewall which is bent from the first bending sidewall to a region between the first bending sidewall and an outer surface of the display panel 100. The second bending sidewall may contact an inner surface of the first bending sidewall, or may be apart from an inner surface of the first bending sidewall to reduce the transfer of an external impact to the outer surface of the display panel 100 in a lateral direction. Accordingly, the second bending sidewall may reduce that the outer surface of the display panel 100 contacts the inner surface of the first bending sidewall or an external impact in a lateral direction is transferred to the outer surface of the display panel 100.

According to another embodiment of the present disclosure, the middle frame 400 may be omitted. Instead of the middle frame 400, a panel connection member or an adhesive may be provided. According to another embodiment of the present disclosure, instead of the middle frame 400, a partition may be provided.

Figure 3:
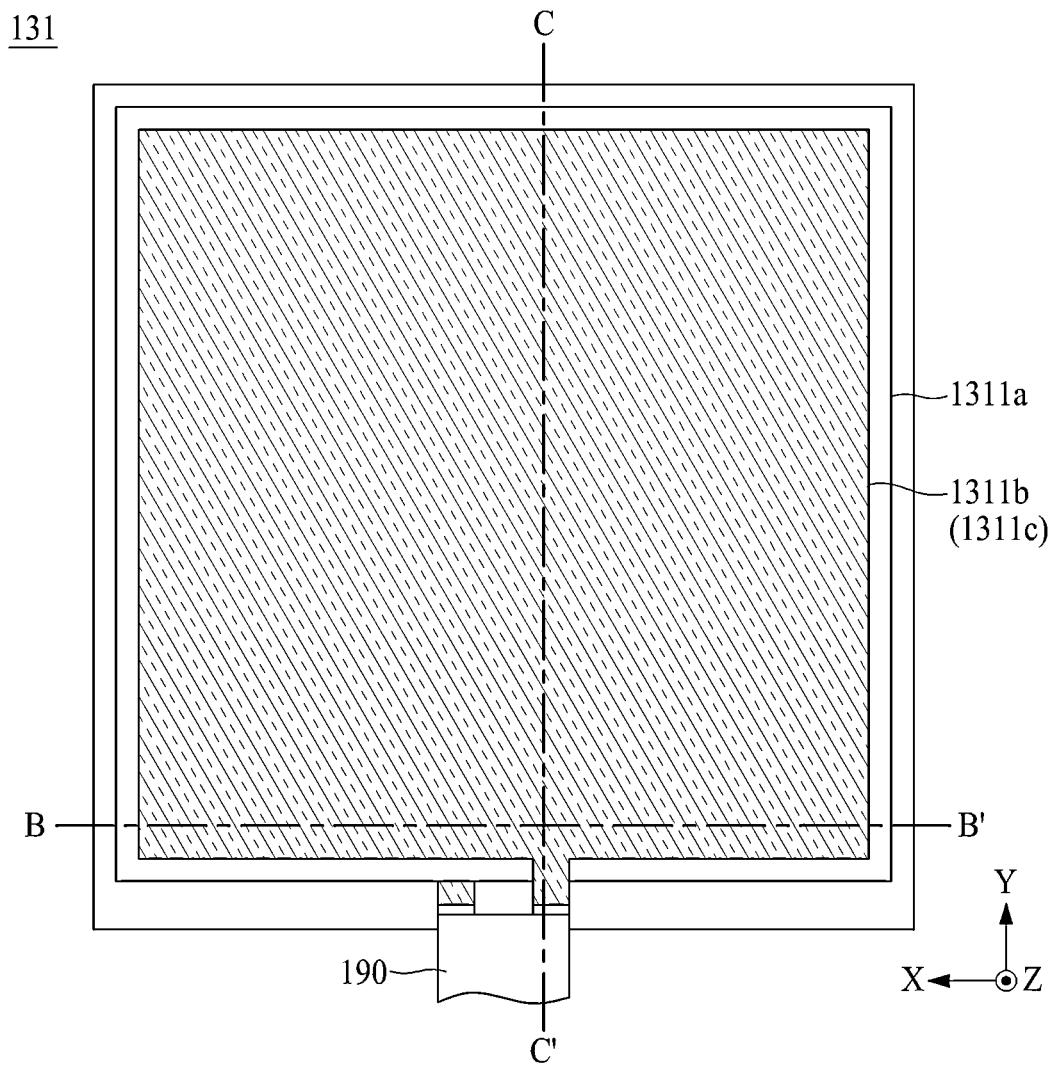
FIG. 3 illustrates a vibration device according to an embodiment of the present disclosure.
Figure 4A:
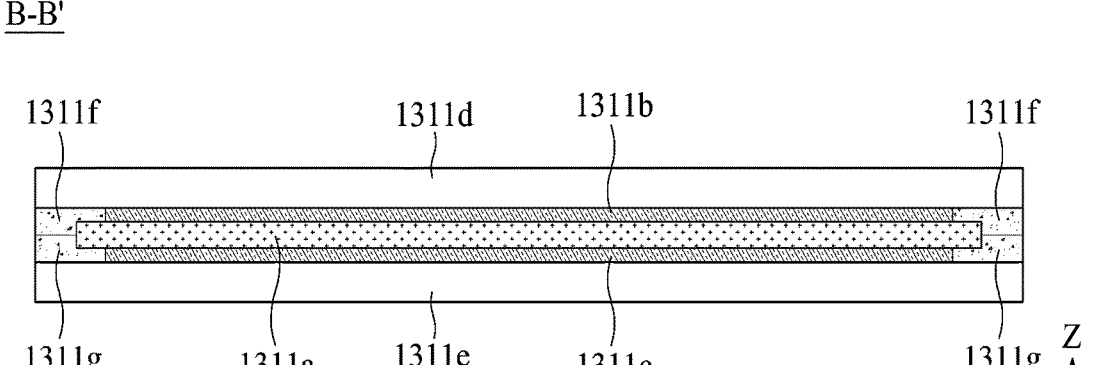
FIG. 4A is a cross-sectional view taken along line B-B' illustrated in FIG. 3.
Figure 4B:
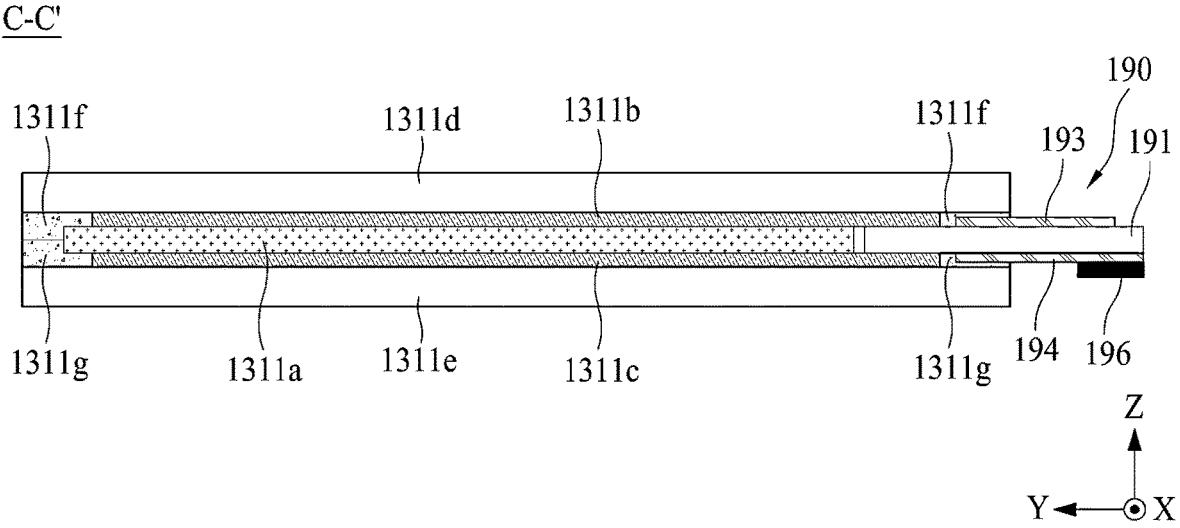
FIG. 4B is a cross-sectional view taken along line C-C' illustrated in FIG. 3.
Figure 5A:
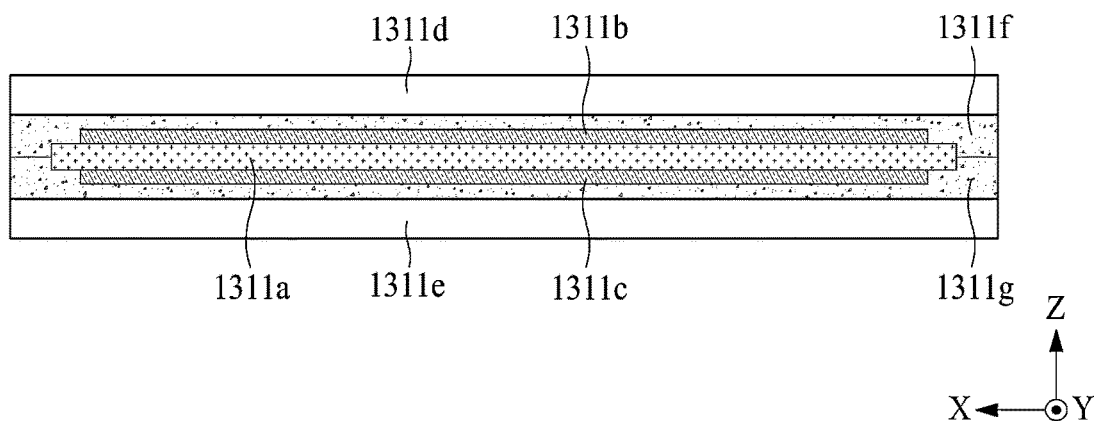
FIG. 5A is another cross-sectional view taken along line B-B' illustrated in FIG. 3.
Figure 5B:
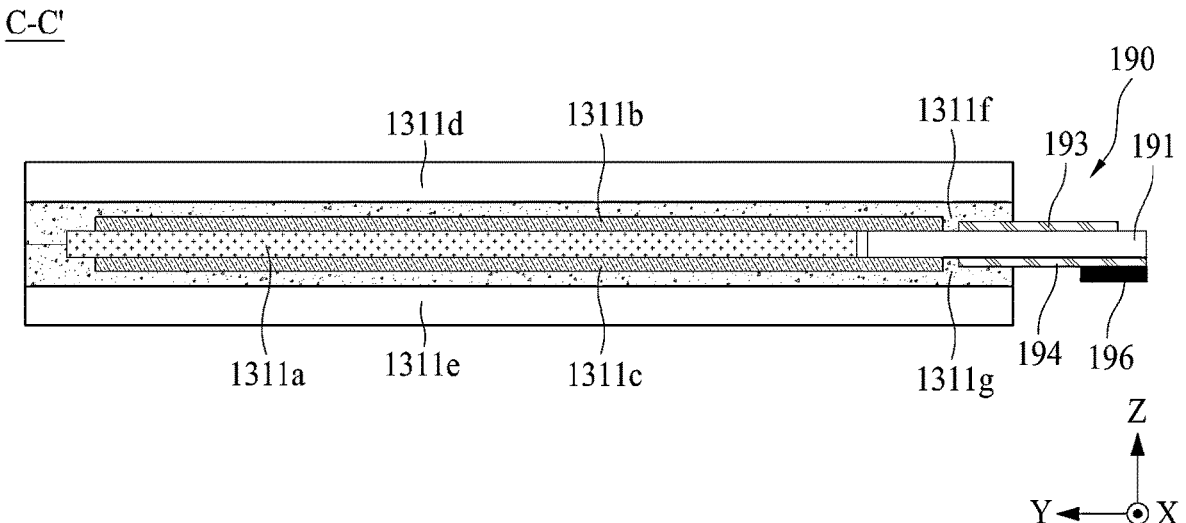
FIG. 5B is another cross-sectional view taken along line C-C' illustrated in FIG. 3.

FIG. 3 illustrates a vibration device according to an embodiment of the present disclosure. FIG. 4A is a cross-sectional view taken along line B-B' illustrated in FIG. 3. FIG. 4B is a cross-sectional view taken along line C-C' illustrated in FIG. 3. FIG. 5A is another cross-sectional view taken along line B-B' illustrated in FIG. 3. FIG. 5B is another cross-sectional view taken along line C-C' illustrated in FIG. 3.

Referring to FIGS. 3 to 5B, a vibration device 131 according to an embodiment of the present disclosure may include a vibration portion 1311a, a first electrode portion 1311b, and a second electrode portion 1311c.

The vibration device 131 according to an embodiment of the present disclosure may be referred to as a flexible vibration structure, a flexible vibrator, a flexible vibration generating device, a flexible vibration generator, a flexible sounder, a flexible sound device, a flexible sound generating device, a flexible sound generator, a flexible actuator, a flexible speaker, a flexible piezoelectric speaker, a film actuator, a film type piezoelectric composite actuator, a film speaker, a film type piezoelectric speaker, or a film type piezoelectric composite speaker, but the terms are not limited thereto.

The vibration portion 1311a may include a piezoelectric material (or an electro active material) having a piezoelectric effect. For example, the piezoelectric material may have a characteristic where pressure or twisting is applied to a crystalline structure by an external force, a potential difference occurs due to dielectric polarization caused by a relative position change of a positive (+) ion and a negative (−) ion, and a vibration is generated by an electric field based on a voltage applied thereto. The vibration portion 1311a may be referred to as the terms such as a vibration layer, a piezoelectric layer, a piezoelectric material layer, an electro active layer, a vibration portion, a piezoelectric material portion, an electro active portion, a piezoelectric structure, a piezoelectric composite layer, a piezoelectric composite, or a piezoelectric ceramic composite, but the terms are not limited thereto. The vibration portion 1311*a* may include a transparent conductive material, a semitransparent conductive material, or an opaque conductive material and may be transparent, semitransparent, or opaque.

The first electrode portion 1311*b* may be disposed at a first surface (or an upper surface) of the vibration portion 1311*a* and may be electrically connected to a first surface of the vibration layer 1311*a*. The second electrode portion 1311*c* may be disposed at a second surface (or a lower surface) of the vibration portion 1311*a* and may be electrically connected to a second surface of the vibration layer 1311*a*. For example, the vibration layer 1311*a* may be polarized (or poling) by a certain voltage applied to the first electrode portion 1311*b* and the second electrode portion 1311*c* in a certain temperature atmosphere or a temperature atmosphere which is changed from a high temperature to a room temperature, but embodiments of the present disclosure are not limited thereto.

A method of manufacturing the vibration device 131 according to an embodiment of the present disclosure will be described below.

The first electrode portion 1311*b* may be formed in the vibration portion 1311*a*. The first electrode portion 1311*b* may be coated by a screen printing process, but embodiments of the present disclosure are not limited thereto.

Subsequently, the first electrode portion 1311*b* may be cured. The first electrode portion 1311*b* may be cured at a temperature of about 150° C. in a convection oven, and then, may be dried.

Subsequently, the vibration portion 1311*a* may be inverted. Also, the second electrode portion 1311*c* may be provided in the vibration portion 1311*a*. The second electrode portion 1311*c* may be coated by a screen printing process, but embodiments of the present disclosure are not limited thereto.

Subsequently, the second electrode portion 1311*c* may be cured. The second electrode portion 1311*c* may be cured at a temperature of about 150° C. in a convection oven, and then, may be dried.

A power supply line for connecting the first electrode portion 1311*b* to the second electrode portion 1311*c* and a pad portion connected to the power supply line may be provided. For example, the power supply line and the pad portion may be disposed at a rear surface of a cover member.

When the first electrode portion 1311*b* and the second electrode portion 1311*c* includes silver (Ag), the cost of the first electrode portion 1311*b* and the second electrode portion 1311*c* may increase, causing an increase in the manufacturing cost. As described above, a coating apparatus for coating a first electrode portion and a second electrode portion, a curing apparatus for curing the first electrode portion and the second electrode portion, and a convection apparatus for drying the first electrode portion and the second electrode portion may be needed. Also, a process of inverting a vibration portion so as to form the first electrode portion and the second electrode portion may be needed. Also, the inventors have recognized a problem where the reliability of a vibration device is reduced because an Ag electrode is good in electrical conductivity but an interface characteristic and an adhesive force with a vibration portion are low. Therefore, the inventors have performed various experiments for decreasing the cost, an apparatus, and a process so as to form an electrode portion. Through the various experiments, the inventors have invented a vibration apparatus in which the cost and a manufacturing process of a vibration device may be simplified.

According to an embodiment of the present disclosure, the first electrode portion 1311*b* may be configured with a conductive adhesive member. For example, the conductive adhesive member may have a conductive characteristic and an adhesive characteristic. For example, the conductive adhesive member may be a conductive tape, but the terms are not limited thereto. The conductive adhesive member may include a first adhesive, a conductive layer, and a second adhesive. For example, the conductive adhesive member may have a stack structure of the first adhesive, a non-woven fabric, and the second adhesive. The conductive layer may be disposed between the first adhesive and the second adhesive. The first adhesive and the second adhesive may each be a conductive acrylic adhesive, but embodiments of the present disclosure are not limited thereto. The conductive layer may be a conductive non-woven fabric, but embodiments of the present disclosure are not limited thereto. The conductive adhesive member may be flexible, and thus, may be attached on the vibration portion 1311*a* in various types. When the first electrode portion 1311*b* includes metal, an air bubble may occur in the first electrode portion 1311*b* due to a firing temperature and a metal component of the first electrode portion 1311*b*, and due to this, an adhesive force with the vibration portion 1311*a* may be reduced and the reliability of the vibration portion 1311*a* may decrease due to a reduction in adhesive force. Therefore, comparing with a case where the first electrode portion 1311*b* includes metal, the conductive adhesive member may improve an adhesive force with the vibration portion 1311*a*, and thus, may enhance the reliability of the vibration portion 1311*a* caused by a reduction in adhesive force, thereby enhancing the reliability of the vibration device 131 or the vibration apparatus 130. Also, in a case where the first electrode portion 1311*b* is configured with the conductive adhesive member, a coating apparatus, a curing apparatus, and convection equipment for forming the first electrode portion 1311*b* may not be provided on the vibration portion 1311*a*. Also, even when the first electrode portion 1311*b* includes metal, the manufacturing cost of the first electrode portion 1311*b* may not increase.

For example, the first electrode portion 1311*b* may have a common electrode form which is disposed at a whole first surface of the vibration portion 1311*a*. For example, the second electrode portion 1311*c* may have a common electrode form which is disposed at a whole second surface of the vibration portion 1311*a*. For example, the second electrode portion 1311*c* may include the same material as that of the first electrode portion 1311*b*, but embodiments of the present disclosure are not limited thereto. For example, the second electrode portion 1311*c* may be configured with the conductive adhesive member.

Referring to FIGS. 4A to 5B, a size of the vibration portion 1311*a* may have a size (or a length) which differs from that of one or more of the first electrode portion 1311*b* and the second electrode portion 1311*c*, but embodiments of the present disclosure are not limited thereto. A size of the vibration portion 1311*a* may have a size (or a length) which is greater than that of one or more of the first electrode portion 1311*b* and the second electrode portion 1311*c*, but embodiments of the present disclosure are not limited thereto. For example, the vibration portion 1311*a* may be disposed to protrude from one or more of the first electrode portion 1311*b* and the second electrode portion 1311*c*. Accordingly, a problem may be solved where electrical short circuit occurs when a signal is applied to the first electrode portion 1311*b* and the second electrode portion 1311*c*, or short circuit occurs due to particles occurring in a manufacturing process.

According to an embodiment of the present disclosure, the first electrode portion 1311*b* and the second electrode portion 1311*c* may be configured with a conductive adhesive member, and thus, a power supply line and/or a pad portion disposed in a cover member for connecting the first electrode portion 1311*b* to the second electrode portion 1311*c* may not be needed, thereby simplifying a structure of a vibration apparatus and implementing a vibration apparatus having a thin thickness. Also, according to an embodiment of the present disclosure, a first electrode portion and a second electrode portion may configure a vibration apparatus where a first cover member and a second cover member are provided as one body, thereby providing a display apparatus or an apparatus including a vibration apparatus having a simplified structure and a thin thickness. Also, according to an embodiment of the present disclosure, the vibration portion 1311*a* may be configured to have a size (or a length) which is greater than that of one or more of the first electrode portion 1311*b* and the second electrode portion 1311*c*, thereby preventing electrical short circuit and/or a defect from occurring in a manufacturing process and/or when a signal is applied thereto. Also, the first electrode portion 1311*b* and the second electrode portion 1311*c* according to an embodiment of the present disclosure may be configured with a power driving line, and thus, a power driving line disposed at a rear surface of a cover member may not be provided.

According to another embodiment of the present disclosure, the vibration device 131 (or the vibration apparatus 130) may further include a first cover member 1311*d* and a second cover member 1311*e*.

The first cover member 1311*d* may be disposed at a first surface of the vibration device 131. For example, the first cover member 1311*d* may be disposed at the first electrode portion 1311*b*. For example, the first cover member 1311*d* may be on the first electrode portion 1311*b*. For example, the first cover member 1311*d* may cover the first electrode portion 1311*b* disposed at the first surface of the vibration portion 1311*a*, and thus, may protect the first surface of the vibration portion 1311*a* or the first electrode portion 1311*b*.

The second cover member 1311*e* may be disposed at a second surface of the vibration device 131. For example, the second cover member 1311*e* may be disposed at the second electrode portion 1311*c*. For example, the second cover member 1311*e* may be on the second electrode portion 1311*c*. For example, the second cover member 1311*e* may cover the second electrode portion 1311*c* disposed at the second surface of the vibration portion 1311*a*, and thus, may protect the second surface of the vibration portion 1311*a* or the second electrode portion 1311*c*.

Each of the first cover member 1311*d* and the second cover member 1311*e* according to an embodiment of the present disclosure may include one or more materials of plastic, fiber, and wood, but embodiments of the present disclosure are not limited thereto. For example, the first cover member 1311*d* and the second cover member 1311*e* may include the same material or different materials. For example, the first cover member 1311*d* and the second cover member 1311*e* may be a polyimide film or a polyethylene terephthalate film, but embodiments of the present disclosure are not limited thereto.

According to another embodiment of the present disclosure, the vibration device 131 (or the vibration apparatus 130) may further include a first adhesive layer 1311*f* and a second adhesive layer 1311*g*. For example, the first adhesive layer 1311*f* may be disposed between the first cover member 1311*d* and the first electrode portion 1311*b*. For example, the second adhesive layer 1311*g* may be disposed between the second cover member 1311*e* and the second electrode portion 1311*c*.

The first cover member 1311*d* according to an embodiment of the present disclosure may be disposed at the first surface of the vibration portion 1311*a* by the first adhesive layer 1311*f* For example, the first cover member 1311*d* may be connected or coupled to the first electrode portion 1311*b* by g the first adhesive layer 1311E For example, the first cover member 1311*d* may be disposed at the first surface of the vibration portion 1311*a* by a film laminating process using the first adhesive layer 1311*f*. Accordingly, the vibration portion 1311*a* may be provided (or disposed) as one body with the first cover member 1311*d*.

The second cover member 1311*e* according to an embodiment of the present disclosure may be disposed at the second surface of the vibration portion 1311*a* by the second adhesive layer 1311*g*. For example, the second cover member 1311*e* may be connected or coupled to the second electrode portion 1311*c* by the second adhesive layer 1311*g*. For example, the second cover member 1311*e* may be disposed at the second surface of the vibration portion 1311*a* by a film laminating process by the second adhesive layer 1311*g*. Accordingly, the vibration portion 1311*a* may be provided (or disposed) as one body with the second cover member 1311*e*.

The first adhesive layer 1311*f* may be disposed between vibration portions 1311*a* and disposed at a first surface of the vibration portion 1311*a*. Referring to FIGS. 4A and 4B, the first electrode portions 1311*b* and the second electrode portions 1311*c* may be configured with a conductive adhesive member having a conductive characteristic and an adhesive characteristic, and thus, the first surface of the vibration portion 1311*a* may be adhered to the first cover member 1311*f* by the first electrode portions 1311*b* and the second electrode portions 1311*c*. For example, the first adhesive layer 1311*f* may be disposed at both lateral surfaces of the vibration portion 1311*a*. Referring to FIGS. 5A and 5B, the first adhesive layer 1311*f* may be formed on a rear surface (or an inner surface) of the first cover member 1311*d* facing the first surface of the vibration portion 1311*a*, filled between vibration portions 1311*a*, and disposed between the first surface of the vibration portion 1311*a* and the first cover member 1311*f*.

The second adhesive layer 1311*g* may be disposed between vibration portions 1311*a* and on a second surface of the vibration portion 1311*a*. Referring to FIGS. 4A and 4B, the first electrode portions 1311*b* and the second electrode portions 1311*c* may be configured with a conductive adhesive member having a conductive characteristic and an adhesive characteristic, and thus, the second surface of the vibration portion 1311*a* may be adhered to the second cover member 1311*e* by the first electrode portions 1311*b* and the second electrode portions 1311*c*. For example, the second adhesive layer 1311*g* may be disposed at the both lateral surfaces of the vibration portion 1311*a*. Referring to FIGS. 5A and 5B, the second adhesive layer 1311*g* may be formed on a front surface (or an inner surface) of the second cover member 1311*e* facing the second surface of the vibration portion 1311*a*, filled between vibration portions 1311*a*, and disposed between the second surface of the vibration portion 1311*a* and the second cover member 1311*e*.

According to an embodiment of the present disclosure, the first cover member 1311*d* may contact the first electrode portion 1311*b*, and the second cover member 1311*e* may contact the second electrode portion 1311*c*. According to an embodiment of the present disclosure, the first electrode portion 1311*b* may be adhered to the first surface of the vibration portion 1311*a* and the first cover member 1311*d*, and the second electrode portion 1311*c* may be adhered to the second surface of the vibration portion 1311*a* and the second cover member 1311*e*. For example, the first and second electrode portions 1311*b* and 1311*c* may be provided as one body with the first and second cover members 1311*d* and 1311*e*. For example, a vibration device where the first and second cover members 1311*d* and 1311*e* are provided as one body with the first and second electrode portions 1311*b* and 1311*c* may be provided. Accordingly, a vibration apparatus having a simplified structure may be provided. Also, according to an embodiment of the present disclosure, a vibration apparatus where a first electrode portion and a second electrode portion are provided as one body with a first cover member and a second cover member may be provided, thereby providing a display apparatus or an apparatus including a vibration apparatus having a simplified structure and a thin thickness.

The first and second adhesive layers 1311*f* and 1311*g* may be connected or coupled to each other between vibration portions 1311*a*. Referring to FIGS. 4A and 4B, the vibration portion 1311*a* may be surrounded by the first and second adhesive layers 1311*f* and 1311*g*, the first electrode portion 1311*b*, and the second electrode portion 1311*c*. Referring to FIGS. 5A and 5B, the vibration portion 1311*a* may be surrounded by the first and second adhesive layers 1311*f* and 1311*g*. For example, the first and second adhesive layers 1311*f* and 1311*g* may be provided between the first cover member 1311*d* and the second cover member 1311*e* to surround the vibration portion 1311*a*. For example, the first and second adhesive layers 1311*f* and 1311*g* may be provided between the first cover member 1311*d* and the second cover member 1311*e* to fully surround the vibration portion 1311*a*. For example, the vibration portion 1311*a* may be buried or embedded between the first and second adhesive layers 1311*f* and 1311*g*.

Each of the first and second adhesive layers 1311*f* and 1311*g* according to an embodiment of the present disclosure may include an electrical insulation material which has adhesive properties and is capable of compression and decompression. For example, each of the first and second adhesive layers 1311*f* and 1311*g* may include epoxy resin, acrylic resin, silicone resin, and urethane resin, but embodiments of the present disclosure are not limited thereto. For example, each of the first and second adhesive layers 1311*f* and 1311*g* may be configured to be transparent, semitransparent, or opaque.

Referring to FIGS. 3, 4B, and 5B, the vibration device 131 or the vibration apparatus 130 according to an embodiment of the present disclosure may further include a signal cable 190 connected to the first electrode portion 1311*b* and the second electrode portion 1311*c*. For example, the signal cable 190 may be configured to be transparent, semitransparent, or opaque. For example, the signal cable 190 may be a flexible cable. For example, the flexible cable may be ductile flat cable. The signal cable 190 may supply the vibration device 131 with a vibration driving signal (or a sound signal) provided from a sound processing circuit.

The sound processing circuit may generate an alternating current (AC) vibration driving signal including a first vibration driving signal and a second vibration driving signal based on sound data provided from an external sound data generating circuit unit. The first vibration driving signal may be one of a positive (+) vibration driving signal and a negative (−) vibration driving signal, and the second vibration driving signal may be one of a positive (+) vibration driving signal and a negative (−) vibration driving signal. For example, the first vibration driving signal may be supplied to the first electrode portion 1311*b* through the signal cable 190. The second vibration driving signal may be supplied to the second electrode portion 1311*c* through the signal cable 190.

The signal cable 190 may be connected to or contact the first electrode portion 1311*b* and/or the second electrode portion 1311*c*. For example, the signal cable 190 may be connected to or contact the first electrode portion 1311*b* and/or the second electrode portion 1311*c*. The signal cable 190 may be electrically connected to the first and second electrode portions 1311*b* and 1311*c* of the vibration device 131 at one side of the vibration device 131, and thus, may be provided as one body with the vibration device 131. For example, the signal cable 190 may be electrically and directly connected to the first and second electrode portions 1311*b* and 1311*c* of the vibration device 131 at one side of the vibration device 131, and thus, may be provided as one body with the vibration device 131. According to an embodiment of the present disclosure, at least a portion of the signal cable 190 may be accommodated into one or more of the first adhesive layer 1311*f* and the second adhesive layer 1311*g*. For example, one side of the signal cable 190 may be accommodated into the first adhesive layer 1311*f* and the second adhesive layer 1311*g*. Accordingly, a vibration apparatus provided as one body with the signal cable 190 may be implemented.

The signal cable 190 may include a line layer 191, a first protection film 193, a second protection film 194, and a stiff portion 196.

For example, the line layer 191 may be connected to or contact one or more of the first electrode portion 1311*b* and the second electrode portion 1311*c*. For example, the line layer 191 may be connected to or contact each of the first electrode portion 1311*b* and the second electrode portion 1311*c*. The line layer 191 may include a copper foil. For example, the line layer 191 may be a copper foil layer, but the terms are not limited thereto. The first protection film 193 may be disposed at a first surface of the line layer 191. The second protection film 194 may be disposed at a second surface different from the first surface of the line layer 191. For example, the second protection film 194 may be disposed at the second surface, which is opposite to the first surface, of the line layer 191. For example, the line layer 191 may be disposed between the first protection film 193 and the second protection film 194. The first protection film 193 and the second protection film 194 may each include polyimide, polyethylene terephthalate, or heat-resistance polyethylene terephthalate, but embodiments of the present disclosure are not limited thereto. According to an embodiment of the present disclosure, the line layer 191, the first protection film 193, and the second protection film 194 may be accommodated into one or more of the first electrode portion 1311*b* and the second electrode portion 1311*c*. Accordingly, a vibration apparatus provided as one body with the signal cable 190 may be implemented.

The stiff portion 196 may be disposed at one side or an end of the first protection film 193 or the second protection film 194. The stiff portion 196 may overlap a portion of the first protection film 193 or a portion of the second protection film 194. For example, the stiff portion 196 may overlap one or more of the first protection film 193 and the second protection film 194. The stiff portion 196 may be configured so that a connection operation or a fastening operation of a connector is easy. For example, the stiff portion 196 may check a connection or fastening state of the signal cable 190. For example, the stiff portion 196 may be a reinforcement portion, but the terms are not limited thereto.

The signal cable 190 may be connected to a main cable based on a connector scheme. For example, the signal cable 190 may branch or extend from the main cable to the vibration device 131. For example, the signal cable 190 may branch from the main cable, or may be connected to the vibration device 131. For example, each signal cable 190 may branch from the main cable and may be individually connected to the vibration device 131.

Figure 6:
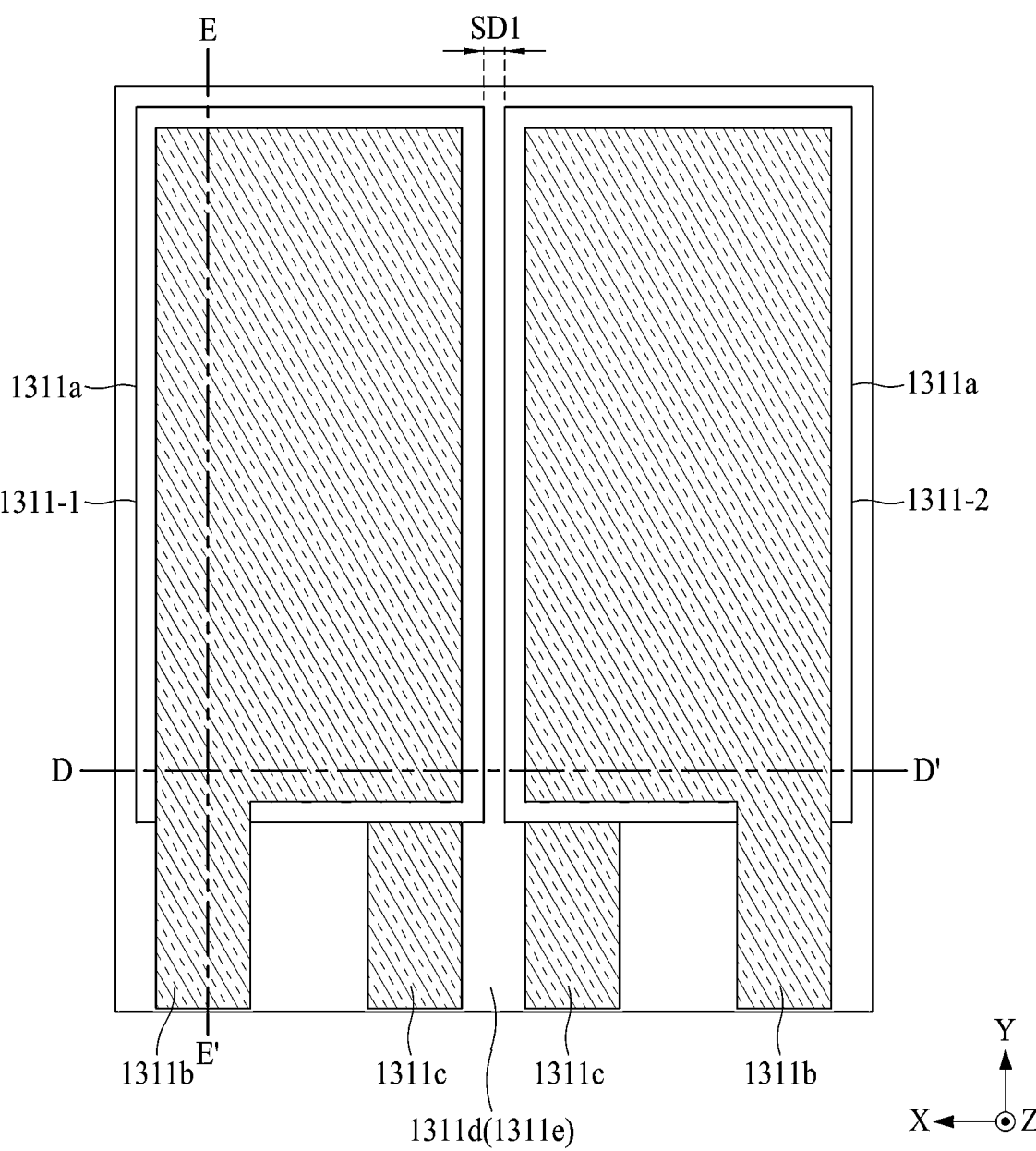
FIG. 6 illustrates a vibration device according to another embodiment of the present disclosure.
Figure 7A:
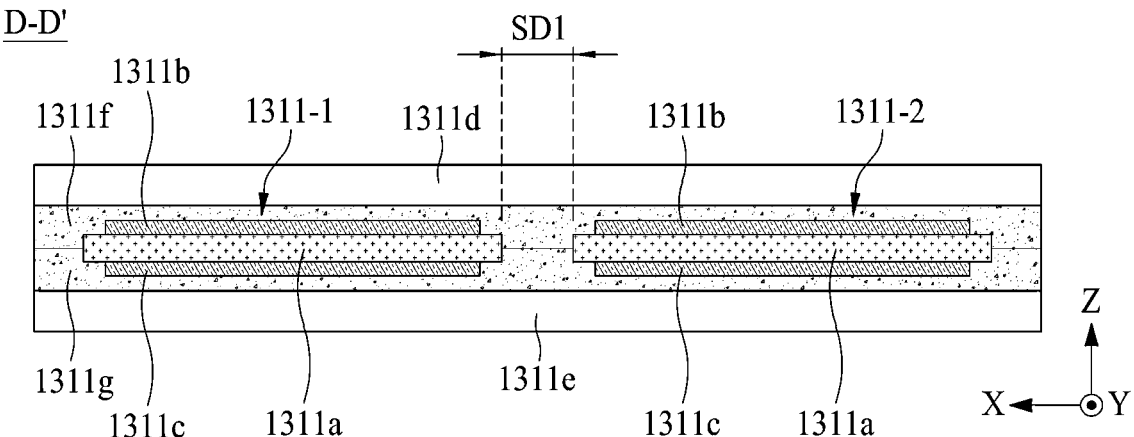
FIG. 7A is a cross-sectional view taken along line D-D' illustrated in FIG. 6.
Figure 7B:
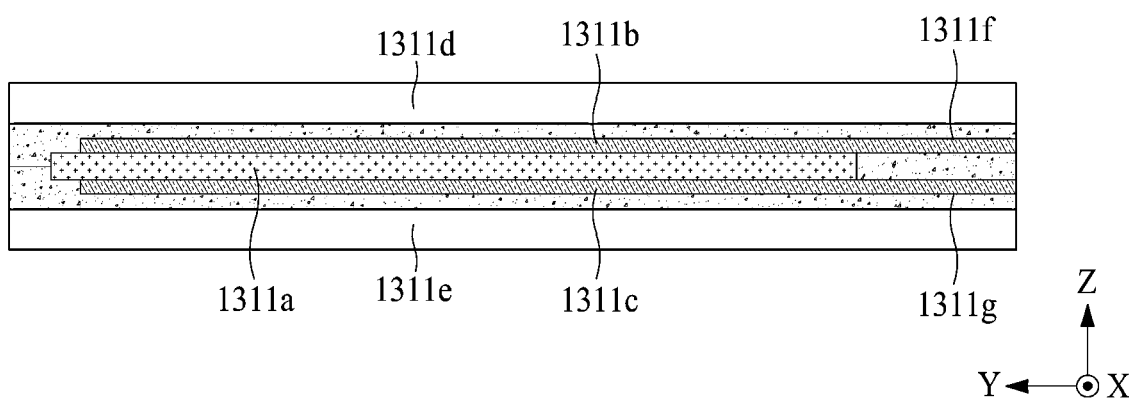
FIG. 7B is a cross-sectional view taken along line E-E' illustrated in FIG. 6.

FIG. 6 illustrates a vibration device according to another embodiment of the present disclosure. FIG. 7A is a cross-sectional view taken along line D-D' illustrated in FIG. 6. FIG. 7B is a cross-sectional view taken along line E-E' illustrated in FIG. 6.

Referring to FIGS. 6 to 7B, a vibration apparatus according to an embodiment of the present disclosure may include first and second vibration generating portions 1311-1 and 1311-2.

The vibration device 1311 or the vibration apparatus according to an embodiment of the present disclosure may be referred to as a flexible vibration structure, a flexible vibrator, a flexible vibration generating device, a flexible vibration generator, a flexible sounder, a flexible sound device, a flexible sound generating device, a flexible sound generator, a flexible actuator, a flexible speaker, a flexible piezoelectric speaker, a film actuator, a film type piezoelectric composite actuator, a film speaker, a film type piezoelectric speaker, or a film type piezoelectric composite speaker, but the terms are not limited thereto.

The first and second vibration generating portions 1311-1 and 1311-2 may be electrically disconnected and arranged apart from each other in a first direction X. The first and second vibration generating portions 1311-1 and 1311-2 may alternately and repeatedly contract and expand based on a piezoelectric effect to vibrate. For example, the first and second vibration generating portions 1311-1 and 1311-2 may be arranged to have a first separation distance (or interval) SD1.

For example, the first and second vibration generating portions 1311-1 and 1311-2 may be arranged or tiled at a certain interval SD1 in the first direction X. Therefore, the vibration device 1311 where the first and second vibration generating portions 1311-1 and 1311-2 are tiled may be a vibration array, a vibration array portion, a vibration module array portion, a vibration array structure, a tiling vibration array, a tiling array module, or a tiling vibration film.

Each of the first and second vibration generating portions 1311-1 and 1311-2 according to an embodiment of the present disclosure may have a tetragonal shape. For example, each of the first and second vibration generating portions 1311-1 and 1311-2 may have a tetragonal shape, but embodiments of the present disclosure are not limited thereto. For example, each of the first and second vibration generating portions 1311-1 and 1311-2 may have a square shape, but embodiments of the present disclosure are not limited thereto.

The first and second vibration generating portions 1311-1 and 1311-2 may be arranged or tiled on the same plane, and thus, the vibration device 131 may increase in area to have a large area, based on tiling of the first and second vibration generating portions 1311-1 and 1311-2 having a relatively small size.

The first and second vibration generating portions 1311-1 and 1311-2 may be disposed or tiled at a certain interval (or distance), and thus, may be implemented as one vibration device (or a single vibration device) which is driven as one complete single body without being independently driven. According to an embodiment of the present disclosure, with respect to the first direction X, an interval or distance SD1 between the first and second vibration generating portions 1311-1 and 1311-2 may be 0.1 mm or more and smaller than 3 cm, but embodiments of the present disclosure are not limited thereto.

According to an embodiment of the present disclosure, the first and second vibration generating portions 1311-1 and 1311-2 may be disposed or tiled to have a first separation distance (or interval) SD1 of 0.1 mm or more and smaller than 3 cm, and thus, may be driven as one vibration device. Thereby, a reproduction band and a sound pressure level characteristic of a sound which is generated based on a single vibration of the first and second vibration generating portions 1311-1 and 1311-2 may be increased. For example, the first and second vibration generating portions 1311-1 and 1311-2 may be arranged at an interval SD1 of 0.1 mm or more and smaller than 5 mm, in order to increase a reproduction band of a sound generated based on a single vibration of the first and second vibration generating portions 1311-1 and 1311-2 and to increase a sound of a low-pitched sound band (for example, a sound pressure level characteristic in 500 Hz or less).

According to an embodiment of the present disclosure, in a case where the first and second vibration generating portions 1311-1 and 1311-2 are arranged at the interval SD1 of smaller than 0.1 mm or without the interval SD1, the reliability of the first and second vibration generating portions 1311-1 and 1311-2 or the vibration device 131 may be reduced due to damage or a crack caused by a physical contact therebetween which occurs when each of the first and second vibration generating portions 1311-1 and 1311-2 vibrates.

According to an embodiment of the present disclosure, in a case where the first and second vibration generating portions 1311-1 and 1311-2 are arranged at the interval SD1 of 3 cm or more, the first and second vibration generating portions 1311-1 and 1311-2 may not be driven as one vibration device due to an independent vibration of each of the first and second vibration generating portions 1311-1 and 1311-2. Therefore, a reproduction band and a sound pressure level characteristic of a sound which is generated based on vibrations of the first and second vibration generating portions 1311-1 and 1311-2 may be reduced. For example, in a case where the first and second vibration generating portions 1311-1 and 1311-2 are arranged at the interval SD1 of 3 cm or more, a sound characteristic and a sound pressure level characteristic of the low-pitched sound band (for example, in 500 Hz or less) may each be reduced.

According to an embodiment of the present disclosure, in a case where the first and second vibration generating portions 1311-1 and 1311-2 are arranged at an interval SD1 of 5 mm, each of the first and second vibration generating portions 1311-1 and 1311-2 may not be perfectly driven as one vibration device, and thus, a sound characteristic and a sound pressure level characteristic of the low-pitched sound band (for example, in 200 Hz or less) may each be reduced.

According to another embodiment of the present disclosure, in a case where the first and second vibration generating portions 1311-1 and 1311-2 are arranged at an interval SD1 of 1 mm, each of the first and second vibration generating portions 1311-1 and 1311-2 may be driven as one vibration device, and thus, a reproduction band of a sound may increase and a sound of the low-pitched sound band (for example, a sound pressure level characteristic in 500 Hz or less) may increase. For example, in a case where the first and second vibration generating portions 1311-1 and 1311-2 are arranged at an interval SD1 of 1 mm, the vibration device 1311 may be implemented as a large-area vibrator which is enlarged based on optimization of a separation distance between the first and second vibration generating portions 1311-1 and 1311-2. Therefore, the vibration device 1311 may be driven as a large-area vibrator based on a single vibration of the first and second vibration generating portions 1311-1 and 1311-2, and thus, a sound characteristic and a sound pressure level characteristic may each increase in the low-pitched sound band and a reproduction band of a sound generated based on a large-area vibration of the vibration device 1311.

Therefore, in order to implement a single vibration (or one vibration device) of the first and second vibration generating portions 1311-1 and 1311-2, the first separation distance SD1 between the first and second vibration generating portions 1311-1 and 1311-2 may be adjusted to 0.1 mm or more and smaller than 3 cm. Also, in order to implement a single vibration (or one vibration apparatus) of the first and second vibration generating portions 1311-1 and 1311-2 and to increase a sound pressure level characteristic of a sound of the low-pitched sound band, the interval SD1 between the first and second vibration generating portions 1311-1 and 1311-2 may be adjusted to 0.1 mm or more and smaller than 5 mm.

According to another embodiment of the present disclosure, the first and second vibration generating portions 1311-1 and 1311-2 may configured one group, and a plurality of groups may be provided in a vibration member or a display panel.

The first and second vibration generating portions 1311-1 and 1311-2 according to an embodiment of the present disclosure may each include a vibration portion 1311a, a first electrode portion 1311b, and a second electrode portion 1311c. The vibration portion 1311a, the first electrode portion 1311b, and the second electrode portion 1311c may be substantially the same as the vibration portion 1311a, the first electrode portion 1311b, and the second electrode portion 1311c described above with reference to FIGS. 3 to 5B, and thus, like reference numerals refer to like elements and repetitive descriptions thereof are omitted.

The vibration device 1311 according to an embodiment of the present disclosure may further include a first cover member 1311d and a second cover member 1311e.

The first cover member 1311d may be disposed at a first surface of the vibration device 1311. For example, the first cover member 1311d may be disposed at the first electrode portion 1311b disposed at a first surface of each of the first and second vibration generating portions 1311-1 and 1311-2, and thus, may be connected to the first surface of each of the first and second vibration generating portions 1311-1 and 1311-2 in common or may support the first surface of each of the first and second vibration generating portions 1311-1 and 1311-2 in common. Therefore, the first cover member 1311d may protect the first surface of each of the first and second vibration generating portions 1311-1 and 1311-2 or the first electrode portion 1311b.

The second cover member 1311e may be disposed at a second surface of the vibration device 1311. For example, the second cover member 1311e may be disposed at the second electrode portion 1311c disposed at a second surface of each of the first and second vibration generating portions

1311-1 and 1311-2, and thus, may be connected to the second surface of each of the first and second vibration generating portions 1311-1 and 1311-2 in common or may support the second surface of each of the first and second vibration generating portions 1311-1 and 1311-2 in common. Therefore, the second cover member 1311e may protect the second surface of each of the first and second vibration generating portions 1311-1 and 1311-2 or the second electrode portion 1311c.

Each of the first cover member 1311d and the second cover member 1311e according to an embodiment of the present disclosure may include one or more materials of plastic, fiber, and wood, but embodiments of the present disclosure are not limited thereto. For example, the first cover member 1311d and the second cover member 1311e may include the same material or different materials. For example, the first cover member 1311d and the second cover member 1311e may be a polyimide film or a polyethylene terephthalate film, but embodiments of the present disclosure are not limited thereto.

The first cover member 1311d according to an embodiment of the present disclosure may be disposed at the first surface of each of the first and second vibration generating portions 1311-1 and 1311-2 by a first adhesive layer 1311f. For example, the first cover member 1311d may be disposed at the first surface of each of the first and second vibration generating portions 1311-1 and 1311-2 by a film laminating process by the first adhesive layer 1311f For example, the first cover member 1311d may be directly disposed at the first surface of each of the first and second vibration generating portions 1311-1 and 1311-2 by the film laminating process by the first adhesive layer 1311f. Accordingly, the first and second vibration generating portions 1311-1 and 1311-2 may be provided (or disposed) as one body or tiled at the first cover member 1311d to have the certain interval SD1.

The second cover member 1311e according to an embodiment of the present disclosure may be disposed at the second surface of each of the first and second vibration generating portions 1311-1 and 1311-2 by a second adhesive layer 1311g. For example, the second cover member 1311e may be disposed at the second surface of each of the first and second vibration generating portions 1311-1 and 1311-2 by a film laminating process by the second adhesive layer 1311g. For example, the second cover member 1311e may be directly disposed at the second surface of each of the first and second vibration generating portions 1311-1 and 1311-2 by the film laminating process by the second adhesive layer 1311g. Accordingly, the first and second vibration generating portions 1311-1 and 1311-2 may be provided (or disposed) as one body or tiled at the second cover member 1311e to have the certain interval SD1.

The first adhesive layer 1311f may be disposed between the first and second vibration generating portions 1311-1 and 1311-2 and on the first surface of each of the first and second vibration generating portions 1311-1 and 1311-2. Referring to FIGS. 7A and 7B, the first adhesive layer 1311f may be formed on a rear surface (or an inner surface) of the first cover member 1311d facing the first surface of each of the first and second vibration generating portions 1311-1 and 1311-2, filled between the first and second vibration generating portions 1311-1 and 1311-2, and disposed between the first surface of each of the first and second vibration generating portions 1311-1 and 1311-2 and the first cover member 1311d. However, embodiments of the present disclosure are not limited thereto, and as described above with FIGS. 4A and 4B, the first electrode portions 1311b and the second electrode portions 1311c may be configured with a conductive adhesive member having a conductive characteristic and an adhesive characteristic, and thus, the first surface of each of the first and second vibration generating portions 1311-1 and 1311-2 may be adhered to the first cover member 1311d by the first electrode portions 1311b and the second electrode portions 1311c. For example, the first adhesive layer 1311f may be disposed at both lateral surfaces of the vibration portion 1311a.

The second adhesive layer 1311g may be disposed between the first and second vibration generating portions 1311-1 and 1311-2 and on the second surface of each of the first and second vibration generating portions 1311-1 and 1311-2. Referring to FIGS. 7A and 7B, the second adhesive layer 1311g may be formed on a front surface (or an inner surface) of the second cover member 1311e facing the second surface of each of the first and second vibration generating portions 1311-1 and 1311-2, filled between the first and second vibration generating portions 1311-1 and 1311-2, and disposed between the second surface of each of the first and second vibration generating portions 1311-1 and 1311-2 and the second cover member 1311e. However, embodiments of the present disclosure are not limited thereto, and as described above with FIGS. 4A and 4B, the first electrode portions 1311b and the second electrode portions 1311c may be configured with a conductive adhesive member having a conductive characteristic and an adhesive characteristic, and thus, the second surface of each of the first and second vibration generating portions 1311-1 and 1311-2 may be adhered to the second cover member 1311e by the first electrode portions 1311b and the second electrode portions 1311c. For example, the second adhesive layer 1311g may be disposed at the both lateral surfaces of the vibration portion 1311a.

The first and second adhesive layers 1311f and 1311g may be connected or coupled to each other between the first and second vibration generating portions 1311-1 and 1311-2. Referring to FIGS. 7A and 7B, the first and second vibration generating portions 1311-1 and 1311-2 may be respectively surrounded by the first and second adhesive layers 1311f and 1311g. For example, the first and second adhesive layers 1311f and 1311g may be provided between the first cover member 1311d and the second cover member 1311e to fully surround the first and second vibration generating portions 1311-1 and 1311-2. For example, each of the first and second vibration generating portions 1311-1 and 1311-2 may be buried or embedded between the first and second adhesive layers 1311f and 1311g. However, embodiments of the present disclosure are not limited thereto, and as described above with reference to FIGS. 4A and 4B, each of the first and second vibration generating portions 1311-1 and 1311-2 may be surrounded by the first and second adhesive layers 1311f and 1311g, the first electrode portion 1311b, and the second electrode portion 1311c.

Each of the first and second adhesive layers 1311f and 1311g according to an embodiment of the present disclosure may include an electrical insulation material which has adhesive properties and is capable of compression and decompression. For example, each of the first and second adhesive layers 1311f and 1311g may include epoxy resin, acrylic resin, silicone resin, and urethane resin, but embodiments of the present disclosure are not limited thereto. For example, each of the first and second adhesive layers 1311f and 1311g may be configured to be transparent, semitransparent, or opaque.

FIGS. 8A to 8F illustrate a vibration device connected to a signal cable according to another embodiment of the present disclosure.

Figure 8A:
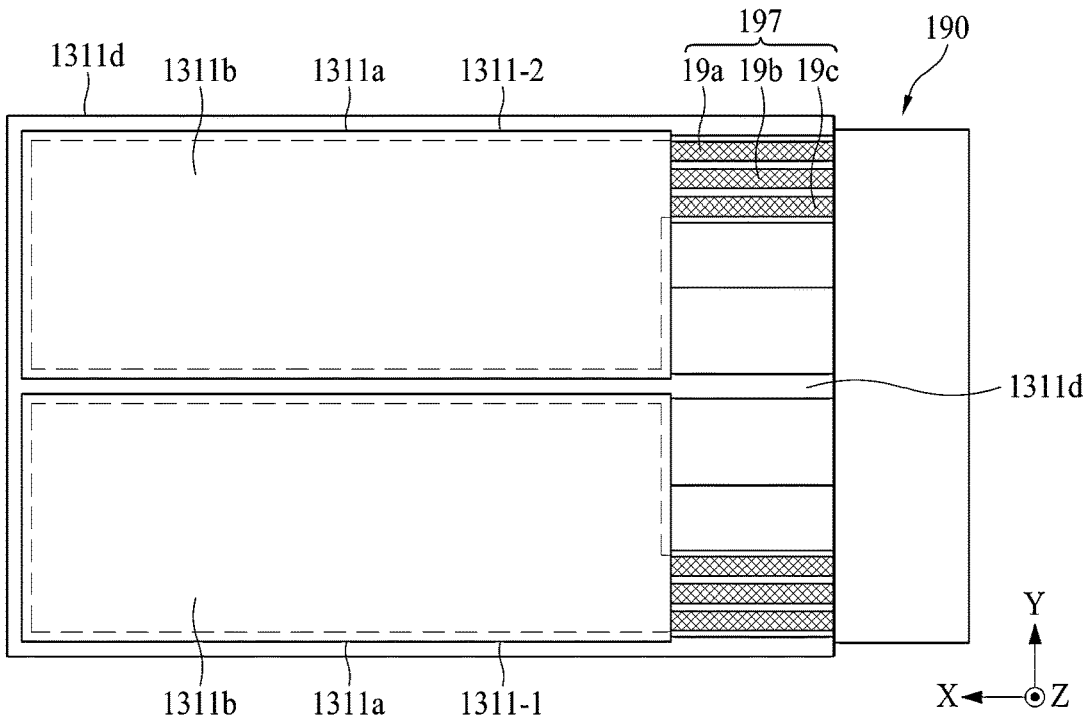
FIGS. 8A to 8F illustrate a vibration device connected to a signal cable according to another embodiment of the present disclosure.
Figure 8B:
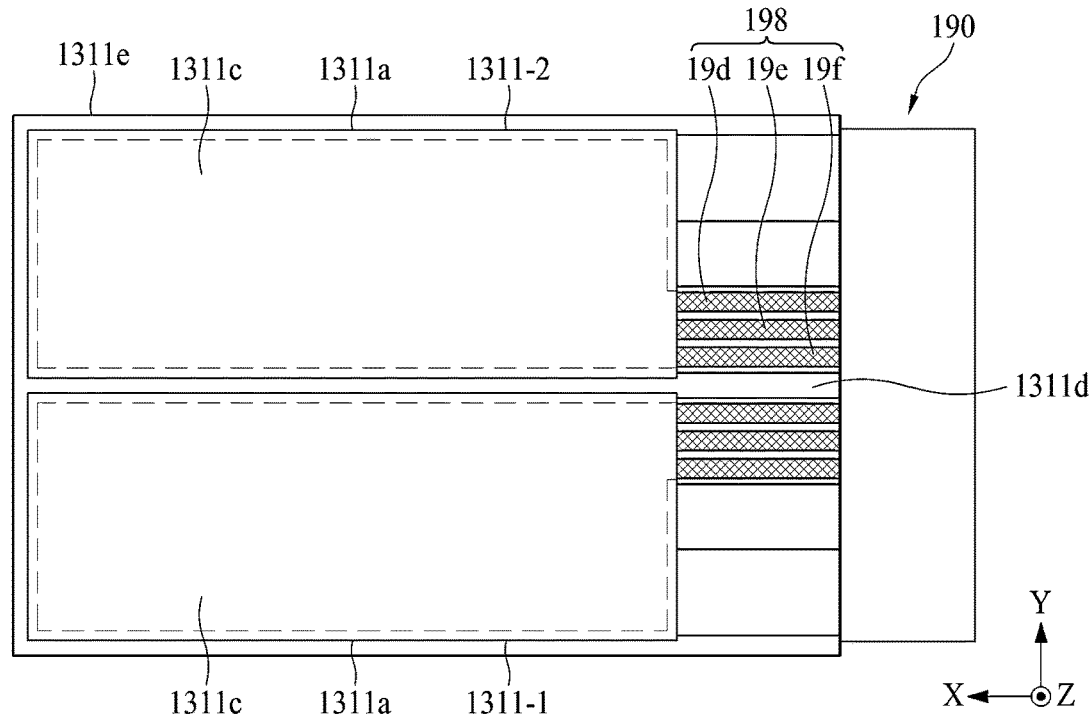
Figure 8C:
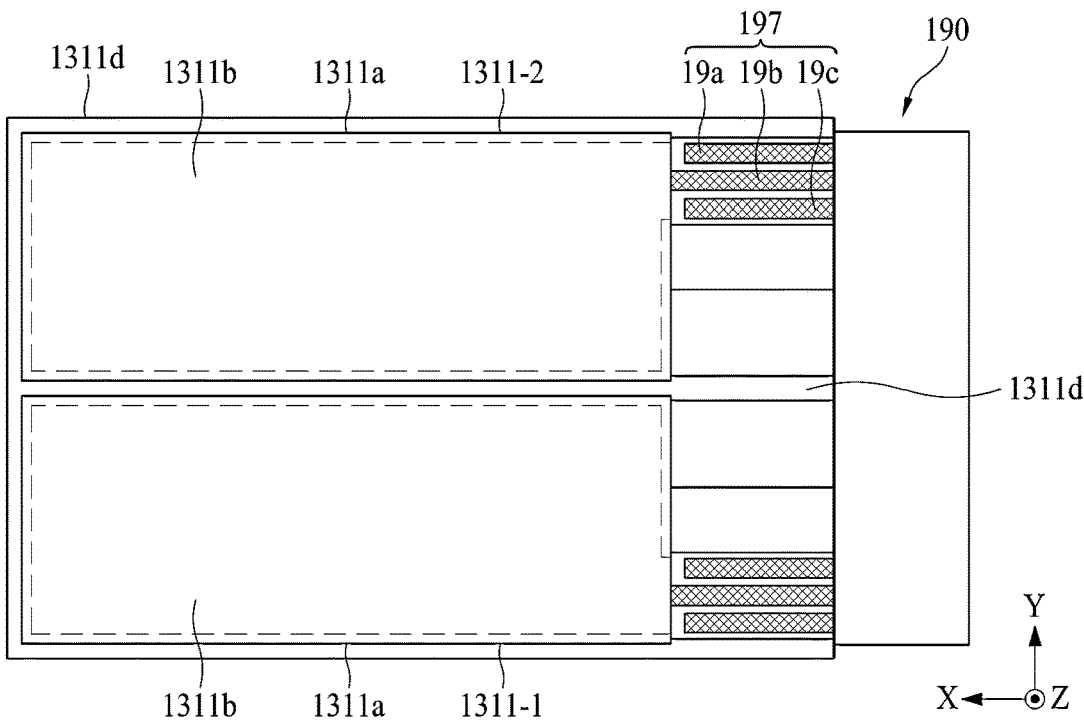
Figure 8D:
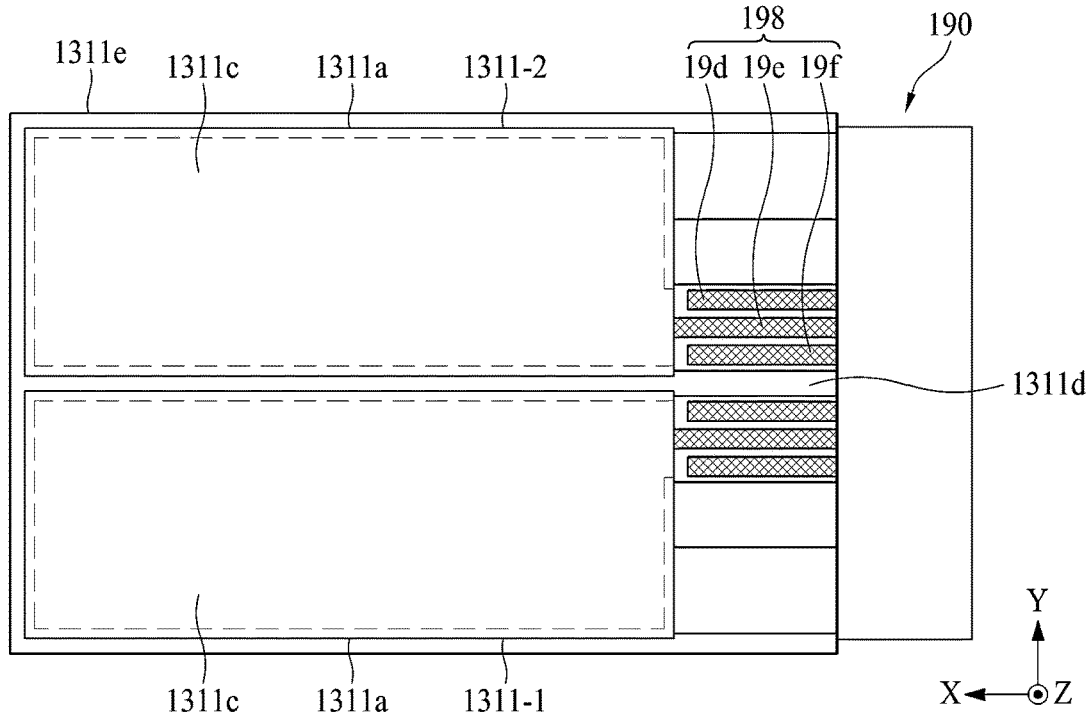
Figure 8E:
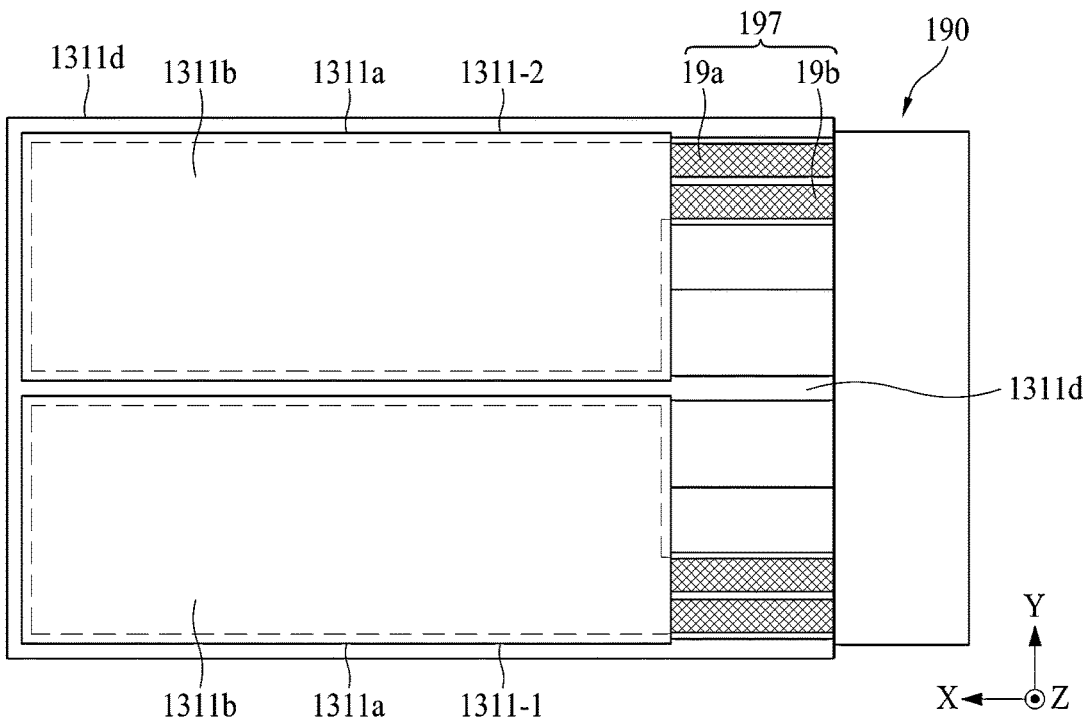
Figure 8F:
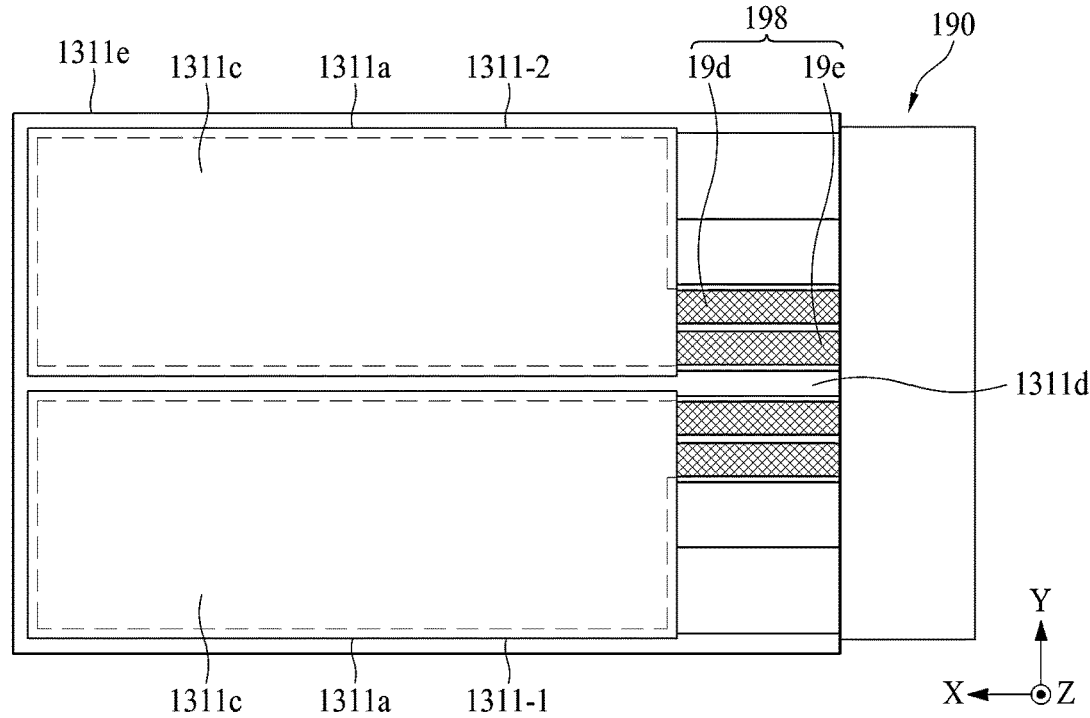

FIGS. 8A, 8C, and 8E illustrate a signal cable connected to a first electrode portion of a vibration device. FIGS. 8B, 8D, and 8F illustrate a signal cable connected to a second electrode portion of a vibration device.

Referring to FIGS. 8A to 8F, a conductive line of a signal cable connected to a first electrode portion 1311b and a second electrode portion 1311c is illustrated. A vibration device including the first electrode portion 1311b and the second electrode portion 1311c may be fitted to the signal cable, and then, the signal cable may be connected to or contact the first electrode portion 1311b and the second electrode portion 1311c.

Referring to FIGS. 6, 8A, and 8C, a signal cable 190 connected to the first electrode portion 1311b may include a plurality of conductive lines. A first connector 197 may be connected to a plurality of conductive lines 19a to 19c. For example, the first connector 197 including the plurality of conductive lines 19a to 19c may be connected to the first electrode portion 1311b. Referring to FIG. 8C, a center line 19b of the plurality of conductive lines 19a to 19c may be configured to be longer, but embodiments of the present disclosure are not limited thereto. For example, the center line 19b of the plurality of conductive lines 19a to 19c connected to the first electrode portion 1311b may be configured to protrude. Because the center line 19b of the plurality of conductive lines 19a to 19c connected to the first electrode portion 1311b is configured to be longer, a problem may be solved where the center line 19b of the signal cable 190 does not contact the first electrode portion 1311b in laminating a first cover member 1311d and a second cover member 1311e. Accordingly, an adhesive force between the signal cable 190 and a vibration portion 1311a including the first electrode portion 1311b may be more enhanced.

Referring to FIG. 8E, the first connector 197 may be connected to the plurality of conductive lines 19a and 19b. Two conductive lines may be configured to have the same width as that of three conductive lines. Accordingly, even when a center portion of a signal cable does not contact an electrode portion in laminating the first cover member 1311d and the second cover member 1311e, conductive lines at both edges (or both peripheries) of the signal cable may contact each other, and thus, an adhesive force between the signal cable 190 and the vibration portion 1311a including the first electrode portion 1311b may be further enhanced. Also, the conductive lines 19a and 19b having the same width as that of three conductive lines may be provided, and thus, a contact area between the signal cable 190 and the vibration portion 1311a including the first electrode portion 1311b may increase, whereby an adhesive force between the signal cable 190 and the vibration portion 1311a may be more enhanced.

According to an embodiment of the present disclosure, a first vibration driving signal may be supplied to the first electrode portion 1311b. The first vibration driving signal provided from a sound processing circuit may be a positive (+) driving signal.

In FIGS. 8A, 8C, and 8E, a solid line represents the vibration portion 1311a of each of first and second vibration generating portions 1311-1 and 1311-2, and the vibration portion 1311a may be configured to be greater than the first electrode portion 1311b. Accordingly, electrical short circuit and/or a defect may be prevented from occurring in a manufacturing process and/or when a signal is applied thereto.

Referring to FIGS. 6, 8B, and 8D, the signal cable 190 connected to the second electrode portion 1311*c* may include a plurality of conductive lines. A second connector 198 may be connected to a plurality of conductive lines 19*d* to 19*f* For example, the second connector 198 connected to the plurality of conductive lines 19*d* to 19*f* may be connected to the second electrode portion 1311*c*. Referring to FIG. 8D, a center line 19*e* of the plurality of conductive lines 19*d* to 19*f* may be configured to be longer, but embodiments of the present disclosure are not limited thereto. For example, the center line 19*e* of the plurality of conductive lines 19*d* to 19*f* connected to the second electrode portion 1311*c* may be provided to protrude. Because the center line 19*e* of the plurality of conductive lines 19*d* to 19*f* connected to the second electrode portion 1311*c* is provided to be longer, a problem may be solved where the center line 19*e* of the signal cable 190 does not contact the second electrode portion 1311*c* in laminating the first cover member 1311*d* and the second cover member 1311*e*. Accordingly, an adhesive force between the signal cable 190 and the vibration portion 1311*a* including the second electrode portion 1311*c* may be more enhanced.

Referring to FIG. 8F, a conductive line of the signal cable 190 connected to the second electrode portion 1311*c* may be provided as two. Two conductive lines may be configured to have the same width as that of three conductive lines of the signal cable. Accordingly, even when a center portion of the signal cable 190 does not contact an electrode portion in laminating the first cover member 1311*d* and the second cover member 1311*e*, conductive lines at both edges (or both peripheries) of the signal cable may contact each other, and thus, an adhesive force between the signal cable 190 and the vibration portion 1311*a* including the second electrode portion 1311*c* may be enhanced. Also, the conductive lines 19*a* and 19*b* having the same width as that of three conductive lines may be provided, and thus, a contact area between the signal cable 190 and the vibration portion 1311*a* including the second electrode portion 1311*c* may increase, whereby an adhesive force between the signal cable 190 and the vibration portion 1311*a* may be more enhanced.

In FIGS. 8B, 8D, and 8F, a solid line represents the vibration portion 1311*a* of each of first and second vibration generating portions 1311-1 and 1311-2, and the vibration portion 1311*a* may be configured to be greater than the second electrode portion 1311*c*. Accordingly, electrical short circuit and/or a defect may be prevented from occurring in a manufacturing process and/or when a signal is applied thereto.

According to an embodiment of the present disclosure, a second vibration driving signal may be supplied to the second electrode portion 1311*c*. The second vibration driving signal provided from the sound processing circuit may be a negative (−) driving signal.

Figure 9A:
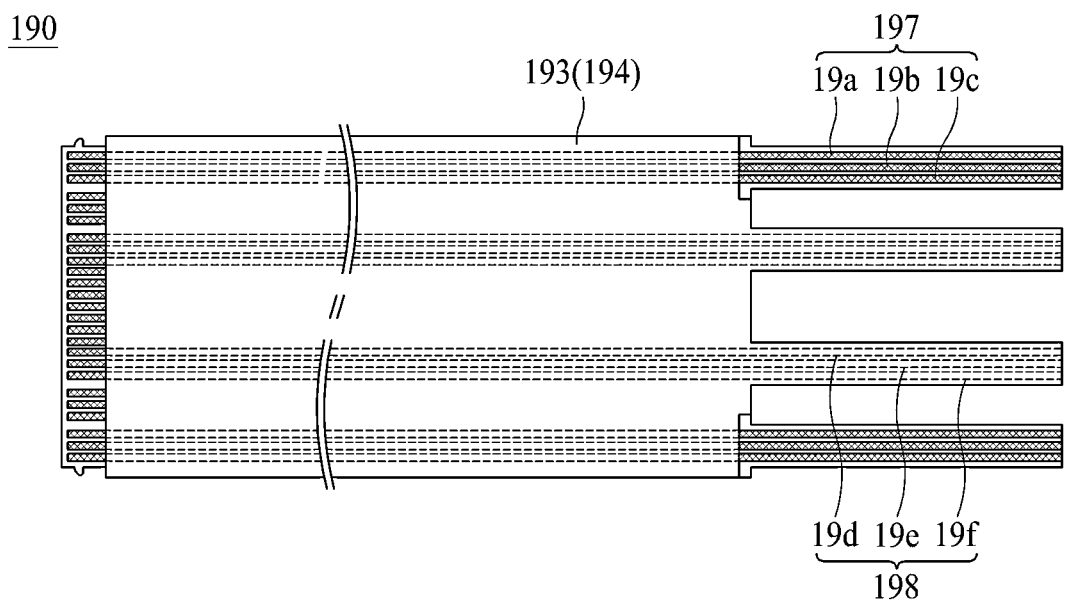
FIGS. 9A and 9B illustrate a signal cable according to an embodiment of the present disclosure.
Figure 9B:
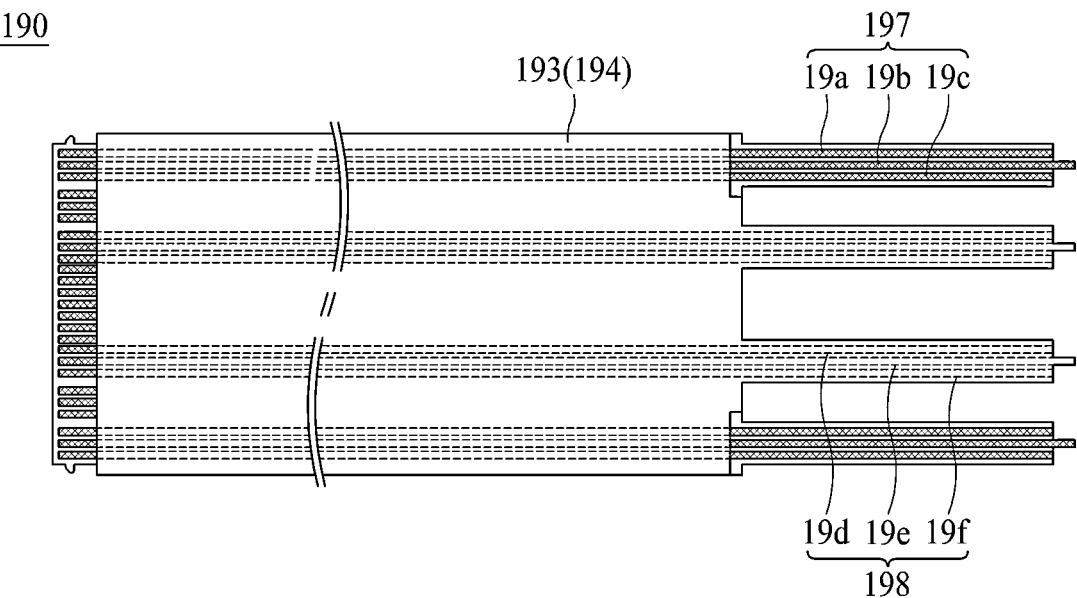

FIGS. 9A and 9B illustrate a signal cable according to an embodiment of the present disclosure.

FIGS. 9A and 9B illustrate a signal cable connected to an electrode portion of a vibration device.

Referring to FIG. 9A, a conductive line of the line layer 191 of the signal cable 190 may be provided in plurality. The first and second protection films 193 and 194 may be disposed at the line layer 191. The first electrode portion 1311*b* may be connected to or contact the conductive lines 19*a* to 19*c* connected to the first connector 197. The second electrode portion 1311*c* may be connected to or contact the conductive lines 19*d* to 19*f* connected to the second connector 198. For example, a first electrode portion 1311*b* of the first vibration generating portion 1311-1, a second electrode portion 1311*c* of the first vibration generating portion 1311-1, a second electrode portion 1311*c* of the second vibration generating portion 1311-2, and a first electrode portion 1311*b* of the second vibration generating portion 1311-2 may be connected to a connector of the signal cable 190. For example, the first vibration driving signal supplied from the sound processing circuit may be a positive (+) vibration driving signal, and the first vibration driving signal may be supplied to the first electrode portion 1311*b*. For example, the second vibration driving signal supplied from the sound processing circuit may be a negative (−) vibration driving signal, and the second vibration driving signal may be supplied to the second electrode portion 1311*c*.

Referring to FIG. 9B, a center conductive line 19*b* of the plurality of conductive lines 19*a* to 19*c* of the line layer 191 of the signal cable 190 may be configured to be longer. For example, the center conductive line 19*b* of the plurality of conductive lines 19*a* to 19*c* connected to the first connector 197 may be configured to be longer. For example, a center conductive line 19*e* of the plurality of conductive lines 19*a* to 19*c* connected to the second connector 198 may be configured to be longer. For example, the first electrode portion 1311*b* of the first vibration generating portion 1311-1, the second electrode portion 1311*c* of the first vibration generating portion 1311-1, the second electrode portion 1311*c* of the second vibration generating portion 1311-2, and the first electrode portion 1311*b* of the second vibration generating portion 1311-2 may be connected to first and second connectors 197 and 198 of the signal cable 190. For example, the first vibration driving signal supplied from the sound processing circuit may be a positive (+) vibration driving signal, and the first vibration driving signal may be supplied to the first electrode portion 1311*b*. For example, the second vibration driving signal supplied from the sound processing circuit may be a negative (−) vibration driving signal, and the second vibration driving signal may be supplied to the second electrode portion 1311*c*. However, embodiments of the present disclosure are not limited thereto, and as described above with reference to FIGS. 8E and 8F, the signal cable may be configured with two conductive lines.

FIGS. 10A to 10D illustrate a method of manufacturing a vibration device according to an embodiment of the present disclosure. FIGS. 10A to 10D will be described with reference to the cross-sectional view taken along line C-C' illustrated in FIG. 3. However, embodiments of the present disclosure are not limited thereto, and FIGS. 10A to 10D may be identically applied to FIGS. 6 and 7.

Referring to FIGS. 10A to 10D, a vibration device according to another embodiment of the present disclosure may include a vibration portion 1311*a*, electrode portions 1311*b* and 1311*c*, and cover members 1311*d* and 1311*e*. The vibration portion 1311*a*, the electrode portions 1311*b* and 1311*c*, and the cover members 1311*d* and 1311*e* are as described above with reference to FIGS. 3 to 5B, and thus, their repetitive descriptions are omitted.

Figure 10A:
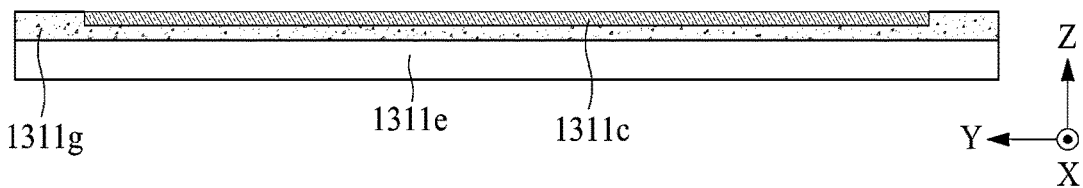
FIGS. 10A to 10D illustrate a method of manufacturing a vibration device according to an embodiment of the present disclosure.
Figure 10B:
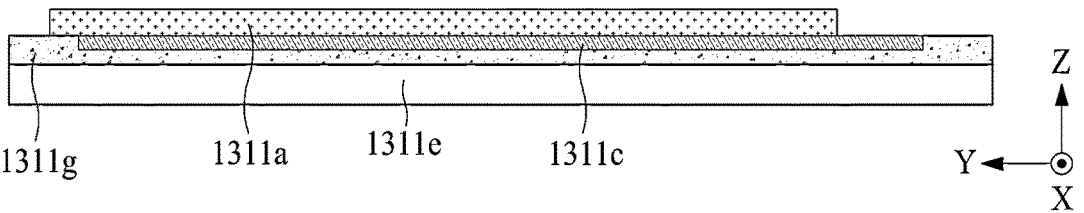

Referring to FIG. 10A, a second electrode portion 1311*c* may be formed on a second cover member 1311*e* and a second adhesive layer 1311*g*. Referring to FIG. 10B, the second electrode portion 1311*c* may be formed on a second electrode portion 1311*c*. The second electrode portion 1311*c* may include a conductive material, and thus, the conductive material of the second electrode portion 1311*c* may be connected to the vibration portion 1311*a*.

Figure 10C:
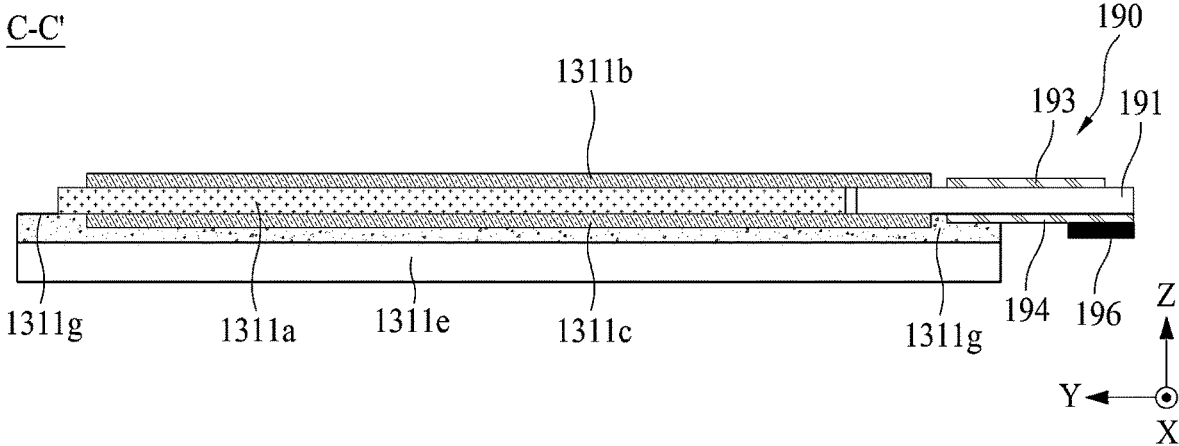

Referring to FIG. 10C, the vibration portion 1311*a* and a signal cable 190 may be aligned, and then, a first electrode portion 1311*b* may be formed. Accordingly, the first electrode portion 1311*b* and the second electrode portion 1311*c* may be connected to the signal cable 190.

Figure 10D:
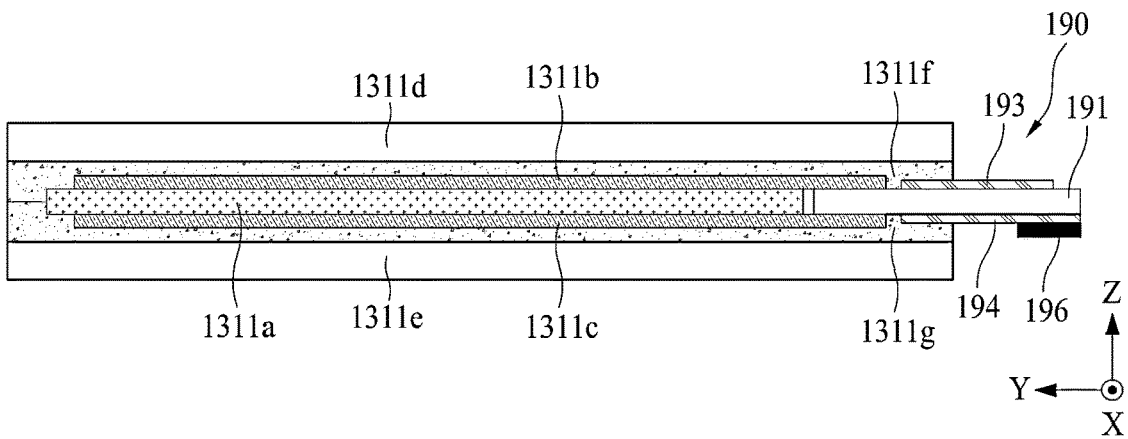

Referring to FIG. 10D, a first cover member 1311*d* and a first adhesive layer 1311*f* may be formed.

In another embodiment, the signal cable 190 may be formed on a second adhesive layer 1311*g*, and then, the first cover member 1311*d* and the first adhesive layer 1311*f* may be formed. Subsequently, the first electrode portion 1311*b* and the second electrode portion 1311*c* may be connected to the signal cable 190. In this case, a process of FIG. 10C may be omitted.

The first and second adhesive layers 1311*f* and 1311*g* according to an embodiment of the present disclosure may each be a double-sided tape or a hot melt adhesive, but embodiments of the present disclosure are not limited thereto. The hot melt adhesive may apply a process of performing rolling lamination at 150° C. and applying pressure to cure at 120° C. to 150° C. For example, the hot melt adhesive may be ethylene-vinyl acetate (EVA), poly-olefin, polyamide, or polyurethane, but embodiments of the present disclosure are not limited thereto.

The first and second adhesive layers 1311*f* and 1311*g* may be provided between the first cover member 1311*d* and the second cover member 1311*e* to fully surround the vibration portion 1311*a*. In another embodiment of the present disclosure, referring to FIGS. 4A and 4B, the vibration portion 1311*a* may be surrounded by the first and second adhesive layers 1311*f* and 1311*g*, the first electrode portion 1311*b*, and the second electrode portion 1311*c*.

Figure 11:
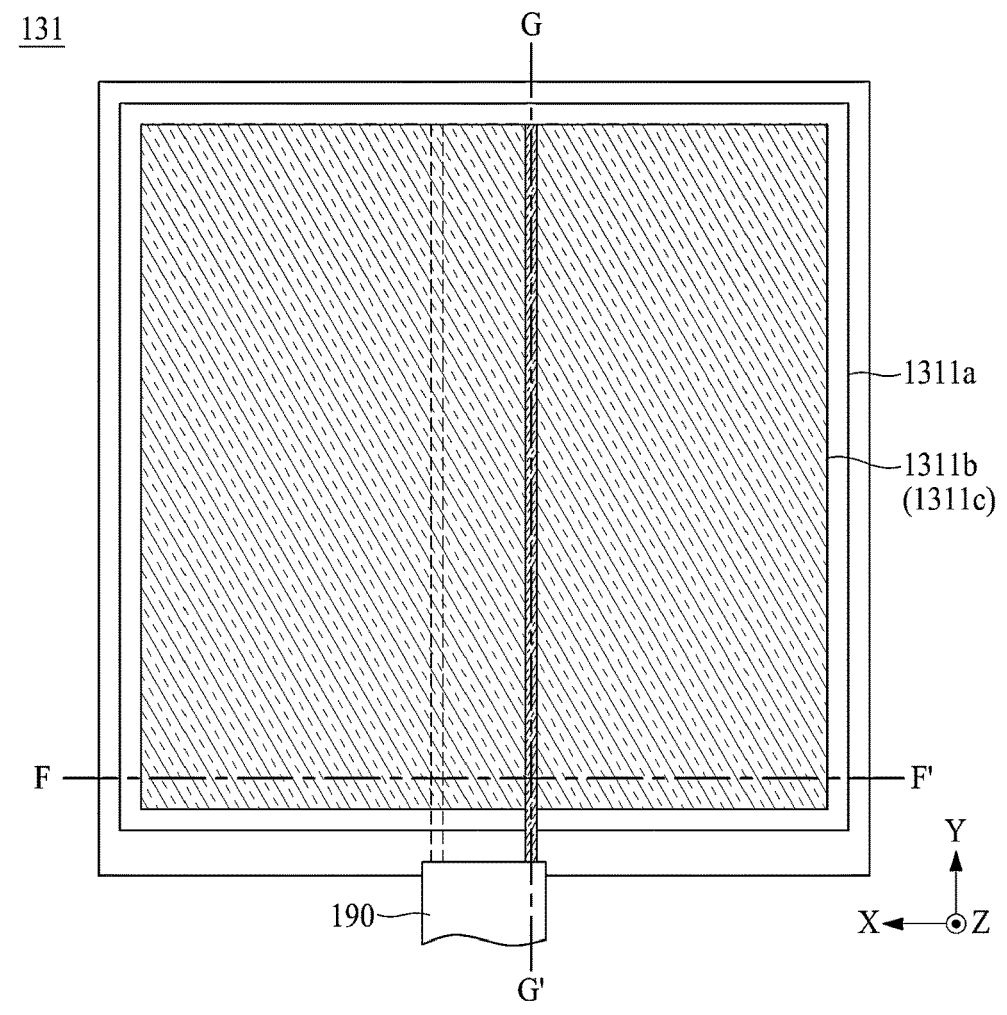
FIG. 11 illustrates a vibration device according to another embodiment of the present disclosure.
Figure 12A:
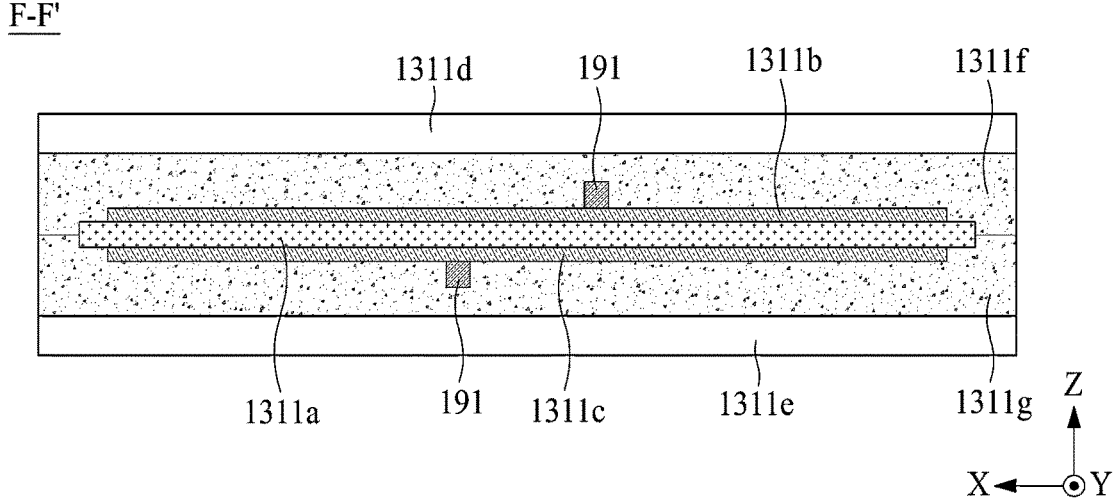
FIG. 12A is a cross-sectional view taken along line F-F' illustrated in FIG. 11.
Figure 12B:
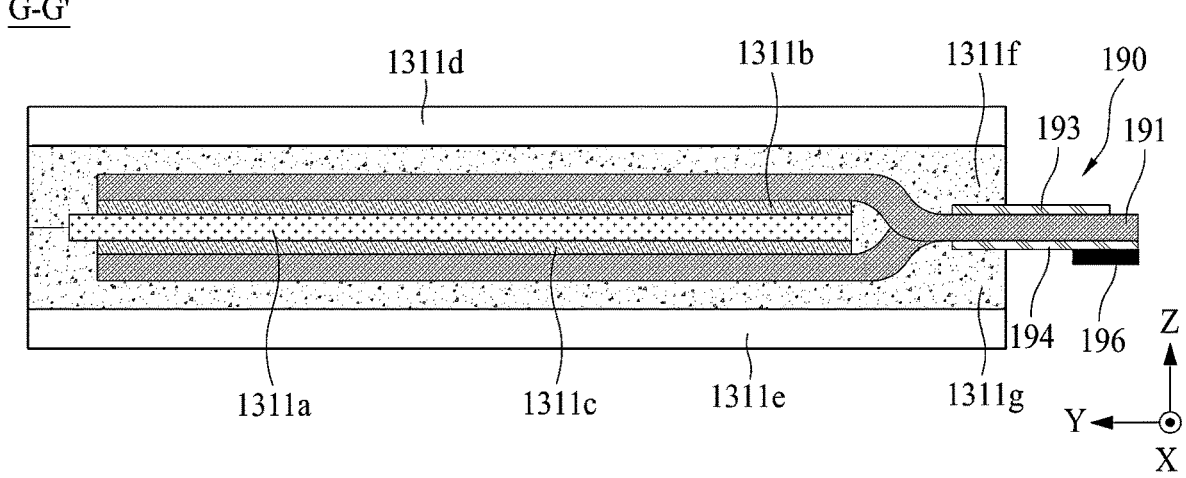
FIG. 12B is a cross-sectional view taken along line G-G' illustrated in FIG. 11.

FIG. 11 illustrates a vibration device according to another embodiment of the present disclosure. FIG. 12A is a cross-sectional view taken along line F-F' illustrated in FIG. 11. FIG. 12B is a cross-sectional view taken along line G-G' illustrated in FIG. 11.

Referring to FIGS. 11 to 12B, a vibration device 131 according to an embodiment of the present disclosure may include a vibration portion 1311*a* and a signal cable 190. For example, the vibration device 131 may be a vibration device which is provided as one body with the signal cable 190.

The vibration device 131 according to an embodiment of the present disclosure may include a vibration portion 1311*a*, a first electrode portion 1311*b*, and a second electrode portion 1311*c*. The vibration portion 1311*a*, the first electrode portion 1311*b*, and the second electrode portion 1311*c* may be substantially the same as the vibration portion 1311*a*, the first electrode portion 1311*b*, and the second electrode portion 1311*c* described above with reference to FIGS. 3 to 5B, and thus, like reference numerals refer to like elements and repetitive descriptions thereof are omitted.

The signal cable 190 according to an embodiment of the present disclosure may include a line layer 191, a first protection film 193, a second protection film 194, and a stiff portion 196. The line layer 191, the first protection film 193, the second protection film 194, and the stiff portion 196 may be substantially the same as the line layer 191, the first protection film 193, the second protection film 194, and the stiff portion 196 described above with reference to FIGS. 3 to 5B, and thus, like reference numerals refer to like elements and repetitive descriptions thereof are omitted.

The signal cable 190 according to an embodiment of the present disclosure may include the line layer 191 including a plurality of conductive lines. For example, some of the plurality of conductive lines may be electrically connected to the first electrode portion 1311*b* of the vibration device 131, and the other of the plurality of conductive lines may be electrically connected to the second electrode portion 1311*c* of the vibration device 131. For example, some of the plurality of conductive lines may be electrically and directly connected to the first electrode portion 1311*b* of the vibration device 131, and the other of the plurality of conductive lines may be electrically and directly connected to the second electrode portion 1311*c* of the vibration device 131.

For example, the line layer 191 of the signal cable 190 may be arranged in a second direction Y. The line layer 191 of each of the conductive lines may be used as a line electrode of the vibration device 131.

The line layer 191 of the conductive line may be electrically connected to the first electrode portion 1311*b* of the vibration device 131. For example, the line layer 191 of the conductive line may be bent toward the first electrode portion 1311*b* of the vibration device 131 at one side of the vibration device 131 and may be electrically connected to one edge portion (or one periphery portion) of the first electrode portion 1311*b* and the first electrode portion 1311*b*.

Another line layer 191 of the conductive line may be electrically connected to the second electrode portion 1311*c* of the vibration device 131. For example, the line layer 191 of the conductive line may be bent toward the second electrode portion 1311*c* of the vibration device 131 at one side of the vibration device 131 and may be electrically connected to one edge portion (or one periphery portion) of the second electrode portion 1311*c* and the second electrode portion 1311*c*.

Therefore, according to an embodiment of the present disclosure, a driving power may be supplied to the vibration device 131 through the line layer 191 of the conductive line of the signal cable 190. Accordingly, a power supply line disposed in each of the first cover member 1311*d* and the second cover member 1311*e* may not be provided and the driving power may be supplied to the first electrode portion 1311*b* and the second electrode portion 1311*c*, and thus, a structure of a vibration apparatus may be simplified. Also, according to an embodiment of the present disclosure, first and second electrode portions may configure a vibration apparatus where the first and second cover members are provided as one body, thereby providing a display apparatus or an apparatus including a vibration apparatus having a simplified structure and a thin thickness.

FIGS. 13A to 13F are perspective views illustrating a vibration portion according to another embodiment of the present disclosure.

Referring to FIGS. 13A to 13F, the vibration device 131 according to an embodiment of the present disclosure may be referred to as a flexible vibration structure, a flexible vibrator, a flexible vibration generating device, a flexible vibration generator, a flexible sounder, a flexible sound device, a flexible sound generating device, a flexible sound generator, a flexible actuator, a flexible speaker, a flexible piezoelectric speaker, a film actuator, a film type piezoelectric composite actuator, a film speaker, a film type piezoelectric speaker, or a film type piezoelectric composite speaker, but the terms are not limited thereto.

The vibration portion 1311*a* according to an embodiment of the present disclosure may include a plurality of first portions 1311*a*1 and a plurality of second portions 1311*a*2. For example, the plurality of first portions 1311*a*1 and the plurality of second portions 1311*a*2 may be alternately and repeatedly arranged in a first direction X (or a second direction Y). For example, the first direction X may be a widthwise direction of the vibration portion 1311*a* and the second direction Y may be a lengthwise direction of the vibration portion 1311*a* intersecting with the first direction X, but embodiments of the present disclosure are not limited thereto and the first direction X may be a lengthwise direction of the vibration portion 1311a and the second direction Y may be a widthwise direction of the vibration portion 1311a.

Each of the plurality of first portions 1311a1 may include an inorganic material portion. The inorganic material portion may include a piezoelectric material, a composite piezoelectric material, or an electro active material, which has a piezoelectric effect.

Each of the plurality of first portions 1311a1 may include a ceramic-based material for generating a relatively high vibration, or may include a piezoelectric ceramic having a perovskite-based crystalline structure. The perovskite crystalline structure may have a piezoelectric effect and/or an inverse piezoelectric effect, and may be a plate-shaped structure having orientation. The perovskite crystalline structure may be represented by a chemical formula "$ABO_3$". In the chemical formula, "A" may include a divalent metal element, and "B" may include a tetravalent metal element. For example, in the chemical formula "$ABO_3$", "A" and "B" may be cations, and "0" may be anions. For example, each of the plurality of first portions 1311a1 may include one or more of lead(II) titanate (Pb-$TiO_3$), lead zirconate (Pb$ZrO_3$), lead zirconate titanate (Pb$ZrTiO_3$), barium titanate (Ba$TiO_3$), and strontium titanate (Sr$TiO_3$), but embodiments of the present disclosure are not limited thereto.

According to another embodiment of the present disclosure, the vibration portion 1311a may include a lead zirconate titanate (PZT)-based material, including lead (Pb), zirconium (Zr), and titanium (Ti); or may include a lead zirconate nickel niobate (PZNN)-based material, including lead (Pb), zirconium (Zr), nickel (Ni), and niobium (Nb), but embodiments of the present disclosure are not limited thereto. According to another embodiment of the present disclosure, the vibration portion 1311a may include one or more of calcium titanate (Ca$TiO_3$), Ba$TiO_3$, and Sr$TiO_3$, each including no Pb, but embodiments of the present disclosure are not limited thereto.

In the vibration portion 1311a, the plurality of first portions 1311a1 and the plurality of second portions 1311a2 may be disposed (or arranged) in parallel on the same plane (or the same layer). Each of the plurality of second portions 1311a2 may be configured to fill a gap between two adjacent first portions 1311a1, and thus, each of the plurality of second portions 1311a2 may be connected to or attached on an adjacent first portion 1311a. Accordingly, the vibration portion 1311a may extend by a desired size or length based on lateral coupling (or connection) of the first portion 1311a1 and the second portion 1311a2.

Figure 13A:
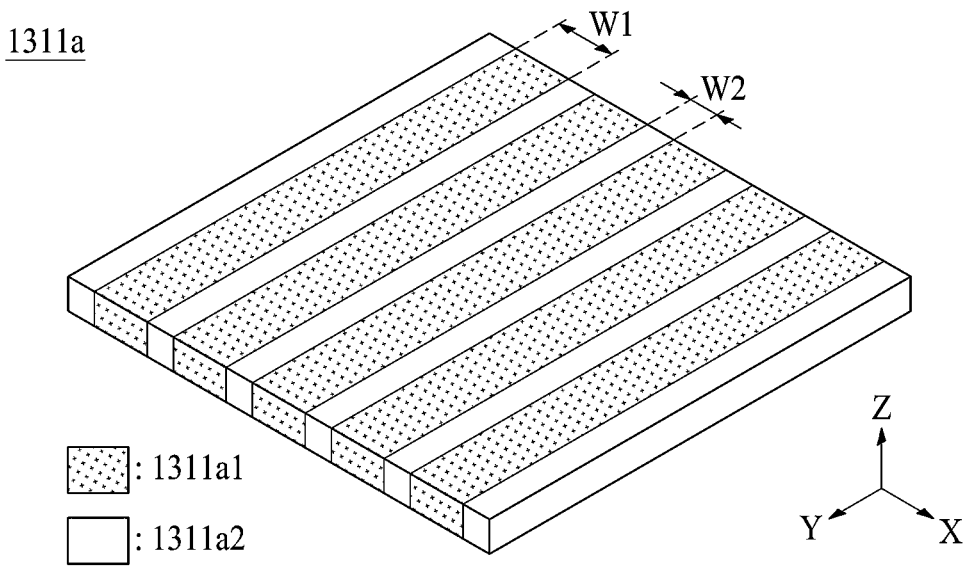
FIGS. 13A to 13F are perspective views illustrating a vibration portion according to an embodiment of the present disclosure.

Referring to FIG. 13A, a vibration portion 1311a of a vibration device 131 according to an embodiment of the present disclosure may include a plurality of first portions 1311a1 and a plurality of second portions 1311a2, which are alternately and repeatedly arranged in a first direction X. Each of the plurality of first portions 1311a1 may be disposed between the plurality of second portions 1311a2 and may have a first width W1 parallel to the first direction X (or a second direction Y) and a length parallel to the second direction Y (or the first direction X). Each of the plurality of second portions 1311a2 may have a second width W2 parallel to the first direction X (or the second direction Y) and a length parallel to the second direction Y (or the first direction X). The first width W1 may be equal to or different from the second width W2.

For example, the first width W1 may be greater than the second width W2. For example, the first portion 1311a1 and the second portion 1311a2 may include a line shape or a stripe shape having the same size or different sizes. Accordingly, the vibration portion 1311a may have a 2-2 composite structure having a piezoelectric characteristic of a 2-2 vibration mode, and thus, may have a resonance frequency of 20 kHz or less, but embodiments of the present disclosure are not limited thereto. For example, the resonance frequency of the vibration portion 1311a may vary based on one or more of a shape, a length, and a thickness.

Figure 13B:
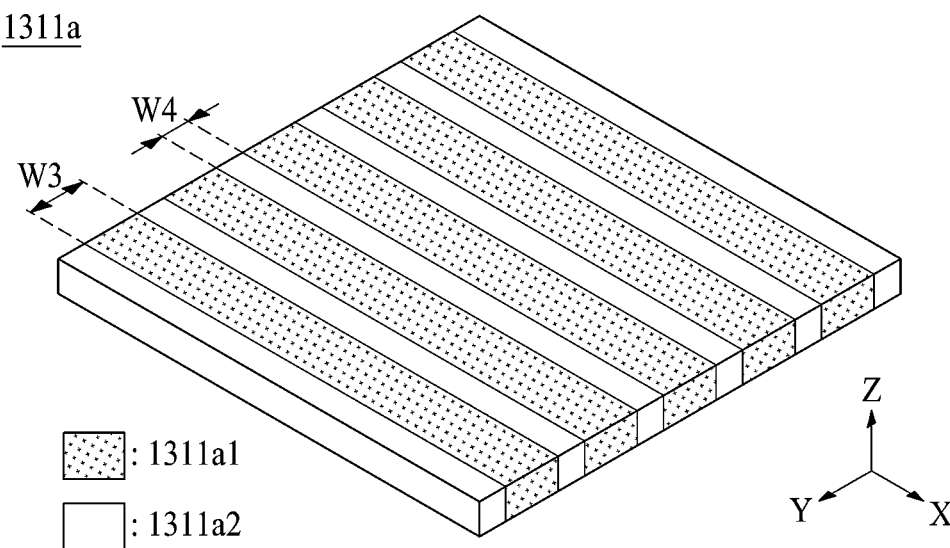

Referring to FIG. 13B, a vibration portion 1311a of a vibration device 131 according to an embodiment of the present disclosure may include a plurality of first portions 1311a1 and a plurality of second portions 1311a2. For example, the plurality of first portions 1311a1 and the plurality of second portions 1311a2 may be alternately and repeatedly arranged in a second direction Y. Each of the plurality of first portions 1311a1 may be disposed between the plurality of second portions 1311a2 and may have a third width W3 parallel to the second direction Y and a length parallel to the first direction X (or the second direction Y). Each of the plurality of second portions 1311a2 may have the same fourth width W4 as the third width W3 and a length parallel to the first direction X (or the second direction Y). For example, the first portion 1311a1 and the second portion 1311a2 may include a line shape or a stripe shape having the same size. The vibration portion 1311a of the vibration device 131 illustrated in FIG. 18B may have a 2-2 composite and may have a resonance frequency of 20 kHz or less, but embodiments of the present disclosure are not limited thereto. For example, a resonance frequency of the vibration portion 1311a may vary based on one or more of a shape, a length, and a thickness.

In the vibration portion 1311a, the width W2 and W4 of each of the plurality of second portions 1311a2 may decrease progressively in a direction from a center portion of the vibration portion 1311a or the vibration device 131 to both edge portions (or both ends or both periphery portions) thereof.

According to an embodiment of the present disclosure, when the vibration portion 1311a or the vibration device 131 vibrates in a vertical direction Z (or a thickness direction), a second portion 1311a2 having a largest width W2 and W4 among the plurality of second portions 1311a2 may be disposed at a portion on which a largest stress concentrates. When the vibration portion 1311a or the vibration device 131 vibrates in the vertical direction Z, a second portion 1311a2 having a smallest width W2 and W4 among the plurality of second portions 1311a2 may be disposed at a portion where a relatively smallest stress occurs. For example, the second portion 1311a2 having the largest width W2 and W4 among the plurality of second portions 1311a2 may be disposed at a center portion of the vibration portion 1311a, and the second portion 1311a2 having the smallest width W2 and W4 among the plurality of second portions 1311a2 may be disposed at both edge portions (or both periphery portions) of the vibration portion 1311a. Accordingly, when the vibration portion 1311a or the vibration device 131 vibrates in the vertical direction Z, an overlap of a resonance frequency or interference of a sound wave occurring at a portion on which a largest stress concentrates may be minimized, and thus, dip of a sound pressure level occurring in a low pitched sound band may be reduced. For example, the flatness of a sound characteristic may be a magnitude of a deviation between a highest sound pressure level and a lowest sound pressure level.

In the vibration portion 1311a, the plurality of first portions 1311a1 may have different sizes (or widths). For example, a size (or a width) of each of the plurality of first portions 1311a1 may decrease or increase progressively in a direction from the center portion of the vibration portion 1311a or the vibration device 131 to both edge portions (or both ends or both periphery portion) thereof. Therefore, a sound pressure level characteristic of a sound of the vibration portion 1311a may be enhanced by various unique vibration frequencies based on vibrations of the plurality of first portions 1311a1 having different sizes, and a reproduction band of a sound may extend.

Each of the plurality of second portions 1311a2 may be disposed between the plurality of first portions 1311a1. Therefore, in the vibration portion 1311a or the vibration device 131, vibration energy based on a link in a unit lattice of the first portion 1311a1 may be increased by the second portion 1311a2, and thus, a vibration characteristic may increase and a piezoelectric characteristic and flexibility may be secured. For example, the second portion 1311a2 may include one of an epoxy-based polymer, an acrylic-based polymer, and a silicone-based polymer, but embodiments of the present disclosure are not limited thereto.

Each of the plurality of second portions 1311a2 according to an embodiment of the present disclosure may be configured with an organic material portion. For example, the organic material portion may be disposed between two adjacent inorganic material portions, and thus, may absorb an impact applied to the inorganic material portion (or the first portion) and may release a stress concentrating on the inorganic material portion, thereby enhancing the durability of the vibration portion 1311a or the vibration device 131 and realizing the flexibility of the vibration portion 1311a or the vibration device 131.

The second portion 1311a2 according to an embodiment of the present disclosure may have a modulus and viscoelasticity that are lower than those of the first portion 1311a1, and thus, the second portion 1311a2 may enhance the reliability of the first portion 1311a1 vulnerable to an impact due to a fragile characteristic of the first portion 1311a1. For example, the second portion 1311a2 may include a material having a loss coefficient of about 0.01 to about 1 and a modulus of about 0.1 GPa (GigaPascals) to about 10 GPa.

The organic material portion included in the second portion 1311a2 may include an organic material, an organic polymer, an organic piezoelectric material, or an organic non-piezoelectric material having a flexible characteristic compared to the inorganic material portion which is the first portion 1311a1. For example, the second portion 1311a2 may be referred to as an adhesive portion, a flexible portion, a bending portion, a damping portion, or a ductile portion, or the like, but embodiments of the present disclosure are not limited thereto.

The plurality of first portions 1311a1 and the plurality of second portions 1311a2 may be disposed on (or connected to) the same plane, and thus, the vibration portion 1311a according to an embodiment of the present embodiment may have a single thin film form. For example, the vibration portion 1311a may have a structure where the plurality of first portions 1311a1 are connected to one side thereof. For example, the vibration portion 1311a may have a structure where the plurality of first portions 1311a1 are connected in all of the vibration portion 1311a. For example, the vibration portion 1311a may be vibrated in a vertical direction with respect to the display panel or the vibration member by the first portion 1311a1 having a vibration characteristic and may be bent in a curved shape by the second portion 1311a2 having flexibility. Also, in the vibration portion 1311a according to an embodiment of the present embodiment, a size of the first portion 1311a1 and a size of the second portion 1311a2 may be set based on a piezoelectric characteristic and flexibility needed for the vibration portion 1311a or the vibration device 131. For example, in the vibration portion 1311a requiring a piezoelectric characteristic rather than flexibility, a size of the first portion 1311a1 may be set to be greater than that of the second portion 1311a2. In another embodiment of the present disclosure, in the vibration portion 1311a requiring flexibility rather than a piezoelectric characteristic, a size of the second portion 1311a2 may be set to be greater than that of the first portion 1311a1. Accordingly, a size of the vibration portion 1311a may be adjusted based on a desired characteristic, and thus, the vibration portion 1311a may be easily designed.

Figure 13C:
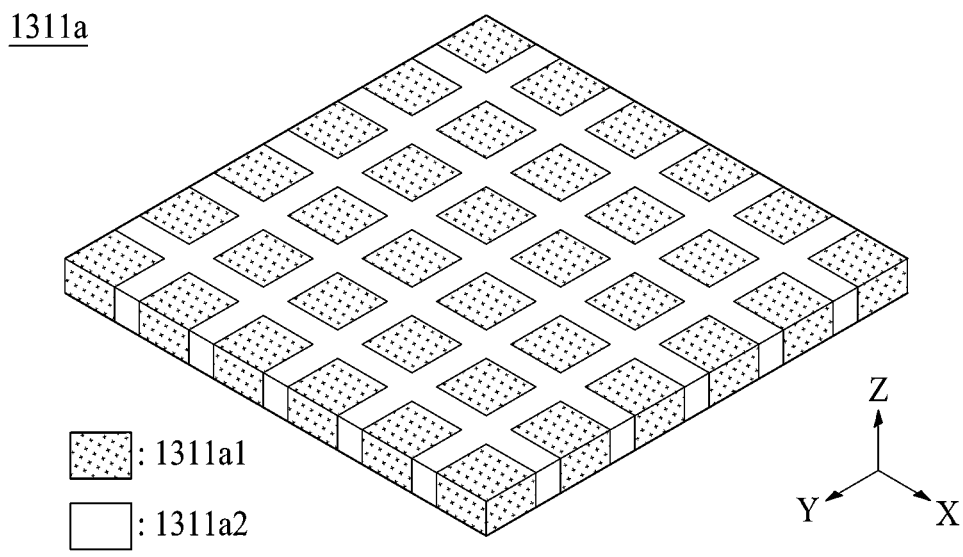

Referring to FIG. 13C, a vibration portion 1311a according to another embodiment of the present disclosure may include a plurality of first portions 1311a1, which are apart from one another in a first direction X and a second direction Y, and a second portion 1311a2 disposed between the plurality of first portions 1311a1.

The plurality of first portions 1311a1 may be arranged apart from one another in each of the first direction X and the second direction Y. For example, the plurality of first portions 1311a1 may be arranged in a lattice form to have a hexahedral shape having the same size. Each of the plurality of first portions 1311a1 may include substantially the same piezoelectric material as that of the first portion 1311a1 described above with reference to FIGS. 13A and 13B, and thus, like reference numerals refer to like elements and repeated descriptions thereof are omitted.

The second portion 1311a2 may be arranged between the plurality of first portions 1311a1 in each of the first direction X and the second direction Y. The second portion 1311a2 may be configured to fill a gap between two adjacent first portions 1311a1 or surround each of the plurality of first portions 1311a1, and thus, may be connected or adhered to an adjacent first portion 1311a1. According to an embodiment of the present disclosure, a width of the second portion 1311a2 disposed between two first portions 1311a1 adjacent to each other in the first direction X may be the same as or different from that of the first portion 1311a1, and a width of the second portion 1311a2 disposed between two first portions 1311a1 adjacent to each other in the second direction Y may be the same as or different from that of the first portion 1311a1. The second portion 1311a2 may include substantially the same piezoelectric material as that of the second portion 1311a2 described above with reference to FIGS. 13A and 13B, and thus, like reference numerals refer to like elements and repeated descriptions thereof are omitted.

As described above, the vibration portion 1311a according to another embodiment of the present disclosure may have a 1-3 composite structure having a piezoelectric characteristic of a 1-3 vibration mode, and thus, may have a resonance frequency of 30 MHz or less, but embodiments of the present disclosure are not limited thereto. For example, the resonance frequency of the vibration portion 1311a may vary based on one or more of a shape, a length, and a thickness.

Figure 13D:
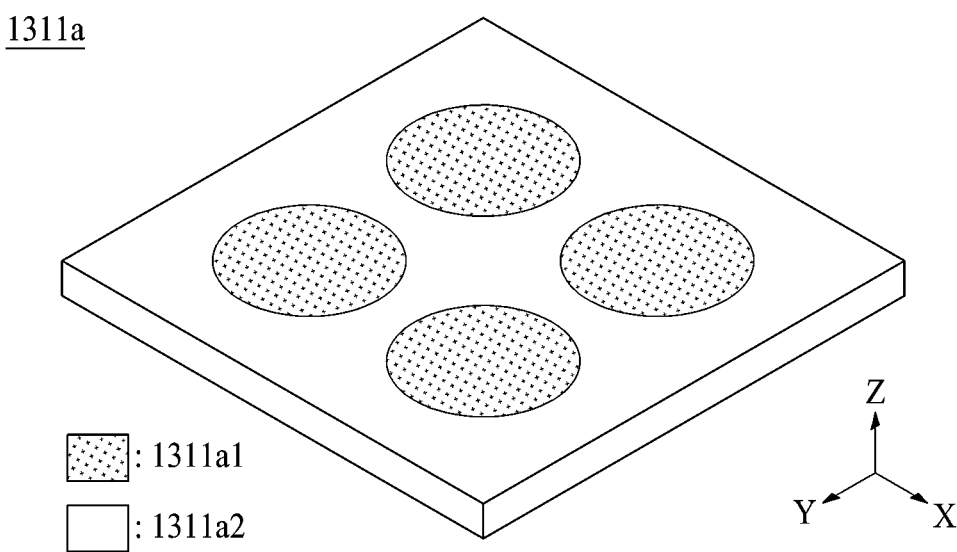

Referring to FIG. 13D, a vibration portion 1311a according to another embodiment of the present disclosure may include a plurality of first portions 1311a1, which are apart from one another in a first direction X and a second direction Y, and a second portion 1311a2 disposed between the plurality of first portions 1311a1.

Each of the plurality of first portions 1311a1 may have a circular-shaped planar structure. For example, each of the plurality of first portions 1311a1 may have a circular plate shape, but embodiments of the present disclosure are not limited thereto. For example, each of the plurality of first portions 1311a1 may have a dot shape such as an oval shape, a polygonal shape, or a donut shape. Each of the plurality of first portions 1311a1 may include substantially the same piezoelectric material as that of the first portion 1311a1 described above with reference to FIGS. 13A and 13B, and thus, like reference numerals refer to like elements and repeated descriptions thereof are omitted.

The second portion 1311a2 may be arranged between the plurality of first portions 1311a1 in each of the first direction X and the second direction Y. The second portion 1311a2 may be configured to surround each of the plurality of first portions 1311a1, and thus, may be connected or adhered to a lateral surface of each of the plurality of first portions 1311a1. Each of the plurality of first portions 1311a1 and the second portion 1311a2 may be disposed (or arranged) in parallel on the same plane (or the same layer). The second portion 1311a2 may include substantially the same organic material as that of the second portion 1311a2 described above with reference to FIGS. 13A and 13B, and thus, like reference numerals refer to like elements and repeated descriptions thereof are omitted.

Figure 13E:
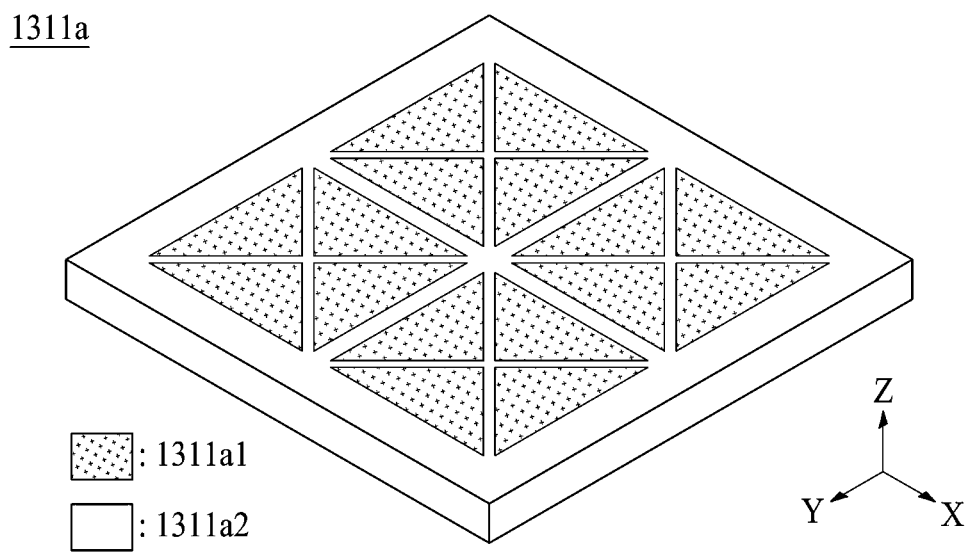

Referring to FIG. 13E, in a vibration device 131 according to another embodiment of the present disclosure, a vibration portion 1311a may include a plurality of first portions 1311a1, which are apart from one another in a first direction X and a second direction Y, and a second portion 1311a2 disposed between the plurality of first portions 1311a1.

Each of the plurality of first portions 1311a1 may have a triangular-shaped planar structure. For example, each of the plurality of first portions 1311a1 may have a triangular plate shape. Each of the plurality of first portions 1311a1 may include substantially the same piezoelectric material as that of the first portion 1311a1 described above with reference to FIGS. 13A and 13B, and thus, like reference numerals refer to like elements and repeated descriptions thereof are omitted.

According to an embodiment of the present disclosure, four adjacent first portions 1311a1 of the plurality of first portions 1311a1 may be arranged adjacent to one another to form a tetragonal shape (or a square shape). A vertex of each of the four adjacent first portions 1311a1 forming a tetragonal shape may be disposed adjacent to a center portion (or a middle portion) of a tetragonal shape.

The second portion 1311a2 may be arranged between the plurality of first portions 1311a1 in each of the first direction X and the second direction Y. The second portion 1311a2 may be configured to surround each of the plurality of first portions 1311a1, and thus, may be connected or adhered to a lateral surface of each of the plurality of first portions 1311a1. Each of the plurality of first portions 1311a1 and the second portion 1311a2 may be disposed (or arranged) in parallel on the same plane (or the same layer). The second portion 1311a2 may include substantially the same organic material as that of the second portion 1311a2 described above with reference to FIGS. 13A and 13B, and thus, like reference numerals refer to like elements and repeated descriptions thereof are omitted.

Figure 13F:
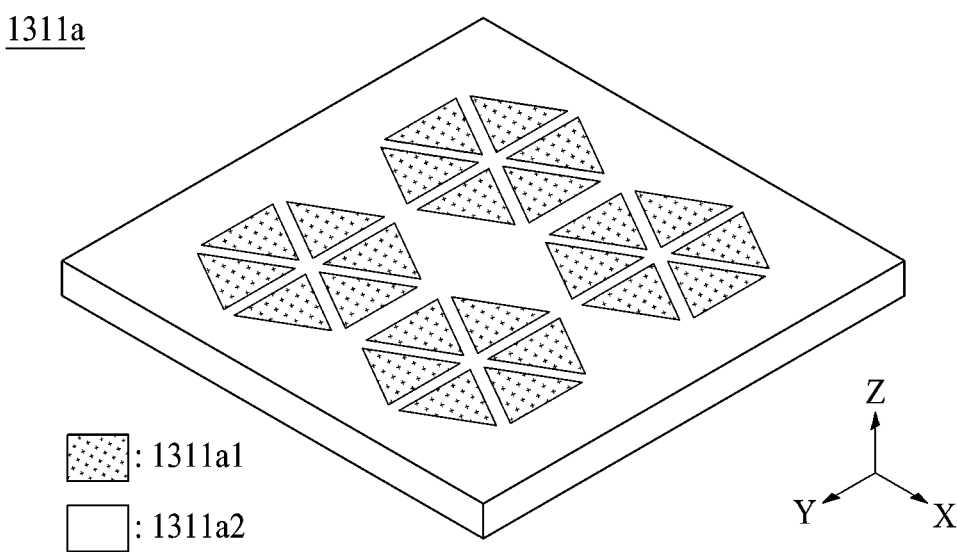

Referring to FIG. 13F, in a vibration device 131 according to another embodiment of the present disclosure, a vibration portion 1311a may include a plurality of first portions 1311a1, which are apart from one another in a first direction X and a second direction Y, and a second portion 1311a2 disposed between the plurality of first portions 1311a1.

Each of the plurality of first portions 1311a1 may have a triangular-shaped planar structure. For example, each of the plurality of first portions 1311a1 may have a triangular plate shape. Each of the plurality of first portions 1311a1 may include substantially the same piezoelectric material as that of the first portion 1311a1 described above with reference to FIGS. 13A and 13B, and thus, like reference numerals refer to like elements and repeated descriptions thereof are omitted.

According to an embodiment of the present disclosure, six adjacent first portions 1311a1 of the plurality of first portions 1311a1 may be arranged adjacent to one another to form a hexagonal shape (or a regular hexagonal shape). A vertex of each of the six adjacent first portions 1311a1 forming a hexagonal shape may be disposed adjacent to a center portion (or a middle portion) of a hexagonal shape.

The second portion 1311a2 may be arranged between the plurality of first portions 1311a1 in each of the first direction X and the second direction Y. The second portion 1311a2 may be configured to surround each of the plurality of first portions 1311a1, and thus, may be connected or adhered to a lateral surface of each of the plurality of first portions 1311a1. Each of the plurality of first portions 1311a1 and the second portion 1311a2 may be disposed (or arranged) in parallel on the same plane (or the same layer). The second portion 1311a2 may include substantially the same organic material as that of the second portion 1311a2 described above with reference to FIGS. 13A and 13B, and thus, like reference numerals refer to like elements and repeated descriptions thereof are omitted. The descriptions of the vibration device of FIGS. 13A to 13F may be identically applied to FIGS. 1 to 12B.

Figure 14:
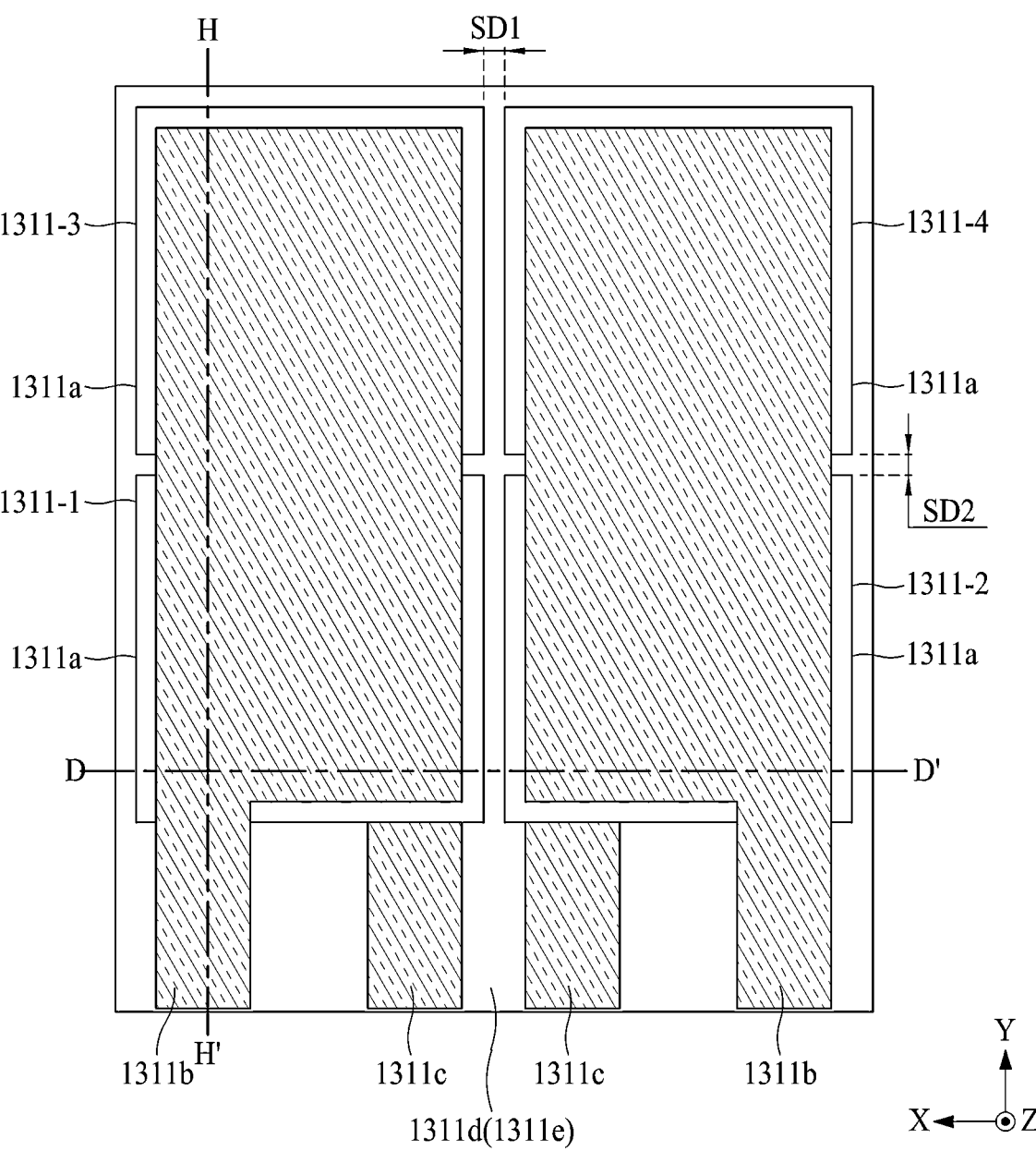
FIG. 14 illustrates a vibration device according to another embodiment of the present disclosure.
Figure 15:
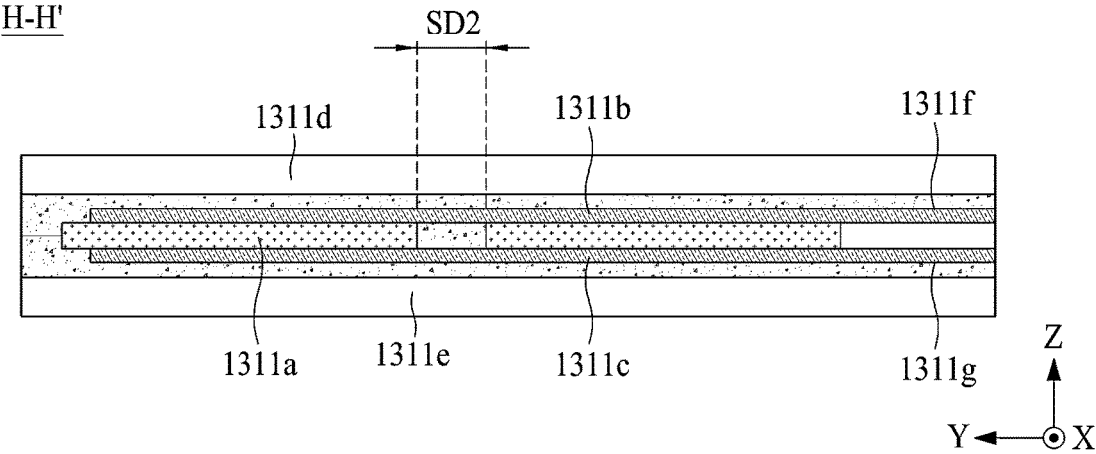
FIG. 15 is a cross-sectional view taken along line H-H' illustrated in FIG. 14.

FIG. 14 illustrates a vibration device according to another embodiment of the present disclosure. FIG. 15 is a cross-sectional view taken along line H-H' illustrated in FIG. 14. A cross-sectional view taken along line D-D' illustrated in FIG. 14 is illustrated in FIG. 7A.

FIGS. 14 and 15 illustrate an embodiment where four vibration generating portions are provided in the vibration apparatus illustrated in FIG. 6. Hereinafter, therefore, the other elements except four vibration generating portions and relevant elements are referred to by like reference numerals, and their repetitive descriptions are omitted or will be briefly given.

Referring to FIGS. 14 and 15, a vibration device according to another embodiment of the present disclosure may include a plurality of vibration generating portions 1311-1 to 1311-4.

The plurality of vibration generating portions 1311-1 to 1311-4 may be electrically disconnected and arranged apart from one another in a first direction X and a second direction Y. For example, the plurality of vibration generating portions 1311-1 to 1311-4 may be arranged in an iXj form on the same plane, and thus, the vibration device may increase in area to have a large area, based on the plurality of vibration generating portions 1311-1 to 1311-4 having a relatively small size. For example, the plurality of vibration generating portions 1311-1 to 1311-4 may be arranged or tiled in an iXj form on the same plane, and thus, the vibration device may increase in area to have a large area, based on tiling of the plurality of vibration generating portions 1311-1 to 1311-4 having a relatively small size. For example, i may be the number of vibration generating portions arranged in a first direction X and may be a natural number of 2 or more, and j may be the number of vibration generating portions arranged in a second direction Y and may be a natural number of 2 or more which is equal to or different from i.

For example, the plurality of vibration generating portions 1311-1 to 1311-4 may be arranged or tiled in a 2×2 form, but embodiments of the present disclosure are not limited thereto. In the following description, an example where a vibration device includes first to fourth vibration generating portions 1311-1 to 1311-4 will be described.

According to an embodiment of the present disclosure, first and second vibration generating portions 1311-1 and 1311-2 may be apart from each other in the first direction X. Third and fourth vibration generating portions 1311-3 and 1311-4 may be apart from each other in the first direction X and may be apart from the first and second vibration generating portions 1311-1 and 1311-2 in the second direction Y. The first and third vibration generating portions 1311-1 and 1311-3 may be apart from each other in the second direction Y to face each other. The second and fourth vibration generating portions 1311-2 and 1311-4 may be apart from each other in the second direction Y to face each other.

The first to fourth vibration generating portions 1311-1 to 1311-4 may be disposed between a first cover member 1311d and a second cover member 1311e. For example, each of the first cover member 1311d and the second cover member 1311e may connect or support the first to fourth vibration generating portions 1311-1 to 1311-4 in common, and thus, the first to fourth vibration generating portions 1311-1 to 1311-4 may be driven as one vibration apparatus (or a single vibration apparatus). For example, the first to fourth vibration generating portions 1311-1 to 1311-4 may be arranged or tiled at a certain interval in the first cover member 1311d and the second cover member 1311e, and thus, may be driven as one vibration apparatus (or a single vibration apparatus). According to another embodiment, the first to fourth vibration generating portions 1311-1 to 1311-4 may configure one group, and a plurality of groups may be arranged.

According to another embodiment of the present disclosure, as described above with reference to FIGS. 6 to 7B, the first vibration generating portion 1311-1 and the third vibration generating portion 1311-3 may configure one vibration apparatus, and the second vibration generating portion 1311-2 and the fourth vibration generating portion 1311-4 may configure one vibration apparatus. For example, the first vibration generating portion 1311-1 and the third vibration generating portion 1311-3 which are two vibration apparatuses may configure one vibration apparatus (o a first group), and the second vibration generating portion 1311-2 and the fourth vibration generating portion 1311-4 which are two vibration apparatuses may configure one vibration apparatus (o a second group) and may be disposed in a vibration member or a display panel. For example, three or more vibration apparatuses (a first group or a second group) may be configured.

According to an embodiment of the present disclosure, as described above with reference to FIGS. 6 to 7D, the first to fourth vibration generating portions 1311-1 to 1311-4 may be arranged (or tiled) at intervals SD1 and SD2 of 0.1 mm or more and less than 3 cm in the first direction X and the second direction Y, or may be arranged or tiled at an interval of 0.1 mm or more and less than 5 mm, for a single-body vibration or a large-area vibration.

Each of the first to fourth vibration generating portions 1311-1 to 1311-4 may include a vibration portion 1311a, a first electrode portion 1311b, and a second electrode portion 1311c.

The vibration portion 1311a of each of the first to fourth vibration generating portions 1311-1 to 1311-4 may include a piezoelectric material (or an electro active material) including a piezoelectric effect. The vibration portion 1311a of each of the first to fourth vibration generating portions 1311-1 to 1311-4 may be substantially the same as one of the vibration portions 1311a described above with reference to FIGS. 3 to 7B and 13A to 13F, and thus, like reference numerals refer to like elements and repetitive descriptions thereof are omitted.

According to an embodiment of the present disclosure, each of the first to fourth vibration generating portions 1311-1 to 1311-4 may include one vibration portion 1311a or different vibration portions 1311a among the vibration portions 1311a described above with reference to FIGS. 3 to 7B and 13A to 13F.

According to another embodiment of the present disclosure, one or more of the first to fourth vibration generating portions 1311-1 to 1311-4 may include different vibration portions 1311a among the vibration portions 1311a described above with reference to FIGS. 3 to 7B and 13A to 13F.

The first electrode portion 1311b may be disposed at a first surface of a corresponding vibration portion 1311a and may be electrically connected to the first surface of the vibration portion 1311a. This may be substantially the same as the first electrode portion 1311b described above with reference to FIGS. 3 to 5B, and thus, like reference numerals refer to like elements and repetitive descriptions thereof are omitted.

The second electrode portion 1311c may be disposed at a second surface of the vibration portion 1311a and may be electrically connected to the second surface of the vibration portion 1311a. This may be substantially the same as the first electrode portion 1311b described above with reference to FIGS. 3 to 5B, and thus, like reference numerals refer to like elements and repetitive descriptions thereof are omitted.

According to an embodiment of the present disclosure, first and second adhesive layers 1311f and 1311g may be connected or coupled to each other between the first to fourth vibration generating portions 1311-1 to 1311-4. Therefore, each of the first to fourth vibration generating portions 1311-1 to 1311-4 may be surrounded by the first and second adhesive layers 1311f and 1311g. For example, the first and second adhesive layers 1311f and 1311g may be provided between the first cover member 1311d and the second cover member 1311e to surround each of the first to fourth vibration generating portions 1311-1 to 1311-4. For example, the first and second adhesive layers 1311f and 1311g may be provided between the first cover member 1311d and the second cover member 1311e to fully surround each of the first to fourth vibration generating portions 1311-1 to 1311-4. For example, each of the first to fourth vibration generating portions 1311-1 to 1311-4 may be buried or embedded between the first and second adhesive layers 1311f and 1311g.

According to an embodiment of the present disclosure, the first electrode portions 1311b and the second electrode portions 1311c may be configured with a conductive adhesive member having a conductive characteristic and an adhesive characteristic, and thus, the first surface of each of the first and second vibration generating portions 1311-1 and 1311-2 may be adhered to the first cover member 1311f by the first electrode portions 1311b and the second electrode portions 1311c. For example, the first adhesive layer 1311f may be disposed at both lateral surfaces of the vibration portion 1311a.

According to an embodiment of the present disclosure, the first electrode portion 1311b and the second electrode portion 1311c may be configured with a conductive adhesive member, and thus, a power supply line and/or a pad portion disposed in a cover member for connecting the first electrode portion 1311b to the second electrode portion 1311c may not be needed, thereby simplifying a structure of a vibration apparatus and implementing a vibration apparatus having a thin thickness. Also, according to an embodiment of the present disclosure, a first electrode portion and a second electrode portion may configure a vibration apparatus where a first cover member and a second cover member are provided as one body, thereby providing a display apparatus or an apparatus including a vibration apparatus having a simplified structure and a thin thickness. Also, according to an embodiment of the present disclosure, the vibration portion 1311a may be configured to have a size (or a length) which is greater than that of one or more of the first electrode portion 1311b and the second electrode portion 1311c, thereby preventing electrical short circuit and/or a defect from occurring in a manufacturing process and/or when a signal is applied thereto. Also, the first electrode portion 1311b and the second electrode portion 1311c according to an embodiment of the present disclosure may be configured with a power driving line, and thus, a power driving line disposed at a rear surface of a cover member may not be provided.

Figure 16:
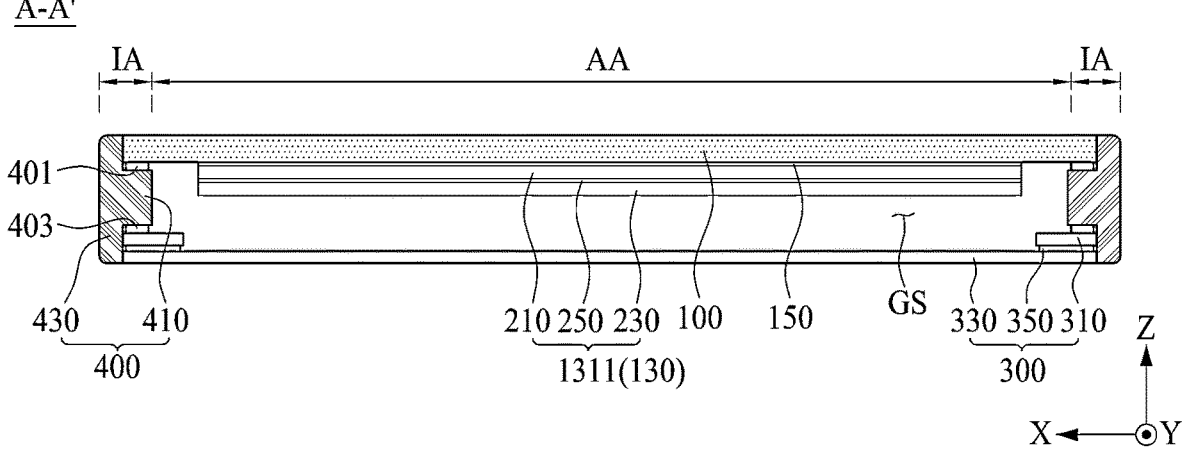
FIG. 16 is another cross-sectional view taken along line A-A' illustrated in FIG. 1.

FIG. 16 is another cross-sectional view taken along line A-A' illustrated in FIG. 1.

The vibration apparatus 130 may be disposed at a rear surface of the vibration member 100. Hereinafter, an example where a vibration member is a display panel will be described.

A vibration apparatus including one vibration generator may have a problem where it is unable to output a sufficient sound. For example, when a vibration apparatus including one vibration generator is applied to an apparatus such as a television (TV) or the like, there may be a problem where it is difficult to secure a sufficient sound. Therefore, when a vibration apparatus implemented with two vibration generators is applied to an apparatus, an attachment area of the display panel 100 or the vibration member (or a vibration object) and the vibration apparatus may be enlarged. As the attachment area is enlarged, when the vibrating device is attached to the rear surface of the display panel 100, it may be difficult to attach the vibration apparatus on the rear surface of the display panel 100 without an air bubble. For example, when the display panel 100 may be a light emitting display panel, there may be a problem where it is difficult to attach the vibration apparatus on an encapsulation substrate without an air bubble. Also, in a vibration apparatus implemented with two vibration generators arranged in parallel, because vibrations of adjacent vibration generators differ, there may be a problem of a division vibration where different vibrations occur. Due to this, there may be a problem where it is difficult to output a sound having enhanced sound flatness. There may be a problem where a division vibration increases as an attachment area of a vibration apparatus increases.

The vibration apparatus 130 according to an embodiment of the present disclosure may include a plurality of vibration generators 210 and 230 which overlap (or stack) each other. The vibration apparatus 130 may include the plurality of vibration generators 210 and 230 which overlap or are stacked to be displaced (or vibrated or drive) in the same direction. For example, the vibration apparatus 130 may include the plurality of vibration generators 210 and 230 which are overlapped or stacked to have the same driving direction.

The plurality of vibration generators 210 and 230 may overlap or be stacked to be displaced (or vibrated or driven) in the same direction. For example, the plurality of vibration generators 210 and 230 may contract or expand in the same driving direction (or displacement direction or vibration direction) based on a vibration driving signal in a state where the plurality of vibration generators 210 and 230 overlap or are stacked, and thus, a displacement amount (or a bending force or a flexural force) or an amplitude displacement of the display panel 100 may increase or may be maximized. Therefore, the plurality of vibration generators 210 and 230 may increase (or maximize) a displacement amount (or a bending force or a flexural force) or an amplitude displacement of the display panel 100 or the vibration member, thereby enhancing a sound pressure level characteristic of a sound and a sound characteristic of a middle-low-pitched sound band generated based on a vibration of the display panel 100. For example, the plurality of vibration generators 210 and 230 may be implemented so that the plurality of vibration generators 210 and 230 overlap or are stacked to have the same driving direction, and thus, a driving force of each of the plurality of vibration generators 210 and 230 may increase or may be maximized, thereby enhancing a sound pressure level characteristic of a sound and a sound characteristic of a middle-low-pitched sound band generated by the display panel 100 based on vibrations of the plurality of vibration generators 210 and 230. For example, the middle-low-pitched sound band may be 200 Hz to 1 kHz, but embodiments of the present disclosure are not limited thereto.

Each of the plurality of vibration generators 210 and 230 may include a vibration portion (or a piezoelectric vibration portion) including piezoelectric ceramic having a piezoelectric characteristic, but embodiments of the present disclosure are not limited thereto. For example, each of the plurality of vibration generators 210 and 230 may include piezoelectric ceramic having a perovskite crystalline structure, and thus, may vibrate (or mechanical displacement) in response to an electrical signal applied from the outside. For example, when a vibration driving signal (or a voice signal) is applied, each of the plurality of vibration generators 210 and 230 may alternately and repeatedly contract and expand based on an inverse piezoelectric effect of the vibration portion (or the piezoelectric vibration portion), and thus, may be displaced (or vibrated or driven) in the same direction based on a bending phenomenon where a bending direction is alternately changed, thereby increasing or maximizing a displacement amount (or a bending force or a flexural force) or an amplitude displacement of the vibration apparatus 130 or/and the display panel 100 (or vibration member).

A first vibration generator 210 disposed at the display panel 100 among the plurality of vibration generators 210 and 230 may be one main vibration generator. For example, the remaining second vibration generator 230 among the plurality of vibration generators 210 and 230 may be at least one auxiliary vibration generator which is stacked on the first vibration generator 210. The second vibration generator 230 may have the same structure as the first vibration generator 210, but embodiments of the present disclosure are not limited thereto.

For example, the first vibration generator 210 may be a first vibration film, a first displacement generator, a first displacement film, a first sound generator, a first vibration array, a first vibration array portion, a first vibration structure array portion, a first vibration array structure, a first tiling vibration array, a first tiling array module, or a first tiling vibration film, but the terms are not limited thereto. For example, the second vibration generator 210 may be a second vibration film, a second displacement generator, a second displacement film, a second sound generator, a second vibration array, a second vibration array portion, a second vibration structure array portion, a second vibration array structure, a second tiling vibration array, a second tiling array module, or a second tiling vibration film, but the terms are not limited thereto.

The vibration apparatus 130 according to an embodiment of the present disclosure may further include a connection member 250 (or a third connection member) disposed between the plurality of vibration generators 210 and 230.

The connection member 250 according to an embodiment of the present disclosure may be disposed between the plurality of vibration generators 210 and 230. For example, the connection member 250 may include a material including an adhesive layer which is good in adhesive force or attaching force with respect to each of the plurality of vibration generators 210 and 230. For example, the connection member 250 may include a foam pad, a double-sided tape, or an adhesive, but embodiments of the present disclosure are not limited thereto. For example, the adhesive layer of the connection member 250 may include epoxy, acrylic, silicone, or urethane, but embodiments of the present disclosure are not limited thereto. For example, the adhesive layer of the connection member 250 may include a urethane-based material which relatively has a ductile characteristic compared to acrylic among acrylic and urethane. Accordingly, the vibration loss of the vibration apparatus 130 caused by displacement interference between the plurality of vibration generators 210 and 230 may be minimized, or each of the plurality of vibration generators 210 and 230 may be freely displaced.

The plurality of vibration generators 210 and 230 according to an embodiment of the present disclosure may be integrated as one structure (or part) by a laminating process by an adhesive.

The apparatus according to an embodiment of the present disclosure may further include a connection member 150 (or a first connection member) disposed between the display panel 100 and the vibration apparatus 130.

The connection member 150 may be disposed between the display panel 100 and the vibration apparatus 130, and thus, may connect or couple the vibration apparatus 130 to the rear surface of the display panel 100. For example, the vibration apparatus 130 may be connected or coupled to the rear surface of the display panel 100 by the connection member 150, and thus, may be supported by or disposed at the rear surface of the display panel 100.

The connection member 150 according to an embodiment of the present disclosure may include may include a material including an adhesive layer which is good in adhesive force or attaching force with respect to each of the rear surface of the display panel 100 and the vibration apparatus 130. For example, the connection member 150 may include a foam pad, a double-sided tape, or an adhesive, but embodiments of the present disclosure are not limited thereto. For example, the adhesive layer of the connection member 150 may include epoxy, acrylic, silicone, or urethane, but embodiments of the present disclosure are not limited thereto. For example, the adhesive layer of the connection member 150 may differ from the adhesive layer of the connection member 250. For example, the adhesive layer of the connection member 150 may include an acrylic-based material which is relatively better in adhesive force and hardness among acrylic and urethane so that the vibration of the vibrating device 130 may be transmitted to the display panel 100 well. Accordingly, a vibration of the vibration apparatus 130 may be transferred to the display panel 100 well.

The adhesive layer of the connection member 150 may further include an additive, such as a tackifier or an adhesion enhancing agent, a wax component, an anti-oxidation agent, or the like. The additive may prevent or reduce the connection member 150 from being detached (stripped) from the display panel 100 by a vibration of the vibration apparatus 130. For example, the tackifier may be rosin derivative or the like, and the wax component may be paraffin wax or the like. For example, the anti-oxidation agent may be a phenol-based anti-oxidation agent, such as thioester, but embodiments of the present disclosure are not limited thereto.

The connection member 150 according to another example of the present disclosure may further include a hollow portion between the display panel 100 and the vibration apparatus 130. The hollow portion of the connection member 150 may provide an air gap between the display panel 100 and the vibration apparatus 130. Due to the air gap, a sound wave (or a sound pressure) based on a vibration of the vibration apparatus 130 may not be dispersed by the connection member 150, and may concentrate on the display panel 100. Thus, the loss of a vibration caused by the connection member 150 may be minimized, thereby increasing a sound pressure level characteristic of a sound generated based on a vibration of the display panel 100.

The apparatus according to an embodiment of the present disclosure may further include a supporting member 300 and a middle frame 400 disposed at a rear surface of the display panel 100. A description of a supporting member 300 and a middle frame 400 may be substantially the same as descriptions given above with reference to FIGS. 1 and 2, and thus, their repetitive descriptions may be omitted.

Figure 17:
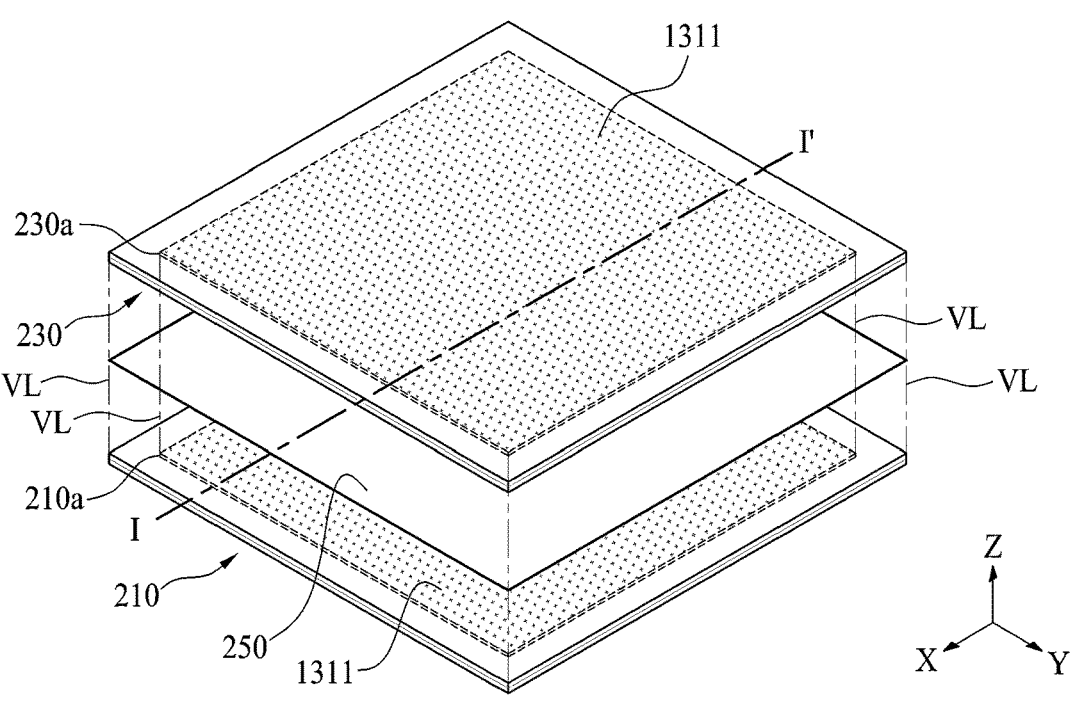
FIG. 17 illustrates a vibration device according to another embodiment of the present disclosure.
Figure 18A:
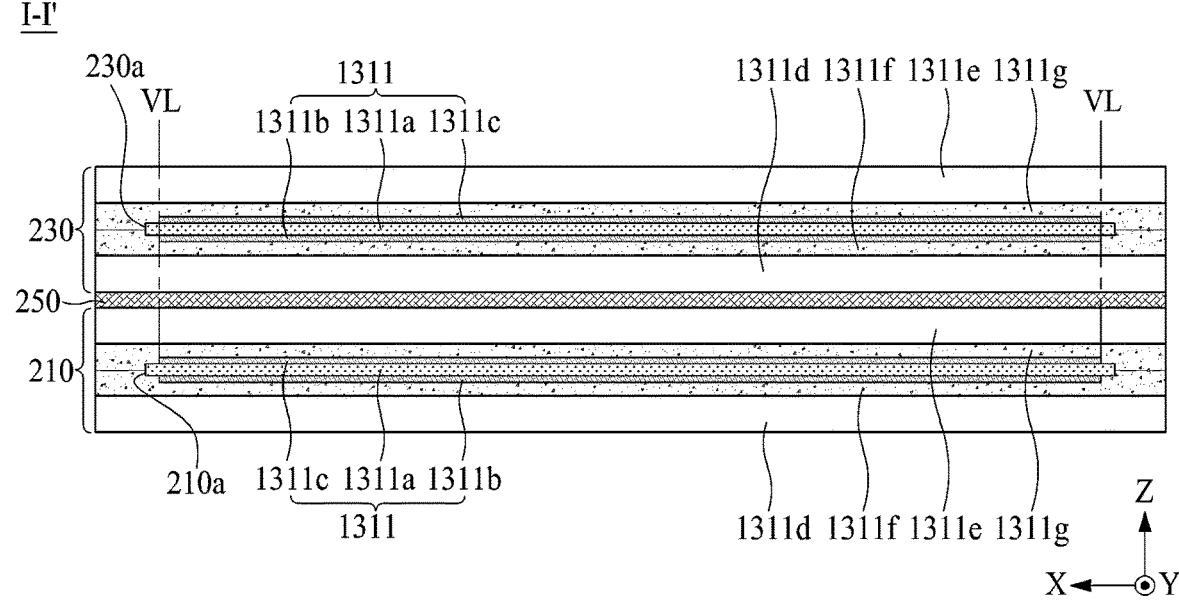
FIG. 18A is a cross-sectional view taken along line I-I' illustrated in FIG. 17.
Figure 18B:
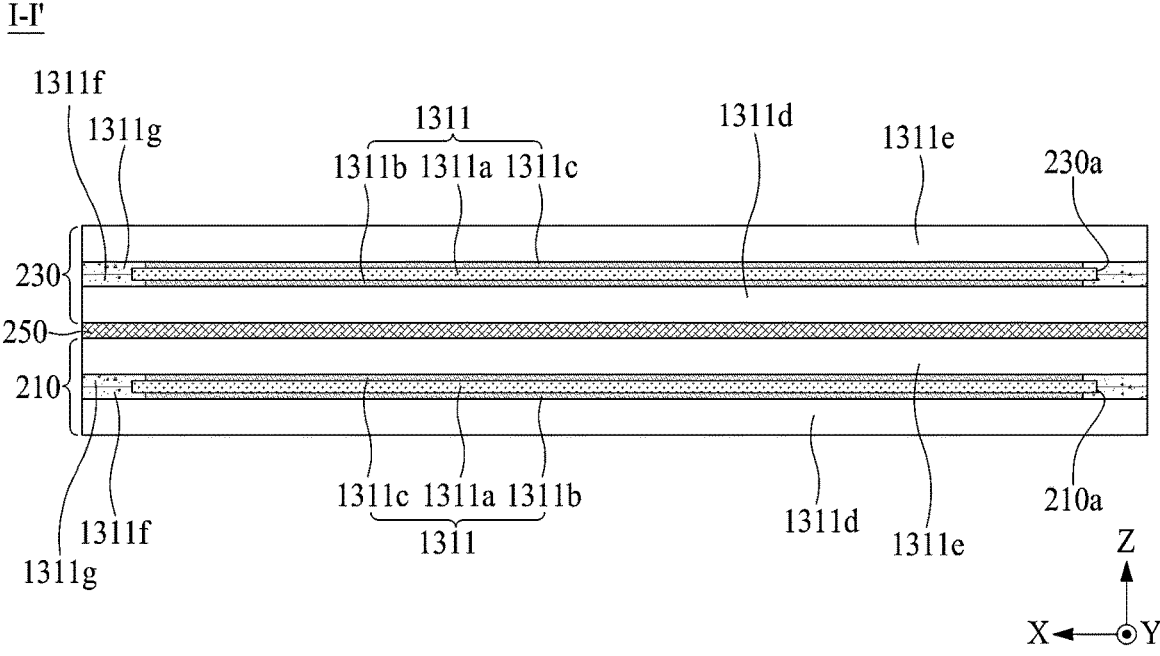
FIG. 18B is another cross-sectional view taken along line I-I' illustrated in FIG. 17.

FIG. 17 illustrates a vibration apparatus according to another embodiment of the present disclosure. FIG. 18A is a cross-sectional view taken along line I-I' illustrated in FIG. 17. FIG. 18B is another cross-sectional view taken along line I-I' illustrated in FIG. 17.

Referring to FIGS. 17 to 18B, a vibration apparatus 130 according to another embodiment of the present disclosure may include a plurality of vibration generators 210 and 230 and a connection member 250. For example, the vibration apparatus 130 may include a vibration device.

The plurality of vibration generators 210 and 230 may overlap or be stacked to be displaced (or driven or vibrated) in the same direction in order to increase or maximize an amplitude displacement of the vibration apparatus 130 and/or an amplitude displacement of the display panel 100. For example, the plurality of vibration generators 210 and 230 may have substantially the same size, but embodiments of the present disclosure are not limited thereto. For example, the plurality of vibration generators 210 and 230 may have substantially the same size within an error range of a manufacturing process, but embodiments of the present disclosure are not limited thereto. Therefore, the plurality of vibration generators 210 and 230 may maximize an amplitude displacement of the vibration apparatus 130 and/or an amplitude displacement of the display panel 100. One sides (or end portions, or outer surfaces, or each corner portion) 210a and 230a of the plurality of vibration generators 210 and 230 may be aligned on a virtual extension line VL extending in a thickness direction Z of the display panel 100, or may be disposed at the virtual extension line VL.

For example, in at least one of the plurality of vibration generators 210 and 230, displacement directions and amplitude displacements of the plurality of vibration generators 210 and 230 may not match, and thus, an amplitude displacement of the vibration apparatus 130 may not be maximized. For example, when at least one of the plurality of vibration generators 210 and 230 has a different size departing from an error range of a manufacturing process, the displacement directions and the amplitude displacements of the plurality of vibration generators 210 and 230 may not match, and thus, the amplitude displacement of the vibration apparatus 130 may not be maximized. Also, when at least one of the plurality of vibration generators 210 and 230 is displaced in a different direction, the displacement directions of the plurality of vibration generators 210 and 230 may not match, and thus, the amplitude displacement of the vibration apparatus 130 may not be maximized.

The vibration apparatus 130 according to an embodiment of the present disclosure may include two or more vibration generators 210 and 230 which are stacked to be displaced (or vibrated or driven) in the same direction. In the following description, an example where the vibration apparatus 130 includes the vibration generators 210 and 230 will be described.

According to an embodiment of the present disclosure, a first vibration generator 210 may be connected to or disposed at a rear surface of the display panel 100 by a connection member 150 (or a first connection member). A second vibration generator 230 may be disposed or attached on the first vibration generator 210 by an connection member 250 (or a third connection member).

The first and second vibration generators 210 and 230 according to an embodiment of the present disclosure may each include a vibration portion 1311a, a first cover member 1311d, and the second cover member 1311e The vibration device 1311 according to an embodiment of the present disclosure may include a vibration portion 1311a, a first electrode portion 1311b disposed at a first surface of the vibration portion 1311a, and a second electrode portion 1311c disposed at a second surface, which is opposite to the first surface, of the vibration portion 1311a.

The vibration portion 1311a may be substantially the same as one of the vibration portions 1311a described above with reference to FIGS. 3 to 5B and 13A to 13F, and thus, like reference numerals refer to like elements and repetitive descriptions thereof are omitted.

The vibration portion 1311a according to an embodiment of the present disclosure may be configured in a circular shape, an ellipse shape, or a polygonal shape, but embodiments of the present disclosure are not limited thereto.

The first electrode portion 1311b may be disposed at a first surface (or an upper surface) of the vibration portion 1311a. The second electrode portion 1311c may be disposed at a second surface (or a rear surface) opposite to or different from the first surface the vibration portion 1311a. The first electrode portion 1311b and the second electrode portion 1311c may be substantially the same as the first electrode portion 1311b and the second electrode portion 1311c described above with reference to FIGS. 3 to 5B, and thus, their repetitive descriptions may be omitted or will be briefly given.

For example, the first electrode portion 1311b may have a size which is less than that of the vibration portion 1311a, but embodiments of the present disclosure are not limited thereto. For examples, the second electrode portion 1311c may have a size which is less than that of the vibration portion 1311a, but embodiments of the present disclosure are not limited thereto. Accordingly, a problem may be solved where electrical short circuit occurs when a signal is applied to the first electrode portion 1311b and the second electrode portion 1311c, or short circuit occurs due to particles occurring in a manufacturing process.

In each of the first and second vibration generators 210 and 230, the first electrode portion 1311b may be disposed closer to the display panel 100 than the second electrode portion 1311c, but embodiments of the present disclosure are not limited thereto. For example, in the vibration apparatus 130 including the plurality of vibration generators 210 and 230 according to an embodiment of the present disclosure, the first electrode portion 1311b of each of the plurality of vibration generators 210 and 230 may be disposed closer to the display panel 100 than the second electrode portion 1311c.

The vibration portion 1311a may be polarized (or poled) by a certain voltage applied to the first electrode portion 1311b and the second electrode portion 1311c in a certain temperature atmosphere or a temperature atmosphere which is changed from a high temperature to a room temperature, but embodiments of the present disclosure are not limited thereto. For example, the vibration portion 1311a may alternately and repeatedly contract and expand based on an inverse piezoelectric effect according to a vibration driving signal (or a sound signal or a voice signal) applied to the first electrode portion 1311b and the second electrode portion 1311c from the outside, and thus, may be displaced or vibrated or driven.

The vibration device 1311 (or the vibration portion 1311a) of the first vibration generator 210 may have the same size as the vibration device 1311 (or the vibration portion 1311a) of the second vibration generator 230. In order to maximize or increase a displacement amount or an amplitude displacement of the vibration apparatus 130, the vibration device 1311 (or the vibration portion 1311a) of the first vibration generator 210 may substantially overlap or stack the vibration device 1311 (or the vibration portion 1311a) of the second vibration generator 230 without being staggered. For example, the vibration device 1311 (or the vibration portion 1311a) of the first vibration generator 210 may substantially overlap or stack the vibration device 1311 (or the vibration portion 1311a) of the second vibration generator 230 within an error range of a manufacturing process without being staggered. For example, the vibration device 1311 (or the vibration portion 1311a) of the first vibration generator 210 and the vibration device 1311 (or the vibration portion 1311a) of the second vibration generator 230 may be implemented in a stack structure which has the same size and overlaps (or stacks) without being staggered, and thus, the displacement amount or the amplitude displacement of the vibration apparatus 130 may be maximized or increased. For example, the vibration device 1311 (or the vibration portion 1311a) of the first vibration generator 210 and the vibration device 1311 (or the vibration portion 1311a) of the second vibration generator 230 may be implemented in a stack structure which has the same size and accurately overlaps (or stacks) without being staggered, and thus, the displacement amount or the amplitude displacement of the vibration apparatus 130 may be maximized or increased.

According to an embodiment of the present disclosure, a first portion (or an end portion, or an outer surface, or each corner portion) 210a of each vibration device 1311 (or the vibration portion 1311a) of the first vibration generator 210 may be aligned on a virtual extension line VL, or may be disposed at the virtual extension line VL. For example, the first portion (or an end portion, or an outer surface, or each corner portion) 210a of each vibration device 1311 (or the vibration portion 1311a) of the first vibration generator 210 may be accurately aligned on a virtual extension line VL, or may be accurately disposed at the virtual extension line VL. A second portion (or an end portion, or an outer surface, or each corner portion) 230a of each vibration device 1311 (or the vibration portion 1311a) of the second vibration generator 230 may be aligned on the virtual extension line VL, or may be disposed at the virtual extension line VL. For example, the second portion (or an end portion, or an outer surface, or each corner portion) 230a of each vibration device 1311 (or the vibration portion 1311a) of the second vibration generator 230 may be accurately aligned on the virtual extension line VL, or may be accurately disposed at the virtual extension line VL. The first portion 210a of each vibration device 1311 (or the vibration portion 1311a) of the first vibration generator 210 may be aligned with or overlap the second portion 230a of each vibration device 1311 (or the vibration portion 1311a) of the second vibration generator 230. For example, the first portion 210a of the vibration device 1311 (or the vibration portion 1311a) of the first vibration generator 210 may be accurately aligned with or accurately overlap the second portion 230a of each vibration device 1311 (or the vibration portion 1311a) of the second vibration generator 230. For example, the first portion 210a of the vibration device 1311 (or the vibration portion 1311a) of the first vibration generator 210 may correspond to the second portion 230a of each vibration device 1311 (or the vibration portion 1311a) of the second vibration generator 230. Therefore, in the vibration apparatus 130 according to an embodiment of the present disclosure, the vibration device 1311 (or a first vibration portion) of the first vibration generator 210 and the vibration device 1311 (or a second vibration portion) of the second vibration generator 230 may be displaced (or vibrated or driven) in the same direction, and thus, the displacement amount or the amplitude displacement of the vibration apparatus 130 may be maximized or increased. Accordingly, a displacement amount (or a bending force or a flexural force) or an amplitude displacement of the display panel 100 may increase (or maximized).

In the first vibration generator 210, the first cover member 1311d may be disposed over the first electrode portion 1311b. The first cover member 1311d may protect the first electrode portion 1311b. The second cover member 1311e may be disposed over the second electrode portion 1311c. The second cover member 1311e may protect the second electrode portion 1311c. For example, the first cover member 1311d and the second cover member 1311e of the first vibration generator 210 may be formed of a plastic material, a fiber material, or wood material, but embodiments of the present disclosure are not limited thereto. For example, in the first vibration generator 210, the first cover member 1311d may be formed of the same or different material as the second cover member 1311e. One or more among the first cover member 1311d and the second cover member 1311e of the first vibration generator 210 may be connected or coupled to a rear surface of the display panel 100 by a connection member (or a third connection member) 250. For example, the first cover member 1311d of the first vibration generator 210 may be connected or coupled to the rear surface of the display panel 100 by the connection member (or the third connection member) 250.

In the second vibration generator 230, the first cover member 1311d may be disposed over the first electrode portion 1311b. The first cover member 1311d may protect the first electrode portion 1311b. The second cover member 1311e may be disposed over the second electrode portion 1311c. The second cover member 1311e may protect the second electrode portion 1311c. For example, the first cover member 1311d and the second cover member 1311e of the second vibration generator 230 may be formed of a plastic material, a fiber material, or wood material, but embodiments of the present disclosure are not limited thereto. For example, in the second vibration generator 230, the first cover member 1311d may be formed of the same or different material as the second cover member 1311e. One or more among the first cover member 1311d and the second cover member 1311e of the second vibration generator 230 may be connected or coupled to a rear surface of the first vibration generator 210 by an connection member (or a third connection member) 250. For example, the first cover member 1311d of the second vibration generator 230 may be connected or coupled to the second cover member 1311e of the first vibration generator 210 by the connection member 250.

In each of the first vibration generator 210 and the second vibration generator 230, each of the first cover member 1311d and the second cover member 1311e may be formed of a plastic material. For example, each of the first cover member 1311d and the second cover member 1311e may be a polyimide (PI) film or a polyethylene terephthalate (PET) film, but embodiments of the present disclosure are not limited thereto.

One or more of the first vibration generator 210 and the second vibration generator 230 according to an embodiment of the present disclosure may further include a first adhesive layer 1311f and a second adhesive layer 1311g.

In the first vibration generator 210, the first adhesive layer 1311f may be disposed between the vibration device 311 and the first cover member 1311d. For example, the first adhesive layer 1311f may be disposed between the first electrode portion 1311b of the vibration device 1311 and the first cover member 1311d. The first cover member 1311d may be disposed over a first surface (or the first electrode portion 1311b) of the vibration device 1311 by the first adhesive layer 1311E For example, the first cover member 1311d may be coupled or connected to the first surface (or the first electrode portion 1311b) of the vibration device 1311 by a film laminating process by the first adhesive layer 1311f.

In the first vibration generator 210, the second adhesive layer 1311g may be disposed between the vibration device 1311 and the second cover member 1311e. For example, the second adhesive layer 1311g may be disposed between the second electrode portion 1311c of the vibration device 1311 and the second cover member 1311e. The second cover member 1311e may be disposed over a second surface (or the second electrode portion 1311c) of the vibration device 1311 by the second adhesive layer 1311g. For example, the second cover member 1311e may be coupled or connected to the second surface (or the second electrode portion 1311c) of the vibration device 1311 by a film laminating process by the second adhesive layer 1311g.

In the first vibration generator 210, first and second adhesive layers 1311f and 1311g may be connected or coupled to each other between the first cover member 1311d and the second cover member 1311e. For example, in the first vibration generator 210, the first and second adhesive layers 1311f and 1311g may be connected or coupled to each other at an edge portion (or a periphery portion) between the first cover member 1311d and the second cover member 1311e. Therefore, in the first vibration generator 210, the vibration device 1311 may be surrounded by the first and second adhesive layers 1311f and 1311g. For example, the first and second adhesive layers 1311f and 1311g may fully surround all of the vibration device 1311 of the first vibration generator 210. For example, the vibration portion 1311a may be buried or embedded between the first and second adhesive layers 1311f and 1311g. For example, for convenience of description, the first and second adhesive layers 1311*f* and 1311*g* are illustrated as the first and second adhesive layers 1311*f* and 1311*g* and may be disposed as one adhesive layer.

Referring to FIG. 18B, in the first vibration generator 210, the first electrode portions 1311*b* and the second electrode portions 1311*c* may be configured with a conductive adhesive member having a conductive characteristic and an adhesive characteristic, and thus, a second surface of the vibration portion 1311*a* may be adhered to the second cover member 1311*e* by the first electrode portions 1311*b* and the second electrode portions 1311*c*. For example, the second adhesive layer 1311*g* may be disposed at the both lateral surfaces of the vibration portion 1311*a*. In the first vibration generator 210, the first and second adhesive layers 1311*f* and 1311*g* may be connected or coupled to each other between vibration portions 1311*a*. For example, the vibration portion 1311*a* may be surrounded by the first and second adhesive layers 1311*f* and 1311*g*, the first electrode portion 1311*b*, and the second electrode portion 1311*c*.

In the second vibration generator 230, the first adhesive layer 1311*f* may be disposed between the vibration device 1311 and the first cover member 1311*d*. For example, the first adhesive layer 1311*f* may be disposed between the first electrode portion 1311*b* of the vibration device 1311 and the first cover member 1311*d*. The first cover member 1311*d* may be disposed over a first surface (or the first electrode portion 1311*b*) of the vibration device 1311 by the first adhesive layer 1311*f*. For example, the first cover member 1311*d* may be coupled or connected to the first surface (or the first electrode portion 1311*b*) of the vibration device 1311 by a film laminating process by the first adhesive layer 1311*f*.

In the second vibration generator 230, the second adhesive layer 1311*g* may be disposed between the vibration device 1311 and the second cover member 1311*e*. For example, the second adhesive layer 1311*g* may be disposed between the second electrode portion 1311*c* of the vibration device 1311 and the second cover member 1311*e*. The second cover member 1311*e* may be disposed over a second surface (or the second electrode portion 1311*c*) of the vibration device 1311 by the second adhesive layer 1311*g*. For example, the second cover member 1311*e* may be coupled or connected to the second surface (or the second electrode portion 1311*c*) of the vibration device 1311 by a film laminating process by the second adhesive layer 1311*g*.

In the second vibration generator 230, the first and the second adhesive layers 1311*f* and 1311*g* may be connected or coupled to each other between the first cover member 1311*d* and the second cover member 1311*e*. For example, in the second vibration generator 230, the first and the second adhesive layers 1311*f* and 1311*g* may be connected or coupled to each other at a periphery portion between the first cover member 1311*d* and the second cover member 1311*e*. Accordingly, in the second vibration generator 230, the vibration device 1311 may be surrounded by the first and second adhesive layers 1311*f* and 1311*g*. For example, the first and second adhesive layers 1311*f* and 1311*g* may completely surround the whole vibration device 1311. For example, the first and second adhesive layers 1311*f* and 1311*g* may be referred to as a cover member, but embodiments of the present disclosure are not limited thereto. When the first and second adhesive layers 1311*f* and 1311*g* are a cover member, the first cover member 1311*d* may be disposed at a first surface of the cover member, and the second cover member 1311*e* may be disposed at a second surface of the cover member. For example, for convenience of description, the first and second adhesive layers 1311*f* and 1311*g* are illustrated as first and second adhesive layers 1311*f* and 1311*g*, but embodiments of the present disclosure are not limited thereto and may be provided as one adhesive layer.

Referring to FIG. 18B, in the second vibration generator 230, the first electrode portions 1311*b* and the second electrode portions 1311*c* may be configured with a conductive adhesive member having a conductive characteristic and an adhesive characteristic, and thus, a second surface of the vibration portion 1311*a* may be adhered to the second cover member 1311*e* by the first electrode portions 1311*b* and the second electrode portions 1311*c*. For example, the second adhesive layer 1311*g* may be disposed at the both lateral surfaces of the vibration portion 1311*a*. In the second vibration generator 230, the first and second adhesive layers 1311*f* and 1311*g* may be connected or coupled to each other between vibration portions 1311*a*. For example, the vibration portion 1311*a* may be surrounded by the first and second adhesive layers 1311*f* and 1311*g*, the first electrode portion 1311*b*, and the second electrode portion 1311*c*.

In each of the first and second vibration generators 210 and 230, each of the first and second adhesive layers 1311*f* and 1311*g* may include an electrical insulation material. For example, the electrical insulation material may have adhesive properties and is capable of compression and decompression. For example, one or more of the first and second adhesive layers 1311*f* and 1311*g* may include epoxy resin, acrylic resin, silicone resin, and urethane resin, but embodiments of the present disclosure are not limited thereto.

The connection member 250 according to an embodiment of the present disclosure may be disposed between the first and second vibration generators 210 and 230. For example, the connection member 250 may be disposed between the first cover member 1311*d* of the first vibration generator 210 and the second cover member 1311*e* of the second vibration generator 230. For example, the connection member 250 may include a material including an adhesive layer which is good in adhesive force or attaching force with respect to the first and second vibration generators 210 and 230. For example, the connection member 250 may include a foam pad, a double-sided tape, or an adhesive, but embodiments of the present disclosure are not limited thereto. For example, an adhesive layer of the connection member 250 may include epoxy, acrylic, silicone, or urethane, but embodiments of the present disclosure are not limited thereto.

In FIGS. 17, 18A, and 18B and description relevant thereto, the vibration apparatus 130 according to an embodiment of the present disclosure has been described as including the first and second vibration generators 210 and 230 and the connection member 250 disposed between the first and second vibration generators 210 and 230, but embodiments of the present disclosure are not limited thereto. For example, the vibration apparatus 130 according to an embodiment of the present disclosure may include a plurality of (for example, three or more) vibration generators 210 and 230 and an connection member 250 disposed between the plurality of vibration generators 210 and 230 based on a sound pressure level characteristic and an output characteristic of a sound generated based on a displacement of the display panel 100 (or vibration member) based on a size and weight, or the like of the display panel 100. In this case, in order to maximize or increase the displacement amount or the amplitude displacement of the vibration device 130, the plurality of vibration generators 210 and 230 may have the same size and may overlap or stack with each other. For example, first and second portions (or end portions, or outer surfaces, or each corner portion) 210a and 230a of each vibration portion 1311 (or vibration layer 1311a) of one or more of the plurality of vibration generators 210 and 230 may substantially overlap or stack without being staggered. For example, the first and second portions (or end portions, or outer surfaces, or each corner portion) 210a and 230a of each vibration portion 1311 (or vibration layer 1311a) of one or more of the plurality of vibration generators 210 and 230 may substantially overlap or stack within an error range of a manufacturing process without being staggered. For example, the first and second portions (or end portions, ends, outer surfaces, or each corner portion) 210a and 230a of each vibration portion 1311 (or vibration layer 1311a) of each of the plurality of vibration generators 210 and 230 may be aligned on a virtual extension line VL, or may be disposed at the virtual extension line VL. For example, the first and second portions (or end portions, ends, outer surfaces, or each corner portion) 210a and 230a of each vibration portion 1311 (or vibration layer 1311a) of each of the plurality of vibration generators 210 and 230 may be accurately aligned on the virtual extension line VL, or may be accurately disposed at the virtual extension line VL.

Figure 19:
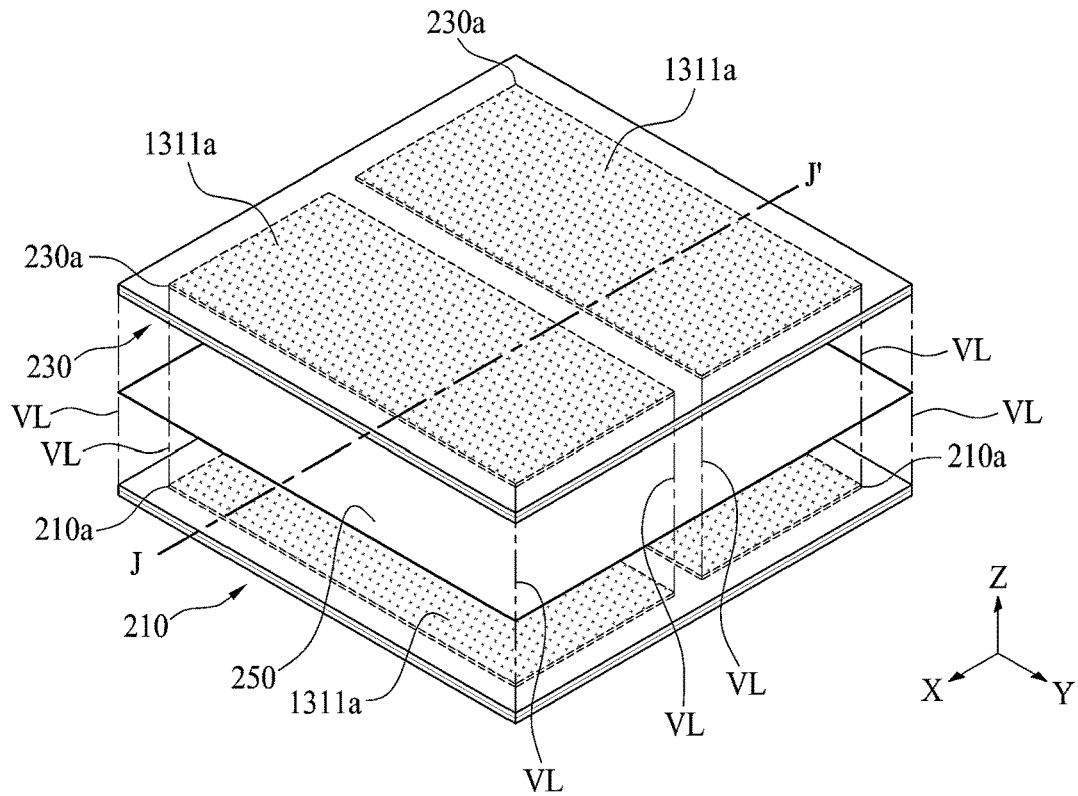
FIG. 19 illustrates a vibration device according to another embodiment of the present disclosure.
Figure 20A:
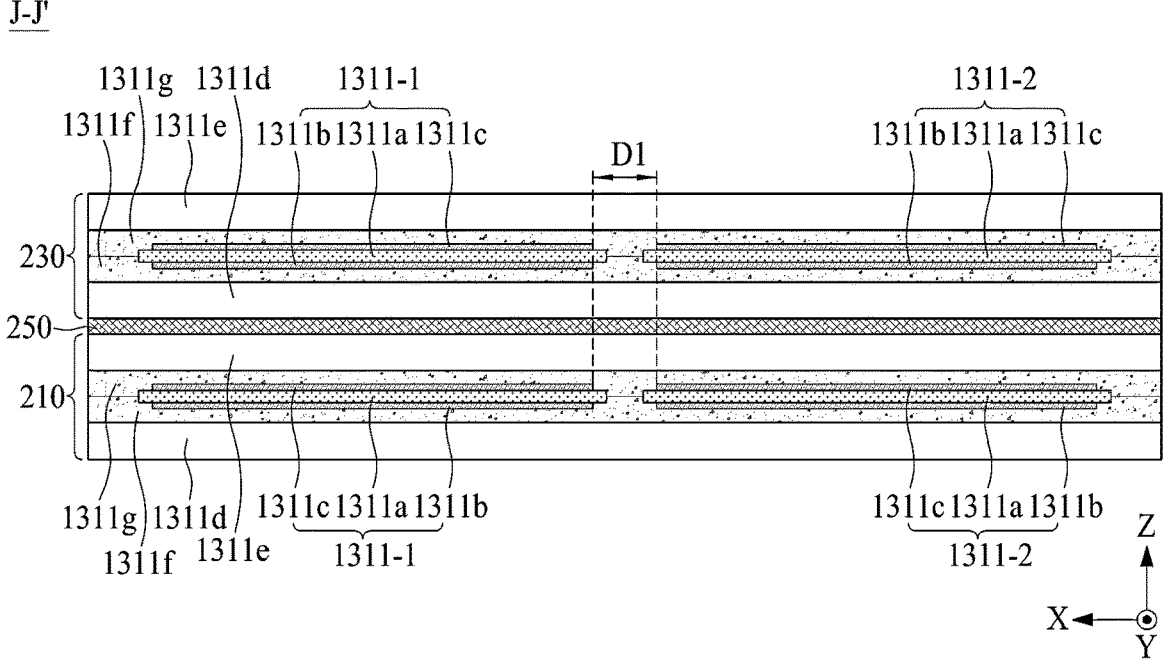
FIG. 20A is a cross-sectional view taken along line J-J' illustrated in FIG. 19.
Figure 20B:
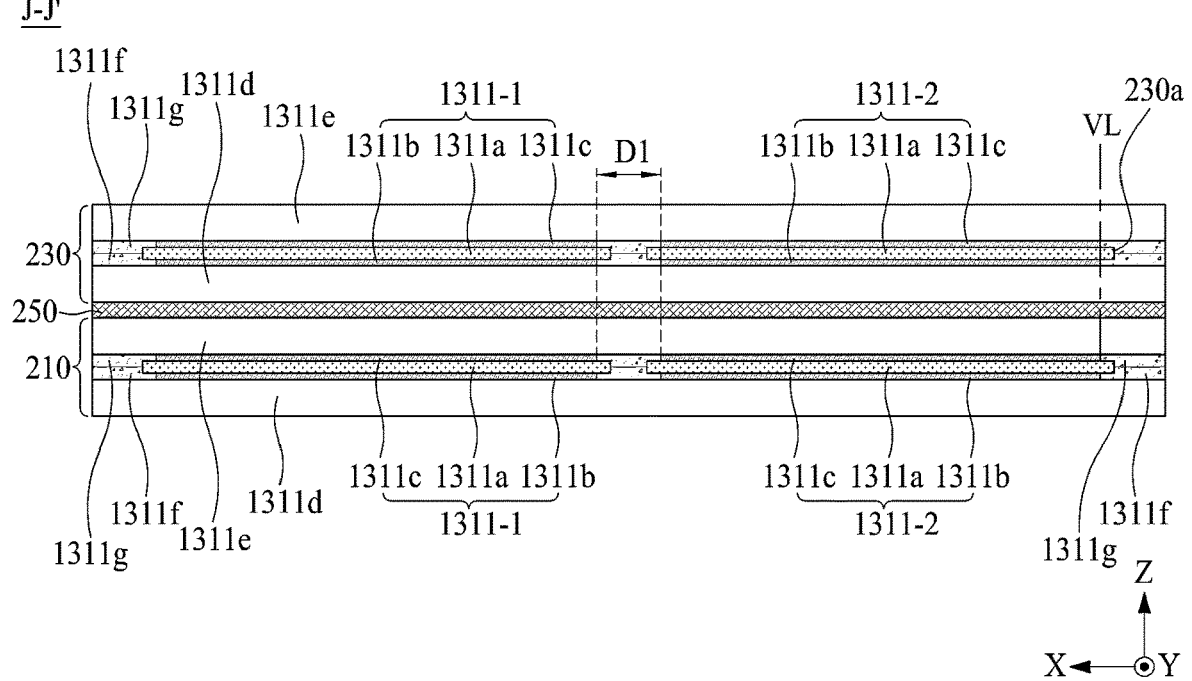
FIG. 20B is another cross-sectional view taken along line J-J' illustrated in FIG. 19.

FIG. 19 illustrates a vibration apparatus according to an embodiment of the present disclosure. FIG. 20A is a cross-sectional view taken along line J-J' illustrated in FIG. 19. FIG. 20B is another cross-sectional view taken along line J-J' illustrated in FIG. 19.

Referring to FIGS. 19, 20A, and 20B, a vibration apparatus 130 according to an embodiment of the present disclosure may include two or more vibration devices.

The vibration apparatus 130 according to an embodiment of the present disclosure may include two or more vibration generators 210 and 230 which are stacked to displace (or vibrate or drive) in the same direction. Descriptions of first and second vibration generators 210 and 230 may be the same as descriptions given above with reference to FIGS. 17 to 18B, and thus, repetitive descriptions thereof are omitted.

According to an embodiment of the present disclosure, a first vibration generator 210 may be connected to or disposed at a rear surface of a display panel 100 by a connection member 150 (or a first connection member). A second vibration generator 230 may be disposed in or adhered to the first vibration generator 210 by an connection member 250 (or a third connection member).

Each of the first and second vibration generators 210 and 230 according to an embodiment of the present disclosure may include a plurality of vibration generating portions 1311-1 and 1311-2. Each of the plurality of vibration generating portions 1311-1 and 1311-2 may include a vibration device, a first cover member 1311d, and a second cover member 1311e.

The vibration generating portions 1311-1 and 1311-2 (or a vibration device) according to an embodiment of the present disclosure may include a vibration portion 1311a, a first electrode portion 1311b disposed at a first surface of the vibration portion 1311a, and a second electrode portion 1311c disposed at a second surface, which is opposite to the first surface, of the vibration portion 1311a. The vibration portion 1311a may be configured to be substantially equal to one of the vibration portions 1311a described above with reference to FIGS. 3 to 5B and 13A to 13F, and thus, like reference numerals refer to like elements and repetitive descriptions thereof are omitted.

The first electrode portion 1311b may be disposed at a first surface (or an upper surface) of the vibration portion 1311a. The second electrode portion 1311c may be disposed at a second surface (or a rear surface) opposite to or different from the first surface the vibration portion 1311a. The first electrode portion 1311b and the second electrode portion 1311c may be substantially the same as the first electrode portion 1311b and the second electrode portion 1311c described above with reference to FIGS. 6 to 7B, and thus, their repetitive descriptions may be omitted or will be briefly given.

In each of the first and second vibration generators 210 and 230, the first electrode portion 1311b may be disposed closer to the display panel 100 than the second electrode portion 1311c, but embodiments of the present disclosure are not limited thereto. For example, in the vibration apparatus 130 including the plurality of vibration generators 210 and 230 according to an embodiment of the present disclosure, the first electrode portion 1311b of each of the plurality of vibration generators 210 and 230 may be disposed closer to the display panel 100 than the second electrode portion 1311c

The vibration generating portions 1311-1 and 1311-2 (or the vibration portion 1311a) of the first vibration generator 210 may have the same size as the vibration device 1311 (or the vibration portion 1311a) of the second vibration generator 230. In order to maximize or increase a displacement amount or an amplitude displacement of the vibration apparatus 130, the vibration generating portions 1311-1 and 1311-2 (or the vibration portion 1311a) of the first vibration generator 210 may substantially overlap or stack the vibration device 1311 (or the vibration portion 1311a) of the second vibration generator 230 without being staggered. For example, the vibration generating portions 1311-1 and 1311-2 (or the vibration portion 1311a) of the first vibration generator 210 may substantially overlap or stack the vibration device 1311 (or the vibration portion 1311a) of the second vibration generator 230 within an error range of a manufacturing process without being staggered. For example, the vibration generating portions 1311-1 and 1311-2 (or the vibration portion 1311a) of the first vibration generator 210 and the vibration device 1311 (or the vibration portion 1311a) of the second vibration generator 230 may be implemented in a stack structure which has the same size and overlaps (or stacks) without being staggered, and thus, the displacement amount or the amplitude displacement of the vibration apparatus 130 may be maximized or increased. For example, the vibration generating portions 1311-1 and 1311-2 (or the vibration portion 1311a) of the first vibration generator 210 and the vibration generating portions 1311-1 and 1311-2 (or the vibration portion 1311a) of the second vibration generator 230 may be implemented in a stack structure which has the same size and accurately overlaps (or stacks) without being staggered, and thus, the displacement amount or the amplitude displacement of the vibration apparatus 130 may be maximized or increased.

According to an embodiment of the present disclosure, a first portion (or an end portion, or an outer surface, or each corner portion) 210a of each vibration generating portions 1311-1 and 1311-2 (or the vibration portion 1311a) of the first vibration generator 210 may be aligned on a virtual extension line VL, or may be disposed at the virtual extension line VL. For example, the first portion (or an end portion, or an outer surface, or each corner portion) 210a of each vibration generating portions 1311-1 and 1311-2 (or the vibration portion 1311a) of the first vibration generator 210 may be accurately aligned on a virtual extension line VL, or may be accurately disposed at the virtual extension line VL. A second portion (or an end portion, or an outer surface, or each corner portion) 230a of each vibration generating portions 1311-1 and 1311-2 (or the vibration portion 1311a)

of the second vibration generator 230 may be aligned on the virtual extension line VL, or may be disposed at the virtual extension line VL. For example, the second portion (or an end portion, or an outer surface, or each corner portion) 230*a* of each vibration generating portions 1311-1 and 1311-2 (or the vibration portion 1311*a*) of the second vibration generator 230 may be accurately aligned on the virtual extension line VL, or may be accurately disposed at the virtual extension line VL. The first portion 210*a* of each vibration generating portions 1311-1 and 1311-2 (or the vibration portion 1311*a*) of the first vibration generator 210 may be aligned with or overlap the second portion 230*a* of each vibration generating portions 1311-1 and 1311-2 (or the vibration portion 1311*a*) of the second vibration generator 230. For example, the first portion 210*a* of the vibration generating portions 1311-1 and 1311-2 (or the vibration portion 1311*a*) of the first vibration generator 210 may be accurately aligned with or accurately overlap the second portion 230*a* of each vibration generating portions 1311-1 and 1311-2 (or the vibration portion 1311*a*) of the second vibration generator 230. For example, the first portion 210*a* of the vibration generating portions 1311-1 and 1311-2 (or the vibration portion 1311*a*) of the first vibration generator 210 may correspond to the second portion 230*a* of each vibration generating portions 1311-1 and 1311-2 (or the vibration portion 1311*a*) of the second vibration generator 230. Therefore, in the vibration apparatus 130 according to an embodiment of the present disclosure, the vibration generating portions 1311-1 and 1311-2 (or a first vibration portion) of the first vibration generator 210 and the vibration generating portions 1311-1 and 1311-2 (or a second vibration portion) of the second vibration generator 230 may be displaced (or vibrated or driven) in the same direction, and thus, the displacement amount or the amplitude displacement of the vibration apparatus 130 may be maximized or increased. Accordingly, a displacement amount (or a bending force or a flexural force) or an amplitude displacement of the display panel 100 may increase (or maximized).

In the first vibration generator 210, the first cover member 1311*d* may be disposed over the first electrode portion 1311*b*. The first cover member 1311*d* may protect the first electrode portion 1311*b*. The second cover member 1311*e* may be disposed over the second electrode portion 1311*c*. The second cover member 1311*e* may protect the second electrode portion 1311*c*. For example, the first cover member 1311*d* and the second cover member 1311*e* of the first vibration generator 210 may be formed of a plastic material, a fiber material, or wood material, but embodiments of the present disclosure are not limited thereto. For example, in the first vibration generator 210, the first cover member 1311*d* may be formed of the same or different material as the second cover member 1311*e*. One or more among the first cover member 1311*d* and the second cover member 1311*e* of the first vibration generator 210 may be connected or coupled to a rear surface of the display panel 100 by a connection member (or a third connection member) 250. For example, the first cover member 1311*d* of the first vibration generator 210 may be connected or coupled to the rear surface of the display panel 100 by the connection member (or the third connection member) 250.

In the second vibration generator 230, the first cover member 1311*d* may be disposed over the first electrode portion 1311*b*. The first cover member 1311*d* may protect the first electrode portion 1311*b*. The second cover member 1311*e* may be disposed over the second electrode portion 1311*c*. The second cover member 1311*e* may protect the second electrode portion 1311*c*. For example, the first cover member 1311*d* and the second cover member 1311*e* of the second vibration generator 230 may be formed of a plastic material, a fiber material, or wood material, but embodiments of the present disclosure are not limited thereto. For example, in the second vibration generator 230, the first cover member 1311*d* may be formed of the same or different material as the second cover member 1311*e*. One or more among the first cover member 1311*d* and the second cover member 1311*e* of the second vibration generator 230 may be connected or coupled to a rear surface of the first vibration generator 210 by a connection member (or a third connection member) 250. For example, the first cover member 1311*d* of the second vibration generator 230 may be connected or coupled to the second cover member 1311*e* of the first vibration generator 210 by the connection member 250.

In each of the first vibration generator 210 and the second vibration generator 230, each of the first cover member 1311*d* and the second cover member 1311*e* may be formed of a plastic material. For example, each of the first cover member 1311*d* and the second cover member 1311*e* may be a polyimide (PI) film or a polyethylene terephthalate (PET) film, but embodiments of the present disclosure are not limited thereto.

One or more of the first vibration generator 210 and the second vibration generator 230 according to an embodiment of the present disclosure may further include a first adhesive layer 1311*f* and a second adhesive layer 1311*g*.

Referring to FIG. 20A, In the first vibration generator 210, the first adhesive layer 1311*f* may be disposed between the vibration generating portions 1311-1 and 1311-2 and the first cover member 1311*d*. For example, the first adhesive layer 1311*f* may be disposed between the first electrode portion 1311*b* of the vibration generating portions 1311-1 and 1311-2 and the first cover member 1311*d*. The first cover member 1311*d* may be disposed over a first surface (or the first electrode portion 1311*b*) of the vibration portion 1311*a* by the first adhesive layer 1311*f* For example, the first cover member 1311*d* may be coupled or connected to the first surface (or the first electrode portion 1311*b*) of the vibration portion 1311*a* by a film laminating process by the first adhesive layer 1311*f*.

In the first vibration generator 210, the second adhesive layer 1311*g* may be disposed between the vibration generating portions 1311-1 and 1311-2 and the second cover member 1311*e*. For example, the second adhesive layer 1311*g* may be disposed between the second electrode portion 1311*c* of the vibration generating portions 1311-1 and 1311-2 and the second cover member 1311*e*. The second cover member 1311*e* may be disposed over a second surface (or the second electrode portion 1311*c*) of the vibration portion 1311*a* by the second adhesive layer 1311*g*. For example, the second cover member 1311*e* may be coupled or connected to the second surface (or the second electrode portion 1311*c*) of the vibration portion 1311*a* by a film laminating process by the second adhesive layer 1311*g*.

In the first vibration generator 210, first and second adhesive layers 1311*f* and 1311*g* may be connected or coupled to each other between the first cover member 1311*d* and the second cover member 1311*e*. For example, in the first vibration generator 210, the first and second adhesive layers 1311*f* and 1311*g* may be connected or coupled to each other at an edge portion (or a periphery portion) between the first cover member 1311*d* and the second cover member 1311*e*. Therefore, in the first vibration generator 210, the vibration generating portions 1311-1 and 1311-2 may be surrounded by the first and second adhesive layers 1311*f* and 1311*g*. For example, the first and second adhesive layers 1311*f* and 1311*g* may fully surround all of the vibration generating portions 1311-1 and 1311-2 of the first vibration generator 210. For example, the first and second adhesive layers 1311*f* and 1311*g* may be disposed as one adhesive layer.

In the second vibration generator 230, the first adhesive layer 1311*f* may be disposed between the vibration generating portions 1311-1 and 1311-2 and the first cover member 1311*d*. For example, the first adhesive layer 1311*f* may be disposed between the first electrode portion 1311*b* of the vibration generating portions 1311-1 and 1311-2 and the first cover member 1311*d*. The first cover member 1311*d* may be disposed over a first surface (or the first electrode portion 1311*b*) of the vibration generating portions 1311-1 and 1311-2 by the first adhesive layer 1311*f* For example, the first cover member 1311*d* may be coupled or connected to the first surface (or the first electrode portion 1311*b*) of the vibration generating portions 1311-1 and 1311-2 by a film laminating process by the first adhesive layer 1311*f*.

In the second vibration generator 230, the second adhesive layer 1311*g* may be disposed between the vibration generating portions 1311-1 and 1311-2 and the second cover member 1311*e*. For example, the second adhesive layer 1311*g* may be disposed between the second electrode portion 1311*c* of the vibration generating portions 1311-1 and 1311-2 and the second cover member 1311*e*. The second cover member 1311*e* may be disposed over a second surface (or the second electrode portion 1311*c*) of the vibration generating portions 1311-1 and 1311-2 by the second adhesive layer 1311*g*. For example, the second cover member 1311*e* may be coupled or connected to the second surface (or the second electrode portion 1311*c*) of the vibration generating portions 1311-1 and 1311-2 by a film laminating process by the second adhesive layer 1311*g*.

In the second vibration generator 230, the first and the second adhesive layers 1311*f* and 1311*g* may be connected or coupled to each other between the first cover member 1311*d* and the second cover member 1311*e*. For example, in the second vibration generator 230, the first and the second adhesive layers 1311*f* and 1311*g* may be connected or coupled to each other at a periphery portion between the first cover member 1311*d* and the second cover member 1311*e*. Accordingly, in the second vibration generator 230, the vibration generating portions 1311-1 and 1311-2 may be surrounded by the first and second adhesive layers 1311*f* and 1311*g*. For example, the first and second adhesive layers 1311*f* and 1311*g* may completely surround the whole vibration generating portions 1311-1 and 1311-2. For example, the first and second adhesive layers 1311*f* and 1311*g* may be disposed as one adhesive layer.

In each of the first and second vibration generators 210 and 230, each of the first and second adhesive layers 1311*f* and 1311*g* may include an electrical insulation material. For example, the electrical insulation material may have adhesive properties and is capable of compression and decompression. For example, one or more of the first and second adhesive layers 1311*f* and 1311*g* may include epoxy resin, acrylic resin, silicone resin, and urethane resin, but embodiments of the present disclosure are not limited thereto.

Referring to FIG. 20B, the first electrode portions 1311*b* and the second electrode portions 1311*c* may be configured with a conductive adhesive member having a conductive characteristic and an adhesive characteristic, and thus, a first surface of each of the vibration generating portions 1311-1 and 1311-2 may be adhered to the first cover member 1311*f* by the first electrode portions 1311*b* and the second electrode portions 1311*c*. For example, the first adhesive layer 1311*f* may be disposed at the both lateral surfaces of the vibration portion 1311*a*. For example, the first electrode portions 1311*b* and the second electrode portions 1311*c* may be configured with a conductive adhesive member having a conductive characteristic and an adhesive characteristic, and thus, a second surface of each of the vibration generating portions 1311-1 and 1311-2 may be adhered to the second cover member 1311*e* by the first electrode portions 1311*b* and the second electrode portions 1311*c*. For example, the second adhesive layer 1311*g* may be disposed at the both lateral surfaces of the vibration portion 1311*a*.

According to another embodiment of the present disclosure, the first and second vibration generating portions 1311-1 and 1311-2 may configured one group, and a plurality of groups may be provided in a vibration member or a display panel.

According to an embodiment of the present disclosure, the first electrode portion 1311*b* and the second electrode portion 1311*c* may be configured with a conductive adhesive member, and thus, a power supply line and/or a pad portion disposed in a cover member for connecting the first electrode portion 1311*b* to the second electrode portion 1311*c* may not be needed, thereby simplifying a structure of a vibration apparatus and implementing a vibration apparatus having a thin thickness. Also, according to an embodiment of the present disclosure, a first electrode portion and a second electrode portion may configure a vibration apparatus where a first cover member and a second cover member are provided as one body, thereby providing a display apparatus or an apparatus including a vibration apparatus having a simplified structure and a thin thickness. Also, according to an embodiment of the present disclosure, the vibration portion 1311*a* may be configured to have a size (or a length) which is greater than that of one or more of the first electrode portion 1311*b* and the second electrode portion 1311*c*, thereby preventing electrical short circuit and/or a defect from occurring in a manufacturing process and/or when a signal is applied thereto. Also, the first electrode portion 1311*b* and the second electrode portion 1311*c* according to an embodiment of the present disclosure may be configured with a power driving line, and thus, a power driving line disposed at a rear surface of a cover member may not be provided.

Figure 21:
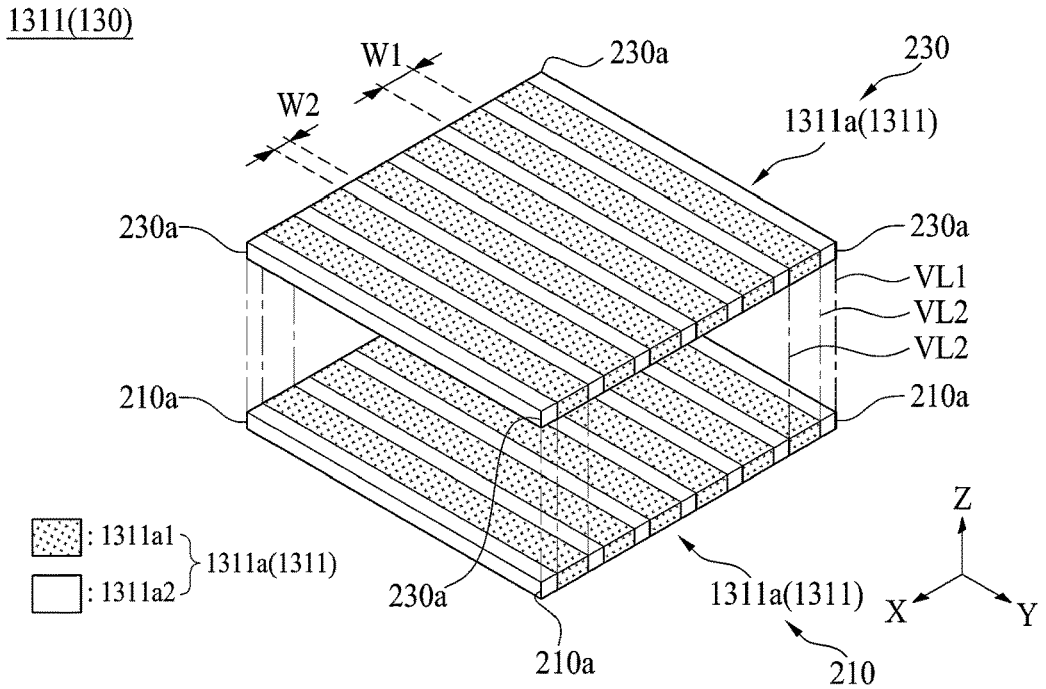
FIG. 21 illustrates a vibration portion according to another embodiment of the present disclosure.

FIG. 21 illustrates a vibration portion according to another embodiment of the present disclosure. FIG. 21 illustrates the vibration portion illustrated in FIGS. 17 to 20B.

Referring to FIG. 21, a vibration portion 1311*a* according to an embodiment of the present disclosure may include a plurality of first portions 1311*a*1 and a plurality of second portions 1311*a*2. For example, the plurality of first portions 1311*a*1 and the plurality of second portions 1311*a*2 may be alternately and repeatedly arranged in a second direction Y (or a first direction X). For example, the first direction X may be a widthwise direction of the vibration portion 1311*a* and the second direction Y may be a lengthwise direction of the vibration portion 1311*a* intersecting with the first direction X, but embodiments of the present disclosure are not limited thereto. For example, the first direction X may be the lengthwise direction of the vibration portion 1311*a*, and the second direction Y may be the widthwise direction of the vibration portion 1311*a*. For example, the first portion 1311*a*1 may be a piezoelectric portion, a piezoelectric device, an inorganic portion, an inorganic material portion, a piezoelectric layer, a vibration layer, a displacement layer, or a displacement element, but the terms are not limited thereto. For example, the second portion 1311*a*2 may be a ductile portion, an elastic portion, a stretch portion, an organic portion, an organic material portion, a damping portion, a bending portion, or a flexible portion, but the terms are not limited thereto.

Each of the plurality of first portions $1311a1$ may include an inorganic material portion. The inorganic material portion may include the above-described materials. The second portion $1311a2$ may include an organic material portion. The organic material portion may include the above-described materials.

Each of the plurality of first portions $1311a1$ according to an embodiment of the present disclosure may be disposed between the plurality of second portions $1311a2$. Each of the plurality of first portions $1311a1$ and the plurality of second portions $1311a2$ may include a piezoelectric material which is be substantially the same as the plurality of first portions $1311a1$ and the plurality of second portions $1311a2$ described above with reference to FIGS. 13A to 13F, and thus, their repetitive descriptions may be omitted.

In order to maximize or increase a displacement amount or an amplitude displacement of the vibration apparatus 130, the vibration device 1311 of the first vibration generator 210 and the vibration device 1311 of the second vibration generator 230 may have the same size and may overlap (or stack) with each other. For example, a first portion (or an end portion, or an outer surface, or each corner portion) $210a$ of the vibration device 1311 (or vibration portion $1311a$) of the first vibration generator 210 may be substantially aligned with or overlap a second portion (or an end portion, or an outer surface, or each corner portion) $230a$ of each vibration device 1311 (or vibration portion $1311a$) of the second vibration generator 230 without being staggered. For example, the first portion (or an end portion, or an outer surface, or each corner portion) $210a$ of the vibration device 1311 (or vibration portion $1311a$) of the first vibration generator 210 may be substantially aligned with or overlap the second portion (or an end portion, or an outer surface, or each corner portion) $230a$ of each vibration device 1311 (or vibration portion $1311a$) of the second vibration generator 230 within an error range of a manufacturing process without being staggered. For example, the first portion (or an end portion, or an outer surface, or each corner portion) $210a$ of each vibration device 1311 (or vibration portion $1311a$) of the first vibration generator 210 may be aligned on a first virtual extension line VL1, or may be disposed at the first virtual extension line VL1. The second portion (or an end portion, or an outer surface, or each corner portion) $230a$ of each vibration device 1311 (or vibration portion $1311a$) of the second vibration generator 230 may be accurately aligned on the first virtual extension line VL1, or may be accurately disposed at the first virtual extension line VL1. The second portion (or an end portion, or an outer surface, or each corner portion) $230a$ of each vibration device 1311 (or vibration portion $1311a$) of the second vibration generator 230 may be aligned on the first virtual extension line VL1, or may be disposed at the first virtual extension line VL1. The second portion (or an end portion, or an outer surface, or each corner portion) $230a$ of each vibration device 1311 (or vibration portion $1311a$) of the second vibration generator 230 may be accurately aligned on the first virtual extension line VL1, or may be accurately disposed at the first virtual extension line VL1.

According to another embodiment of the present disclosure, the plurality of first portions $1311a1$ of the first vibration generator 210 and the plurality of first portions $1311a1$ of the second vibration generator 230 may have the same size as each other, and may substantially overlap or stack with each other. For example, the plurality of first portions $1311a1$ of the first vibration generator 210 and the plurality of first portions $1311a1$ of the second vibration generator 230 may have the same size as each other, and may substantially overlap or stack without being staggered. According to an embodiment of the present disclosure, the first portions (or an end portion, or an outer surface, or each corner portion) of each of the plurality of first portions $1311a1$ included in the first vibration generator 210 may substantially overlap or stack the first portions (or an end portion, or an outer surface, or each corner portion) of each of the plurality of first portions $1311a1$ included in the second vibration generator 230. For example, the first portions (or an end portion, or an outer surface, or each corner portion) of each of the plurality of first portions $1311a1$ included in the first vibration generator 210 may substantially overlap or stack the first portions (or an end portion, or an outer surface, or each corner portion) of each of the plurality of first portions $1311a1$ included in the second vibration generator 230 without being staggered. For example, the first portions (or an end portion, or an outer surface, or each corner portion) of each of the plurality of first portions $1311a1$ included in the first vibration generator 210 and the first portions (or an end portion, or an outer surface, or each corner portion) of each of the plurality of first portions $1311a1$ included in the second vibration generator 230 may be aligned on or disposed at a second virtual extension line VL2. For example, the first portions (or an end portion, or an outer surface, or each corner portion) of each of the plurality of first portions $1311a1$ included in the first vibration generator 210 and the first portions (or an end portion, or an outer surface, or each corner portion) of each of the plurality of first portions $1311a1$ included in the second vibration generator 230 may be accurately aligned on or accurately disposed at the second virtual extension line VL2 without being staggered.

According to another embodiment of the present disclosure, the plurality of second portions $1311a2$ of the first vibration generator 210 and the plurality of second portions $1311a2$ of the second vibration generator 230 may have the same size as each other, and may substantially overlap or stack with each other. For example, the plurality of second portions $1311a2$ of the first vibration generator 210 and the plurality of second portions $1311a2$ of the second vibration generator 230 may have the same size as each other, and may substantially overlap or stack without being staggered. According to an embodiment of the present disclosure, the first portions (or an end portion, or an outer surface, or each corner portion) of each of the plurality of second portions $1311a2$ included in the first vibration generator 210 may substantially overlap or stack the first portions (or an end portion, or an outer surface, or each corner portion) of each of the plurality of second portions $1311a2$ included in the second vibration generator 230. For example, the first portions (or an end portion, or an outer surface, or each corner portion) of each of the plurality of second portions $1311a2$ included in the first vibration generator 210 may substantially overlap or stack the first portions (or an end portion, or an outer surface, or each corner portion) of each of the plurality of second portions $1311a2$ included in the second vibration generator 230 without being staggered. For example, the first portions (or an end portion, or an outer surface, or each corner portion) of each of the plurality of second portions $1311a2$ included in the first vibration generator 210 and the first portions (or an end portion, or an outer surface, or each corner portion) of each of the plurality of second portions $1311a2$ included in the second vibration generator 230 may be aligned on or disposed at a second virtual extension line VL2. For example, the first portions (or an end portion, or an outer surface, or each corner portion) of each of the plurality of second portions 1311$a$2 included in the first vibration generator 210 and the first portions (or an end portion, or an outer surface, or each corner portion) of each of the plurality of second portions 1311$a$2 included in the second vibration generator 230 may be accurately aligned on or accurately disposed at the second virtual extension line VL2 without being staggered. Therefore, in the vibration apparatus 130 according to an embodiment of the present disclosure, the vibration portion 1311$a$ of the first vibration generator 210 and the vibration portion 1311$a$ of the second vibration generator 230 may be displaced (or vibrated or driven) in the same direction, and thus, the displacement amount or the amplitude displacement of the vibration apparatus 130 may be maximized or increased, thereby increasing (or maximizing) a displacement amount (or a bending force or a flexural force) or an amplitude displacement of the display panel 100.

In FIG. 21 and description relevant thereto, the vibration apparatus 130 according to another embodiment of the present disclosure has been described as including the first and second vibration generators 210 and 230, but embodiments of the present disclosure are not limited thereto. For example, the vibration apparatus 130 according to another embodiment of the present disclosure may include a plurality of (for example, three or more) vibration generators 210 and 230. In this case, in order to maximize or increase the displacement amount or the amplitude displacement of the vibration device 130, the plurality of vibration generators 210 and 230 may have the same size and may overlap or stack with each other. According to an embodiment of the present disclosure, a first portion 1311$a$1 of a vibration generator 210 disposed at an upper layer (or a top layer) among the three or more vibration generators 210 and 230 and a first portion 1311$a$1 of a vibration generator 230 disposed at a lower layer (or a bottom layer) among the three or more vibration generators 210 and 230 may substantially overlap or stack with each other. For example, the first portion 1311$a$1 of the vibration generator 210 disposed at the upper layer among the three or more vibration generators 210 and 230 and the first portion 1311$a$1 of the vibration generator 230 disposed at the lower layer among the three or more vibration generators 210 and 230 may substantially overlap or stack without being staggered. For example, the first portion 1311$a$1 of the vibration generator 210 disposed at the upper layer among the three or more vibration generators 210 and 230 and the first portion 1311$a$1 of the vibration generator 230 disposed at the lower layer among the three or more vibration generators 210 and 230 may be aligned on or disposed at a virtual extension line VL. For example, the first portion 1311$a$1 of the vibration generator 210 disposed at the upper layer among the three or more vibration generators 210 and 230 and the first portion 1311$a$1 of the vibration generator 230 disposed at the lower layer among the three or more vibration generators 210 and 230 may be accurately aligned on or accurately disposed at the virtual extension line VL. Also, a second portion 1311$a$2 of the vibration generator 210 disposed at the upper layer among the three or more vibration generators 210 and 230 and a second portion 1311$a$2 of the vibration generator 230 disposed at the lower layer among the three or more vibration generators 210 and 230 may substantially overlap or stack with each other. For example, the second portion 1311$a$2 of the vibration generator 210 disposed at the upper layer among the three or more vibration generators 210 and

230 and the second portion 1311$a$2 of the vibration generator 230 disposed at the lower layer among the three or more vibration generators 210 and 230 may substantially overlap or stack without being staggered. For example, the second portion 1311$a$2 of the vibration generator 210 disposed at the upper layer among the three or more vibration generators 210 and 230 and the second portion 1311$a$2 of the vibration generator 230 disposed at the lower layer among the three or more vibration generators 210 and 230 may be aligned on or disposed at the virtual extension line VL. For example, the second portion 1311$a$2 of the vibration generator 210 disposed at the upper layer among the three or more vibration generators 210 and 230 and the second portion 1311$a$2 of the vibration generator 230 disposed at the lower layer among the three or more vibration generators 210 and 230 may be accurately aligned on or accurately disposed at the virtual extension line VL.

Figure 22:
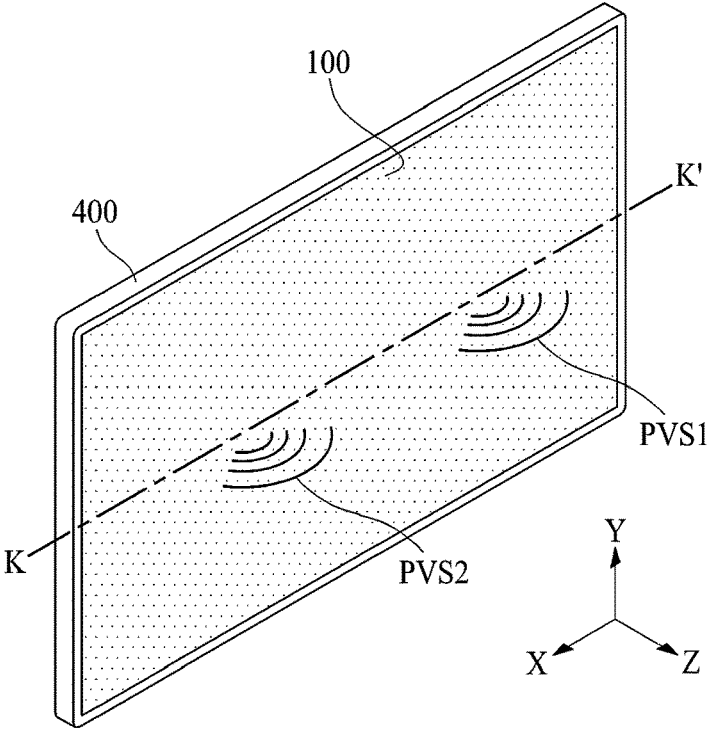
FIG. 22 illustrates an apparatus according to another embodiment of the present disclosure.
Figure 23:
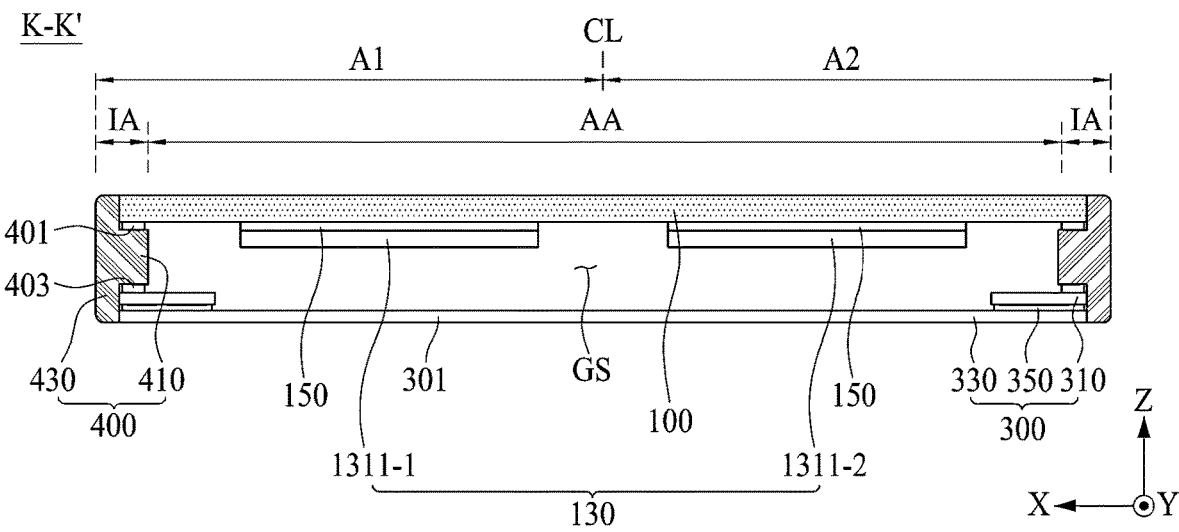
FIG. 23 is a cross-sectional view taken along line K-K' illustrated in FIG. 22.

FIG. 22 illustrates an apparatus according to another embodiment of the present disclosure. FIG. 23 is a cross-sectional view taken along line K-K' illustrated in FIG. 22.

With reference to FIGS. 22 and 23, in the apparatus according to another embodiment of the present disclosure, a rear surface (or a back surface) of a display panel 100 may include a first region (or a first rear area) A1 and a second region (or a second rear area) A2. For example, in the rear surface of the display panel 100, the first region A1 may be a left rear region, and the second region A2 may be a right rear region. The first and second regions A1 and A2 may be a left-right symmetrical with respect to a center line CL of the display panel 100 in a first direction X, but embodiments of the present disclosure are not limited thereto. For example, each of the first and second regions A1 and A2 may overlap the display area of the display panel 100.

A vibration apparatus 130 according to another embodiment of the present disclosure may include a first vibration generating portion 1311-1 and a second vibration generating portion 1311-2, which are disposed at a rear surface of a display panel 100. For example, the first vibration generating portion 1311-1 may be a first vibration generating apparatus, a first vibration apparatus, a first displacement apparatus, a first sound apparatus, or a first sound generating apparatus, but the terms are not limited thereto. For example, the second vibration generating portion 1311-2 may be a second vibration generating apparatus, a second vibration apparatus, a second displacement apparatus, a second sound apparatus, or a second sound generating apparatus, but the terms are not limited thereto.

The first vibration generating portion 1311-1 may be disposed in the first region A1 of the display panel 100. For example, the first vibration generating portion 1311-1 may be disposed close to a center or a periphery within the first region A1 of the display panel 100 with respect to the first direction X. The first vibration generating portion 1311-1 according to an embodiment of the present disclosure may vibrate the first region A1 of the display panel 100, and thus, may generate a first vibration sound PVS1 or a first haptic feedback in the first region A1 of the display panel 100. For example, the first vibration generating portion 1311-1 according to an embodiment of the present disclosure may directly vibrate the first region A1 of the display panel 100, and thus, may generate the first vibration sound PVS1 or the first haptic feedback in the first region A1 of the display panel 100. For example, the first vibration sound PVS1 may be a left sound. A size of the first vibration generating portion 1311-1 according to an embodiment of the present disclosure may have a size corresponding to half or less of the first region A1 or half or more of the first region A1 based on a characteristic of the first vibration sound PVS1 or a sound characteristic needed for an apparatus. As another embodiment of the present disclosure, the size of the first vibration generating portion 1311-1 may have a size corresponding to the first region A1 of the display panel 100. For example, the size of the first vibration generating portion 1311-1 may have the same size as the first area A1 of the display panel 100 or may have a size smaller than the first area A1 of the display panel 100.

The second vibration generating portion 1311-2 may be disposed in the second region A2 of the display panel 100. For example, the second vibration generating portion 1311-2 may be disposed close to a center or a periphery within the second region A2 of the display panel 100 with respect to the first direction X. The second vibration generating portion 1311-2 according to an embodiment of the present disclosure may vibrate the second region A2 of the display panel 100, and thus, may generate a second vibration sound PVS2 or a second haptic feedback in the second region A2 of the display panel 100. For example, the second vibration generating portion 1311-2 according to an embodiment of the present disclosure may directly vibrate the second region A2 of the display panel 100, and thus, may generate the second vibration sound PVS2 or the second haptic feedback in the second region A2 of the display panel 100. For example, the second vibration sound PVS2 may be a right sound. A size of the second vibration generating portion 1311-2 according to an embodiment of the present disclosure may have a size corresponding to half or less of the second region A2 or half or more of the second region A2 based on a characteristic of the second vibration sound PVS2 or a sound characteristic needed for an apparatus. As another embodiment of the present disclosure, the size of the second vibration generating portion 1311-2 may have a size corresponding to the second region A2 of the display panel 100. For example, the size of the second vibration generating portion 1311-2 may have the same size as the second area A2 of the display panel 100 or may have a size smaller than the second area A2 of the display panel 100. Therefore, the first vibration generating portion 1311-1 and the second vibration generating portion 1311-2 may have the same size or different sizes to each other based on a sound characteristic of left and right sounds and/or a sound characteristic of the apparatus. And, the first vibration generating portion 1311-1 and the second vibration generating portion 1311-2 may be disposed in a left-right symmetrical structure or a left-right asymmetrical structure with respect to the center line CL of the display panel 100.

Each of the first vibration generating portion 1311-1 and the second vibration generating portion 1311-2 may include one or more among the vibration apparatus 200 described above with reference to FIGS. 1 to 21, and thus, their repetitive descriptions may be omitted.

The connection member 150 according to an embodiment of the present disclosure may be disposed between each of the first vibration generating portion 1311-1 and the second vibration generating portion 1311-2 and the rear surface of the display panel 100. For example, each of the first vibration generating portion 1311-1 and the second vibration generating portion 1311-2 may be disposed at the rear surface of the display panel 100 by the connection member 150. The connection member 150 may be substantially the same as the connection member 150 described above with reference to FIG. 2, and thus, their repetitive descriptions may be omitted.

Accordingly, the apparatus according to another embodiment of the present disclosure may output, through the first vibration generating portion 1311-1 and the second vibration generating portion 1311-2, a left sound or the first vibration sound PVS1 and a right sound or the second vibration sound PVS2 to a forward region in front of the display panel 100 to provide a sound to a user.

Figure 24:
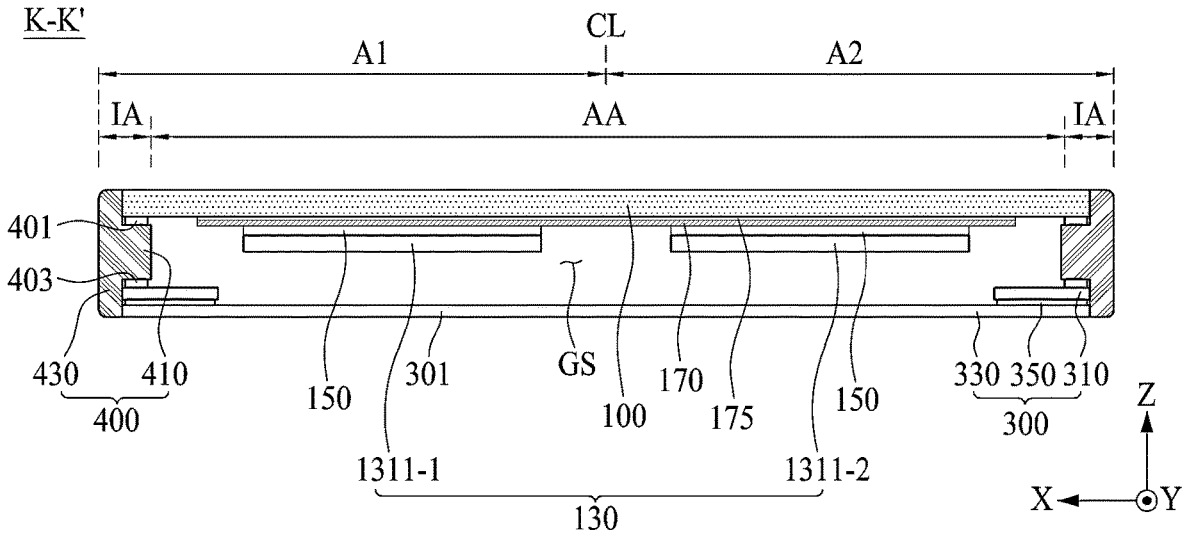
FIG. 24 is another cross-sectional view taken along line K-K' illustrated in FIG. 22.

FIG. 24 is another cross-sectional view taken along line K-K' illustrated in FIG. 22. FIG. 24 illustrates an embodiment where a plate is additionally provided in the apparatus illustrated in FIG. 23. Hereinafter, therefore, the other elements except a plate and relevant elements are referred to by like reference numerals, and their repetitive descriptions are omitted or will be briefly given.

Referring to FIG. 24, an apparatus according to another embodiment of the present disclosure may include a display panel 100 and a vibration apparatus 130, and moreover, may further include a plate 170 disposed between the display panel 100 and the vibration apparatus 130. For example, a vibration member may be connected to one of a first electrode portion and a second electrode portion of the vibration apparatus 130. For example, the display panel 100 may be connected to one of the first electrode portion and the second electrode portion of the vibration apparatus 130.

Each of the display panel 100 and the vibration apparatus 130 may be substantially the same as each of the display panel 100 and the vibration apparatus 130 described above with reference to FIGS. 1 to 21, and thus, their repetitive descriptions may be omitted or will be briefly given.

The plate 170 may be disposed between each of the first vibration generating portion 1311-1 and the second vibration generating portion 1311-2 of the vibration apparatus 130 and the rear surface of the display panel 100.

The plate 170 may dissipate heat generated from the display panel 100 or may reinforce a mass of the vibration apparatus 130 which is disposed at or hung from the rear surface of the display panel 100. The plate 170 may have the same shape and size as the rear surface of the display panel 100, or may have the same shape and size as the vibration apparatus 130. As another embodiment of the present disclosure, the plate 170 may have a size different from the display panel 100. For example, the plate 170 may be smaller than the size of the display panel 100. As another embodiment of the present disclosure, the plate 170 may have a size different from the vibration apparatus 130. For example, the plate 170 may be greater or smaller than the size of the vibration apparatus 130. The vibration apparatus 130 may be the same as or smaller than the size of the display panel 100.

The plate 170 according to an embodiment of the present disclosure may include a metal material. For example, the plate 170 may include one or more materials of stainless steel, aluminum (Al), a magnesium (Mg), a Mg alloy, a magnesium-lithium (Mg—Li) alloy, and an Al alloy, but embodiments of the present disclosure are not limited thereto.

The plate 170 according to an embodiment of the present disclosure may include a plurality of opening portions. The plurality of opening portions may be configured to have a predetermined size and a predetermined interval. For example, the plurality of opening portions may be provided along a first direction X and a second direction Y so as to have a predetermined size and a predetermined interval. Due to the plurality of opening portions, a sound wave (or a sound pressure) based on a vibration of the vibration apparatus 130 may not be dispersed by the plate 170, and may concentrate on the display panel 100. Thus, the loss of a vibration caused by the plate 170 may be minimized, thereby increasing a sound pressure level characteristic of a sound generated based on a vibration of the display panel 100. For example, the plate 170 including the plurality of openings may have a mesh shape. For example, the plate 170 including the plurality of openings may be a mesh plate.

According to some embodiments of the present disclosure, the plate 170 may be connected or coupled to the rear surface of the display panel 100. The plate 170 may dissipate heat occurring in the display panel 100. For example, the plate 170 may be referred to as a heat dissipation member, a heat dissipation plate, or a heat sink, but embodiments of the present disclosure are not limited thereto.

According to an embodiment of the present disclosure, the plate 170 may reinforce a mass of the vibration apparatus 130 which is disposed at or hung from the rear surface of the display panel 100. Thus, the plate 170 may decrease a resonance frequency of the vibration apparatus 130 based on an increase in mass of the vibration apparatus 130. Therefore, the plate 170 may increase a sound characteristic and a sound pressure level characteristic of the low-pitched sound band generated based on a vibration of the vibration apparatus 130 and may enhance the flatness of a sound pressure level characteristic. For example, the flatness of a sound pressure level characteristic may be a magnitude of a deviation between a highest sound pressure level and a lowest sound pressure level. For example, the plate 170 may be referred to as a weight member, a mass member, a sound planarization member, or the like, but embodiments of the present disclosure are not limited thereto.

According to an embodiment of the present disclosure, a displacement amount (or a bending force or a flexural force) or an amplitude displacement (or a vibration width) of the display panel 100 with the plate 170 disposed therein may decrease as a thickness of the plate 170 increases, based on the stiffness of the plate 170. Accordingly, a sound pressure level characteristic and a low-pitched sound band characteristic of a sound generated based on a displacement (or a vibration) of the display panel 100.

The plate 170 according to an embodiment of the present disclosure may be coupled or connected to a rear surface of the display panel 100 by a connection member (or a fourth connection member) 175.

The connection member 175 according to an embodiment of the present disclosure may include a material including an adhesive layer which is good in adhesive force or attaching force with respect to the rear surface of the display panel 100 and the vibration apparatus 130, respectively. For example, the connection member 175 may include a foam pad, a double-sided tape, or an adhesive, but embodiments of the present disclosure are not limited thereto. For example, the adhesive layer of the connection member 175 may include epoxy, acrylic, silicone, or urethane, but embodiments of the present disclosure are not limited thereto. For example, the adhesive layer of the connection member 175 may be the same as the adhesive layer of the connection member 150, but embodiments of the present disclosure are not limited thereto. For example, the adhesive layer of the connection member 175 may include an acrylic-based material which is relatively better in adhesive force and hardness among acrylic and urethane so that the vibration of the vibrating apparatus 130 may be transmitted to the display panel 100 well. As another embodiment of the present disclosure, the adhesive layer of the connection member 175 may differ from the adhesive layer of the connection member 150.

The vibration apparatus 130 may be connected or coupled to a rear surface of the plate 170 by the connection member 150 described above, and thus, may be supported by or hung at the rear surface of the plate 170. Each of the first vibration generating portion 1311-1 and the second vibration generating portion 1311-2 of the vibration apparatus 130 may be connected or coupled to a rear surface of the plate 170 by the connection member 150 described above, and thus, may be supported by or hung at the rear surface of the plate 170.

The plate 170 according to an embodiment of the present disclosure may be integrated into the vibration apparatus 130, or may be provided as an element of the vibration apparatus 130. For example, the plate 170 and the vibration apparatus 130 may be configured as one structure or one component (or module), which is provided as one body. Accordingly, when the plate 170 is disposed between the rear surface of the display panel 100 and the vibration apparatus 130, an assembly process between the display panel 100 and the vibration apparatus 130 may be easily performed based on component integration (or modulization) between the plate 170 and the vibration apparatus 130.

As another embodiment of the present disclosure, in a case where the plate 170 and the vibration apparatus 130 are configured as one structure or one component (or module) which is provided as one body, a non-display panel may be configured as a vibration plate. The plate 170 and the vibration apparatus 130 may be disposed at the non-display panel. The plate 170 and the vibration apparatus 130 may be connected or coupled to the non-display panel by a connection member. For example, the non-display panel may be wood, plastic, glass, cloth, a vehicle interior material, a building indoor ceiling, an aircraft interior material, or the like, but embodiments of the present disclosure are not limited thereto. Therefore, a sound may be output by vibrating the non-display panel. As another embodiment of the present disclosure, in a case where the plate 170 and the vibration apparatus 130 are configured as one structure or one component (or module) which is provided as one body, the plate 170 may be configured as a vibration plate. For example, the plate 170 may include one or more materials of stainless steel, aluminum (Al), a magnesium (Mg), a Mg alloy, a magnesium-lithium (Mg—Li) alloy, and an Al alloy, but embodiments of the present disclosure are not limited thereto. For example, in a module (or structure) of the plate 170 and the vibration apparatus 130, the plate 170 may include a single nonmetal material or a composite nonmetal material of one or more among wood, plastic, glass, cloth, and leather, but embodiments of the present disclosure are not limited thereto.

Accordingly, the apparatus according to another embodiment of the present disclosure may output, through the first vibration generating portion 1311-1 and the second vibration generating portion 1311-2, a left sound PVS1 and a right sound PVS2 to a forward region in front of the display panel 100 to provide a sound to a user. Moreover, in the apparatus, a resonance frequency of the vibration device 130 may decrease by the plate 170, and the heat generated from the display panel 100 may dissipate through the plate 170.

Figure 25:
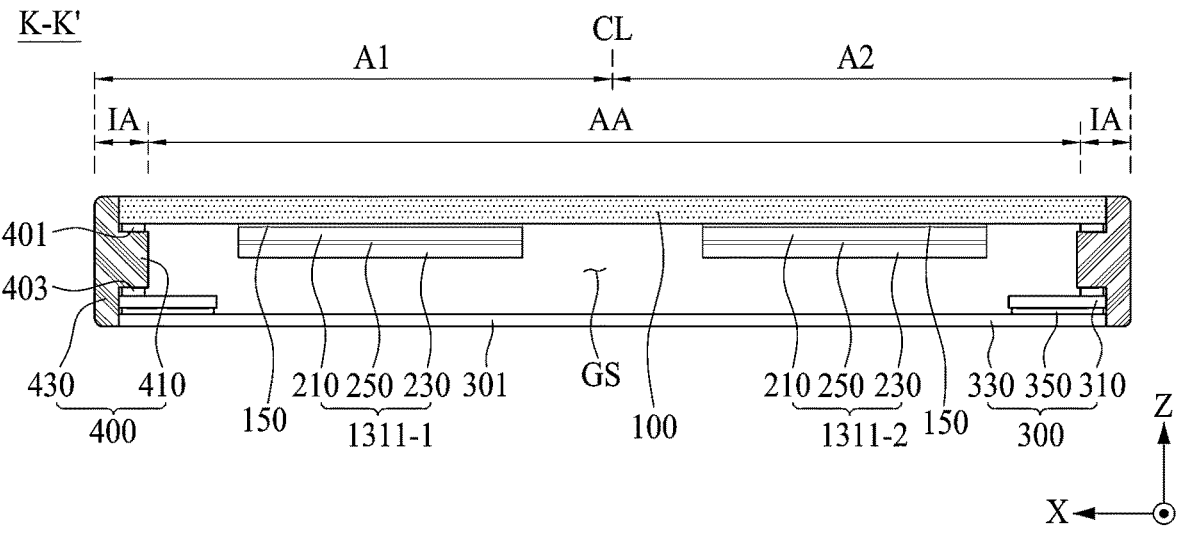
FIG. 25 is another cross-sectional view taken along line K-K' illustrated in FIG. 22.
Figure 26:
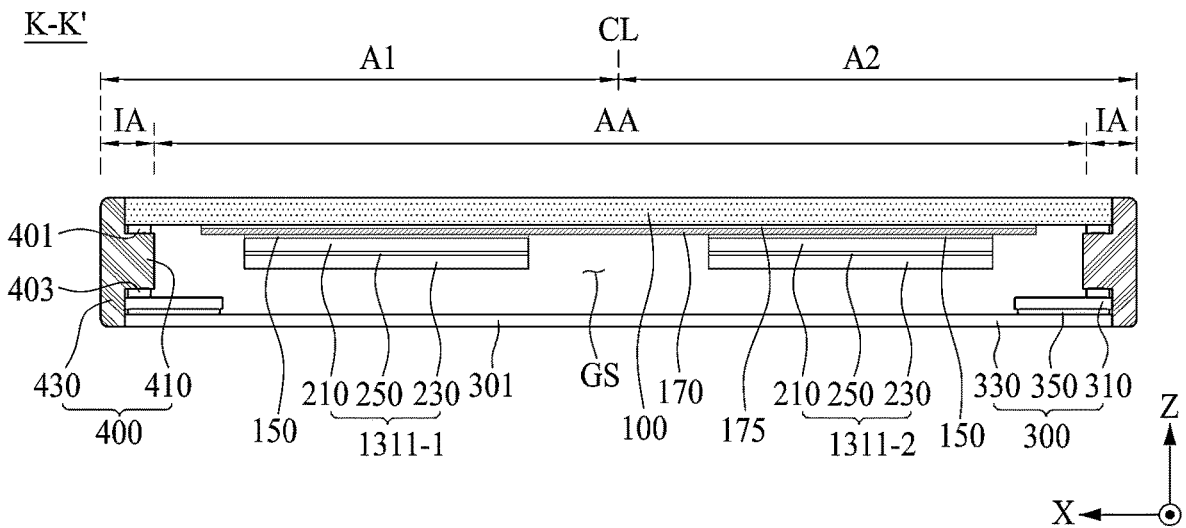
FIG. 26 is another cross-sectional view taken along line K-K' illustrated in FIG. 22.

FIG. 25 is another cross-sectional view taken along line K-K' illustrated in FIG. 22. FIG. 26 illustrates an embodiment where a plate is additionally provided in an apparatus illustrated in FIG. 25.

Referring to FIGS. 25 and 26, a vibration apparatus 130 according to another embodiment of the present disclosure may include a first vibration generating portion 1311-1 and a second vibration generating portion 1311-2, which are disposed at a rear surface of a display panel 100. For example, the first vibration generating portion 1311-1 may be a first vibration generating apparatus, a first vibration apparatus, a first displacement apparatus, a first sound apparatus, or a first sound generating apparatus, but the terms are not limited thereto. For example, the second vibration generating portion 1311-2 may be a second vibration generating apparatus, a second vibration apparatus, a second displacement apparatus, a second sound apparatus, or a second sound generating apparatus, but the terms are not limited thereto. Each of the first and second vibration generating portions 1311-1 and 1311-2 may include one or more of the vibration apparatuses 130 described above with reference to FIGS. 17 to 21. The display panel 100 and the vibration apparatus 130 may be substantially the same as the display panel 100 and the vibration apparatus 130 described above with reference to FIGS. 17 to 21, and thus, repetitive descriptions thereof are omitted or will be briefly given below. A description of the plate 170 may be substantially the same as description given above with reference to FIG. 24, and thus, repetitive descriptions thereof are omitted or will be briefly given below.

The vibration apparatus 130 according to an embodiment of the present disclosure may include a plurality of vibration generators 210 and 230 which have the first size and overlap or stack with each other, thereby minimizing a reduction in the displacement amount of the display panel 100 caused by the thickness of the plate 170. Also, the vibration apparatus 130 according to an embodiment of the present disclosure may include the plurality of vibration generators 210 and 230 which have the first size and overlap, and thus, the displacement amount of the display panel 100 may be increased or maximized, thereby increasing or enhancing a sound pressure level characteristic and a low-pitched sound band characteristic of a sound generated based on the displacement of the display panel 100. Accordingly, in the apparatus according to another embodiment of the present disclosure, the vibration apparatus 130 may increase or maximize the displacement amount of the display panel 100 with the plate 170 disposed therein, based on a stack structure of the vibration generators 210 and 230 which overlap or stack with each other. The plate 170 may have a thickness which enables heat of the display panel 100 to be smoothly dissipated.

The plate 170 according to an embodiment of the present disclosure may be connected or coupled to a front surface of the vibration apparatus 130 by the connection member 150 described above. For example, the plate 170 may be connected or coupled to an uppermost vibration generator of the plurality of vibration generators 210 and 230 of the vibration apparatus 130 by the connection member 150. For example, when the vibration apparatus 130 include first and second vibration generators 210 and 230, the plate 170 may be connected or coupled to a first surface of the second vibration generator 230 or a second surface of the first vibration generator 210 by the connection member 150.

Therefore, as described above with reference to FIGS. 17 to 22, an apparatus according to another embodiment of the present disclosure may increase or enhance a sound pressure level characteristic and a low pitched sound band characteristic of a sound generated based on a displacement of the display panel 100, based on a stack structure of the vibration generators 210 and 230. Also, in the apparatus according to another embodiment of the present disclosure, a resonance frequency of the vibration apparatus 130 may be reduced by the plate 170, and heat of the display panel 100 may be dissipated. Also, according to an embodiment of the present disclosure, a first electrode portion and a second electrode portion may be configured with a conductive adhesive member, and thus, a power supply line and/or a pad portion disposed in a cover member for connecting the first electrode portion to the second electrode portion may not be needed, thereby providing a display apparatus or an apparatus including a vibration apparatus having a simplified structure and a thin thickness. Also, according to an embodiment of the present disclosure, a first electrode portion and a second electrode portion may configure a vibration apparatus where a first cover member and a second cover member are provided as one body, thereby providing a display apparatus or an apparatus including a vibration apparatus having a simplified structure and a thin thickness.

Figure 27:
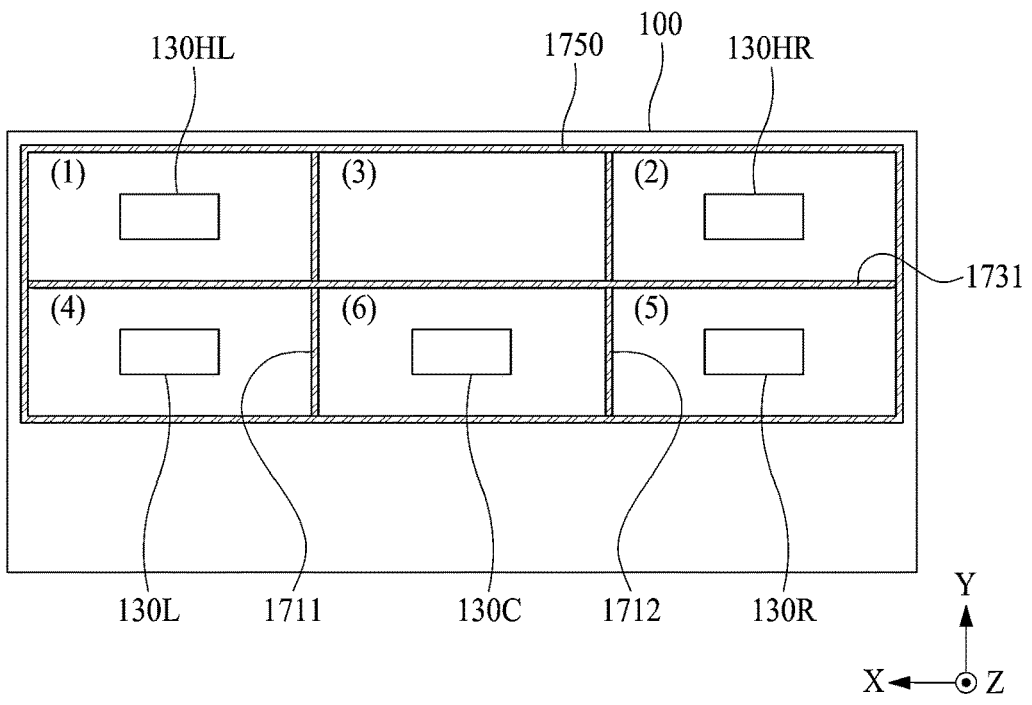
FIG. 27 illustrates an apparatus including a vibration apparatus according to another embodiment of the present disclosure.

FIG. 27 illustrates an apparatus including a vibration apparatus according to another embodiment of the present disclosure.

Referring to FIG. 27, a rear surface of a display panel 100 may include first to sixth regions (1) to (6). For example, a vibration member 100 may include the first to sixth regions (1) to (6). The first region (1), the second region (2), and the third region (3) may be disposed at an upper portion of the vibration member 100. The third region (3) may be disposed between the first region (1) and the second region (2). The fourth region (4), the fifth region (5), and the sixth region (6) may be disposed under the first region (1), the second region (2), and the third region (3). The sixth region (6) may be disposed between the fourth region (4) and the fifth region (5).

One or more vibration apparatuses may be disposed in one or more of the first to sixth regions (1) to (6). For example, the one or more vibration apparatuses may be connected to the vibration member and may be disposed in one or more of the first to sixth regions (1) to (6). For example, the vibration member may output a sound based on vibrations of the one or more vibration apparatuses.

For example, when the vibration member 100 is a display panel, the vibration apparatus may be disposed between the display panel and a supporting member 300. For example, the vibration apparatus may be disposed between a rear surface of the display panel and a top surface (or an upper surface) of the supporting member 300. For example, the display panel may output a sound based on vibrations of the one or more vibration apparatuses. In the following embodiments, an example where the vibration member 100 is the display panel 100 and the vibration apparatus is disposed at a rear surface of the display panel 100 will be described, but embodiments of the present disclosure are not limited thereto. For example, the vibration device may be disposed between the display panel 100 and a supporting member 300. For example, the vibration device may be disposed between a rear surface of the display panel 100 and a top surface (or an upper surface) of the supporting member 300. As another example, as described with reference to FIGS. 5A to 5B, the vibration device may be modularized and configured.

According to some embodiments of the present disclosure, the apparatus may further include a partition. For example, the partition may be disposed between the display panel 100 and the supporting member 300. The partition may be an air gap or a space where a sound is generated when the display panel 100 is vibrated by the vibration apparatus 130. An air gap or a space which generates or outputs a sound may be referred to as a partition. The partition may separate a sound or may separate a channel, thereby preventing or decreasing the occurrence of a non-transparent sound caused by interference of a sound. The partition may be referred to as an enclosure or a baffle, but the terms are not limited thereto. In the following embodiments, an example where a partition is disposed in a supporting member will be described. However, embodiments of the present disclosure are not limited thereto, and the partition may be disposed at a rear surface of a display panel. In order to illustrate the vibration apparatus and the partition, an example where the vibration apparatus and the partition are disposed in the supporting member will be described. For example, in a case where the partition is disposed in the supporting member, an adverse influence of image quality of the display panel caused by the partition disposed in the display panel may be reduced.

Referring to FIG. 27, a partition may be disposed to separate a left sound and a right sound which are output by the vibration apparatus 130 disposed at the rear surface of the display panel 100. For example, the partition may be disposed between the display panel 100, corresponding to first to sixth regions (1) to (6) of the display panel 100, and the supporting member 300.

A first partition 1711 may be disposed between the first region (1) and the third region (3). The first partition 1711 may be disposed between the fourth region (4) and the sixth region (6). For example, the first partition 1711 may be disposed between the first and fourth region (1) and (4) and the third and sixth region (3) and (6).

A second partition 1712 may be disposed between the second region (2) and the third region (3). The second partition 1712 may be disposed between the fourth region (4) and the sixth region (6). For example, the second partition 1712 may be disposed between the second and fourth region (2) and (4) and the third and sixth region (3) and (6).

For example, the first partition 1711 and the second partition to 1744 may separate left and right channels or left and right sounds generated by a first vibration apparatus 130HL and a second vibration apparatus 130HR. For example, the first partition 1711 and the second partition 1712 may separate a height left channel or a height left sound, generated by the first vibration apparatus 130HL, and a height right channel or a height right sound generated by the second vibration apparatus 130HR. For example, the first partition 1711 and the second partition 1712 may separate left and right channels or left and right sounds, which are generated by a third vibration apparatus 130L and a fourth vibration apparatus 130R. For example, the first partition 1711 and the second partition 1712 may separate the left channel or the left sound, generated by the third vibration apparatus 130L, and the right channel or the right sound generated by the fourth vibration apparatus 130R.

The first vibration apparatus 130HL and the second vibration apparatus 130HR may be further configured for implementing a multi-channel sound, and a partition should be configured for separating channels or sounds, generated by the first vibration apparatus 130HL and the second vibration apparatus 130HR, and channels or sounds generated by the third vibration apparatus 130L, the fourth vibration apparatus 130R, and a fifth vibration apparatus 130C. When the first and second partitions 1711 and 1712 are provided, left and right sounds or left and right channels may be separated from one another. A partition for generating a sound in each vibration apparatus should be configured so that a height sound or a height channel are separated from a lower sound or a bottom channel and vibration devices disposed in regions of the rear surface of the display panel 100 implement independent sounds for each region.

A partition may be configured to separate a height channel of the display panel 100 from a bottom channel of a display panel 100. For example, the third partition 1731 may separate the height channel of the display panel 100 from the bottom channel of the display panel 100. For example, the eleventh partition 1731 may separate channels or sounds, generated by the first vibration apparatus 130HL and the second vibration apparatus 130HR disposed at an upper portion of the display panel 100, from channels or sounds generated by the third vibration apparatus 130L, the fourth vibration apparatus 130R, and the fifth vibration apparatus 130C. The third partition 1731 may be disposed between the first to third regions (1) to (3) and the fourth to sixth regions (4) to (6). For example, the third partition 1731 may separate height channels or height sounds, generated by the first vibration apparatus 130HL and the second vibration apparatus 130HR, from center channels or center sounds generated by the third vibration apparatus 130L, the fourth vibration apparatus 130R, and the fifth vibration apparatus 130C.

The first partition 1711, the second partition 1712, and the third partition 1731 may be disposed in the supporting member 300. For example, the first partition 1711, the second partition 1712, and the third partition 1731 may be disposed at a top surface (or an upper surface) of the supporting member 300. For example, the first partition 1711, the second partition 1712, and the third partition 1731 may be disposed between the display panel 100 and the supporting member 300. For example, the first partition 1711, the second partition 1712, and the third partition 1731 may be disposed between the rear surface of the display panel 100 and the top surface (or the upper surface) of supporting member 300.

According to an embodiment of the present disclosure, the fourth partition 1750 may be provided between the supporting member 300 and the display panel 100. For example, the fourth partition 1750 may be disposed at an edge (or a periphery) of the supporting member 300. For example, the fourth partition 1750 may be disposed at an edge (or a periphery) of a top surface (or upper surface) of the supporting member 300. The fourth partition 1750 may be a whole region of four sides of an outer portion of the top surface (or the upper surface) of the supporting member 300. In another embodiment of the present disclosure, the fourth partition 1750 may be disposed at an edge (or a periphery) of the rear surface of the display panel 100. For example, the fourth partition 1750 may surround an edge (or a periphery) of the display panel 100. The fourth partition 1750 may be a whole region of four sides of an outer portion of the rear surface of the display panel 100. The fourth partition 1750 may be a whole region of the supporting member 300 or the rear surface of the display panel 100. For example, the fourth partition 1750 may be disposed to surround the first to fifth vibration apparatuses 130HL to 130C. For example, the fourth partition 1750 may be disposed along a region between a rear edge (or a rear periphery) of the display panel 100 and a front edge (or a front periphery) of the supporting member 300 to surround the vibration apparatus. The fourth partition 1750 may be referred to as an edge partition, a sound blocking member, an edge enclosure, or an edge baffle, but the terms are not limited thereto. The fourth partition 1750 may be disposed along a shape of the display panel 100 so as to prevent a wave phenomenon of the display panel 100. The wave phenomenon may be a phenomenon where a shape of a partition swells to a screen of a display panel when a thickness of a substrate configuring the display panel is thinned, and moreover, may be a problem where some regions of the display panel is recognized unevenly because the display panel is not flat or a supporting member is not flat. For example, in a case where the fourth partition 1750 is an adhesive member for attaching the display panel 100 of FIGS. 1 and 2 on the supporting member 330 of FIGS. 1 and 2, the adhesive member described above with reference to FIGS. 1 to 5E may be omitted, and the fourth partition 1750 may act as an adhesive member. However, embodiments of the present disclosure are not limited thereto, and the adhesive member for attaching the display panel 100 on the supporting member 300 may be provided in the supporting member 300 or the rear surface of the display panel 100. For example, the fourth partition 1750 may be disposed to be adjacent to or to contact a connection member 150 and may be surrounded by the connection member 150. In another embodiment of the present disclosure, the fourth partition 1750 and the connection member 150 may be provided as one body.

Therefore, because the fourth partition 1750 is further provided, a peak or dip phenomenon may be reduced, and the flatness of a sound characteristic may be improved. For example, the peak phenomenon may be a phenomenon where a sound pressure level bounces in a specific frequency, and the dip phenomenon may be a phenomenon where a low sound pressure level is generated because a specific frequency is not generated. For example, the flatness of the sound characteristic may be a magnitude of a deviation between a highest sound pressure level and a lowest sound pressure level.

According to another embodiment of the present disclosure, another partition may be disposed at a lower portion of each of the third vibration apparatus 130L, the fourth vibration apparatus 130R, and the fifth vibration apparatus 130C. The other partition may be disposed at a lower portion of the display panel 100 and may be separated from a driver for driving the display panel 100. For example, the other partition may be separated from a driver for driving the third vibration apparatus 130L, the fourth vibration apparatus 130R, the fifth vibration apparatus 130C, and the display panel 100. In this case, the fourth partition 1750 may not be provided.

Each of the first partition 1711, the second partition 1712, the third partition 1731, and the fourth partition 1750 may include one or more of a double-sided tape, a double-sided foam tape, a double-sided foam pad, a single-sided tape, a single-sided foam tape, a single-sided foam pad, an adhesive, and a bond, but embodiments of the present disclosure are not limited thereto. In a case where each of the first partition 1711, the second partition 1712, the third partition 1731, and the fourth partition 1750 is configured with a double-sided tape or a double-sided foam pad, an adhesive force may be enhanced in a process of attaching the rear surface of the display panel 100 on the top surface (or the upper surface) of the supporting member 300. For example, each of the first partition 1711, the second partition 1712, the third partition 1731, and the fourth partition 1750 may include a material having elasticity which enables a certain degree of compression. For example, each of the first partition 1711, the second partition 1712, the third partition 1731, and the fourth partition 1750 may include polyurethane, polyolefin, or polyethylene, but embodiments of the present disclosure are not limited thereto.

According to an embodiment of the present disclosure, at least one first vibration apparatus 130HL may be disposed in the first region (1) of the rear surface of the display panel. For example, the first vibration device 130HL may be a height left channel. At least one second vibration apparatus 130HR may be disposed in the second region (2) of the rear surface of the display panel. For example, the second vibration device 130HR may be a height right channel.

At least one third vibration apparatus 130L may be disposed in the fourth region (4) of the rear surface of the display panel, and at least one fourth vibration apparatus 130R may be disposed in the fifth region (5) of the rear surface of the display panel. At least one fifth vibration apparatus 130C may be disposed in the sixth region (6) of the rear surface of the display panel. For example, the third vibration apparatus 130L may be a left channel, the fourth vibration apparatus 130R may be a right channel, and the fifth vibration apparatus 130C may be a center channel.

For example, the first vibration apparatus 130HL and the second vibration apparatus 130HR may each be a height channel, and the third vibration apparatus 130L, the fourth vibration apparatus 130R, and the fifth vibration apparatus 130C may each be a main channel. The first vibration apparatus 130HL and the second vibration apparatus 130HR may each be a vibration apparatus which outputs a full-range sound. For example, the fourth to eighth vibration devices 500L to 500RC may each be a main channel, and the third vibration apparatus 130L, the fourth vibration apparatus 130R, and the fifth vibration apparatus 130C may each be a vibration apparatus which outputs a full-range sound. For example, a pitched sound band of a full range may be about 300 Hz or more, but is not limited thereto. For example, when the third vibration apparatus 130L and the fourth vibration apparatus 130R are provided, a left sound and a right sound may be reproduced, but the display apparatus according to an embodiment of the present disclosure may further include the first vibration apparatus 130HL and the second vibration apparatus 130HR and may reproduce a height channel, thereby implementing a real sound of the height channel. For example, in the display apparatus according to an embodiment of the present disclosure, because the first vibration apparatus 130HL and the second vibration apparatus 130HR are further provided, there may not be a position difference between a screen and a sound image, and thus, a sound image based on the screen may be implemented, thereby realizing a real sound based on a position. Also, the fifth vibration apparatus 130C may implement a center channel in addition to a left sound and a right sound, thereby providing an apparatus for outputting a multichannel.

According to an embodiment of the present disclosure, the third region (3) may not configure a vibration apparatus. Therefore, vibrations of the first vibration apparatus 130HL and the second vibration apparatus 130HR may be attenuated and absorbed in the third region (3) of the display panel 100, and thus, the transfer of a sound from the first region (1) to the second region (2) may be blocked or reduced and the transfer of a sound from the second region (2) to the first region (1) may be blocked or reduced. Accordingly, a degradation in sound quality caused by interference of sounds generated in the first region (1) and the second region (2) may be reduced, and a sound characteristic of each of a middle-pitched sound band and a high-pitched sound band may be more enhanced. For example, the middle-pitched sound band may be about 200 Hz to about 3 kHz, the high-pitched sound band may be 3 kHz or more, and the low-pitched sound band may be 200 Hz or less. However, a range of a pitched sound band is not limited thereto.

Therefore, the apparatus according to an embodiment of the present disclosure may be configured with five vibration apparatuses and may be configured with vibration apparatuses having a height channel and a main channel, thereby providing a display apparatus having 5 channels or 5.1 channels. Also, the five vibration apparatuses may be independently supplied with a sound signal and driven, and thus, each of the five vibration apparatuses may reproduce an independent sound channel. Accordingly, an apparatus or a display apparatus for implementing the 5 channels or the 5.1 channels may be provided. According to an embodiment of the present disclosure, a vibration device may be configured with an electrode portion configured with a conductive adhesive member, and a vibration apparatus including a signal cable for applying a vibration driving signal to the electrode portion may be provided, thereby providing an apparatus or a display apparatus having the 5 channels or the 5.1 channels by a vibration apparatus having a more simplified structure. Also, according to an embodiment of the present disclosure, a first electrode portion and a second electrode portion may configure a vibration apparatus where a first cover member and a second cover member are provided as one body, thereby providing a display apparatus or an apparatus including a vibration apparatus having a simplified structure and a thin thickness. Also, according to an embodiment of the present disclosure, a display apparatus or an apparatus including a multichannel may be provided, and thus, a sound or a voice may be generated by dividing in detail a position at which a sound is generated, thereby enhancing immersion experience and/or a sense of realism.

According to an embodiment of the present disclosure, the first to fifth vibration apparatuses 130HL to 130C may be configured as the vibration apparatus described above with reference to FIGS. 1 to 21. According to an embodiment of the present disclosure, the first vibration apparatus 130HL and the second vibration apparatus 130HR may be configured as the same vibration apparatus, for the left-right symmetricity of a sound. For example, the first vibration apparatus 130HL and the second vibration apparatus 130HR may be configured as one of the vibration apparatuses 130 described above with reference to FIGS. 2 to 7B and 14 to 16. In another embodiment of the present disclosure, the first vibration apparatus 130HL and the second vibration apparatus 130HR may be configured as one or more of FIGS. 13A to 13F among the vibration apparatuses 130 described above with reference to FIGS. 2 to 7B and 14 to 16. According to an embodiment of the present disclosure, the third vibration apparatus 130L and the fourth vibration apparatus 130R may be configured as the same vibration apparatus, for the left-right symmetricity of a sound. For example, the third vibration apparatus 130L and the fourth vibration apparatus 130R may be configured as one of the vibration apparatuses 130 described above with reference to FIGS. 17 to 21. In another embodiment of the present disclosure, the third vibration apparatus 130L and the fourth vibration apparatus 130R may be configured as one or more of FIGS. 13A to 13F among the vibration apparatuses 130 described above with reference to FIGS. 17 to 21. For example, the third to fifth vibration apparatuses 130L to 130C may be configured as one or more of the vibration apparatuses 130 described above with reference to FIGS. 17 to 21. In another embodiment of the present disclosure, the third to fifth vibration apparatuses 130L to 130C may be configured as one or more of FIGS. 13A to 13F among the vibration apparatuses 130 described above with reference to FIGS. 17 to 21. A sound of a high pitched sound band may be enhanced by the first vibration apparatus 130HL and the second vibration apparatus 130HR, and an apparatus or a display apparatus where a sound of a middle-low pitched sound band is enhanced by the third to fifth vibration apparatuses 130L to 130C may be provided. According to another embodiment of the present disclosure, the first to fifth vibration apparatuses 130HL to 130C may be configured as the same vibration apparatus. The first to fifth vibration apparatuses 130HL to 130C may be configured as one or more of the vibration apparatuses 130 described above with reference to FIGS. 2 to 7B, 14 to 16, and 17 to 21. According to another embodiment of the present disclosure, the first to fifth vibration apparatuses 130HL to 130C may be configured as one or more of FIGS. 13A to 13F among the vibration apparatuses 130 described above with reference to FIGS. 2 to 7B, 14 to 16, and 17 to 21. According to an embodiment of the present disclosure, a first electrode portion and a second electrode portion may be configured with a conductive adhesive member, and thus, a power supply line and/or a pad portion disposed in a cover member for connecting the first electrode portion to the second electrode portion may not be needed, thereby providing a multi-channel display apparatus or apparatus including a vibration apparatus having a simplified structure and a thin thickness. Also, according to an embodiment of the present disclosure, a first electrode portion and a second electrode portion may configure a vibration apparatus where a first cover member and a second cover member are provided as one body, thereby providing a display apparatus or an apparatus including a vibration apparatus having a simplified structure and a thin thickness.

Figure 28:
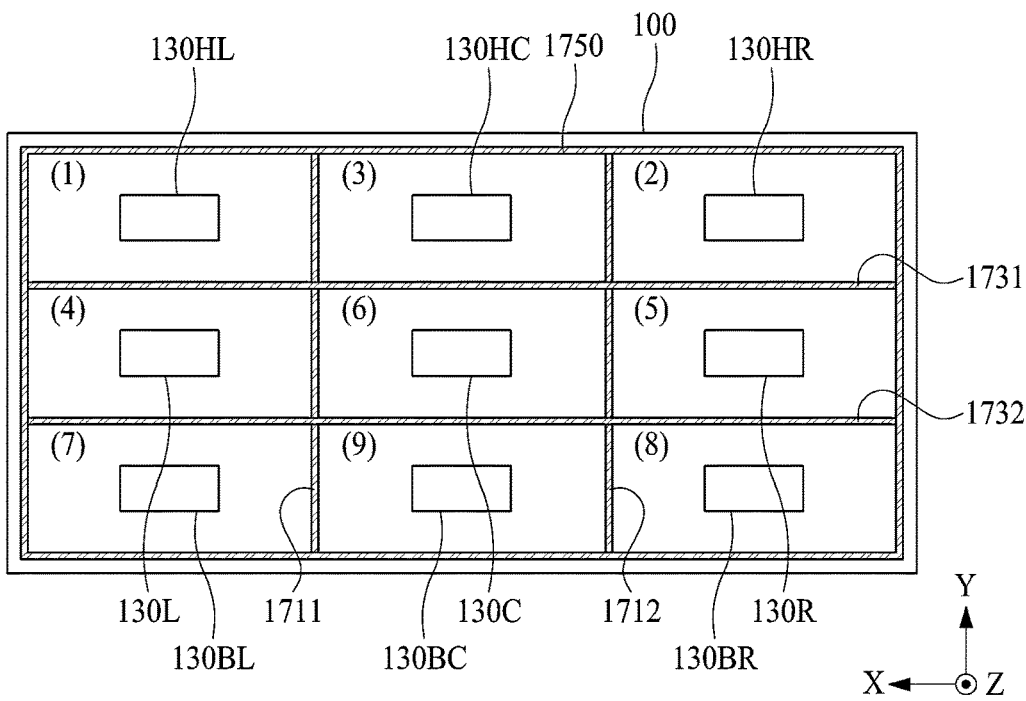
FIG. 28 illustrates an apparatus including a vibration apparatus according to another embodiment of the present disclosure.

FIG. 28 illustrates an apparatus including a vibration apparatus according to another embodiment of the present disclosure.

Referring to FIG. 28, a rear surface of a display panel 100 may include first to ninth regions (1) to (9). For example, a vibration member may include the first to ninth regions (1) to (9). For example, one or more vibration apparatuses may be disposed in one or more of the first to ninth regions (1) to (9). For example, one or more vibration apparatuses may be connected to the vibration member and may be disposed in one or more of the first to ninth regions (1) to (9). For example, the vibration member may output a sound based on vibrations of one or more vibration apparatuses.

The first region (1), the second region (2), and the third region (3) may be disposed at an upper portion of the vibration member 100. The third region (3) may be disposed between the first region (1) and the second region (2). The fourth region (4), the fifth region (5), and the sixth region (6) may be disposed under the first region (1), the second region (2), and the third region (3). The sixth region (6) may be disposed between the fourth region (4) and the fifth region (5). The seventh region (7), the eighth region (8), and the ninth region (9) may be disposed under the fourth region (4), the fifth region (5), and the sixth region (6). The ninth region (9) may be disposed between the seventh region (7) and the eighth region (8). For example, the fourth region (4), the fifth region (5), and the sixth region (6) may be disposed between the first to third regions (1) to (3) and the seventh to ninth regions (7) to (9).

According to an embodiment of the present disclosure, at least one first vibration apparatus 130HL may be disposed in the first region (1) of the rear surface of the display panel. For example, the first vibration apparatus 130HL may be a height left channel. At least one second vibration apparatus 130HR may be disposed in the second region (2) of the rear surface of the display panel. For example, the second vibration apparatus 130HR may be a height right channel. At least one third vibration device 130HC may be disposed in the third region (3) of the rear surface of the display panel. For example, the third vibration device 130HC may be a height center channel.

At least one fourth vibration apparatus 130L may be disposed in the fourth region (4) of the rear surface of the display panel. For example, the fourth vibration apparatus 130L may be a left channel. At least one fifth vibration apparatus 130R may be disposed in the fifth region (5) of the rear surface of the display panel. The fifth vibration apparatus 130R may be a right channel. At least one sixth vibration apparatus 130C may be disposed in the sixth region (6) of the rear surface of the display panel. For example, the sixth vibration apparatus 130C may be a center channel.

According to an embodiment of the present disclosure, at least one seventh vibration apparatus 130BL may be disposed in the seventh region (7) of the rear surface of the display panel. For example, the seventh vibration device 130BL may be a bottom left channel. At least one eighth vibration apparatus 130BR may be disposed in the eighth region (8) of the rear surface of the display panel. For example, the eighth vibration apparatus 130BR may be a bottom right channel. At least one ninth vibration device 130BC may be disposed in the ninth region (9) of the rear surface of the display panel. For example, the ninth vibration device 130BC may be a bottom center channel.

For example, the first to third vibration apparatuses 130HL to 130HC may each be a height channel. The fourth to sixth vibration apparatuses 130L to 130C may each be a center channel. The seventh to ninth vibration apparatuses 130BL to 130BC may each be a bottom channel. For example, the first to third vibration apparatuses 130HL to 130HC and the seventh to ninth vibration apparatuses 130BL to 130BC may each be a speaker which notifies an action or a motion of a person or an object. For example, the first to third vibration apparatuses 130HL to 130HC and the seventh to ninth vibration apparatuses 130BL to 130BC may each be a vibration apparatus which outputs a full-range sound. For example, a pitched sound band of a full range may be about 300 Hz or more, but is not limited thereto. For example, the fourth to sixth vibration apparatuses 130L to 130C may each be a main channel. The fourth to sixth vibration apparatuses 130L to 130C may each be a vibration apparatus which outputs a full-range sound.

A first partition 1711 may be disposed between the first region (1) and the second region (2). For example, the first partition 1711 may be disposed between the first region (1) and the third region (3). The first partition 1711 may be disposed between the fourth region (4) and the fifth region (5). For example, the first partition 1711 may be disposed between the fourth region (4) and the sixth region (6). The first partition 1711 may be disposed between the seventh region (7) and the eighth region (8). For example, the first partition 1711 may be disposed between the seventh region (7) and the ninth region (9). For example, the first partition 1711 may be disposed between the first region (1), the fourth region (4), and the seventh region (7) and the second region (2), the fifth region (5), and the eighth region (8). For example, the first partition 1711 may be disposed between the first region (1), the fourth region (4), and the seventh region (7) and the second region (3), the sixth region (6), and the ninth region (9). For example, the first partition 1711 may separate height left and right channels or height left and right sounds, which are generated by the first vibration apparatus 130HL and the second vibration apparatus 130HR. For example, the first partition 1711 may separate center left and right channels or center left and right sounds, which are generated by the fourth vibration apparatus 130L and the fifth vibration apparatus 130R. For example, the first partition 1711 may separate bottom left and right channels or bottom left and right sounds, which are generated by the seventh vibration apparatus 130BL and the eighth vibration apparatus 130BR.

For example, the first partition 1711 may separate channels or sounds, which are generated by the first vibration apparatus 130HL and the third vibration apparatus 130HC.

For example, the first partition 1711 may separate a height left channel or a height left sound, generated by the first vibration apparatus 130HL, from a height center channel or a height center sound generated by the third vibration apparatus 130HC. For example, the first partition 1711 may separate channels or sounds, which are generated by the fourth vibration apparatus 130L and the sixth vibration apparatus 130C. For example, the first partition 1711 may separate a left channel or a left sound, generated by the fourth vibration apparatus 130L, from a center channel or a center sound generated by the sixth vibration apparatus 130C. For example, the first partition 1711 may separate channels or sounds, which are generated by the seventh vibration apparatus 130BL and the ninth vibration apparatus 130BC. For example, the first partition 1711 may separate a bottom left channel or a bottom left sound, generated by the seventh vibration apparatus 130BL, from a bottom center channel or a bottom center sound generated by the ninth vibration apparatus 130BC.

A second partition 1712 may be disposed between the second region (2) and the third region (3). For example, the second partition 1712 may be disposed between the fifth region (5) and the sixth region (6). The second partition 1712 may be disposed between the eighth region (8) and the ninth region (9). For example, the second partition 1712 may be disposed between the second region (2), the fifth region (5), and the eighth region (8) and the third region (3), the sixth region (6), and the ninth region (9). For example, the second partition 1712 may separate left and right channels or left and right sounds, which are generated by the first vibration apparatus 130HL and the second vibration apparatus 130HR. For example, the second partition 1712 may separate left and right channels or left and right sounds, which are generated by the fourth vibration apparatus 130L and the fifth vibration apparatus 130R. For example, the second partition 1712 may separate left and right channels or left and right sounds, which are generated by the seventh vibration apparatus 130BL and the eighth vibration apparatus 130BR. For example, the second partition 1712 may separate channels or sounds, which are generated by the second vibration apparatus 130HR and the third vibration apparatus 130HC. For example, the second partition 1712 may separate a height right channel or a height right sound, generated by the second vibration apparatus 130HR, from a height center channel or a height center sound generated by the third vibration apparatus 130HC. For example, the second partition 1712 may separate channels or sounds, which are generated by the fifth vibration apparatus 130R and the sixth vibration apparatus 130C. For example, the second partition 1712 may separate a right channel or a right sound, generated by the fifth vibration apparatus 130R, from a center channel or a center sound generated by the sixth vibration apparatus 130C. For example, the second partition 1712 may separate channels or sounds, which are generated by the eighth vibration apparatus 130BR and the ninth vibration apparatus 130BC. For example, the second partition 1712 may separate a bottom right channel or a bottom right sound, generated by the eighth vibration apparatus 130BR, from a bottom center channel or a bottom center sound generated by the ninth vibration apparatus 130BC.

A third partition 1731 may be disposed between the first to third regions (1) to (3) and the fourth to sixth regions (4) to (6). For example, the third partition 1731 may separate height channels or height sounds, generated by the first to third vibration apparatuses 130HL to 130HC, from center channels (or main channels) or center sounds (or main sounds) generated by the fourth to sixth vibration apparatuses 130L to 130C.

A fourth partition 1732 may be disposed between the fourth to sixth regions (4) to (6) and the seventh to ninth regions (7) to (9). For example, the fourth partition 1732 may separate center channels or center sounds, generated by the fourth to sixth vibration apparatuses 130L to 130R, from bottom channels or bottom sounds generated by the seventh to ninth vibration apparatuses 130BL to 130BC.

According to an embodiment of the present disclosure, a fifth partition 1750 may be provided between the supporting member 300 and the display panel 100. A description of the fifth partition 1750 may be the same as description given above with reference to FIG. 27, and thus, its detailed description is omitted.

According to another embodiment of the present disclosure, another partition may be disposed under or at a lower portion of each of the seventh vibration apparatus 13L, the eighth vibration apparatus 130R, and the ninth vibration apparatus 130C. The other partition may be disposed at a lower portion of the display panel 100 and may be separated from a driver for driving the display panel 100. For example, the other partition may be separated from a driver for driving the seventh vibration apparatus 13L, the eighth vibration apparatus 130R, the ninth vibration apparatus 130C, and the display panel 100. In this case, the fifth partition 1750 may not be provided.

Each of the first partition 1711, the second partition 1712, the third partition 1731, the fourth partition 1732, and the fifth partition 1750 may include one or more of a double-sided tape, a double-sided foam tape, a double-sided foam pad, a single-sided tape, a single-sided foam tape, a single-sided foam pad, an adhesive, and a bond, but embodiments of the present disclosure are not limited thereto. In a case where each of the first partition 1711, the second partition 1712, the third partition 1731, the fourth partition 1732, and the fifth partition 1750 is configured with a double-sided tape or a double-sided foam pad, an adhesive force may be enhanced in a process of attaching a rear surface of the display panel 100 on a top surface (or an upper surface) of the supporting member 300. For example, each of the first partition 1711, the second partition 1712, the third partition 1731, the fourth partition 1732, and the fifth partition 1750 may include a material having elasticity which enables a certain degree of compression. For example, each of the first partition 1711, the second partition 1712, the third partition 1731, the fourth partition 1732, and the fifth partition 1750 may include polyurethane, polyolefin, or polyethylene, but embodiments of the present disclosure are not limited thereto.

Therefore, the apparatus according to an embodiment of the present disclosure may be configured with nine vibration apparatuses and may be configured with vibration apparatuses having a height channel, a main channel, and a bottom channel, thereby providing a display apparatus having 9 channels. Also, the nine vibration apparatuses may be independently supplied with a sound signal and driven, and thus, each of the nine vibration apparatuses may reproduce an independent sound channel. Accordingly, an apparatus or a display apparatus for implementing the 9 channels may be provided. According to an embodiment of the present disclosure, a vibration device may be configured with an electrode portion configured with a conductive adhesive member, and a vibration apparatus including a signal cable for applying a vibration driving signal to the electrode portion may be provided, thereby providing an apparatus or a display apparatus having the 9 channels by a vibration apparatus having a more simplified structure. Also, according to an embodiment of the present disclosure, a first electrode portion and a second electrode portion may configure a vibration apparatus where a first cover member and a second cover member are provided as one body, thereby providing a vehicular apparatus including a vibration apparatus having a simplified structure and a thin thickness.

According to an embodiment of the present disclosure, the first to ninth vibration apparatuses 130HL to 130HC may be configured as the vibration apparatus described above with reference to FIGS. 1 to 21. According to an embodiment of the present disclosure, the first vibration apparatus 130HL and the second vibration apparatus 130HR may be configured as the same vibration apparatus, for the left-right symmetricity of a sound. For example, the first vibration apparatus 130HL and the second vibration apparatus 130HR may be configured as one or more of the vibration apparatuses 130 described above with reference to FIGS. 2 to 7B and 14 to 16. In another embodiment of the present disclosure, the first vibration apparatus 130HL and the second vibration apparatus 130HR may be configured as one or more of FIGS. 13A to 13F among the vibration apparatuses 130 described above with reference to FIGS. 2 to 7B and 14 to 16. For example, the first to third vibration apparatuses 130HL to 130HC may be configured as one or more of the vibration apparatuses 130 described above with reference to FIGS. 2 to 7B and 14 to 16. In another embodiment of the present disclosure, the first to third vibration apparatuses 130HL to 130HC may be configured as one or more of FIGS. 13A to 13F among the vibration apparatuses 130 described above with reference to FIGS. 2 to 7B and 14 to 16. According to an embodiment of the present disclosure, the fourth vibration apparatus 130L and the fifth vibration apparatus 130R may be configured as the same vibration apparatus, for the left-right symmetricity of a sound. For example, the fourth vibration apparatus 130L and the fifth vibration apparatus 130R may be configured as one or more of the vibration apparatuses 130 described above with reference to FIGS. 17 to 21. For example, the fourth vibration apparatus 130L and the fifth vibration apparatus 130R may be configured as one or more of the vibration apparatuses 130 described above with reference to FIGS. 17 to 21. In another embodiment of the present disclosure, the fourth vibration apparatus 130L and the fifth vibration apparatus 130C may be configured as one or more of FIGS. 13A to 13F among the vibration apparatuses 130 described above with reference to FIGS. 17 to 21. According to an embodiment of the present disclosure, the seventh vibration apparatus 130BL and the eighth vibration apparatus 130BR may be configured as the same vibration apparatus, for the left-right symmetricity of a sound. For example, the seventh vibration apparatus 130BL and the eighth vibration apparatus 130BR may be configured as one or more of the vibration apparatuses 130 described above with reference to FIGS. 2 to 7B and 14 to 16 and/or FIGS. 17 to 21. In another embodiment of the present disclosure, the seventh vibration apparatus 130BL and the eighth vibration apparatus 130BR may be configured as one or more of FIGS. 13A to 13F among the vibration apparatuses 130 described above with reference to FIGS. 2 to 7B and 14 to 16 and/or FIGS. 17 to 21. The seventh to ninth vibration apparatuses 130BL to 130BC may be configured as one or more of the vibration apparatuses 130 described above with reference to FIGS. 2 to 7B and 14 to 16 and/or FIGS. 17 to 21. In another embodiment of the present disclosure, the seventh to ninth vibration apparatuses 130BL to 130BC may be configured as one or more of FIGS. 13A to 13F among the vibration apparatuses 130 described above with reference to FIGS. 2 to 7B and 14 to 16 and/or FIGS. 17 to 21. A sound of a high pitched sound band may be enhanced by the first to third vibration apparatuses 130HL to 130HC, and an apparatus or a display apparatus where a sound of a middle-low pitched sound band is enhanced by the fourth to sixth vibration apparatuses 130L to 130C and/or the seventh to ninth vibration apparatuses 130BL to 130BC may be provided. According to another embodiment of the present disclosure, the first to ninth vibration apparatuses 130HL to 130BC may be configured as the same vibration apparatus. The first to ninth vibration apparatuses 130HL to 130BC may be configured as one or more of the vibration apparatuses 130 described above with reference to FIGS. 2 to 7B, 14 to 16, and 17 to 21. According to another embodiment of the present disclosure, the first to ninth vibration apparatuses 130HL to 130BC may be configured as one or more of FIGS. 13A to 13F among the vibration apparatuses 130 described above with reference to FIGS. 2 to 7B, 14 to 16, and 17 to 21. According to an embodiment of the present disclosure, a first electrode portion and a second electrode portion may be configured with a conductive adhesive member, and thus, a power supply line and/or a pad portion disposed in a cover member for connecting the first electrode portion to the second electrode portion may not be needed, thereby providing a multi-channel display apparatus or apparatus including a vibration apparatus having a simplified structure and a thin thickness. Also, according to an embodiment of the present disclosure, a first electrode portion and a second electrode portion may configure a vibration apparatus where a first cover member and a second cover member are provided as one body, thereby providing a display apparatus or an apparatus including a vibration apparatus having a simplified structure and a thin thickness. Also, according to an embodiment of the present disclosure, a display apparatus or an apparatus including a multichannel may be provided, and thus, a sound or a voice may be generated by dividing in detail a position at which a sound is generated, thereby enhancing immersion experience and/or a sense of realism.

Figure 29:
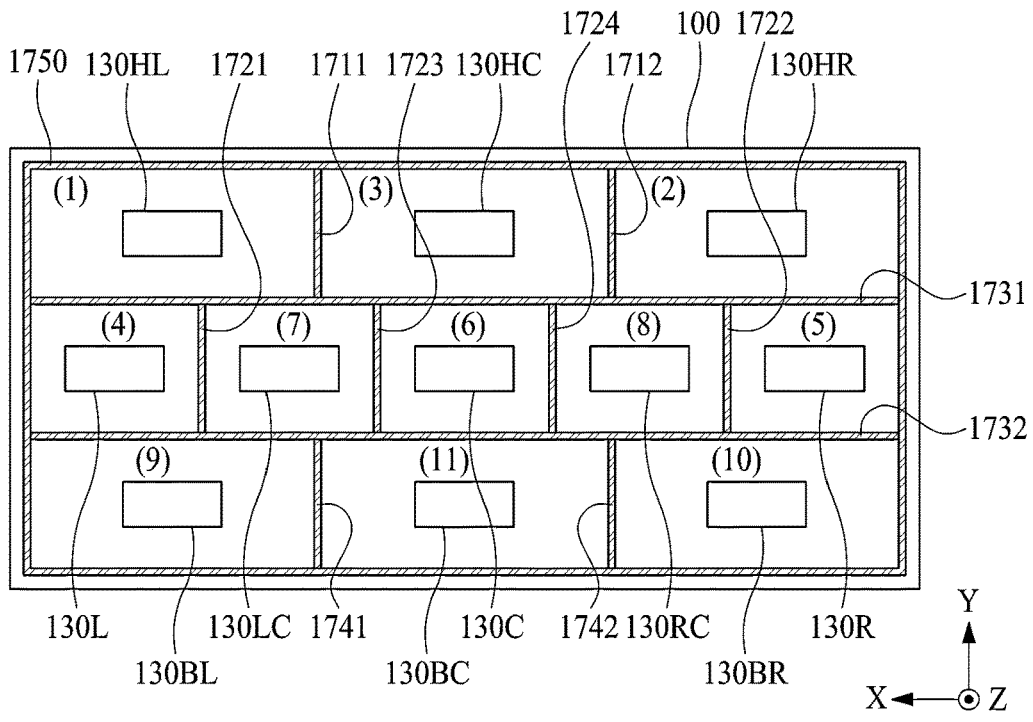
FIG. 29 illustrates an apparatus including a vibration apparatus according to another embodiment of the present disclosure.

FIG. 29 illustrates an apparatus including a vibration apparatus according to an embodiment of the present disclosure.

Referring to FIG. 29, a rear surface of a display panel 100 may include first to eleventh regions (1) to (11). For example, a vibration member may include the first to eleventh regions (1) to (11). For example, one or more vibration apparatuses may be disposed in one or more of the first to eleventh regions (1) to (11). For example, one or more vibration apparatuses may be connected to the vibration member and may be disposed in one or more of the first to eleventh regions (1) to (11). For example, the vibration member may output a sound based on vibrations of one or more vibration apparatuses.

The first region (1), the second region (2), and the third region (3) may be disposed at an upper portion of the vibration member 100. The third region (3) may be disposed between the first region (1) and the second region (2).

The fourth region (4), the fifth region (5), the sixth region (6), the seventh region (7), and the eighth region (8) may be disposed under the first region (1), the second region (2), and the third region (3). The sixth region (6) may be disposed between the fourth region (4) and the fifth region (5). The seventh region (7) may be disposed between the fourth region (4) and the sixth region (6). The eighth region (8) may be disposed between the fifth region (5) and the sixth region (6). The sixth region (6) may be disposed between the seventh region (7) and the eighth region (8).

The ninth region (9), the tenth region (10), and the eleventh region (11) may be disposed under the fourth region (4), the fifth region (5), the sixth region (6), the seventh region (7), and the eighth region (8). The eleventh region (11) may be disposed between the ninth region (9) and the tenth region (10). For example, the fourth region (4), the fifth region (5), and the sixth region (6) may be disposed between the first to third regions (1) to (3) and the ninth to eleventh regions (9) to (11).

According to an embodiment of the present disclosure, at least one first vibration apparatus 130HL may be disposed in the first region (1) of the rear surface of the vibration member 100 or the display panel. For example, the first vibration apparatus 130HL may be a height left channel. At least one second vibration apparatus 130HR may be disposed in the second region (2) of the rear surface of the display panel. For example, the second vibration apparatus 130HR may be a height right channel. At least one third vibration device 130HC may be disposed in the third region (3) of the rear surface of the display panel. For example, the third vibration device 130HC may be a height center channel.

According to an embodiment of the present disclosure, at least one fourth vibration apparatus 130L may be disposed in the fourth region (4) of the rear surface of the display panel. For example, the fourth vibration apparatus 130L may be a left channel. At least one fifth vibration apparatus 130R may be disposed in the fifth region (5) of the rear surface of the display panel. For example, the fifth vibration apparatus 130R may be a right channel. At least one sixth vibration apparatus 130C may be disposed in the sixth region (6) of the rear surface of the display panel. For example, the sixth vibration apparatus 130C may be a center channel. At least one seventh vibration apparatus 130LC may be disposed in the seventh region (7) of the rear surface of the display panel. For example, the seventh vibration apparatus 130LC may be a left center channel. At least one eighth vibration apparatus 130RC may be disposed in the eighth region (8) of the rear surface of the display panel. For example, the eighth vibration apparatus 130RC may be a right center channel.

According to an embodiment of the present disclosure, at least one ninth vibration apparatus 130BL may be disposed in the ninth region (9) of the rear surface of the display panel. For example, the ninth vibration device 130BL may be a bottom left channel. At least one tenth vibration apparatus 130BR may be disposed in the tenth region (10) of the rear surface of the display panel. For example, the tenth vibration apparatus 130BR may be a bottom right channel. At least one eleventh vibration device 130BC may be disposed in the eleventh region (11) of the rear surface of the display panel. For example, the eleventh vibration device 130BC may be a bottom center channel.

For example, the first to third vibration apparatuses 130HL to 130HC may each be a height channel. The fourth to eighth vibration apparatuses 130L to 130RC may each be a center channel. The ninth to eleventh vibration apparatuses 130BL to 130BC may each be a bottom channel. For example, the first to third vibration apparatuses 130HL to 130HC and the ninth to eleventh vibration apparatuses 130BL to 130BC may each be a speaker which notifies an action or a motion of a person or an object. For example, the first to third vibration apparatuses 130HL to 130HC and the ninth to eleventh vibration apparatuses 130BL to 130BC may each be a vibration apparatus which outputs a full-range sound. For example, a pitched sound band of a full range may be about 300 Hz or more, but is not limited thereto. For example, the fourth to eighth vibration apparatuses 130L to 130RC may each be a main channel. The fourth to eighth vibration apparatuses 130L to 130RC may each be a vibration apparatus which outputs a full-range sound.

A first partition 1711 may be disposed between the first region (1) and the second region (2). For example, the first partition 1711 may separate height left and right channels or height left and right sounds generated by the first vibration apparatus 130HL and the second vibration apparatus 130HR. The first partition 1711 may be disposed between the first region (1) and the third region (3). For example, the first partition 1711 may separate height left channel or height left sound, generated by the first vibration apparatus 130HL, from height center channel or height center sound generated by the third vibration apparatus 130HC.

A second partition 1712 may be disposed between the first region (1) and the second region (2). For example, the second partition 1712 may separate height left and right channels or height left and right sounds generated by the first vibration apparatus 130HL and the second vibration apparatus 130HR. The second partition 1712 may be disposed between the second region (2) and the third region (3). For example, the second partition 1712 may separate height right channel or height right sound, generated by the second vibration apparatus 130HR, from height center channel or height center sound generated by the third vibration apparatus 130HC.

A third partition 1721 may be disposed between the fourth region (4) and the fifth region (5). For example, the third partition 1721 may separate center left and right channels or center left and right sounds generated by the first vibration apparatus 130HL and the second vibration apparatus 130HR. The third partition 1721 may be disposed between the fourth region (4) and the seventh region (7). For example, the third partition 1721 may separate left channel or left sound, generated by the fourth vibration apparatus 130L, from left center channel or left center sound generated by the seventh vibration apparatus 130LC.

A fourth partition 1722 may be disposed between the fourth region (4) and the fifth region (5). For example, the fourth partition 1722 may separate center left and right channels or center left and right sounds generated by the first vibration apparatus 130HL and the second vibration apparatus 130HR. The fourth partition 1722 may be disposed between the fifth region (5) and the eighth region (8). For example, the fourth partition 1722 may separate right channel or right sound, generated by the fifth vibration apparatus 130R, from right center channel or right center sound generated by the eighth vibration apparatus 130RC.

A fifth partition 1723 may be disposed between the sixth region (6) and the seventh region (7). For example, the fifth partition 1723 may separate center channel or center sound, generated by the sixth vibration apparatus 130C, from left center channel or left center sound generated by the seventh vibration apparatus 130LC.

A sixth partition 1724 may be disposed between the sixth region (6) and the eighth region (8). For example, the sixth partition 1724 may separate center channel or center sound, generated by the sixth vibration apparatus 130C, from right center channel or right center sound generated by the eighth vibration apparatus 130RC.

A seventh partition 1741 may be disposed between the ninth region (9) and the tenth region (10). For example, the seventh partition 1741 may separate bottom left and right channels or bottom left and right sounds generated by the ninth vibration apparatus 130BL and the tenth vibration apparatus 130BR. The seventh partition 1741 may be disposed between the ninth region (9) and the eleventh region (11). For example, the seventh partition 1741 may separate bottom left channel or bottom left sound, generated by the ninth vibration apparatus 130BL, from bottom center channel or bottom center sound generated by the eleventh vibration apparatus 130BC.

An eighth partition 1742 may be disposed between the ninth region (9) and the tenth region (10). For example, the eighth partition 1742 may separate bottom left and right channels or bottom left and right sounds generated by the ninth vibration apparatus 130BL and the tenth vibration apparatus 130BR. The eighth partition 1742 may be disposed between the tenth region (10) and the eleventh region (11). For example, the eighth partition 1742 may separate bottom right channel or bottom right sound, generated by the tenth vibration apparatus 130BR, from bottom center channel or bottom center sound generated by the eleventh vibration apparatus 130BC.

According to an embodiment of the present disclosure, a ninth partition 1750 may be provided between the supporting member 300 and the display panel 100. A description of the ninth partition 1750 may be the same as the fourth partition 1750 described above with reference to FIG. 27, and thus, its detailed description is omitted.

According to another embodiment of the present disclosure, another partition may be disposed under or at a lower portion of each of the ninth to eleventh vibration apparatus 130BL to 130BC. The other partition may be disposed at a lower portion of the display panel 100 and may be separated from a driver for driving the display panel 100. For example, the other partition may be separated from a driver for driving the ninth to eleventh vibration apparatus 130BL to 130BC, and the display panel 100. In this case, the ninth partition 1750 may not be provided.

Each of the first partition 1711, the second partition 1712, the third partition 1721, the fourth partition 1722, the fifth partition 1723, the sixth partition 1724, the seventh partition 1741, the eighth partition 1742, and the ninth partition 1750 may include one or more of a double-sided tape, a double-sided foam tape, a double-sided foam pad, a single-sided tape, a single-sided foam tape, a single-sided foam pad, an adhesive, and a bond, but embodiments of the present disclosure are not limited thereto. In a case where each of the first partition 1711, the second partition 1712, the third partition 1721, the fourth partition 1722, the fifth partition 1723, the sixth partition 1724, the seventh partition 1741, the eighth partition 1742, and the ninth partition 1750 is configured with a double-sided tape or a double-sided foam pad, an adhesive force may be enhanced in a process of attaching a rear surface of the display panel 100 on a top surface (or an upper surface) of the supporting member 300. For example, each of the first partition 1711, the second partition 1712, the third partition 1721, the fourth partition 1722, the fifth partition 1723, the sixth partition 1724, the seventh partition 1741, the eighth partition 1742, and the ninth partition 1750 may include a material having elasticity which enables a certain degree of compression. For example, each of the first partition 1711, the second partition 1712, the third partition 1721, the fourth partition 1722, the fifth partition 1723, the sixth partition 1724, the seventh partition 1741, the eighth partition 1742, and the ninth partition 1750 may include polyurethane, polyolefin, or polyethylene, but embodiments of the present disclosure are not limited thereto.

Therefore, the apparatus according to an embodiment of the present disclosure may be configured with eleven vibration apparatuses and may be configured with vibration apparatuses having a height channel, a main channel, and a bottom channel, thereby providing a display apparatus having 11 channels. Also, the eleven vibration apparatuses may be independently supplied with a sound signal and driven, and thus, each of the eleven vibration apparatuses may reproduce an independent sound channel. Accordingly, an apparatus or a display apparatus for implementing the 11 channels may be provided. According to an embodiment of the present disclosure, a vibration device may be configured with an electrode portion configured with a conductive adhesive member, and a vibration apparatus including a signal cable for applying a vibration driving signal to the electrode portion may be provided, thereby providing an apparatus or a display apparatus having the 11 channels by a vibration apparatus having a more simplified structure. Also, according to an embodiment of the present disclosure, a first electrode portion and a second electrode portion may configure a vibration apparatus where a first cover member and a second cover member are provided as one body, thereby providing a vehicular apparatus including a vibration apparatus having a simplified structure and a thin thickness.

According to an embodiment of the present disclosure, the first to third vibration apparatuses 130HL to 130HC may be configured as the vibration apparatus described above with reference to FIGS. 1 to 21. According to an embodiment of the present disclosure, the first vibration apparatus 130HL and the second vibration apparatus 130HR may be configured as the same vibration apparatus, for the left-right symmetricity of a sound. For example, the first vibration apparatus 130HL and the second vibration apparatus 130HR may be configured as one or more of the vibration apparatuses 130 described above with reference to FIGS. 2 to 7B and 14 to 16. In another embodiment of the present disclosure, the first vibration apparatus 130HL and the second vibration apparatus 130HR may be configured as one or more of FIGS. 13A to 13F among the vibration apparatuses 130 described above with reference to FIGS. 2 to 7B and 14 to 16. For example, the first to third vibration apparatuses 130HL to 130HC may be configured as one or more of the vibration apparatuses 130 described above with reference to FIGS. 2 to 7B and 14 to 16. In another embodiment of the present disclosure, the first to third vibration apparatuses 130HL to 130HC may be configured as one or more of FIGS. 13A to 13F among the vibration apparatuses 130 described above with reference to FIGS. 2 to 7B and 14 to 16. According to an embodiment of the present disclosure, the fourth vibration apparatus 130L and the fifth vibration apparatus 130R may be configured as the same vibration apparatus, for the left-right symmetricity of a sound. For example, the fourth vibration apparatus 130L and the fifth vibration apparatus 130R may be configured as one or more of the vibration apparatuses 130 described above with reference to FIGS. 17 to 21. For example, the fourth vibration apparatus 130L and the fifth vibration apparatus 130R may be configured as one or more of the vibration apparatuses 130 described above with reference to FIGS. 17 to 21. In another embodiment of the present disclosure, the fourth vibration apparatus 130L and the fifth vibration apparatus 130C may be configured as one or more of FIGS. 13A to 13F among the vibration apparatuses 130 described above with reference to FIGS. 17 to 21. For example, the fourth to eighth vibration apparatuses 130L to 130RC may be configured as one or more of the vibration apparatuses 130 described above with reference to FIGS. 17 to 21. In another embodiment of the present disclosure, the fourth to eighth vibration apparatuses 130L to 130RC may be configured as one or more of FIGS. 13A to 13F among the vibration apparatuses 130 described above with reference to FIGS. 17 to 21. According to an embodiment of the present disclosure, the ninth vibration apparatus 130BL and the tenth vibration apparatus 130BR may be configured as the same vibration apparatus, for the left-right symmetricity of a sound. For example, the ninth vibration apparatus 130BR and the tenth vibration apparatus 130BR may be configured as one or more of the vibration apparatuses 130 described above with reference to FIGS. 2 to 7B and 14 to 16 and/or FIGS. 17 to 21. In another embodiment of the present disclosure, the ninth vibration apparatus 130BR and the tenth vibration apparatus 130BR may be configured as one or more of FIGS. 13A to 13F among the vibration apparatuses 130 described above with reference to FIGS. 2 to 7B and 14 to 16 and/or FIGS. 17 to 21. For example, the ninth to eleventh vibration apparatuses 130BL to 130BC may be configured as one or more of the vibration apparatuses 130 described above with reference to FIGS. 2 to 7B and 14 to 16 and/or FIGS. 17 to 21. In another embodiment of the present disclosure, the ninth to eleventh vibration apparatuses 130BL to 130BC may be configured as one or more of FIGS. 13A to 13F among the vibration apparatuses 130 described above with reference to FIGS. 2 to 7B and 14 to 16 and/or FIGS. 17 to 21. A sound of a high pitched sound band may be enhanced by the first to third vibration apparatuses 130HL to 130HC, and an apparatus or a display apparatus where a sound of a middle-low pitched sound band is enhanced by the fourth to eighth vibration apparatuses 130L to 130RC and/or the ninth to eleventh vibration apparatuses 130BL to 130BC may be provided. According to another embodiment of the present disclosure, the first to eleventh vibration apparatuses 130HL to 130BC may be configured as the same vibration apparatus. The first to eleventh vibration apparatuses 130HL to 130BC may be configured as one or more of the vibration apparatuses 130 described above with reference to FIGS. 2 to 7B, 14 to 16, and 17 to 21. According to another embodiment of the present disclosure, the first to eleventh vibration apparatuses 130HL to 130BC may be configured as one or more of FIGS. 13A to 13F among the vibration apparatuses 130 described above with reference to FIGS. 2 to 7B, 14 to 16, and 17 to 21. Also, according to an embodiment of the present disclosure, a display apparatus or an apparatus including a multichannel may be provided, and thus, a sound or a voice may be generated by dividing in detail a position at which a sound is generated, thereby enhancing immersion experience and/or a sense of realism.

Figure 30:
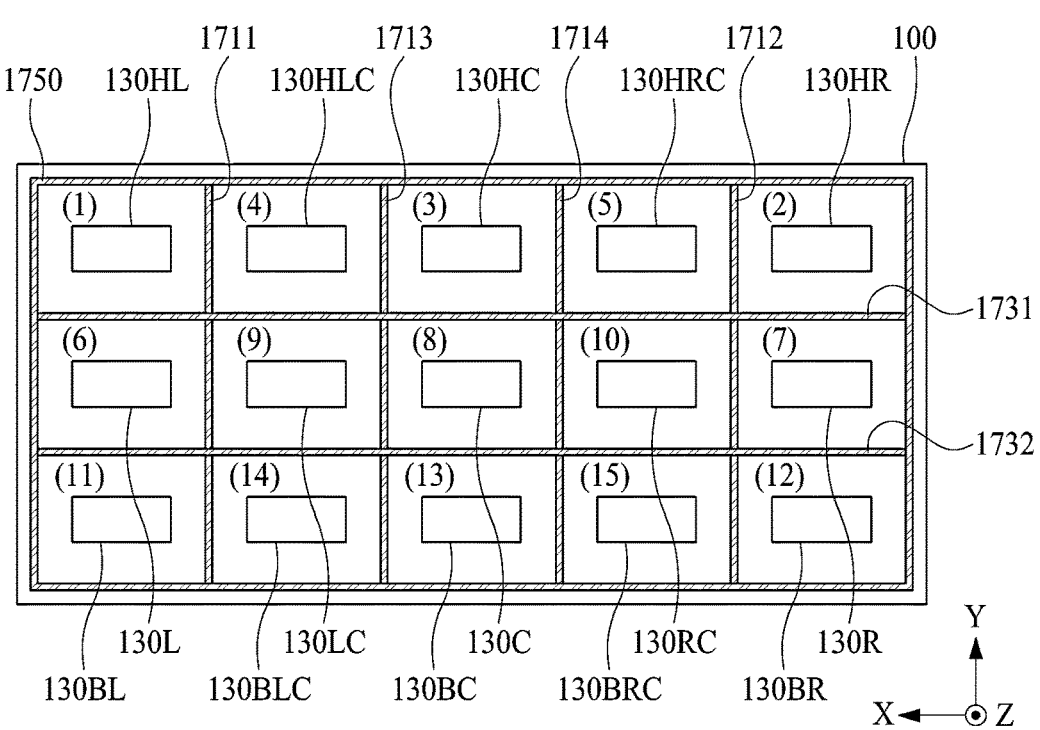
FIG. 30 illustrates an apparatus including a vibration apparatus according to another embodiment of the present disclosure.

FIG. 30 illustrates an apparatus including a vibration apparatus according to an embodiment of the present disclosure.

Referring to FIG. 30, a rear surface of a display panel 100 may include first to fifteenth regions (1) to (15). For example, a vibration member may include the first to fifteenth regions (1) to (15). For example, one or more vibration apparatuses may be disposed in one or more of the first to fifteenth regions (1) to (15). For example, one or more vibration apparatuses may be connected to the vibration member and may be disposed in one or more of the first to fifteenth regions (1) to (15). For example, the vibration member may output a sound based on vibrations of one or more vibration apparatuses.

The first region (1), the second region (2), the third region (3), the fourth region (4), and the fifth region (5) may be disposed at an upper portion of the vibration member 100. The third region (3) may be disposed between the first region (1) and the second region (2). The fourth region (4) may be disposed between the first region (1) and the third region (3). The fifth region (5) may be disposed between the second region (2) and the third region (3). The third region (3) may be disposed between the fourth region (4) and the fifth region (5).

The sixth region (6), the seventh region (7), the eighth region (8), the ninth region (9), and the tenth region (10) may be disposed under the first region (1), the second region (2), the third region (3), the fourth region (4), and the fifth region (5). The ninth region (9) may be disposed between the sixth region (6) and the eighth region (8). The tenth region (10) may be disposed between the seventh region (7) and the eighth region (8). The eighth region (8) may be disposed between the ninth region (9) and the tenth region (10).

The eleventh region (11), the twelfth region (12), the thirteenth region (13), the fourteenth region (14), and the fifteenth region (15) may be disposed under the sixth region (6), the seventh region (7), the eighth region (8), the ninth region (9), and the tenth region (10). The thirteenth region (13) may be disposed between the eleventh region (11) and the twelfth region (12). The fourteen region (14) may be disposed between the eleventh region (11) and the thirteenth region (13). The fifteenth region (15) may be disposed between the twelfth region (12) and the thirteenth region (13). The thirteenth region (13) may be disposed between the fourteenth region (14) and the fifteenth region (15). For example, the sixth region (6), the seventh region (7), the eighth region (8), the ninth region (9), and the tenth region (10) may be disposed between the first to fifth regions (1) to (5) and the eleventh to fifteenth regions (11) to (15).

According to an embodiment of the present disclosure, at least one first vibration apparatus 130HL may be disposed in the first region (1) of the rear surface of the display panel. For example, the first vibration apparatus 130HL may be a height left channel. At least one second vibration apparatus 130HR may be disposed in the second region (2) of the rear surface of the display panel. For example, the second vibration apparatus 130HR may be a height right channel. At least one third vibration device 130HC may be disposed in the third region (3) of the rear surface of the display panel. For example, the third vibration device 130HC may be a height center channel. At least one fourth vibration apparatus 130HLC may be disposed in the fourth region (4) of the rear surface of the display panel. For example, the fourth vibration apparatus 130HLC may be a height left center channel. At least one fifth vibration apparatus 130HRC may be disposed in the fifth region (5) of the rear surface of the display panel. For example, the fifth vibration apparatus 130HRC may be a height right center channel.

According to an embodiment of the present disclosure, at least one sixth vibration apparatus 130L may be disposed in the sixth region (6) of the rear surface of the display panel. For example, the sixth vibration apparatus 130L may be a left channel. At least one seventh vibration apparatus 130R may be disposed in the seventh region (7) of the rear surface of the display panel. The second vibration apparatus 130R may be a right channel. At least one eighth vibration device 130C may be disposed in the eighth region (8) of the rear surface of the display panel. For example, the eighth vibration device 130C may be a center channel. At least one ninth vibration apparatus 130LC may be disposed in the ninth region (9) of the rear surface of the display panel. For example, the ninth vibration apparatus 130LC may be a left center channel. At least one tenth vibration apparatus 130RC may be disposed in the tenth region (10) of the rear surface of the display panel. For example, the tenth vibration apparatus 130RC may be a right center channel.

According to an embodiment of the present disclosure, at least one eleventh vibration apparatus 130BL may be disposed in the eleventh region (11) of the rear surface of the display panel. For example, the eleventh vibration apparatus 130BL may be a bottom left channel. At least one twelfth vibration apparatus 130BR may be disposed in the twelfth region (12) of the rear surface of the display panel. For example, the twelfth vibration apparatus 130BR may be a bottom right channel. At least one thirteenth vibration apparatus 130BC may be disposed in the thirteenth region (13) of the rear surface of the display panel. For example, the thirteenth vibration apparatus 130BC may be a bottom center channel. At least one fourteenth vibration apparatus 130BLC may be disposed in the fourteenth region (14) of the rear surface of the display panel. For example, the fourteenth vibration apparatus 130BLC may be a bottom left channel. At least one fifteenth vibration apparatus 130BRC may be disposed in the fifteenth region (15) of the rear surface of the display panel. For example, the fifteenth vibration apparatus 130BRC may be a bottom right channel.

For example, the first to fifth vibration apparatuses 130HL to 130HRC may each be a height channel. The sixth to tenth vibration apparatuses 130L to 130RC may each be a center channel. The eleventh to fifteenth vibration apparatuses 130BL to 130BRC may each be a bottom channel. For example, the first to fifth vibration apparatuses 130HL to 130HC and the eleventh to fifteenth vibration apparatuses 130BL to 130BRC may each be a speaker which notifies an action or a motion of a person or an object. For example, the first to fifth vibration apparatuses 130HL to 130HRC and the eleventh to fifteenth vibration apparatuses 130BL to 130BRC may each be a vibration apparatus which outputs a full-range sound. For example, a pitched sound band of a full range may be about 300 Hz or more, but is not limited thereto. For example, the sixth to tenth vibration apparatuses 130L to 130RC may each be a main channel. The sixth to tenth vibration apparatuses 130L to 130RC may each be a vibration apparatus which outputs a full-range sound.

A first partition 1711 may be disposed between the first region (1) and the second region (2). For example, the first partition 1711 may be disposed between the first region (1) and the fourth region (4). The first partition 1711 may be disposed between the sixth region (6) and the seventh region (7). For example, the first partition 1711 may be disposed between the sixth region (6) and the ninth region (9). For example, the first partition 1711 may be disposed between the eleventh region (11) and the fourteenth region (14). For example, the first partition 1711 may be disposed between the first region (1), the sixth region (6), and the eleventh region (11) and the second region (3), the seventh region (7), and the twelfth region (12). For example, the first partition 1711 may be disposed between the first region (1), the sixth region (6), and the eleventh region (11) and the fourth region (4), the ninth region (9), and the fourteenth region (14). For example, the first partition 1711 may separate height left and right channels or height left and right sounds, which are generated by the first vibration apparatus 130HL and the second vibration apparatus 130HR. For example, the first partition 1711 may separate left and right channels or left and right sounds, which are generated by the sixth vibration apparatus 130L and the seventh vibration apparatus 130R. For example, the first partition 1711 may separate bottom left and right channels or bottom left and right sounds, which are generated by the eleventh vibration apparatus 130BL and the twelfth vibration apparatus 130BR. For example, the first partition 1711 may separate channels or sounds, which are generated by the first vibration apparatus 130HL and the fourth vibration apparatus 130HLC. For example, the first partition 1711 may separate a height left channel or a height left sound, generated by the first vibration apparatus 130HL, from a height left center channel or a height left center sound generated by the fourth vibration apparatus 130HLC. For example, the first partition 1711 may separate channels or sounds, which are generated by the sixth vibration apparatus 130L and the ninth vibration apparatus 130LC. For example, the first partition 1711 may separate a left channel or a left sound, generated by the sixth vibration apparatus 130L, from a left center channel or a left center sound generated by the ninth vibration apparatus 130LC. For example, the first partition 1711 may separate channels or sounds, which are generated by the eleventh vibration apparatus 130BL and the fourteenth vibration apparatus 130BLC. For example, the first partition 1711 may separate a bottom left channel or a bottom left sound, generated by the eleventh vibration apparatus 130BL, from a bottom left center channel or a bottom left center sound generated by the fourteenth vibration apparatus 130BLC.

A second partition 1712 may be disposed between the first region (1) and the second region (2). For example, the second partition 1712 may be disposed between the second region (2) and the fifth region (5). The second partition 1712 may be disposed between the sixth region (6) and the seventh region (7). For example, the second partition 1712 may be disposed between the seventh region (7) and the tenth region (10). For example, the second partition 1712 may be disposed between the eleventh region (11) and the twelfth region (12). For example, the second partition 1712 may be disposed between the twelfth region (12) and the fifteenth region (15). For example, the second partition 1712 may be disposed between the first region (1), the sixth region (6), and the eleventh region (11) and the second region (2), the seventh region (7), and the twelfth region (12). For example, the second partition 1712 may be disposed between the second region (2), the seventh region (7), and the twelfth region (12) and the fifth region (5), the tenth region (10), and the fifteenth region (15). For example, the second partition 1712 may separate height left and right channels or height left and right sounds, which are generated by the first vibration apparatus 130HL and the second vibration apparatus 130HR. For example, the second partition 1712 may separate left and right channels or left and right sounds, which are generated by the sixth vibration apparatus 130L and the seventh vibration apparatus 130R. For example, the second partition 1712 may separate bottom left and right channels or bottom left and right sounds, which are generated by the eleventh vibration apparatus 130BL and the twelfth vibration apparatus 130BR. For example, the second partition 1712 may separate channels or sounds, which are generated by the second vibration apparatus 130HR and the fifth vibration apparatus 130HRC. For example, the second partition 1712 may separate a height right channel or a height right sound, generated by the second vibration apparatus 130HR, from a height right center channel or a height right center sound generated by the fifth vibration apparatus 130HRC. For example, the second partition 1712 may separate channels or sounds, which are generated by the seventh vibration apparatus 130R and the tenth vibration apparatus 130RC. For example, the second partition 1712 may separate a right channel or a right sound, generated by the seventh vibration apparatus 130R, from a right center channel or a right center sound generated by the tenth vibration apparatus 130RC. For example, the second partition 1712 may separate channels or sounds, which are generated by the twelfth vibration apparatus 130BR and the fifteenth vibration apparatus 130BRC. For example, the second partition 1712 may separate a bottom right channel or a bottom right sound, generated by the twelfth vibration apparatus 130BR, from a bottom right center channel or a bottom right center sound generated by the fifteenth vibration apparatus 130BRC.

A third partition 1713 may be disposed between the first region (1) and the second region (2). For example, the third partition 1713 may be disposed between the third region (3) and the fourth region (4). The third partition 1713 may be disposed between the sixth region (6) and the seventh region (7). For example, the third partition 1713 may be disposed between the eighth region (8) and the ninth region (9). For example, the third partition 1713 may be disposed between the eleventh region (11) and the twelfth region (12). For example, the third partition 1713 may be disposed between the thirteenth region (13) and the fourteenth region (14). For example, the third partition 1713 may be disposed between the third region (3), the eighth region (8), and the thirteenth region (13) and the fourth region (4), the ninth region (9), and the fourteenth region (14). For example, the third partition 1713 may separate height left and right channels or height left and right sounds, which are generated by the first vibration apparatus 130HL and the second vibration apparatus 130HR. For example, the third partition 1713 may separate left and right channels or left and right sounds, which are generated by the sixth vibration apparatus 130L and the seventh vibration apparatus 130R. For example, the third partition 1713 may separate bottom left and right channels or bottom left and right sounds, which are generated by the eleventh vibration apparatus 130BL and the twelfth vibration apparatus 130BR. For example, the third partition 1713 may separate a height center channel or a height center sound, generated by the third vibration apparatus 130HC, from a height left center channel or a height left center sound generated by the fourth vibration apparatus 130HLC. For example, the third partition 1713 may separate a center channel or a center sound, generated by the eighth vibration apparatus 130C, from a left center channel or a left center sound generated by the ninth vibration apparatus 130LC. For example, the third partition 1713 may separate a bottom center channel or a bottom center sound, generated by the thirteenth vibration apparatus 130BC, from a bottom left center channel or a bottom left center sound generated by the fourteenth vibration apparatus 130BLC.

A fourth partition 1714 may be disposed between the first region (1) and the second region (2). For example, the fourth partition 1714 may be disposed between the third region (3) and the fifth region (5). The fourth partition 1714 may be disposed between the sixth region (6) and the seventh region (7). For example, the fourth partition 1714 may be disposed between the eighth region (8) and the tenth region (10). For example, the fourth partition 1714 may be disposed between the eleventh region (11) and the twelfth region (12). For example, the fourth partition 1714 may be disposed between the thirteenth region (13) and the fifteenth region (15). For example, the fourth partition 1714 may be disposed between the third region (3), the eighth region (8), and the thirteenth region (13) and the fifth region (5), the tenth region (10), and the fifteenth region (15). For example, the fourth partition 1714 may separate height left and right channels or height left and right sounds, which are generated by the first vibration apparatus 130HL and the second vibration apparatus 130HR. For example, the fourth partition 1714 may separate left and right channels or left and right sounds, which are generated by the sixth vibration apparatus 130L and the seventh vibration apparatus 130R. For example, the fourth partition 1714 may separate a bottom left channel or a bottom left sound, generated by the eleventh vibration apparatus 130BL, from a bottom right channel or a bottom right sound generated by the twelfth vibration apparatus 130BR. For example, the fourth partition 1714 may separate a height center channel or a height center sound, generated by the third vibration apparatus 130HC, from a height right center channel or a height right center sound generated by the fifth vibration apparatus 130HRC. For example, the fourth partition 1714 may separate a center channel or a center sound, generated by the eighth vibration apparatus 130C, from a right center channel or a right center sound generated by the tenth vibration apparatus 130RC. For example, the fourth partition 1714 may separate a bottom center channel or a bottom center sound, generated by the thirteenth vibration apparatus 130BC, from a bottom right center channel or a bottom right center sound generated by the fifteenth vibration apparatus 130BRC.

A fifth partition 1731 may be disposed between the first to fifth regions (1) to (5) and the sixth to tenth regions (6) to (10). For example, the fifth partition 1731 may separate height channels or height sounds, generated by the first to fifth vibration apparatuses 130HL to 130HRC, from center channels (or main channels) or center sounds (or main sounds) generated by the sixth to tenth vibration apparatuses 130L to 130RC.

A sixth partition 1732 may be disposed between the sixth to tenth regions (6) to (10) and the eleventh to fifteenth regions (11) to (15). For example, the sixth partition 1732 may separate center channels or center sounds, generated by the sixth to tenth vibration apparatuses 130L to 130RC, from bottom channels or bottom sounds generated by the eleventh to fifteenth vibration apparatuses 130BL to 130BRC.

According to an embodiment of the present disclosure, a seventh partition 1750 may be provided between the supporting member 300 and the display panel 100. A description of the seventh partition 1750 may be the same as the fourth partition 1750 described above with reference to FIG. 27, and thus, its detailed description is omitted.

According to another embodiment of the present disclosure, another partition may be disposed under or at a lower portion of each of the eleventh to fifteenth vibration apparatus 130BL to 130BRC. The other partition may be disposed at a lower portion of the display panel 100 and may be separated from a driver for driving the display panel 100. For example, the other partition may be separated from a driver for driving the eleventh to fifteenth vibration apparatus 130BL to 130BRC, and the display panel 100. In this case, the seventh partition 1750 may not be provided.

Each of the first partition 1711, the second partition 1712, the third partition 1713, the fourth partition 1714, the fifth partition 1731, the sixth partition 1732, and the seventh partition 1750 may include one or more of a double-sided tape, a double-sided foam tape, a double-sided foam pad, a single-sided tape, a single-sided foam tape, a single-sided foam pad, an adhesive, and a bond, but embodiments of the present disclosure are not limited thereto. In a case where each of the first partition 1711, the second partition 1712, the third partition 1713, the fourth partition 1714, the fifth partition 1731, the sixth partition 1732, and the seventh partition 1750 is configured with a double-sided tape or a double-sided foam pad, an adhesive force may be enhanced in a process of attaching a rear surface of the display panel 100 on a top surface (or an upper surface) of the supporting member 300. For example, each of the first partition 1711, the second partition 1712, the third partition 1713, the fourth partition 1714, the fifth partition 1731, the sixth partition 1732, and the seventh partition 1750 may include a material having elasticity which enables a certain degree of compression. For example, each of the first partition 1711, the second partition 1712, the third partition 1713, the fourth partition 1714, the fifth partition 1731, the sixth partition 1732, and the seventh partition 1750 may include polyurethane, polyolefin, or polyethylene, but embodiments of the present disclosure are not limited thereto.

Therefore, the apparatus according to an embodiment of the present disclosure may be configured with fifteenth vibration apparatuses and may be configured with vibration apparatuses having a height channel, a main channel, and a bottom channel, thereby providing a display apparatus having 15 channels. Also, the fifteenth vibration apparatuses may be independently supplied with a sound signal and driven, and thus, each of the fifteenth vibration apparatuses may reproduce an independent sound channel. Accordingly, an apparatus or a display apparatus for implementing the 15 channels may be provided. According to an embodiment of the present disclosure, a vibration device may be configured with an electrode portion configured with a conductive adhesive member, and a vibration apparatus including a signal cable for applying a vibration driving signal to the electrode portion may be provided, thereby providing an apparatus or a display apparatus having the 15 channels by a vibration apparatus having a more simplified structure. Also, according to an embodiment of the present disclosure, a first electrode portion and a second electrode portion may configure a vibration apparatus where a first cover member and a second cover member are provided as one body, thereby providing a vehicular apparatus including a vibration apparatus having a simplified structure and a thin thickness.

According to an embodiment of the present disclosure, the first to fifteenth vibration apparatuses 130HL to 130RC may be configured as the vibration apparatus described above with reference to FIGS. 1 to 21. According to an embodiment of the present disclosure, the first vibration apparatus 130HL and the second vibration apparatus 130HR may be configured as the same vibration apparatus, for the left-right symmetricity of a sound. For example, the first vibration apparatus 130HL and the second vibration apparatus 130HR may be configured as one or more of the vibration apparatuses 130 described above with reference to FIGS. 2 to 7B and 14 to 16. For example, the first to fifth vibration apparatuses 130HL to 130HRC may be configured as one or more of the vibration apparatuses 130 described above with reference to FIGS. 2 to 7B. According to an embodiment of the present disclosure, the sixth vibration apparatus 130L and the seventh vibration apparatus 130R may be configured as the same vibration apparatus, for the left-right symmetricity of a sound. For example, the sixth vibration apparatus 130L and the seventh vibration apparatus 130R may be configured as one or more of the vibration apparatuses 130 described above with reference to FIGS. 17 to 21. In another embodiment of the present disclosure, the sixth vibration apparatus 130L and the seventh vibration apparatus 130R may be configured as one or more of FIGS. 13A to 13F among the vibration apparatuses 130 described above with reference to FIGS. 17 to 21. For example, the sixth to tenth vibration apparatuses 130L to 130RC may be configured as one or more of the vibration apparatuses 130 described above with reference to FIGS. 17 to 21. In another embodiment of the present disclosure, the sixth to tenth vibration apparatuses 130L to 130RC may be configured as one or more of FIGS. 13A to 13F among the vibration apparatuses 130 described above with reference to FIGS. 17 to 21. According to an embodiment of the present disclosure, the eleventh vibration apparatus 130BL and the twelfth vibration apparatus 130BR may be configured as the vibration apparatus. For example, the eleventh vibration apparatus 130BL and the twelfth vibration apparatus 130BR may be configured as one or more of the vibration apparatuses 130 described above with reference to FIGS. 2 to 7B and 14 to 16 and/or FIGS. 17 to 21. In another embodiment of the present disclosure, the first to fifteenth vibration apparatuses 130HL to 130BRC may be configured as one or more of FIGS. 13A to 13F among the vibration apparatuses 130 described above with reference to FIGS. 2 to 7B and 14 to 16 and/or FIGS. 17 to 21. For example, the eleventh to fifteenth vibration apparatuses 130BL to 130BRC may be configured as one or more of the vibration apparatuses 130 described above with reference to FIGS. 2 to 7B and 14 to 16 and/or FIGS. 17 to 21. In another embodiment of the present disclosure, the first to fifteenth vibration apparatuses 130HL to 130BRC may be configured as one or more of FIGS. 13A to 13F among the vibration apparatuses 130 described above with reference to FIGS. 2 to 7B and 14 to 16 and/or FIGS. 17 to 21. A sound of a high pitched sound band may be enhanced by the first to fifth vibration apparatuses 130HL to 130HRC, and an apparatus or a display apparatus where a sound of a middle-low pitched sound band is enhanced by the sixth to tenth vibration apparatuses 130L to 130RC and/or the eleventh to fifteenth vibration apparatuses 130BL to 130BRC may be provided. According to another embodiment of the present disclosure, the first to fifteenth vibration apparatuses 130HL to 130BRC may be configured as the same vibration apparatus. The first to fifteenth vibration apparatuses 130HL to 130BRC may be configured as one or more of the vibration apparatuses 130 described above with reference to FIGS. 2 to 7B, 14 to 16, and 17 to 21. According to another embodiment of the present disclosure, the first to fifteenth vibration apparatuses 130HL to 130BRC may be configured as one or more of FIGS. 13A to 13F among the vibration apparatuses 130 described above with reference to FIGS. 2 to 7B, 14 to 16, and 17 to 21. According to an embodiment of the present disclosure, a first electrode portion and a second electrode portion may be configured with a conductive adhesive member, and thus, a power supply line and/or a pad portion disposed in a cover member for connecting the first electrode portion to the second electrode portion may not be needed, thereby providing a multi-channel display apparatus or apparatus including a vibration apparatus having a simplified structure and a thin thickness. Also, according to an embodiment of the present disclosure, a first electrode portion and a second electrode portion may configure a vibration apparatus where a first cover member and a second cover member are provided as one body, thereby providing a display apparatus or an apparatus including a vibration apparatus having a simplified structure and a thin thickness. Also, according to an embodiment of the present disclosure, a display apparatus or an apparatus including a multichannel may be provided, and thus, a sound or a voice may be generated by dividing in detail a position at which a sound is generated, thereby enhancing immersion experience and/or a sense of realism.

Figure 31:
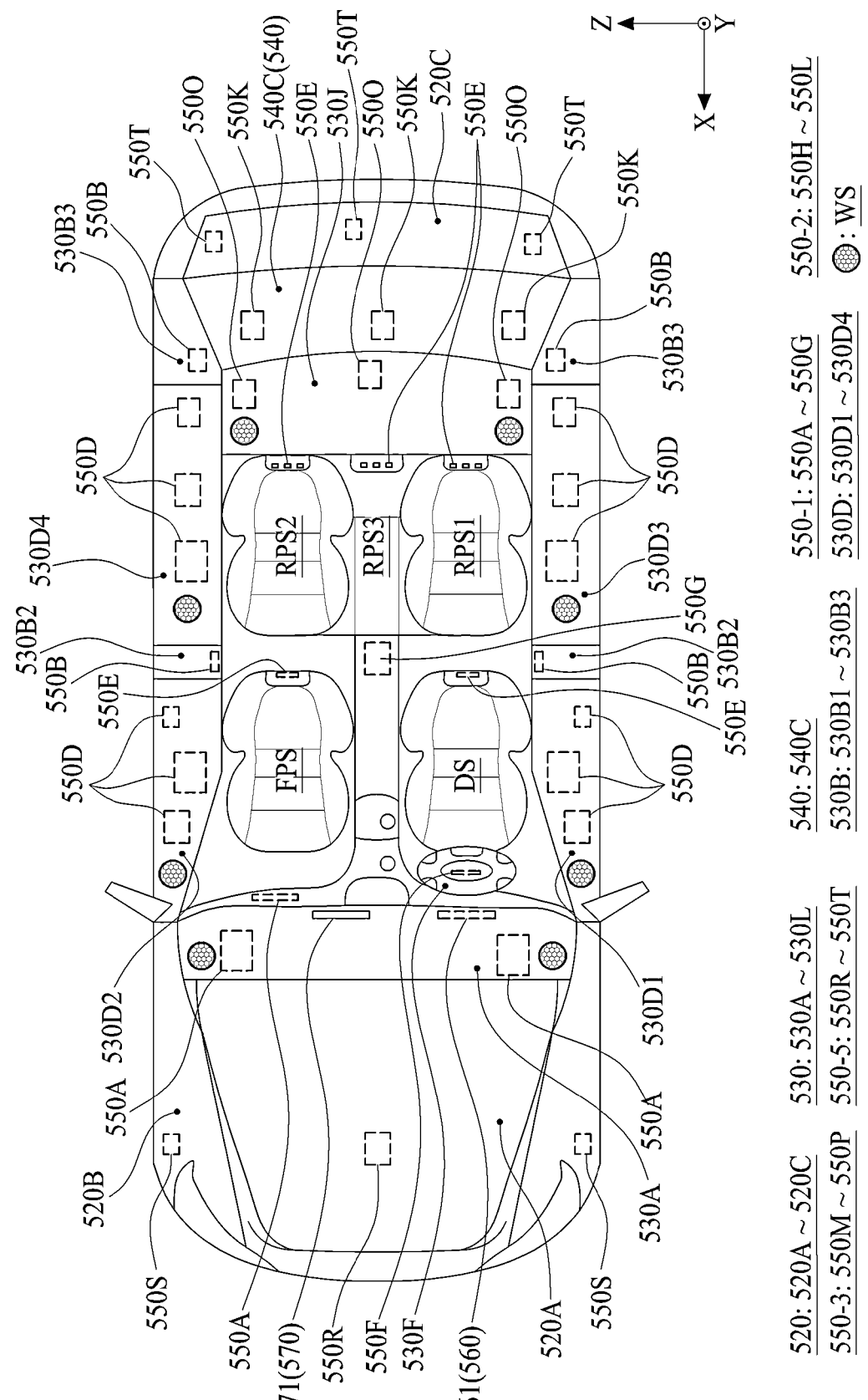
FIG. 31 illustrates a vehicular apparatus according to another embodiment of the present disclosure.
Figure 32:
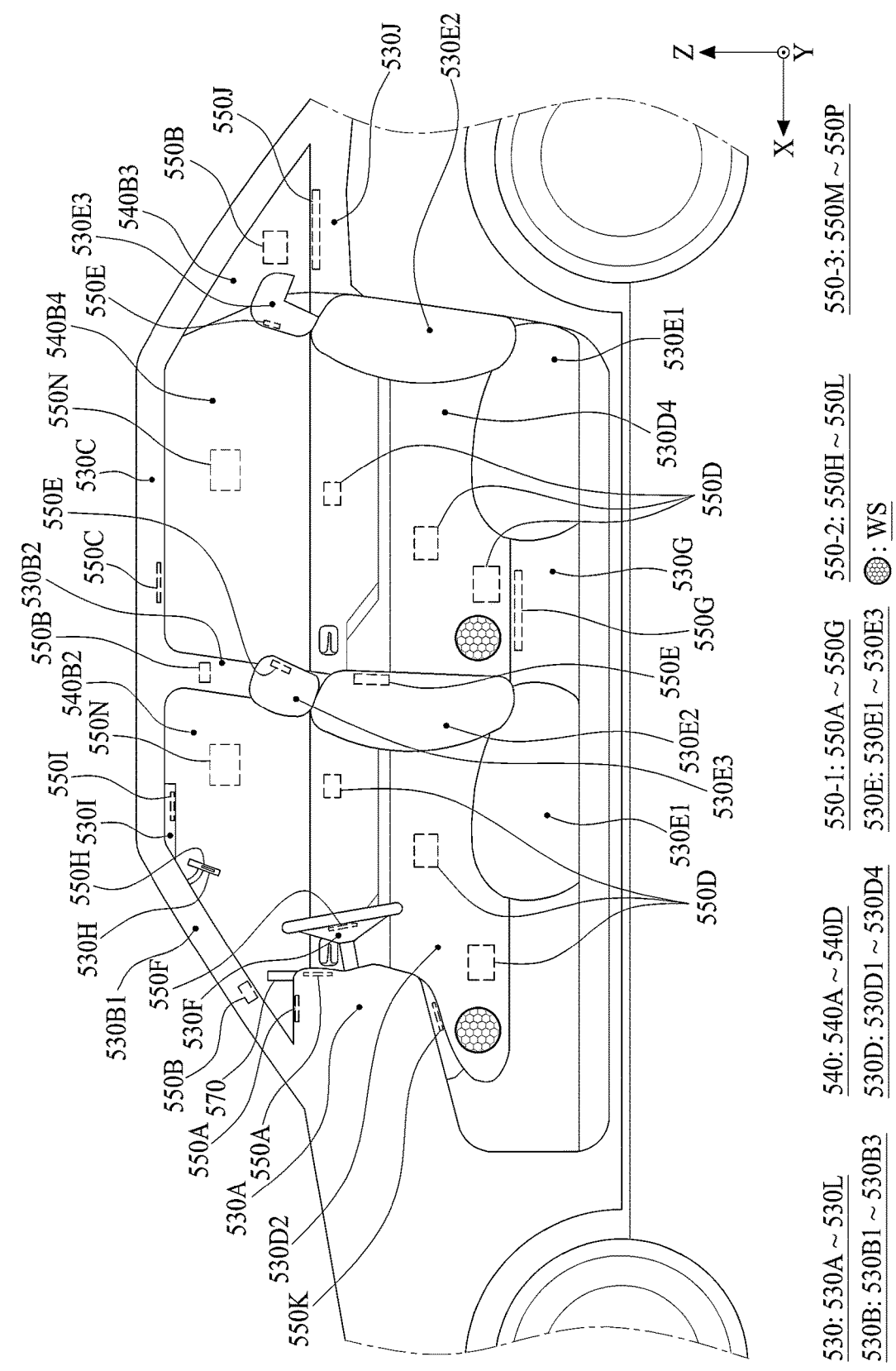
FIG. 32 illustrates a vehicular apparatus according to another embodiment of the present disclosure.
Figure 33:
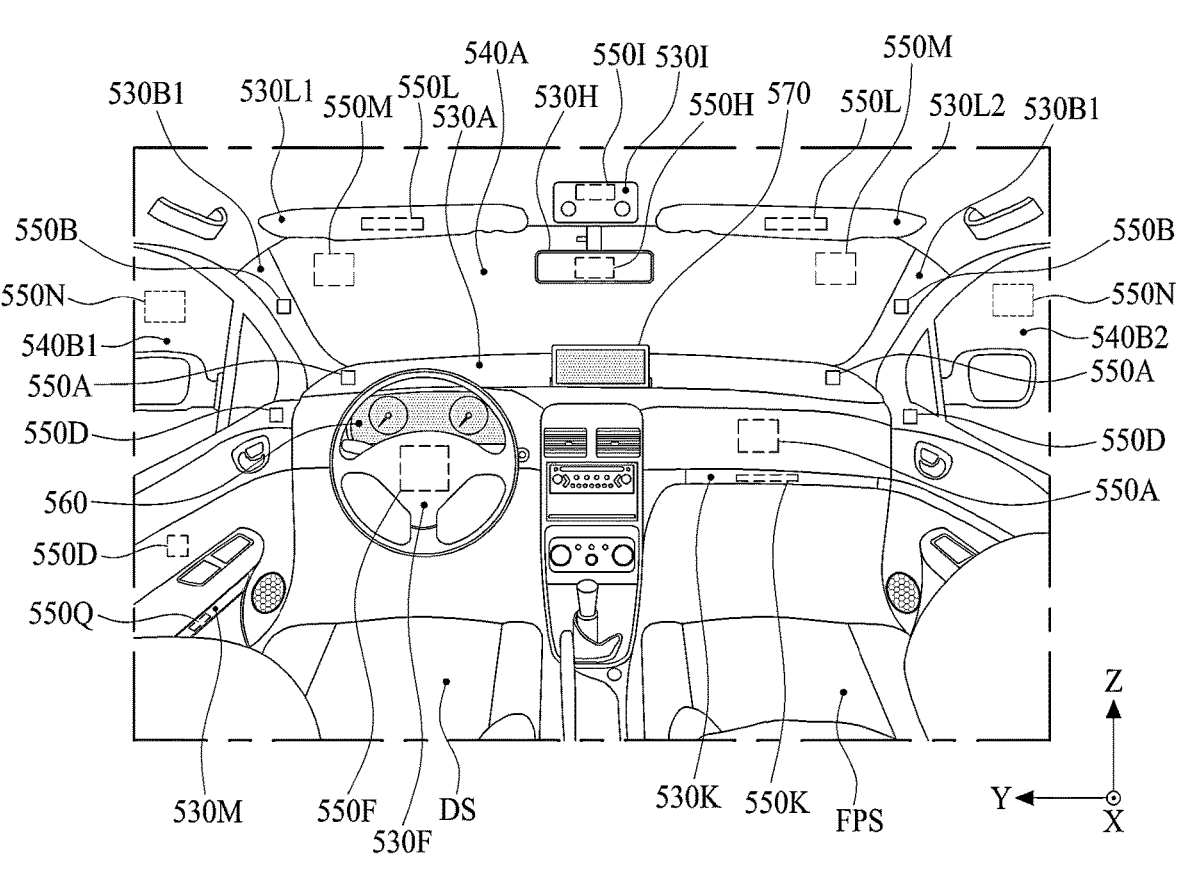
FIG. 33 illustrates a vibration generating apparatus disposed near a driver seat and a front passenger seat of FIGS. 31 and 32.
Figure 34:
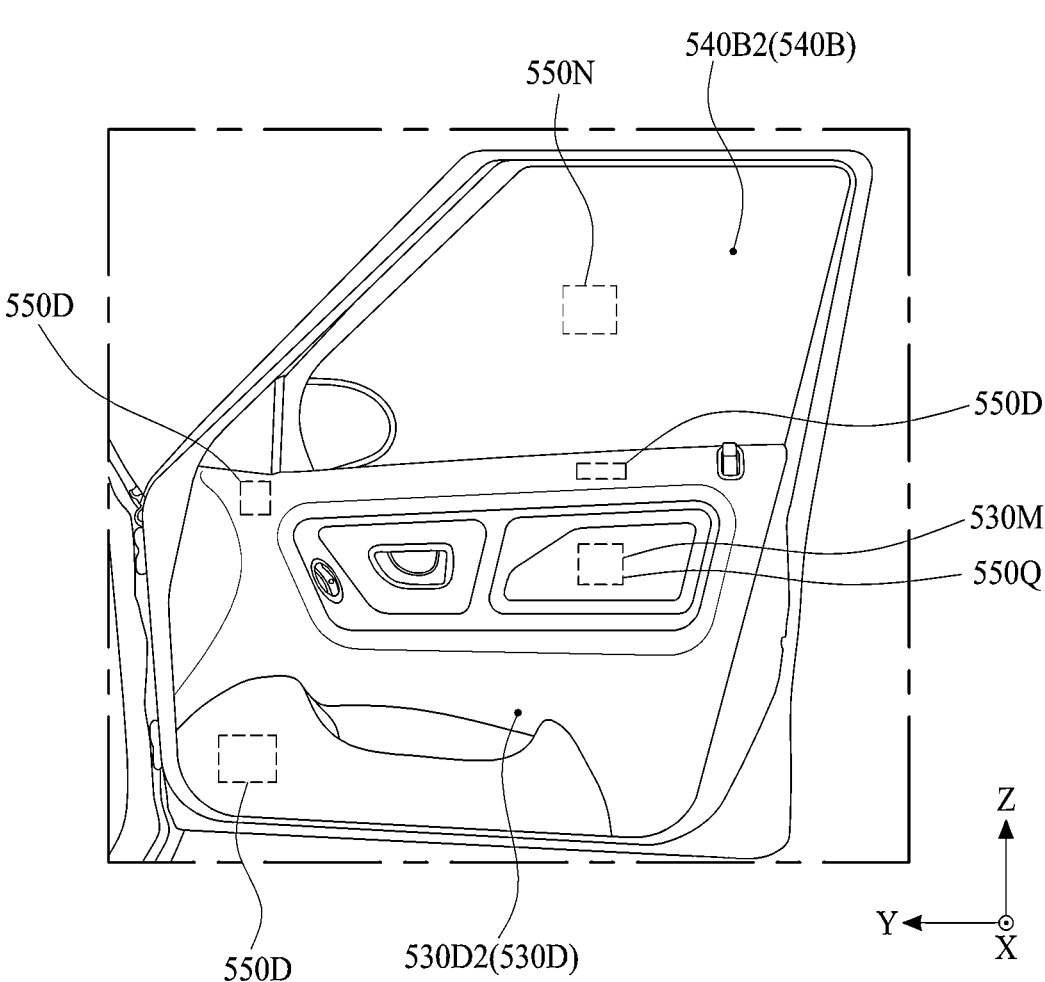
FIG. 34 illustrates a vibration generating apparatus disposed in each of a door and a window of FIGS. 31 and 32.
Figure 35:
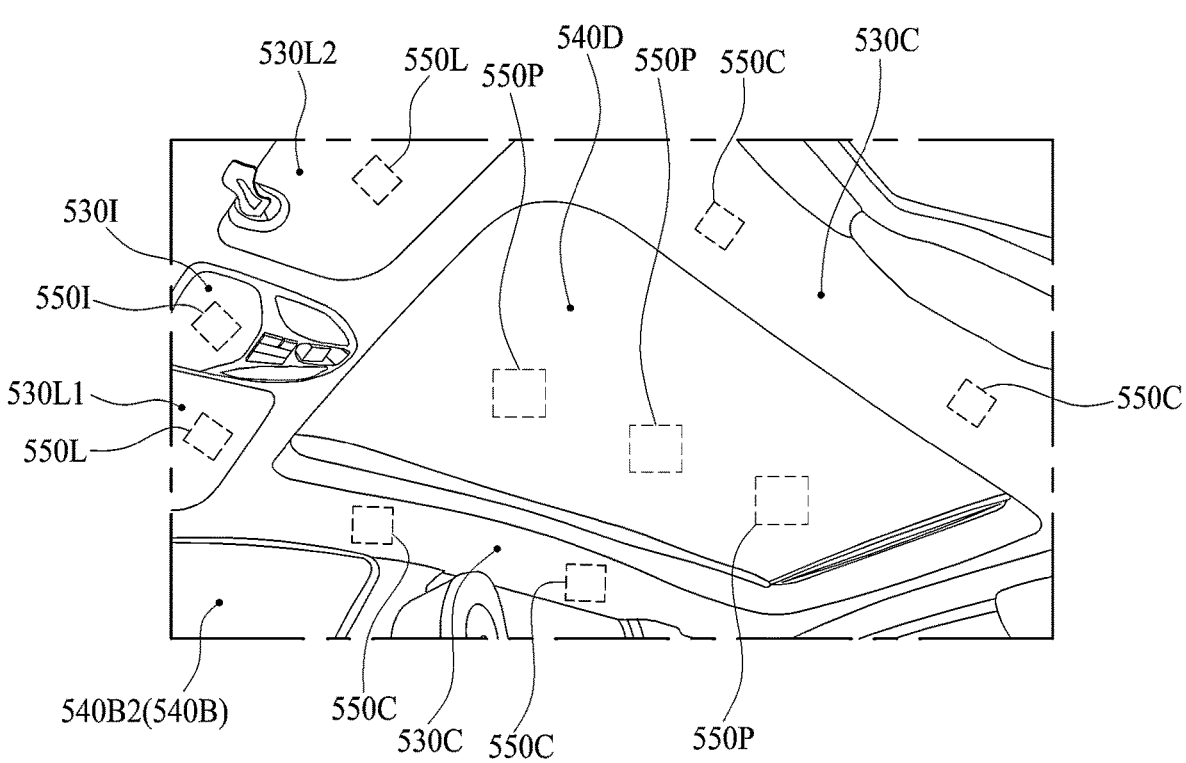
FIG. 35 illustrates a vibration generating apparatus disposed in a roof panel of FIGS. 31 and 32.
Figure 36:
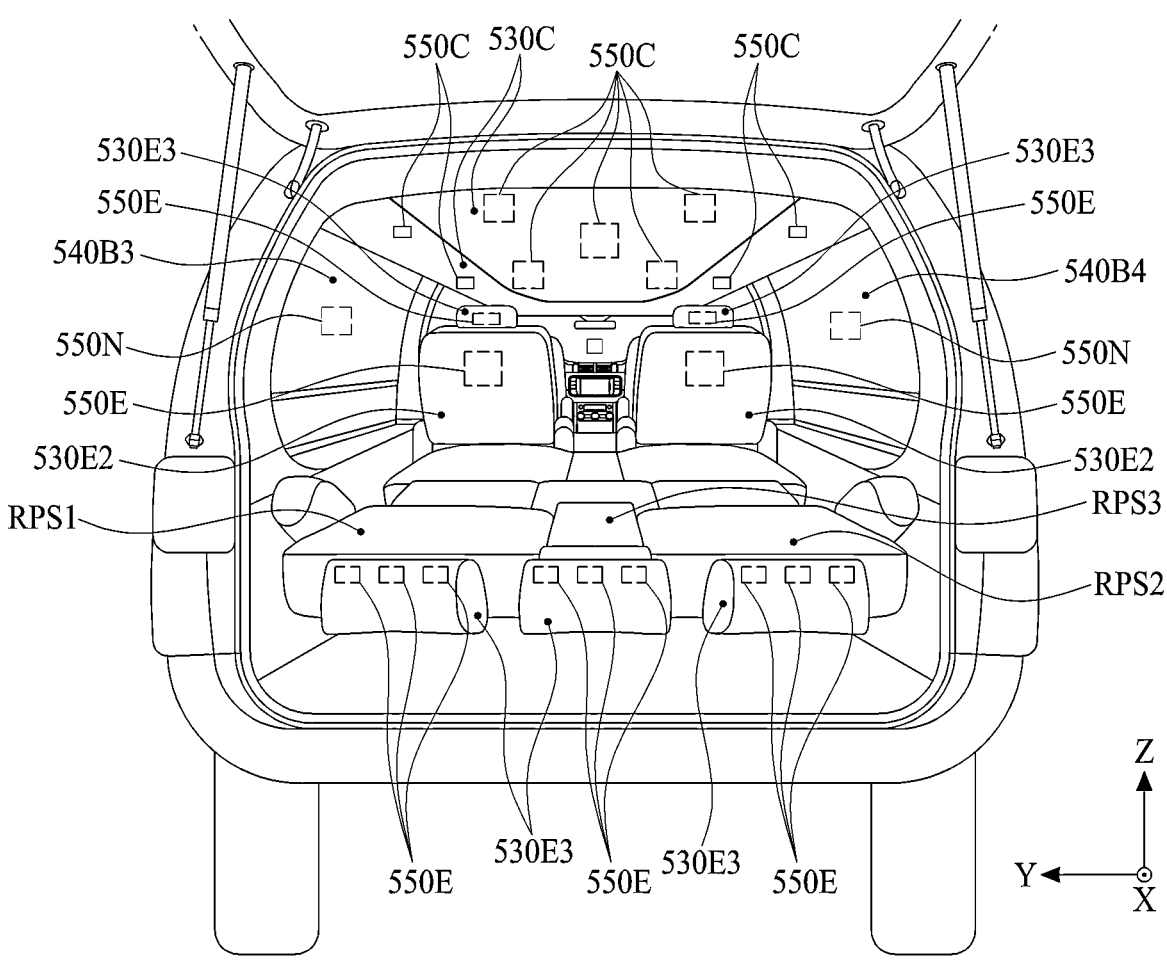
FIG. 36 illustrates a vibration generating apparatus disposed in each of a roof panel, a window, and a seat of FIGS. 31 and 32.

FIG. 31 illustrates a vehicular apparatus according to another embodiment of the present disclosure. FIG. 32 illustrates a vehicular apparatus according to another embodiment of the present disclosure. FIG. 33 illustrates a vibration generating apparatus disposed near a driver seat and a front passenger seat of FIGS. 31 and 32. FIG. 34 illustrates a vibration generating apparatus disposed in each of a door and a window of FIGS. 31 and 32. FIG. 35 illustrates a vibration generating apparatus disposed in a roof panel of FIGS. 31 and 32. FIG. 36 illustrates a vibration generating apparatus disposed in each of a roof panel, a window, and a seat of FIGS. 31 and 32.

Referring to FIGS. 31 to 36, a vehicular apparatus according to another embodiment of the present disclosure may include a first vibration generating apparatus 550-1 configured to output a sound in an exterior material 520 and an interior material 530. For example, the first vibration generating apparatus 550-1 may be disposed in the exterior material 520 or the interior material 530 or between the exterior material 520 and the interior material 530 to output a sound. For example, the first vibration generating apparatus 550-1 may be disposed in one or more of the exterior material 520, the interior material 530, and a region between the exterior material 520 and the interior material 530 to output a sound. For example, one or more of the exterior material 520 and the interior material 530 may output a sound based on vibrations of one or more vibration generating apparatuses.

The first vibration apparatus 550-1 may include at least one or more vibration devices 550A to 550G which are disposed between the main structure (or the exterior material) and one or more of a dashboard interior material 530A, a pillar interior material 530B, a roof interior material 530C, a door interior material 530D, a seat interior material 530E, a handle interior material 530F, and a floor interior material 530G. For example, the first vibration apparatus 550-1 may include at least one or more of the first to seventh vibration apparatuses 550A to 550G and may output sounds of one or more channels by the one or more vibration generating devices.

For example, one or more of the first to seventh vibration apparatuses 550A to 550G may be configured to be transparent or semitransparent. For example, when a window is totally transparent, one or more of the first to seventh vibration apparatuses 550A to 550G may be configured to be transparent and may be disposed in a center region or a peripheral region of the window. When the window includes a semitransparent portion or an opaque portion, one or more of the first to seventh vibration apparatuses 550A to 550G may be configured to be semitransparent or opaque and may be disposed at the semitransparent portion or the opaque portion of the window. For example, one or more of the first to seventh vibration apparatuses 550A to 550G may be referred to as a transparent vibration generator, a transparent vibration generating apparatus, or a transparent sound generating apparatus, but embodiments of the present disclosure are not limited thereto.

With reference to FIGS. 31 to 33, the first vibration device 550A according to an embodiment of the present disclosure may be disposed between the dashboard 530A and a dash panel and may be configured to indirectly or directly vibrate the dashboard 530A to output a sound. For example, the first vibration device 550A may include the vibration apparatuses 130 according to the ninth embodiment or the tenth embodiment of the present disclosure described above with reference to FIGS. 1 to 26, and thus, the repetitive description thereof is omitted. For example, the first vibration device 550A may be referred to as the term such as a dashboard speaker or a first speaker, or the like, but embodiments of the present disclosure are not limited thereto.

According to an embodiment of the present disclosure, at least one or more of the dash panel and the dashboard 530A may include a first region corresponding to a driver seat DS, a second region corresponding to a passenger seat FPS, and a third region (or a middle region) between the first region and the second region. At least one or more of the dash panel and the dashboard 530A may further include a fourth region which is inclined to face the passenger seat FPS.

According to an embodiment of the present disclosure, the first vibration device 550A may be configured to vibrate at least one or more among the first to fourth regions of the dashboard 530A. For example, the first vibration device 550A may be disposed at each of the first and second regions of the dashboard 530A, or may be disposed at each of the first to fourth regions of the dashboard 530A. For example, the first vibration device 550A may be disposed at each of the first and second regions of the dashboard 530A, or may be disposed at at least one or more of the first to fourth regions of the dashboard 530A. For example, the first vibration device 550A may be configured to output a sound of about 150 Hz to about 20 kHz. For example, the first vibration device 550A configured to vibrate at least one or more among the first to fourth regions of the dashboard 530A may have the same sound output characteristic or different sound output characteristics. For example, the first vibration device 550A configured to vibrate each of the first to fourth regions of the dashboard 530A may have the same sound output characteristic or different sound output characteristics.

The second vibration device 550B according to an embodiment of the present disclosure may be disposed between the pillar interior material 530B and a pillar panel and may be configured to indirectly or directly vibrate the pillar interior material 530B to output a sound. For example, the second vibration device 550B may include the vibration apparatuses 130 according to the ninth embodiment or the tenth embodiment of the present disclosure described above with reference to FIGS. 1 to 26, and thus, the repetitive description thereof is omitted. For example, the second vibration device 550B may be referred to as the term such as a pillar speaker, a tweeter speaker, or a second speaker, or the like, but embodiments of the present disclosure are not limited thereto.

According to an embodiment of the present disclosure, the pillar panel may include a first pillar (or an A pillar) disposed at both sides of a front glass window, a second pillar (or a B pillar) disposed at both sides of a center of a vehicle body, and a third pillar (or a C pillar) disposed at both sides of a rear portion of the vehicle body. The pillar interior material 530B may include a first pillar interior material 530B1 covering the first pillar, a second pillar interior material 530B2 covering the second pillar, and a third pillar interior material 530B3 covering the third pillar.

According to an embodiment of the present disclosure, the second vibration device 550B may be disposed in at least one or more of a region between the first pillar and the first pillar interior material 530B1, a region between the second pillar and the second pillar interior material 530B2, and a region between the third pillar and the third pillar interior material 530B3, and thus, may vibrate at least one or more of the first to third pillar interior materials 530B1 to 530B3. For example, the second vibration device 550B may be configured to output a sound at about 2 kHz to about 20 kHz, but embodiments of the present disclosure are not limited thereto. For example, the second vibration device 550B may be configured to output a sound at about 150 Hz to about 20 kHz. For example, the second vibration device 550B configured to vibrate at least one or more of the first to third pillar interior materials 530B1 to 530B3 may have the same sound output characteristic or different sound output characteristics.

Referring to FIGS. 32, 35, and 36, a third vibration device 550C according to an embodiment of the present disclosure may be disposed between a roof panel and a roof interior material 530C and may be configured to directly or indirectly vibrate the roof interior material 530C to output a sound. For example, the third vibration device 550C may be configured to be transparent or semitransparent. For example, the third vibration device 550C may include the vibration apparatus 130 described above with reference to FIGS. 1 to 26, and thus, its repetitive description is omitted. For example, the third vibration device 550C may be referred to as a roof speaker or a third speaker, but embodiments of the present disclosure are not limited thereto.

According to an embodiment of the present disclosure, at least one or more of the roof panel and the roof interior material 530C covering the roof panel may include the first region corresponding to the driver seat DS, the second region corresponding to the passenger seat FPS, a third region corresponding to a region between the driver seat DS and the passenger seat FPS, a fourth region corresponding to a first rear seat RPS1 behind the driver seat DS, a fifth region corresponding to a second rear seat RPS2 behind the passenger seat FPS, a sixth region corresponding to a region between the first rear seat RPS1 and the second rear seat RPS2, and a seventh region between the third region and the sixth region.

For example, the third vibration device 550C may be configured to vibrate at least one or more among the first to seventh regions of the roof interior material 530C. For example, the third vibration device 550C may be configured to output a sound of about 150 Hz to about 20 kHz. For example, the third vibration device 550C configured to vibrate at least one or more among the first to seventh regions of the roof interior material 530C may have the same sound output characteristic or different sound output characteristics. For example, the third vibration device 550C configured to vibrate each of the first to seventh regions of the roof interior material 530C may have the same sound output characteristic or different sound output characteristics. For example, at least one or more third vibration devices 550C configured to vibrate at least one or more among the first to seventh regions of the roof interior material 530C may be configured to output a sound of about 2 kHz to about 20 kHz, and the other third vibration devices 550C may be configured to output a sound at about 150 Hz to about 20 kHz. For example, at least one or more among third vibration devices 550C configured to vibrate each of the first to seventh regions of the roof interior material 530C may be configured to output a sound of about 2 kHz to about 20 kHz, and the other third vibration devices 550C may be configured to output a sound at about 150 Hz to about 20 kHz.

With reference to FIGS. 31 to 34, the fourth vibration device 550D according to an embodiment of the present disclosure may be disposed between the door frame and the door interior material 530D and may be configured to indirectly or directly vibrate the door interior material 530D to output a sound. For example, the fourth vibration device 550D may include the apparatus 9 and 10 according to the ninth embodiment or the tenth embodiment of the present disclosure described above with reference to FIGS. 1 to 26, and thus, the repetitive description thereof is omitted. For example, the fourth vibration device 550D may be referred to as the term such as a door speaker or a fourth speaker, or the like, but embodiments of the present disclosure are not limited thereto.

According to an embodiment of the present disclosure, at least one or more of the door frame and the door interior material 530D may include an upper region, a middle region, and a lower region with respect to a height direction Z of the apparatus 20. For example, the fourth vibration device 550D may be disposed at at least one or more among an upper region, a middle region, and a lower region between the door frame and the door interior material 530D, and thus, may vibrate at least one or more among an upper region, a middle region, and a lower region of the door interior material 530D.

According to an embodiment of the present disclosure, an upper region of a door interior material 530D may include a curved portion having a curvature radius which is relatively small. A fourth vibration device 550D for vibrating the upper region of the door interior material 530D may have flexibility due to a second portion 1311*a*2 having flexibility of the vibration device 131 illustrated in one or more of FIGS. 13A to 13F among the vibration apparatuses described above with reference to FIGS. 2 to 7B, 14 to 16, and 17 to 26, and thus, may be bent in a shape which is intactly based on a shape (or a surface shape) of a curved portion of the upper region of the door interior material 530D.

According to an embodiment of the present disclosure, the door frame may include a first door frame (or a left front door frame), a second door frame (or a right front door frame), a third door frame (or a left rear door frame), and a fourth door frame (or a right rear door frame). According to an embodiment of the present disclosure, the door interior material 530D may include a first door interior material (or a left front door interior material) 530D1 covering the first door frame, a second door interior material (or a right front door interior material) 530D2 covering the second door frame, a third door interior material (or a left rear door interior material) 530D3 covering the third door frame, and a fourth door interior material (or a right rear door interior material) 530D4 covering the fourth door frame. For example, the fourth vibration device 550D may be disposed at at least one or more among an upper region, a middle region, and a lower region between each of the first to fourth door frames and the first to fourth door interior materials 530D1 to 530D4 and may vibrate at least one or more among an upper region, a middle region, and a lower region of each of the first to fourth door interior materials 530D1 to 530D4.

According to an embodiment of the present disclosure, the fourth vibration device 550D configured to vibrate the upper region of each of the first to fourth door interior materials 530D1 to 530D4 may be configured to output a sound of about 2 kHz to about 20 kHz, or may be configured to output a sound of about 150 Hz to about 20 kHz. For example, the fourth vibration device 550D configured to vibrate the upper regions of at least one or more among the first to fourth door interior materials 530D1 to 530D4 may be configured to output a sound of about 2 kHz to about 20 kHz, or may be configured to output a sound of about 150 Hz to about 20 kHz.

According to an embodiment of the present disclosure, the fourth vibration device 550D configured to vibrate the middle regions or/and the lower regions of at least one or more among the first to fourth door interior materials 530D1 to 530D4 may be configured to output a sound of about 150 Hz to about 20 kHz. For example, the fourth vibration device 550D configured to vibrate the middle region or/and the lower region of each of the first to fourth door interior materials 530D1 to 530D4 may be configured to output a sound of about 150 Hz to about 20 kHz. For example, the fourth vibration device 550D configured to vibrate the middle regions or/and the lower regions of at least one or more among the first to fourth door interior materials 530D1 to 530D4 may be one or more of a woofer, a mid-woofer, and a sub-woofer, but embodiments of the present disclosure are not limited thereto. For example, the fourth vibration device 550D configured to vibrate the middle region or/and the lower region of each of the first to fourth door interior materials 530D1 to 530D4 may be referred to as the term such as one or more of a woofer, a mid-woofer, and a sub-woofer, but embodiments of the present disclosure are not limited thereto.

Sounds, which are respectively output from the fourth vibration device 550D disposed at the first door interior material 530D1 and the fourth vibration device 550D disposed at the second door interior material 530D2, may be combined and output. For example, sounds, which are output from at least one or more of the fourth vibration device 550D disposed at the first door interior material 530D1 and the fourth vibration device 550D disposed at the second door interior material 530D2, may be combined and output. Also, a sound output from the fourth vibration device 550D disposed at the third door interior material 530D3 and a sound output from the fourth vibration device 550D disposed at the fourth door interior material 530D4 may be combined and output.

According to an embodiment of the present disclosure, an upper region of each of the first to fourth door interior materials 530D1 to 530D4 may include a first upper region adjacent to the dashboard 530A, a second upper region adjacent to the rear seats RPS1, RPS2, and RPS3, and a third upper region between the first upper region and the second upper region. For example, the fourth vibration device 550D may be disposed at one or more among the first to third upper regions of each of the first to fourth door interior materials 530D1 to 530D4.

For example, the fourth vibration device 550D may be disposed at the first upper region of each of the first and second door interior materials 530D1 and 530D2 and may be disposed at one or more among the second and third upper regions of each of the first and second door interior materials 530D1 and 530D2. For example, the fourth vibration device 550D may be disposed at one or more among the first to third upper regions of one or more among the first to fourth door interior materials 530D1 to 530D4. For example, the fourth vibration device 550D configured to vibrate the first upper regions of one or more among the first and second door interior materials 530D1 and 530D2 may be configured to output a sound of about 2 kHz to about 20 kHz, and the fourth vibration device 550D configured to vibrate one or more among the second and third upper regions of each of the first and second door interior materials 530D1 and 530D2 may be configured to output a sound of about 2 kHz to about 20 kHz, or may be configured to output a sound of about 150 Hz to about 20 kHz. For example, the fourth vibration device 550D configured to vibrate one or more among the second and third upper regions of one or more among the first and second door interior materials 530D1 and 530D2 may be configured to output a sound of about 2 kHz to about 20 kHz, or may be configured to output a sound of about 150 Hz to about 20 kHz.

With reference to FIGS. 31, 32, and 36, the fifth vibration device 550E according to an embodiment of the present disclosure may be disposed between a seat frame and the seat interior material 530E and may be configured to indirectly or directly vibrate the seat interior material 530E to output a sound. For example, the fifth vibration device 550E may include the vibration apparatuses 130 described above with reference to FIGS. 1 to 26, and thus, the repetitive description thereof is omitted. For example, the fifth vibration device 550E may be referred to as the term such as a sheet speaker, a headrest speaker, or a fifth speaker, or the like, but embodiments of the present disclosure are not limited thereto.

According to an embodiment of the present disclosure, the seat frame may include a first seat frame (or a driver seat frame), a second seat frame (or a passenger seat frame), a third seat frame (or a first rear seat frame), a fourth seat frame (or a second rear seat frame), and a fifth seat frame (or a third rear seat frame). According to an embodiment of the present disclosure, the seat interior material 530E may include a first seat interior material surrounding the first seat frame, a second seat interior material surrounding the second seat frame, a third seat interior material surrounding the third seat frame, a fourth seat interior material surrounding the fourth seat frame, and a fifth seat interior material surrounding the fifth seat frame.

According to an embodiment of the present disclosure, at least one or more among the first to fifth seat frames may include a seat bottom frame, a seat back frame, and a headrest frame. The seat interior material 530E may include a seat bottom interior material 530E1 surrounding the seat bottom frame, a seat back interior material 530E2 surrounding the seat back frame, and a headrest interior material 530E3 surrounding the headrest frame. At least one or more among the seat bottom interior material 530E1, the seat back interior material 530E2, and the headrest interior material 530E3 may include a seat inner interior material and a seat outer interior material. The seat inner interior material may include a foam layer. The seat outer interior material may include a surface layer including a fiber or leather. The outer seat interior material may further include a base layer including a plastic material which supports the surface layer.

According to an embodiment of the present disclosure, the fifth vibration device 550E may be disposed at at least one or more among a region between the seat back frame and the seat back interior material 530E2 and a region between the headrest frame and the headrest interior material 530E3, and thus, may vibrate at least one or more among the seat outer interior material of the seat back interior material 530E2 and the seat outer interior material of the headrest interior material 530E3.

According to an embodiment of the present disclosure, the fifth vibration device 550E disposed at at least one or more of the driver seat DS and the passenger seat FPS may be disposed at at least one or more among the region between the seat back frame and the seat back interior material 530E2 and the region between the headrest frame and the headrest interior material 530E3.

According to an embodiment of the present disclosure, the fifth vibration device 550E disposed at at least one or more among the first to third rear seats RPS1, RPS2, and RPS3 may be disposed between the headrest frame and the headrest interior material 530E3. For example, at least one or more among the first to third rear seats RPS1, RPS2, and RPS3 may include at least one or more fifth vibration devices 550E disposed between the headrest frame and the headrest interior material 530E3.

According to an embodiment of the present disclosure, the fifth vibration device 550E vibrating the seat back interior materials 530E2 of at least one or more among the driver seat DS and the passenger seat RPS may be configured to output a sound of about 150 Hz to about 20 kHz.

According to an embodiment of the present disclosure, the fifth vibration device 550E vibrating the headrest interior materials 530E3 of at least one or more among the driver seat DS, the passenger seat FPS, and the first to third rear seats RPS1, RPS2, and RPS3 may be configured to output a sound of about 2 kHz to about 20 kHz, or may be configured to output a sound of about 150 Hz to about 20 kHz.

With reference to FIGS. 31 to 33, the sixth vibration device 550F according to an embodiment of the present disclosure may be disposed between a handle frame and the handle interior material 530F and may be configured to indirectly or directly vibrate the handle interior material 530F to output a sound. For example, the sixth vibration device 550F may include the vibration apparatuses 130 described above with reference to FIGS. 1 to 26, and thus, the repetitive description thereof is omitted. For example, the sixth vibration device 550F may be referred to as the term such as a handle speaker, a steering speaker, or a sixth speaker, or the like, but embodiments of the present disclosure are not limited thereto.

According to an embodiment of the present disclosure, the sixth vibration device 550F may be configured to indirectly or directly vibrate the handle interior material 530F to provide a driver with a sound. For example, a sound output by the sixth vibration device 550F may be a sound which is the same as or different from a sound output from each of the first to fifth vibration devices 550A to 550E. For example, a sound output by the sixth vibration device 550F may be a sound which is the same as or different from sounds output from at least one or more among the first to fifth vibration devices 550A to 550E.

In an embodiment of the present disclosure, the sixth vibration device 550F may output a sound which is to be provided to only the driver. In another embodiment of the present disclosure, the sound output by the sixth vibration device 550F and a sound output by each of the first to fifth vibration devices 550A to 550E may be combined and output. For example, the sound output by the sixth vibration device 550F and the sound output by at least one or more among the first to fifth vibration devices 550A to 550E may be combined and output.

With reference to FIGS. 31 and 32, the seventh vibration device 550G may be disposed between the floor panel and the floor interior material 530G and may be configured to indirectly or directly vibrate the floor internal material 530G to output a sound. The seventh vibration device 550G may be disposed between the floor interior material 530G and the floor panel disposed between the front seats DS and FPS and the third rear seat RPS3. For example, the seventh vibration device 550G may include the vibration apparatuses 130 described above with reference to FIGS. 1 to 26, and thus, the repetitive description thereof is omitted. For example, the seventh vibration device 550G may be configured to output a sound of about 150 Hz to about 20 kHz. For example, the seventh vibration device 550G may be referred to as the term such as a floor speaker, a bottom speaker, an under speaker, or a seventh speaker, or the like, but embodiments of the present disclosure are not limited thereto.

With reference to FIGS. 31 to 35, the vehicular apparatus according to an embodiment of the present disclosure may further include a second vibration generating apparatus 550-2 which is disposed in the interior material 530 exposed at an indoor space. For example, the vehicular apparatus according to an embodiment of the present disclosure may include only the second vibration generating apparatus 550-2 instead of the first vibration generating apparatus 550-1, or may include all of the first vibration generating apparatus 550-1 and the second vibration generating apparatus 550-2.

For example, a first vibration generating apparatus 550-1 and/or a second vibration generating apparatus 550-2 may be disposed in an interior material 530 to output a sound. For example, the interior material 530 may output a sound based on vibrations of one or more vibration generating apparatuses (or vibration apparatus).

According to an embodiment of the present disclosure, the interior material 530 may further include a rear view mirror 530H, an overhead console 530I, a rear package interior material 530J, a glove box 530K, and a sun visor 530L, or the like.

The second vibration generating apparatus 550-2 according to an embodiment of the present disclosure may include at least one or more vibration devices 550H to 550L which are disposed at at least one among the rear view mirror 530H, the overhead console 530I, the rear package interior material 530J, the glove box 530K, and the sun visor 530L. For example, the second vibration generating apparatus 550-2 may include at least one or more among eighth to twelfth vibration devices 550H to 550L, and thus, may output sounds of one or more channels.

With reference to FIGS. 31 to 35, the eighth vibration device 550H may be disposed at the rear view mirror 530H and may be configured to indirectly or directly vibrate the rear view mirror 530H to output a sound. The eighth vibration device 550H may be disposed between a mirror housing connected to the main structure and the rear view mirror 530H supported by the mirror housing. For example, the eighth vibration device 550H may include the apparatuses 130 described above with reference to FIGS. 13A to 13F in the vibration apparatus of FIGS. 2 to 7B, 14 to 16, and 17 to 26, and thus, repetitive description thereof is omitted. For example, the eighth vibration device 550H may be configured to output a sound of about 150 Hz to about 20 kHz. For example, the eighth vibration device 550H may be referred to as the term such as a mirror speaker or an eighth speaker, or the like, but embodiments of the present disclosure are not limited thereto.

With reference to FIGS. 32, 33, and 35, the ninth vibration device 550I may be disposed at the overhead console 530I and may be configured to indirectly or directly vibrate a console cover of the overhead console 530I to output a sound. According to an embodiment of the present disclosure, the overhead console 530I may include a console box buried (or embedded) into the roof panel, a lighting device disposed at the console box, and a console cover covering the lighting device and the console box.

The ninth vibration device 550I may be disposed between the console box of the overhead console 530I and the console cover and may vibrate the console cover. For example, the ninth vibration device 550I may be disposed between the console box of the overhead console 530I and the console cover and may directly vibrate the console cover. For example, the ninth vibration device 550I may include the vibration apparatuses 130 described above with reference to FIGS. 13A to 13F in the vibration apparatus of FIGS. 2 to 7B, 14 to 16, and 17 to 26, and thus, the repetitive description thereof is omitted. For example, the ninth vibration device 550I may be configured to output a sound of about 150 Hz to about 20 kHz. For example, the ninth vibration device 550I may be referred to as the term such as a console speaker, a lighting speaker, or a ninth speaker, or the like, but embodiments of the present disclosure are not limited thereto.

The vehicular apparatus according to an embodiment of the present disclosure may further include a center lighting box disposed at a center region of the roof interior material 530C, a center lighting device disposed at the center lighting box, and a center lighting cover covering the center lighting device. In this case, the ninth vibration device 550I may be further disposed between the center lighting box and the center lighting cover of the center lighting device and may additionally vibrate the center lighting cover.

With reference to FIGS. 31 and 32, the tenth vibration device 550J may be disposed at the rear package interior material 530J and may be configured to indirectly or directly vibrate the rear package interior material 530J to output a sound. The rear package interior material 530J may be disposed behind (or back portion) the first to third rear seats RPS1, RPS2, and RPS3. For example, a portion of the rear package interior material 530J may be disposed under a rear glass window 540C.

The tenth vibration device 550J may be disposed at a rear surface of the rear package interior material 530J and may vibrate the rear package interior material 530J. For example, the tenth vibration device 550J may include the vibration apparatuses 130 described above with reference to FIGS. 13A to 13F in the vibration apparatus of FIGS. 2 to 7B, 14 to 16, and 17 to 26, and thus, the repetitive description thereof is omitted. For example, the tenth vibration device 550J may be referred to as the term such as a rear speaker or a tenth speaker, or the like, but embodiments of the present disclosure are not limited thereto.

According to an embodiment of the present disclosure, the rear package interior material 530J may include a first region corresponding to a rear portion of the first rear seat RPS1, a second region corresponding to a rear portion of the second rear seat RPS2, and a third region corresponding to a rear portion of the third passenger seat RPS3.

According to an embodiment of the present disclosure, the tenth vibration device 550J may be disposed to vibrate at least one or more among the first to third regions of the rear package interior material 530J. For example, the tenth vibration device 550J may be disposed at each of the first and second regions of the rear package interior material 530J, or may be disposed at each of the first to third regions of the rear package interior material 530J. For example, the tenth vibration device 550J may be disposed at at least one or more among the first and second regions of the rear package interior material 530J, or may be disposed at at least one or more among the first to third regions of the rear package interior material 530J. For example, the tenth vibration device 550J may be configured to output a sound at about 150 Hz to about 20 kHz. For example, the tenth vibration device 550J configured to vibrate each of the first to third regions of the rear package interior material 530J may have the same sound output characteristic or different sound output characteristics. For example, the tenth vibration device 550J configured to vibrate at least one or more among the first to third regions of the rear package interior material 530J may have the same sound output characteristic or different sound output characteristics.

With reference to FIGS. 31 to 33, the eleventh vibration device 550K may be disposed at a glove box 530K and may be configured to indirectly or directly vibrate the glove box 530K to output a sound. The glove box 530K may be disposed at a dashboard 530A corresponding to a front portion of the passenger seat FPS.

The eleventh vibration device 550K may be disposed at an inner surface of the glove box 530K and may vibrate the glove box 530K. For example, the eleventh vibration device 550K may include the vibration apparatuses 130 described above with reference to FIGS. 13A to 13F in the vibration apparatus of FIGS. 2 to 7B, 14 to 16, and 17 to 26, and thus, the repetitive description thereof is omitted. For example, the eleventh vibration device 550K may be configured to output a sound of about 150 Hz to about 20 kHz, or may be one or more of a woofer, a mid-woofer, and a sub-woofer, but embodiments of the present disclosure are not limited thereto. For example, the eleventh vibration device 550K may be referred to as the term such as a glove box speaker or an eleventh speaker, or the like, but embodiments of the present disclosure are not limited thereto.

With reference to FIG. 33, the twelfth vibration device 550L may be disposed at the sun visor 530L and may configured to indirectly or directly vibrate the sun visor 530L to output a sound. The sun visor 530L may include a first sun visor 530L1 corresponding to the driver seat DS and a second sun visor 530L2 corresponding to the passenger seat FPS.

The twelfth vibration device 550L may be disposed at at least one or more among the first sun visor 530L1 and the second sun visor 530L2 and may indirectly or directly vibrate at least one or more among the first sun visor 530L1 and the second sun visor 530L2. For example, the twelfth vibration device 550L may include the vibration apparatuses 130 described above with reference to FIGS. 13A to 13F in the vibration apparatus of FIGS. 2 to 7B, 14 to 16, and 17 to 26, and thus, the repetitive description thereof is omitted. For example, the twelfth vibration device 550L may be configured to output a sound of about 150 Hz to about 20 kHz. For example, the twelfth vibration device 550L may be referred to as the term such as a sun visor speaker or a twelfth speaker, or the like, but embodiments of the present disclosure are not limited thereto.

According to an embodiment of the present disclosure, at least one or more among the first sun visor 530L1 and the second sun visor 530L2 may further include a sun visor mirror. In this case, the twelfth vibration device 550L may be configured to indirectly or directly vibrate a sun visor mirror of at least one or more among the first sun visor 530L1 and the second sun visor 530L2. The twelfth vibration device 550L vibrating the sun visor mirror may include the vibration apparatuses 130 described above with reference to FIGS. 13A to 13F in the vibration apparatus of FIGS. 2 to 7B, 14 to 16, and 17 to 26, and thus, the repetitive description thereof is omitted.

With reference to FIGS. 31 to 35, the vehicular apparatus according to an embodiment of the present disclosure may further include a third vibration generating apparatus 550-3 disposed at the glass window 540. For example, the vehicular apparatus according to an embodiment of the present disclosure may include the third vibration generating apparatus 550-3 instead of at least one or more of the first and second vibration generating apparatuses 550-1 and 550-2, or may include all of the first to third vibration generating apparatuses 550-1, 550-2, and 550-3.

For example, one or more of the first vibration generating apparatus 550-1, a second vibration generating apparatus 550-2, and a third vibration generating apparatus 550-3 may be disposed in a window 540 to output a sound. For example, the window 540 may output a sound on based vibrations of one or more vibration generating apparatuses (or vibration apparatus).

The third vibration generating apparatus 550-3 may include at least one or more vibration devices 550M to 550P disposed at the glass window 540. For example, the third vibration generating apparatus 550-3 may include at least one or more among thirteenth to sixteenth vibration devices 550M to 550P, and thus, may output sounds of one or more channels. For example, the third vibration generating apparatus 550-3 may be referred to as the term such as a window speaker, a transparent sound generating apparatus, a transparent speaker, or an opaque speaker, or the like, but embodiments of the present disclosure are not limited thereto.

At least one or more among the thirteenth to sixteenth vibration devices 550M to 550P according to an embodiment of the present disclosure may be configured to indirectly or directly vibrate the glass window 540. For example, at least one or more among the thirteenth to sixteenth vibration devices 550M to 550P may include the vibration apparatuses 130 described above with reference to FIGS. 1 to 26, may be configured to be transparent, semitransparent, or opaque, and thus, their repetitive descriptions are omitted.

According to an embodiment of the present disclosure, the glass window 540 may include a front glass window 540A, a side glass window 540B, and a rear glass window 540C. According to an embodiment of the present disclosure, the glass window 540 may further include a roof glass window 540D. For example, when the vehicular apparatus includes the roof glass window 540D, a portion of a region of the roof frame and the roof interior material 530C may be replaced with the roof glass window 540D. For example, when the vehicular apparatus includes the roof glass window 540D, the third vibration generating device 550C may be configured to indirectly or directly vibrate a periphery portion of the roof interior material 530C surrounding the roof glass window 540D.

With reference to FIGS. 31 to 33, the thirteenth vibration device 550M according to an embodiment of the present disclosure may be disposed at the front glass window 540A and may be configured to output a sound by vibrating itself or may be configured to indirectly or directly vibrate the front glass window 540A to output a sound.

According to an embodiment of the present disclosure, the front glass window 540A may include a first region corresponding to the driver seat DS, a second region corresponding to the passenger seat FPS, and a third region (or a middle region) between the first region and the second region.

For example, the thirteenth vibration device 550M may be disposed at at least one or more among the first to third regions of the front glass window 540A. For example, the thirteenth vibration device 550M may be disposed at each of the first and second regions of the front glass window 540A, or may be disposed at each of the first to third regions of the front glass window 540A. For example, the thirteenth vibration device 550M may be disposed at at least one or more among the first and second regions of the front glass window 540A, or may be disposed at at least one or more among the first to third regions of the front glass window 540A. For example, the thirteenth vibration device 550M disposed in each of the first to third regions of the front glass window 540A may have the same sound output characteristic or different sound output characteristics. For example, the thirteenth vibration device 550M disposed at at least one or more among the first to third regions of the front glass window 540A may have the same sound output characteristic or different sound output characteristics. For example, the thirteenth vibration device 550M may be configured to output a sound of about 150 Hz to about 20 kHz. For example, the thirteenth vibration device 550M may be referred to as the term such as a front window speaker or a thirteenth speaker, or the like, but embodiments of the present disclosure are not limited thereto.

With reference to FIGS. 32 to 34 and 36, the fourteenth vibration device 550N according to an embodiment of the present disclosure may be disposed at the side glass window 540B and may be configured to output a sound by vibrating itself or may be configured to indirectly or directly vibrate the side glass window 540B to output a sound.

According to an embodiment of the present disclosure, the side glass window 540B may include a first side glass window (or a left front window) 540B1, a second side glass window (or a right front window) 540B2, a third side glass window (or a left rear window) 540B3, and a fourth side glass window (or a right rear window) 540B4.

According to an embodiment of the present disclosure, the fourteenth vibration device 550N may be disposed at at least one or more among the first to fourth side glass windows 540B1 to 540B4. For example, at least one or more among the first to fourth side glass windows 540B1 to 540B4 may include at least one or more fourteenth vibration devices 550N.

According to an embodiment of the present disclosure, the fourteenth vibration device 550N may be disposed at at least one or more among the first to fourth side glass windows 540B1 to 540B4 and may be configured to output a sound by vibrating itself or may be configured to indirectly or directly vibrate a corresponding side glass window to output the sound. For example, the fourteenth vibration device 550N may be configured to output a sound of about 150 Hz to about 20 kHz. For example, the fourteenth vibration device 550N disposed at at least one or more among the first to fourth side glass windows 540B1 to 540B4 may have the same sound output characteristic or different sound output characteristics. For example, the fourteenth vibration device 550N may be configured to output a sound of about 150 Hz to about 20 kHz. For example, the fourteenth vibration device 550N may be a side window speaker or a fourteenth speaker, or the like, but embodiments of the present disclosure are not limited thereto.

With reference to FIG. 31, the fifteenth vibration device 550O according to an embodiment of the present disclosure may be disposed at the rear glass window 540C and may be configured to output a sound by vibrating itself or may be configured to indirectly or directly vibrate the rear glass window 540C to output a sound.

According to an embodiment of the present disclosure, the rear glass window 540C may include a first region corresponding to a rear portion of the first rear seat RPS1, a second region corresponding to a rear portion of the second rear seat RPS2, and a third region corresponding to a rear portion of the third rear seat RPS3.

According to an embodiment of the present disclosure, the fifteenth vibration device 550O may be disposed at each of first to third regions of the rear glass window 540C. For example, the fifteenth vibration device 550O may be disposed at at least one or more among the first to third regions of the rear glass window 540C. For example, the fifteenth vibration device 550O may be disposed at each of the first and second regions of the rear glass window 540C, or may be disposed at each of the first to third regions of the rear glass window 540C. For example, the fifteenth vibration device 550O may be disposed at at least one or more among the first and second regions of the rear glass window 540C, or may be disposed at at least one or more among the first to third regions of the rear glass window 540C. For example, the fifteenth vibration device 550O may be configured to output a sound of about 150 Hz to about 20 kHz. For example, the fifteenth vibration device 550O disposed at each of the first to third regions of the rear glass window 540C may have the same sound output characteristic or different sound output characteristics. For example, the fifteenth vibration device 550O disposed at at least one or more among the first to third regions of the rear glass window 540C may have the same sound output characteristic or different sound output characteristics. For example, the fifteenth vibration device 550O disposed at at least one or more among the first to third regions of the rear glass window 540C may be configured to output a sound of about 150 Hz to about 20 kHz, or may be one or more of a woofer, a mid-woofer, and a sub-woofer, or the like, but embodiments of the present disclosure are not limited thereto. For example, the fifteenth vibration device 550O may be referred to as the term such as a rear window speaker or a fifteenth speaker, or the like, but embodiments of the present disclosure are not limited thereto.

With reference to FIG. 35, the sixteenth vibration device 550P according to an embodiment of the present disclosure may be disposed at the roof glass window 540D and may output a sound by vibrating itself or may be configured to indirectly or directly vibrate the roof glass window 540D to output a sound.

The roof glass window 540D according to an embodiment of the present disclosure may be disposed over the front seats DS and FPS. For example, the sixteenth vibration device 550P may be disposed at a middle region of the roof glass window 540D. For example, the sixteenth vibration device 550P may be configured to output a sound of about 150 Hz to about 20 kHz. For example, the sixteenth vibration device 550P may be referred to as the term such as a roof window speaker or a sixteenth speaker, or the like, but embodiments of the present disclosure are not limited thereto.

According to another embodiment of the present disclosure, the roof glass window 540D may be disposed at the front seats DS and FPS or may be disposed at the front seats DS and FPS and the rear seats RPS1, RPS2, and RPS3. For example, the roof glass window 540D may include a first region corresponding to the front seats DS and FPS and a second region corresponding to the rear seats RPS1, RPS2, and RPS3. And, the roof glass window 540D may include a third upper region between the first upper region and the second upper region.

For example, the sixteenth vibration device 550P may be disposed at at least one or more among the first and second regions of the roof glass window 540D or may be disposed at at least one or more among the first to third regions of the roof glass window 540D. For example, the sixteenth vibration device 550P may be configured to output a sound of about 150 Hz to about 20 kHz. For example, the sixteenth vibration device 550P disposed at at least one or more among the first to third regions of the roof glass window 540D may have the same sound output characteristic or different sound output characteristics.

With reference to FIGS. 31 to 33, the vehicular apparatus according to an embodiment of the present disclosure may further include a woofer speaker WS which is disposed at at least one or more among a dashboard 530A, a door frame, and a rear package interior material 530J.

The woofer speaker WS according to an embodiment of the present disclosure may include at least one or more among a woofer, a mid-woofer, and a sub-woofer. For example, the woofer speaker WS may be referred to as the term such as a speaker or the like which outputs a sound of about 60 Hz to about 150 Hz, but embodiments of the present disclosure are not limited thereto. Therefore, the woofer speaker WS may output a sound of about 60 Hz to about 150 Hz, and thus, may enhance a low-pitched sound band characteristic of a sound which is output to an indoor space.

According to an embodiment of the present disclosure, the woofer speaker WS may be disposed at at least one or more among first and second regions of the dashboard 530A. According to an embodiment of the present disclosure, the woofer speaker WS may be disposed at each of first to fourth door frames of the door frame and may be exposed at a lower region among each of the first to fourth door interior materials 530D1 to 530D4 of the door interior material 530D.

For example, the woofer speaker WS may be disposed at at least one or more among the first to fourth door frames of the door frame and may be exposed at the lower regions of at least one or more among the first to fourth door interior materials 530D1 to 530D4 of the door interior material 530D. According to another embodiment of the present disclosure, the woofer speaker WS may be disposed at at least one or more among the first and second regions of the rear package interior material 530J. For example, the fourth vibration device 550D disposed at the lower region of each of the first to fourth door interior materials 530D1 to 530D4 may be replaced by the woofer speaker WS. For example, the fourth vibration device 550D disposed in the lower regions of at least one or more among the first to fourth door interior materials 530D1 to 530D4 may be replaced by the woofer speaker WS.

With reference to FIGS. 33 and 34, the vehicular apparatus according to an embodiment of the present disclosure may further include a garnish member 530M which covers a portion of the interior material 530 exposed at the indoor space and a fourth vibration generating apparatus 550-4 disposed at the interior material 530.

For example, a fourth vibration generating apparatus 550-4 may be disposed in a garnish member 530M and the interior material 530 to output a sound. For example, one or more of the garnish member 530M and the interior material 530 may output a sound based on vibrations of one or more vibration generating apparatuses (or vibration apparatus).

The garnish member 530M may be configured to cover a portion of the door interior material 530D exposed at an indoor space, but embodiments of the present disclosure are not limited thereto. For example, the garnish member 530M may be configured to cover a portion of one or more among the dashboard 530A, the filler interior material 530B, and the roof interior material 530C, which are exposed at the indoor space.

The garnish member 530M according to an embodiment of the present disclosure may include a metal material or a nonmetal material (or a composite nonmetal material) having a material characteristic suitable for generating a sound based on a vibration. For example, a metal material of the garnish member 530M may include any one or more materials of stainless steel, aluminum (Al), an Al alloy, a magnesium (Mg), a Mg alloy, and a magnesium-lithium (Mg— Li) alloy, but embodiments of the present disclosure are not limited thereto. The nonmetal material (or the composite nonmetal material) of the garnish member 530M may include one or more of wood, plastic, glass, metal, cloth, fiber, rubber, paper, and leather, but embodiments of the present disclosure are not limited thereto. For example, the garnish member 530M may include a metal material having a material characteristic suitable for generating a sound of a high-pitched sound band, but embodiments of the present disclosure are not limited thereto. For example, the high-pitched sound band may have a frequency of 1 kHz or more or 3 kHz or more, but embodiments of the present disclosure are not limited thereto.

The fourth vibration generating apparatus 550-4 may include a seventeenth vibration device 550Q disposed between the garnish member 530M and the interior material 530. For example, the fourth vibration generating apparatus 550-4 or the seventeenth vibration device 550Q may be referred to as the term such as a garnish speaker or a seventeenth speaker, or the like, but embodiments of the present disclosure are not limited thereto.

The seventeenth vibration device 550Q according to an embodiment of the present disclosure may include one or more of the vibration apparatuses 130 described above with reference to FIGS. 1 to 26. The seventeenth vibration device 550Q may be disposed in a main interior material 530 and a garnish member 530M and may be connected or coupled to the garnish member 530M.

The seventeenth vibration device 550Q according to an embodiment of the present disclosure may be configured to indirectly or directly vibrate the garnish member 530M to output a sound into the indoor space of the vehicular apparatus. For example, the seventeenth vibration device 550Q may be configured to output a sound of a high-pitched sound band, but embodiments of the present disclosure are not limited thereto.

Referring to FIG. 33, the vehicular apparatus according to an embodiment of the present disclosure may further include a fifth vibration generating apparatus 550-5 disposed at an inner surface of the exterior material 520. For example, the fifth vibration generating apparatus 550-5 may be disposed in the exterior material 520 to output a sound. For example, the exterior material 520 may output a sound based on vibrations of one or more vibration generating apparatuses (or vibration apparatus).

The fifth vibration generating apparatus 550-5 may include one or more vibration device 550R, 550S, and 550T disposed between the main structure and one or more among a hood panel 520A, a front fender panel 520B, and a trunk panel 520C. For example, the fifth vibration generating apparatus 550-5 may include at least one or more among one or more eighteenth to twentieth vibration devices 550R, 550S, and 550T, and thus, may output sounds of one or more channels.

The one or more eighteenth vibration device 550R according to an embodiment of the present disclosure may be connected or coupled to an inner surface of the hood panel 520A and may indirectly or directly vibrate the hood panel 520A to output a sound into an outdoor space of the vehicular apparatus. For example, the one or more eighteenth vibration devices 550R may be configured to be connected or coupled to one or more among a center portion and a periphery portion of the inner surface of the hood panel 520A.

One or more eighteenth vibration devices 550R according to an embodiment of the present disclosure may include one or more of the vibration apparatuses 130 described above with reference to FIGS. 1 to 26. The one or more eighteenth vibration devices 550R may be connected or coupled to an inner surface of a hood panel 520A. For example, the one or more eighteenth vibration devices 550R may be configured to output a sound of 150 Hz to 20 kHz. For example, the one or more eighteenth vibration devices 550R may be referred to as a hood panel speaker or an eighteenth speaker, but embodiments of the present disclosure are not limited thereto.

The one or more nineteenth vibration devices 550S according to an embodiment of the present disclosure may be connected or coupled to an inner surface of the front fender panel 520B and may be configured to indirectly or directly vibrate the front fender panel 520B to output a sound to the outdoor space of the vehicular apparatus. For example, the one or more nineteenth vibration devices 550S may be disposed to have a certain interval at the inner surface of the front fender panel 520B.

The one or more nineteenth vibration devices 550S according to an embodiment of the present disclosure may include the vibration apparatuses 130 described above with reference to FIGS. 1 to 26, and thus, the repetitive description thereof is omitted. The one or more nineteenth vibration devices 550S may be connected or coupled to the inner surface of the front fender panel 520B through a coupling member. For example, the one or more nineteenth vibration devices 550S may be configured to output a sound of about 150 Hz to about 20 kHz. For example, the one or more nineteenth vibration devices 550S may be referred to as the term such as a fender panel speaker or a nineteenth speaker, or the like, but embodiments of the present disclosure are not limited thereto.

The one or more twentieth vibration devices 550T according to an embodiment of the present disclosure may be connected or coupled to an inner surface of the trunk panel 520C and may be configured to indirectly or directly vibrate the trunk panel 520C to output a sound to the outdoor space of the vehicular apparatus. For example, the one or more twentieth vibration devices 550T may be configured to be connected or coupled to one or more among a center portion and a periphery portion of the trunk panel 520C.

The one or more twentieth vibration devices 550T according to an embodiment of the present disclosure may include the vibration apparatuses 130 disclosure described above with reference to FIGS. 1 to 26, and thus, the repetitive description thereof is omitted. The one or more twentieth vibration devices 550T may be connected or coupled to the inner surface of the trunk panel 520C through a coupling member. For example, the one or more twentieth vibration devices 550T may be configured to output a sound of about 150 Hz to about 20 kHz. For example, the one or more twentieth vibration devices 550T may be referred to as the term such as a trunk panel speaker or a nineteenth speaker, or the like, but embodiments of the present disclosure are not limited thereto.

According to another embodiment of the present disclosure, the fifth vibration generating apparatus 550-5 may further include one or more vibration apparatuses which are disposed in one or more of a door inner panel and a door outer panel.

Referring to FIGS. 31 to 33, the vehicular apparatus according to an embodiment of the present disclosure may further include an instrument panel apparatus 560 and an infotainment apparatus 570.

The instrument panel apparatus 560 according to an embodiment of the present disclosure may be disposed in a first region of the dashboard 530A to face the driver seat DS. The instrument panel apparatus 560 may include a display (or a first display) 561 which is disposed in the first region of the dashboard 530A to face the driver seat DS.

The first display 561 may include any one of the apparatuses described above with reference to FIGS. 1 to 26, and thus, the repetitive description thereof is omitted. For example, the instrument panel apparatus 560 may output a sound, generated by a vibration of a vibration member (or a display panel) 100 based on a vibration of one or more vibration apparatuses 130 included in the first display 561, toward the driver seat DS. For example, the vibration apparatus 130 disposed in the first display 561 of the instrument panel apparatus 560 may be configured to output a sound of about 150 Hz to about 20 kHz.

The infotainment apparatus 570 may be disposed in a third region of the dashboard 530A.

The infotainment apparatus 570 according to an embodiment of the present disclosure may be fixed on the third region of the dashboard 530A in an upright state.

According to another embodiment of the present disclosure, the infotainment apparatus 570 may be installed to be raised and lowered at the third region of the dashboard 530A. For example, the infotainment apparatus 570 may be received or accommodated into the dashboard 530A based on the power turn-off of the vehicular apparatus or the manipulation of a vehicle passenger and may protrude to a region on the dashboard 530A based on the power turn-on of the vehicular apparatus or the manipulation of the vehicle passenger.

The infotainment apparatus 570 according to an embodiment of the present disclosure may include a display (or a second display) 571 disposed in the third region of the dashboard 530A, and a display elevation device.

The second display 571 may include any one of the apparatuses described above with reference to FIGS. 1 to 26, and thus, the repetitive description thereof is omitted. For example, the infotainment apparatus 570 may output a sound, generated by a vibration of a display panel based on a vibration of one or more vibration apparatuses 130 included in the second display 571 toward the driver seat DS. For example, the one or more vibration apparatuses 130 disposed at the second display 271 of the infotainment apparatus 570 may be configured to output a sound of about 150 Hz to about 20 kHz.

The display elevation device may be disposed into the third region of the dashboard 530A and may support the second display 571 so as to be raised and lowered. For example, the display elevation device may raise the second display 571 based on the power turn-on of the vehicular apparatus or the manipulation of the vehicle passenger, thereby allowing the second display 571 to protrude to a region on the dashboard 530A. Also, the display elevation device may lower the second display 571 based on the power turn-off of the vehicular apparatus or the manipulation of the vehicle passenger, thereby allowing the second display 571 to be received or accommodated into the dashboard 530A.

As described above, the vehicular apparatus according to an embodiment of the present disclosure may output a sound to one or more of an indoor space and an external space by one or more of the first vibration generating apparatus 550-1 disposed in the interior material 530, the second vibration generating apparatus 550-2 disposed in the interior material 530 exposed at the indoor space, the third vibration generating apparatus 550-3 disposed in the window 540, the fourth vibration generating apparatus 550-4 disposed in the garnish member 530M, and the fifth vibration generating apparatus 550-5 disposed in the exterior material 520, and thus, may output a sound by one or more of the exterior material 520 and the interior material 530 as a sound vibration plate, thereby outputting a multi-channel surround stereo sound. Also, the vehicular apparatus according to an embodiment of the present disclosure may output a sound by using, as a sound vibration plate, one or more display panels of one or more displays 561 and 571 of the instrument panel apparatus 560 and the infotainment apparatus 570 and may output a multi-channel surround stereo sound, which is more realistic, through each of the first to third vibration generating apparatuses 550-1 to 550-3, the instrument panel apparatus 560, and the infotainment apparatus 570. According to an embodiment of the present disclosure, a first electrode portion and a second electrode portion may be configured with a conductive adhesive member, and thus, a power supply line and/or a pad portion disposed in a cover member for connecting the first electrode portion to the second electrode portion may not be needed, thereby providing a vehicular apparatus including a vibration apparatus having a simplified structure and a thin thickness. Also, according to an embodiment of the present disclosure, a first electrode portion and a second electrode portion may configure a vibration apparatus where a first cover member and a second cover member are provided as one body, thereby providing a vehicular apparatus including a vibration apparatus having a simplified structure and a thin thickness.

A vibration apparatus according to an embodiment of the present disclosure may be connected to all electronic devices by wire or wirelessly and may be used as a vibration apparatus of a corresponding electronic device.

For example, a vibration generating apparatus according to an embodiment of the present disclosure may be applied to a vibration generating apparatus disposed at an apparatus. The apparatus according to an embodiment of the present disclosure may be applied to mobile apparatuses, video phones, smart watches, watch phones, wearable apparatuses, foldable apparatuses, rollable apparatuses, bendable apparatuses, flexible apparatuses, curved apparatuses, sliding apparatuses, variable apparatuses, electronic organizers, electronic books, portable multimedia players (PMPs), personal digital assistants (PDAs), MP3 players, mobile medical devices, desktop personal computers (PCs), laptop PCs, netbook computers, workstations, navigation apparatuses, automotive navigation apparatuses, automotive display apparatuses, automotive apparatuses, theater apparatuses, theater display apparatuses, TVs, wall paper display apparatuses, signage apparatuses, game machines, notebook computers, monitors, cameras, camcorders, and home appliances, or the like. Also, the vibration generating apparatus according to some embodiments of the present disclosure may be applied to organic light-emitting lighting apparatuses or inorganic light-emitting lighting apparatuses. When the vibration generating apparatus of an embodiment of the present disclosure is applied to lighting apparatuses, the vibration generating apparatus may act as lighting and a speaker. Also, when the vibration apparatus according to some embodiments of the present disclosure is applied to a mobile device, or the like, the vibration generating apparatus may be one or more of a speaker, a receiver, and a haptic device, but embodiments of the present disclosure are not limited thereto.

A vibration apparatus according to various embodiments of the present disclosure will be described below.

A vibration apparatus according to various embodiments of the present disclosure may include a vibration portion, a first electrode portion at a first surface of the vibration portion and configured with a conductive adhesive member, and a second electrode portion at a second surface different from the first surface of the vibration portion.

According to various embodiments of the present disclosure, the second electrode portion may include the same material as a material of the first electrode portion.

According to various embodiments of the present disclosure, the second electrode portion may include the conductive adhesive member.

According to various embodiments of the present disclosure, a size of the vibration portion may differ from a size of one or more of the first electrode portion and the second electrode portion.

According to various embodiments of the present disclosure, a size of the vibration portion may be greater than a size of one or more of the first electrode portion and the second electrode portion.

According to various embodiments of the present disclosure, the vibration portion may protrude from one or more of the first electrode portion and the second electrode portion.

According to various embodiments of the present disclosure, the conductive adhesive member may include a first adhesive, a conductive layer on the first adhesive, and a second adhesive on the conductive layer.

According to various embodiments of the present disclosure, the vibration apparatus may further include a first cover member at the first electrode portion, and a second cover member at the second electrode portion.

According to various embodiments of the present disclosure, the first cover member may contact the first electrode portion, and the second cover member may contact the second electrode portion.

According to various embodiments of the present disclosure, the first electrode portion may contact the first surface of the vibration portion and the first cover member, and the second electrode portion may contact the second surface of the vibration portion and the second cover member.

According to various embodiments of the present disclosure, the vibration apparatus may further include a first adhesive layer between the first cover member and the first electrode portion, and a second adhesive layer between the second cover member and the second electrode portion.

According to various embodiments of the present disclosure, the vibration apparatus may further include a signal cable connected to the first electrode portion and the second electrode portion, the signal cable may include a line layer connected to each of the first electrode portion and the second electrode portion, a first protection film at a first surface of the line layer, and a second protection film at a second surface different from the first surface of the line layer.

According to various embodiments of the present disclosure, the line layer may contact one or more of the first electrode portion and the second electrode portion.

According to various embodiments of the present disclosure, the signal cable may further include a stiff portion overlapping one or more of the first protection film and the second protection film.

According to various embodiments of the present disclosure, the vibration apparatus may further include a signal cable connected to the first electrode portion and the second electrode portion, one side of the signal cable may be accommodated into the first adhesive layer and the second adhesive layer.

According to various embodiments of the present disclosure, the vibration portion may include a plurality of inorganic material portions having a piezoelectric characteristic and an organic material portion between the plurality of inorganic material portions.

According to various embodiments of the present disclosure, the vibration apparatus may further include a vibration member connected to one of the first electrode portion and the second electrode portion, and a plate between the vibration member and the vibration apparatus.

According to various embodiments of the present disclosure, the vibration apparatus may further include a first vibration apparatus including the vibration portion, the first electrode portion, and the second electrode portion, and a second vibration apparatus including the vibration portion, the first electrode portion, and the second electrode portion, the vibration member may include a first region and a second region, and the first vibration apparatus may be disposed in the first region, and the second vibration apparatus is disposed in the second region.

According to various embodiments of the present disclosure, the vibration apparatus may further include two or more vibration generators including the vibration portion, the first electrode portion, and the second electrode portion, the two or more vibration generators may be stacked to vibrate in the same direction.

According to various embodiments of the present disclosure, the vibration apparatus may further include a vibration member connected to one of the first electrode portion and the second electrode portion, the vibration member may further include a plate, and the plate may include a metal material, or comprises a single nonmetal or composite nonmetal material including one or more of wood, plastic, glass, cloth, fiber, rubber, paper, and leather.

According to various embodiments of the present disclosure, each of the vibration member and the plate may have the same size.

According to various embodiments of the present disclosure, the vibration apparatus may further include a vibration member connected to one of the first electrode portion and the second electrode portion, the vibration member may include one or more of a display panel including a plurality of pixels configured to display an image, a light emitting diode lighting panel, an organic light emitting diode lighting panel, and an inorganic light emitting diode lighting panel.

According to various embodiments of the present disclosure, the vibration apparatus may further include a vibration member connected to one of the first electrode portion and the second electrode portion, the vibration member may include one or more of a display panel including a pixel configured to display an image, a screen panel on which an image is to be projected from a display apparatus, a lighting panel, a signage panel, a vehicular interior material, a vehicular window, a vehicular exterior material, a ceiling material of a building, an interior material of a building, a window of a building, an interior material of an aircraft, a window of an aircraft, wood, plastic, glass, metal, cloth, fiber, paper, rubber, leather, and mirror.

A vibration apparatus according to various embodiments of the present disclosure may include a vibration portion, a first electrode portion at a first surface of the vibration portion, a second electrode portion at a second surface different from the first surface of the vibration portion, a first cover member on the first electrode portion, a second cover member under the second electrode portion, a first adhesive layer between the first electrode portion and the first cover member, a second adhesive layer between the second electrode portion and the second cover member, and a signal cable configured to apply a signal to each of the first electrode portion and the second electrode portion, at least a portion of the signal cable may be accommodated into one or more of the first adhesive layer and the second adhesive layer.

According to various embodiments of the present disclosure, one of the first electrode portion and the second electrode portion may include a conductive adhesive member.

According to various embodiments of the present disclosure, the signal cable may include a line layer between a first protection film and a second protection film, and the first protection film, the second protection film, and the line layer may be accommodated into one or more of the first adhesive layer and the second adhesive layer.

According to various embodiments of the present disclosure, the line layer may be connected to the first electrode portion and the second electrode portion.

An apparatus according to various embodiments of the present disclosure may include a vibration member including a plurality of regions, and one or more vibration apparatuses connected to the vibration member and disposed in one or more of the plurality of regions. The one or more vibration apparatuses may include a vibration portion, a first electrode portion at a first surface of the vibration portion and configured with a conductive adhesive member, and a second electrode portion at a second surface different from the first surface of the vibration portion.

An apparatus according to various embodiments of the present disclosure may include a vibration member including a plurality of regions, and one or more vibration apparatuses connected to the vibration member and disposed in one or more of the plurality of regions. The one or more vibration apparatuses may include a vibration portion, a first electrode portion at a first surface of the vibration portion, a second electrode portion at a second surface different from the first surface of the vibration portion, a first cover member on the first electrode portion, a second cover member under the second electrode portion, a first adhesive layer between the first electrode portion and the first cover member, a second adhesive layer between the second electrode portion and the second cover member, and a signal cable configured to apply a signal to each of the first electrode portion and the second electrode portion, at least a portion of the signal cable may be accommodated into one or more of the first adhesive layer and the second adhesive layer.

According to various embodiments of the present disclosure, the plurality of regions may be first to sixth regions.

According to various embodiments of the present disclosure, the plurality of regions may be first to ninth regions.

According to various embodiments of the present disclosure, the plurality of regions may be first to eleventh regions.

According to various embodiments of the present disclosure, the plurality of regions may be first to fifteenth regions.

According to various embodiments of the present disclosure, the vibration apparatus may further comprise one or more partitions disposed to separate the plurality of regions from each other.

An apparatus according to various embodiments of the present disclosure may include a vibration member including first to sixth regions, and one or more vibration apparatuses connected to the vibration member and disposed in one or more of the first to sixth regions, the one or more vibration apparatuses may include a vibration portion, a first electrode portion at a first surface of the vibration portion and configured with a conductive adhesive member, and a second electrode portion at a second surface different from the first surface of the vibration portion.

An apparatus according to various embodiments of the present disclosure may include a vibration member including first to sixth regions, and one or more vibration apparatuses connected to the vibration member and disposed in one or more of the first to sixth regions, the one or more vibration apparatuses may include a vibration portion, a first electrode portion at a first surface of the vibration portion, a second electrode portion at a second surface different from the first surface of the vibration portion, a first cover member on the first electrode portion, a second cover member under the second electrode portion, a first adhesive layer between the first electrode portion and the first cover member, a second adhesive layer between the second electrode portion and the second cover member, and a signal cable configured to apply a signal to each of the first electrode portion and the second electrode portion, at least a portion of the signal cable may be accommodated into one or more of the first adhesive layer and the second adhesive layer.

An apparatus according to various embodiments of the present disclosure may include a vibration member including first to ninth regions, and one or more vibration apparatuses connected to the vibration member and disposed at one or more of the first to ninth regions, the one or more vibration apparatuses may include a vibration portion, a first electrode portion at a first surface of the vibration portion and configured with a conductive adhesive member, and a second electrode portion at a second surface different from the first surface of the vibration portion.

An apparatus according to various embodiments of the present disclosure may include a vibration member including first to ninth regions, and one or more vibration apparatuses connected to the vibration member and disposed in one or more of the first to ninth regions, the one or more vibration apparatuses may include a vibration portion, a first electrode portion at a first surface of the vibration portion, a second electrode portion at a second surface different from the first surface of the vibration portion, a first cover member on the first electrode portion, a second cover member under the second electrode portion, a first adhesive layer between the first electrode portion and the first cover member, a second adhesive layer between the second electrode portion and the second cover member, and a signal cable configured to apply a signal to each of the first electrode portion and the second electrode portion, at least a portion of the signal cable may be accommodated into one or more of the first adhesive layer and the second adhesive layer.

An apparatus according to various embodiments of the present disclosure may include a vibration member including first to eleventh regions, and one or more vibration apparatuses connected to the vibration member and disposed in one or more of the first to eleventh regions, the one or more vibration apparatuses may include a vibration portion, a first electrode portion at a first surface of the vibration portion and configured with a conductive adhesive member, and a second electrode portion at a second surface different from the first surface of the vibration portion.

An apparatus according to various embodiments of the present disclosure may include a vibration member including first to eleventh regions, and one or more vibration apparatuses connected to the vibration member and disposed in one or more of the first to eleventh regions, the one or more vibration apparatuses may include a vibration portion, a first electrode portion at a first surface of the vibration portion, a second electrode portion at a second surface different from the first surface of the vibration portion, a first cover member on the first electrode portion, a second cover member under the second electrode portion, a first adhesive layer between the first electrode portion and the first cover member, a second adhesive layer between the second electrode portion and the second cover member, and a signal cable configured to apply a signal to each of the first electrode portion and the second electrode portion, at least a portion of the signal cable may be accommodated into one or more of the first adhesive layer and the second adhesive layer.

An apparatus according to various embodiments of the present disclosure may include a vibration member including first to fifteenth regions, and one or more vibration apparatuses connected to the vibration member and disposed in one or more of the first to fifteenth regions, the one or more vibration apparatuses may include a vibration portion, a first electrode portion at a first surface of the vibration portion and configured with a conductive adhesive member, and a second electrode portion at a second surface different from the first surface of the vibration portion.

An apparatus according to various embodiments of the present disclosure may include a vibration member including first to fifteenth regions, and one or more vibration apparatuses connected to the vibration member and disposed in one or more of the first to fifteenth regions, the one or more vibration apparatuses may include a vibration portion, a first electrode portion at a first surface of the vibration portion, a second electrode portion at a second surface different from the first surface of the vibration portion, a first cover member on the first electrode portion, a second cover member under the second electrode portion, a first adhesive layer between the first electrode portion and the first cover member, a second adhesive layer between the second electrode portion and the second cover member, and a signal cable configured to apply a signal to each of the first electrode portion and the second electrode portion, at least a portion of the signal cable may be accommodated into one or more of the first adhesive layer and the second adhesive layer.

An apparatus according to various embodiments of the present disclosure may include a vibration member, and one or more vibration apparatuses connected to the vibration member, the one or more vibration apparatuses may include a vibration portion, a first electrode portion at a first surface of the vibration portion and configured with a conductive adhesive member, and a second electrode portion at a second surface different from the first surface of the vibration portion.

An apparatus according to various embodiments of the present disclosure may include a vibration member, and one or more vibration apparatuses connected to the vibration member, the one or more vibration apparatuses may include a vibration portion, a first electrode portion at a first surface of the vibration portion, a second electrode portion at a second surface different from the first surface of the vibration portion, a first cover member on the first electrode portion, a second cover member under the second electrode portion, a first adhesive layer between the first electrode portion and the first cover member, a second adhesive layer between the second electrode portion and the second cover member, and a signal cable configured to apply a signal to each of the first electrode portion and the second electrode portion, at least a portion of the signal cable may be accommodated into one or more of the first adhesive layer and the second adhesive layer.

According to various embodiments of the present disclosure, the vibration member may output a sound based on vibrations of the one or more vibration apparatuses, and the vibration member may include one or more materials of metal, plastic, fiber, leather, wood, cloth, paper, rubber, and glass.

According to various embodiments of the present disclosure, the vibration member may include one of a display panel including a pixel displaying an image, a screen panel on which an image is projected from a display apparatus, a lighting panel, a signage panel, a vehicular interior material, a vehicular exterior material, a vehicular window, a mirror, an indoor ceiling of a building, and a window of a building.

A vehicular apparatus or a vehicle according to various embodiments of the present disclosure may include an exterior material, an interior material covering the exterior material, and one or more vibration generating apparatuses in one or more of the exterior material, the interior material, and a region between the exterior material and the interior material, the one or more vibration generating apparatuses may include the a vibration portion, a first electrode portion at a first surface of the vibration portion and configured with a conductive adhesive member, and a second electrode portion at a second surface different from the first surface of the vibration portion, and one or more of the interior material and the exterior material may output a sound based on vibrations of the one or more vibration generating apparatuses.

A vehicular apparatus according to various embodiments of the present disclosure may include an exterior material, an interior material covering the exterior material, and one or more vibration generating apparatuses in one or more of the exterior material, the interior material, and a region between the exterior material and the interior material, the one or more vibration generating apparatuses may include the a vibration portion, a first electrode portion at a first surface of the vibration portion, a second electrode portion at a second surface different from the first surface of the vibration portion, a first cover member on the first electrode portion, a second cover member under the second electrode portion, a first adhesive layer between the first electrode portion and the first cover member, a second adhesive layer between the second electrode portion and the second cover member, and a signal cable applying a signal to each of the first electrode portion and the second electrode portion, at least a portion of the signal cable may be accommodated into one or more of the first adhesive layer and the second adhesive layer, and one or more of the interior material and the exterior material may output a sound based on vibrations of the one or more vibration generating apparatuses.

According to various embodiments of the present disclosure, the interior material may include one or more materials of metal, plastic, fiber, leather, wood, cloth, rubber, and paper.

According to various embodiments of the present disclosure, the interior material may include one or more of a dashboard, a pillar interior material, a roof interior material, a door interior material, a seat interior material, a handle interior material, a floor interior material, and a rear package interior material, and the one or more vibration generating apparatuses may vibrate one or more of the dashboard, the pillar interior material, the roof interior material, the door interior material, the seat interior material, the handle interior material, the floor interior material, and the rear package interior material.

According to various embodiments of the present disclosure, the vehicular apparatus or vehicle may further include a window, and a transparent vibration generating apparatus disposed in the window.

According to various embodiments of the present disclosure, the window may include one or more of a front window, a side window, a rear window, and a roof window of a vehicular apparatus, and the transparent vibration gen-erating apparatus may vibrate one or more of the front window, the side window, the rear window, and the roof window.

An apparatus according to an embodiment of the present disclosure may be configured with a vibration apparatus including an electrode including a conductive adhesive member, thereby providing a structure-simplified vibration apparatus and an apparatus and a vehicular apparatus includ-ing the vibration apparatus.

It will be apparent to those skilled in the art that various modifications and variations can be made in the present disclosure without departing from the technical idea or scope of the disclosures. Thus, it is intended that the present disclosure cover the modifications and variations of this disclosure provided they come within the scope of the appended claims and their equivalents.

What is claimed is:

1. A vibration apparatus, comprising: a vibration portion; a first electrode portion at a first surface of the vibration portion and configured with a conductive adhesive member; and a second electrode portion at a second surface different from the first surface of the vibration portion; and further comprising a signal cable connected to the first electrode portion and the second electrode portion, wherein the signal cable comprises: a line layer connected to each of the first electrode portion and the second electrode portion; a first protection film at a first surface of the line layer; and a second protection film at a second surface different from the first surface of the line layer.

2. The vibration apparatus of claim 1, wherein the second electrode portion comprises the same material as a material of the first electrode portion.

3. The vibration apparatus of claim 1, wherein the second electrode portion comprises the conductive adhesive mem-ber.

4. The vibration apparatus of claim 1, wherein a size of the vibration portion differs from a size of one or more of the first electrode portion and the second electrode portion.

5. The vibration apparatus of claim 1, wherein a size of the vibration portion is greater than a size of one or more of the first electrode portion and the second electrode portion.

6. The vibration apparatus of claim 1, wherein the vibra-tion portion protrudes from one or more of the first electrode portion and the second electrode portion.

7. The vibration apparatus of claim 1, wherein the con-ductive adhesive member comprises:
a first adhesive;
a conductive layer on the first adhesive; and
a second adhesive on the conductive layer.

8. The vibration apparatus of claim 1, further comprising:
a first cover member at the first electrode portion; and
a second cover member at the second electrode portion.

9. The vibration apparatus of claim 8, wherein:
the first cover member contacts the first electrode portion; and
the second cover member contacts the second electrode portion.

10. The vibration apparatus of claim 8, wherein:
the first electrode portion contacts the first surface of the vibration portion and the first cover member; and
the second electrode portion contacts the second surface of the vibration portion and the second cover member.

11. The vibration apparatus of claim 8, further comprising:
    a first adhesive layer between the first cover member and the first electrode portion; and
    a second adhesive layer between the second cover member and the second electrode portion.

12. The vibration apparatus of claim 1, wherein the line layer contacts one or more of the first electrode portion and the second electrode portion.

13. The vibration apparatus of claim 1, wherein the signal cable further comprises a stiff portion overlapping one or more of the first protection film and the second protection film.

14. The vibration apparatus of claim 11, further comprising a signal cable connected to the first electrode portion and the second electrode portion,
    wherein one side of the signal cable is accommodated into the first adhesive layer and the second adhesive layer.

15. The vibration apparatus of claim 1, wherein the vibration portion comprises a plurality of inorganic material portions having a piezoelectric characteristic and an organic material portion between the plurality of inorganic material portions.

16. The vibration apparatus of claim 1, further comprising:
    a vibration member connected to one of the first electrode portion and the second electrode portion; and
    a plate between the vibration member and the vibration apparatus.

17. The vibration apparatus of claim 16, further comprising:
    a first vibration apparatus including the vibration portion, the first electrode portion, and the second electrode portion; and
    a second vibration apparatus including the vibration portion, the first electrode portion, and the second electrode portion,
    wherein the vibration member comprises a first region and a second region, and
    wherein the first vibration apparatus is disposed at the first region, and the second vibration apparatus is disposed at the second region.

18. The vibration apparatus of claim 1, further comprising two or more vibration generators including the vibration portion, the first electrode portion, and the second electrode portion,
    wherein the two or more vibration generators are stacked to vibrate in the same direction.

19. The vibration apparatus of claim 1, further comprising a vibration member connected to one of the first electrode portion and the second electrode portion,
    wherein the vibration member further comprises a plate, and
    wherein the plate comprises a metal material, or comprises a single nonmetal or composite nonmetal material including one or more of wood, plastic, glass, cloth, fiber, rubber, paper, and leather.

20. The vibration apparatus of claim 19, wherein each of the vibration member and the plate has the same size.

21. The vibration apparatus of claim 1, further comprising a vibration member connected to one of the first electrode portion and the second electrode portion,
    wherein the vibration member comprises one or more of a display panel including a plurality of pixels configured to display an image, a light emitting diode lighting panel, an organic light emitting diode lighting panel, and an inorganic light emitting diode lighting panel.

22. The vibration apparatus of claim 1, further comprising a vibration member connected to one of the first electrode portion and the second electrode portion,
    wherein the vibration member comprises one or more of a display panel including a pixel configured to display an image, a screen panel on which an image is to be projected from a display apparatus, a lighting panel, a signage panel, a vehicular interior material, a vehicular window, a vehicular exterior material, a ceiling material of a building, an interior material of a building, a window of a building, an interior material of an aircraft, a window of an aircraft, wood, plastic, glass, metal, cloth, fiber, paper, rubber, leather, and mirror.

23. An apparatus, comprising:
    a vibration member including a plurality of regions; and
    one or more vibration apparatuses connected to the vibration member and disposed in one or more of the plurality of regions,
    wherein the one or more vibration apparatuses comprise the vibration apparatus of claim 1.

24. The apparatus of claim 23, wherein the plurality of regions are first to sixth regions.

25. The apparatus of claim 23, wherein the plurality of regions are first to ninth regions.

26. The apparatus of claim 23, wherein the plurality of regions are first to eleventh regions.

27. The apparatus of claim 23, wherein the plurality of regions are first to fifteenth regions.

28. The apparatus of claim 23, further comprising:
    one or more partitions disposed to separate the plurality of regions from each other.

29. An apparatus, comprising:
    a vibration member; and
    one or more vibration apparatuses connected to the vibration member,
    wherein the one or more vibration apparatuses comprise the vibration apparatus of claim 1.

30. The apparatus of claim 29, wherein the vibration member outputs a sound based on vibrations of the one or more vibration apparatuses, and
    wherein the vibration member comprises one or more materials of metal, plastic, fiber, leather, wood, cloth, paper, rubber, and glass.

31. The apparatus of claim 29, wherein the vibration member comprises one of a display panel including a pixel configured to display an image, a screen panel on which an image is to be projected from a display apparatus, a lighting panel, a signage panel, a vehicular interior material, a vehicular exterior material, a vehicular window, a mirror, an indoor ceiling of a building, and a window of a building.

32. A vehicular apparatus, comprising:
    an exterior material;
    an interior material covering the exterior material; and
    one or more vibration generating apparatuses in one or more of the exterior material, the interior material, and a region between the exterior material and the interior material,
    wherein the one or more vibration generating apparatuses comprise the vibration apparatus of claim 1, and
    one or more of the interior material and the exterior material output a sound based on vibrations of the one or more vibration generating apparatuses.

33. The vehicular apparatus of claim 32, wherein the interior material comprises one or more materials of metal, plastic, fiber, leather, wood, cloth, rubber, and paper.

34. The vehicular apparatus of claim 32, wherein the interior material comprises one or more of a dashboard, a pillar interior material, a roof interior material, a door interior material, a seat interior material, a handle interior material, a floor interior material, and a rear package interior material, and wherein the one or more vibration generating apparatuses vibrate one or more of the dashboard, the pillar interior material, the roof interior material, the door interior material, the seat interior material, the handle interior material, the floor interior material, and the rear package interior material.

35. The vehicular apparatus of claim 32, further comprising:

a window; and a transparent vibration generating apparatus disposed in the window.

36. The vehicular apparatus of claim 35, wherein the window comprises one or more of a front window, a side window, a rear window, and a roof window of a vehicular apparatus, and wherein the transparent vibration generating apparatus vibrates one or more of the front window, the side window, the rear window, and the roof window.

37. A vibration apparatus, comprising:

a vibration portion;

a first electrode portion at a first surface of the vibration portion;

a second electrode portion at a second surface different from the first surface of the vibration portion;

a first cover member on the first electrode portion;

a second cover member under the second electrode portion;

a first adhesive layer between the first electrode portion and the first cover member;

a second adhesive layer between the second electrode portion and the second cover member; and a signal cable configured to apply a signal to each of the first electrode portion and the second electrode portion, wherein at least a portion of the signal cable is accommodated into one or more of the first adhesive layer and the second adhesive layer; and wherein the signal cable comprises a line layer between a first protection film and a second protection film, and wherein the first protection film, the second protection film, and the line layer are accommodated into one or more of the first adhesive layer and the second adhesive layer.

38. The vibration apparatus of claim 37, wherein one of the first electrode portion and the second electrode portion comprises a conductive adhesive member.

39. The vibration apparatus of claim 37, wherein the line layer is connected to the first electrode portion and the second electrode portion.

40. An apparatus, comprising:

a vibration member including a plurality of regions; and one or more vibration apparatuses connected to the vibration member and disposed in one or more of the plurality of regions, wherein the one or more vibration apparatuses comprise the vibration apparatus of claim 37.

41. The apparatus of claim 40, wherein the plurality of regions are first to sixth regions.

42. The apparatus of claim 40, wherein the plurality of regions are first to ninth regions.

43. The apparatus of claim 40, wherein the plurality of regions are first to eleventh regions.

44. The apparatus of claim 40, wherein the plurality of regions are first to fifteenth regions.

45. The apparatus of claim 40, further comprising:

one or more partitions disposed to separate the plurality of regions from each other.

46. An apparatus, comprising:

a vibration member; and one or more vibration apparatuses connected to the vibration member, wherein the one or more vibration apparatuses comprise the vibration apparatus of claim 37.

47. The apparatus of claim 46, wherein the vibration member outputs a sound based on vibrations of the one or more vibration apparatuses, and wherein the vibration member comprises one or more materials of metal, plastic, fiber, leather, wood, cloth, paper, rubber, and glass.

48. The apparatus of claim 46, wherein the vibration member comprises one of a display panel including a pixel configured to display an image, a screen panel on which an image is to be projected from a display apparatus, a lighting panel, a signage panel, a vehicular interior material, a vehicular exterior material, a vehicular window, a mirror, an indoor ceiling of a building, and a window of a building.

49. A vehicular apparatus, comprising:

an exterior material;

an interior material covering the exterior material; and one or more vibration generating apparatuses in one or more of the exterior material, the interior material, and a region between the exterior material and the interior material, wherein the one or more vibration generating apparatuses comprise the vibration apparatus of claim 24, and one or more of the interior material and the exterior material output a sound based on vibrations of the one or more vibration generating apparatuses.

50. The vehicular apparatus of claim 49, wherein the interior material comprises one or more materials of metal, plastic, fiber, leather, wood, cloth, rubber, and paper.

51. The vehicular apparatus of claim 49, wherein the interior material comprises one or more of a dashboard, a pillar interior material, a roof interior material, a door interior material, a seat interior material, a handle interior material, a floor interior material, and a rear package interior material, and wherein the one or more vibration generating apparatuses vibrate one or more of the dashboard, the pillar interior material, the roof interior material, the door interior material, the seat interior material, the handle interior material, the floor interior material, and the rear package interior material.

52. The vehicular apparatus of claim 49, further comprising:

a window; and a transparent vibration generating apparatus disposed in the window.

53. The vehicular apparatus of claim 52, wherein the window comprises one or more of a front window, a side window, a rear window, and a roof window of a vehicular apparatus, and wherein the transparent vibration generating apparatus vibrates one or more of the front window, the side window, the rear window, and the roof window.

* * * * *